United States Patent
Lu et al.

(10) Patent No.: US 11,934,417 B2
(45) Date of Patent: *Mar. 19, 2024

(54) DYNAMICALLY MONITORING AN INFORMATION TECHNOLOGY NETWORKED ENTITY

(71) Applicant: Splunk Inc., San Francisco, CA (US)

(72) Inventors: Ai-Chi Lu, San Francisco, CA (US);
Arun Ramani, Bellevue, WA (US);
Nicholas Matthew Tankersley, Seattle, CA (US)

(73) Assignee: Splunk Inc., San Francisco, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 17/373,580

(22) Filed: Jul. 12, 2021

(65) Prior Publication Data
US 2021/0342337 A1 Nov. 4, 2021

Related U.S. Application Data

(63) Continuation of application No. 16/049,628, filed on Jul. 30, 2018, now Pat. No. 11,093,518, which is a
(Continued)

(51) Int. Cl.
*G06F 7/00* (2006.01)
*G06F 3/04847* (2022.01)
(Continued)

(52) U.S. Cl.
CPC ........ *G06F 16/248* (2019.01); *G06F 3/04847* (2013.01); *G06F 16/9535* (2019.01); *G06F 3/04842* (2013.01)

(58) Field of Classification Search
None
See application file for complete search history.

(56) References Cited

U.S. PATENT DOCUMENTS 5,717,911 A 2/1998 Madrid
6,611,867 B1 8/2003 Bowman-Amuah
(Continued)

FOREIGN PATENT DOCUMENTS

WO WO 2013/119200 8/2013

OTHER PUBLICATIONS

"vSphere Monitoring and Performance", VMware, Inc., Update 1, vSphere 5.5, EN-001357-02, 2010-2014, pp. 1-174, http://pubs.vmware.com/vsphere-55/topic/com.vmware.ICbase/PDF/vsphere-esxi-vcenter-server-551-monitoring-performace-guide.pdf.
(Continued)

*Primary Examiner* — Tuan A Pham
(74) *Attorney, Agent, or Firm* — Knobbe, Martens, Olson & Bear, LLP

(57) ABSTRACT

Data intake and query system (DIQS) instances supporting applications including lower-tier, focused, work group oriented applications, are tailored to display the metrics for the needs of the user. An interface caused by operation of an entity monitoring system (EMS) operating in conjunction with the lower-tier DIQS displays the monitored entities as individual representations. The user selects a metric and a metric threshold. The EMS causes a display of an interface having a representation for each monitored entity. Each representation includes a metric value and indicates an entity status based on the metric value and the threshold. The user can dynamically change the threshold on the interface for easy visualization of aggregation of monitored entities to determine the performance of the infrastructure. The interface also provides the user with the ability to select an entity and click through to the entity analysis workspace for more detailed information.

20 Claims, 88 Drawing Sheets

Related U.S. Application Data continuation-in-part of application No. 15/885,632, filed on Jan. 31, 2018, now abandoned, which is a continuation-in-part of application No. 15/713,606, filed on Sep. 23, 2017, now Pat. No. 11,200,130.

(60) Provisional application No. 62/563,010, filed on Sep. 25, 2017.

(51) Int. Cl.
*G06F 16/00* (2019.01)
*G06F 16/248* (2019.01)
*G06F 16/9535* (2019.01)
*G06F 3/04842* (2022.01)

(56) References Cited

U.S. PATENT DOCUMENTS

| | | |
|---|---|---|
| 6,704,012 B1 | 3/2004 | Lefave |
| 6,905,827 B2 | 6/2005 | Wohlgemuth et al. |
| 7,026,121 B1 | 4/2006 | Wohlgemuth et al. |
| 7,050,432 B1 | 5/2006 | Banavar et al. |
| 7,124,101 B1 | 10/2006 | Mikurak |
| 7,235,358 B2 | 6/2007 | Wohlgemuth et al. |
| 7,299,358 B2 | 11/2007 | Chateau et al. |
| 7,315,826 B1 | 1/2008 | Guheen et al. |
| 7,321,894 B2 | 1/2008 | Degtyar |
| 7,444,342 B1 | 10/2008 | Hall et al. |
| 7,461,334 B1 | 12/2008 | Lu et al. |
| 7,613,801 B2 | 11/2009 | Cote et al. |
| 7,660,787 B2 | 2/2010 | Borrillo et al. |
| 7,680,721 B2 | 3/2010 | Cutler |
| 7,711,670 B2 | 5/2010 | Roediger |
| 7,716,253 B2 | 5/2010 | Netz et al. |
| 7,778,952 B2 | 8/2010 | Vespe et al. |
| 7,792,784 B2 | 9/2010 | Gupta |
| 7,800,613 B2 | 9/2010 | Hanrahan et al. |
| 7,822,662 B2 | 10/2010 | Guzik et al. |
| 7,822,708 B1 | 10/2010 | Mathew et al. |
| 7,848,260 B2 | 12/2010 | Cowan |
| 7,849,069 B2 | 12/2010 | Liu et al. |
| 7,877,359 B2 | 1/2011 | Kodama et al. |
| 7,937,344 B2 | 5/2011 | Baum et al. |
| 7,945,596 B2 | 5/2011 | Anonsen et al. |
| 8,050,921 B2 | 11/2011 | Mark et al. |
| 8,056,130 B1 | 11/2011 | Njemanze et al. |
| 8,095,417 B2 | 1/2012 | Handy et al. |
| 8,099,400 B2 | 1/2012 | Haub et al. |
| 8,112,425 B2 | 2/2012 | Baum et al. |
| 8,126,891 B2 | 2/2012 | Laxman et al. |
| 8,176,069 B2 | 5/2012 | Timm et al. |
| 8,234,308 B2 | 7/2012 | Brunswig et al. |
| 8,266,148 B2 | 9/2012 | Guha et al. |
| 8,320,261 B2 | 11/2012 | Vasamsetti et al. |
| 8,327,335 B2 | 12/2012 | Noble et al. |
| 8,341,164 B1 | 12/2012 | Rosenberg et al. |
| 8,356,047 B2 | 1/2013 | Narayanan et al. |
| 8,364,460 B2 | 1/2013 | Ostermeyer et al. |
| 8,370,324 B2 | 2/2013 | Kiyama et al. |
| 8,412,696 B2 | 4/2013 | Zhang et al. |
| 8,488,460 B2 | 7/2013 | Holm-Öste et al. |
| 8,538,787 B2 | 9/2013 | Braun et al. |
| 8,543,527 B2 | 9/2013 | Bates et al. |
| 8,560,366 B2 | 10/2013 | Mikurak |
| 8,589,403 B2 | 11/2013 | Marquardt et al. |
| 8,613,083 B1 | 12/2013 | Njemanze et al. |
| 8,682,925 B1 | 3/2014 | Marquardt et al. |
| 8,712,953 B2 | 4/2014 | Beringer et al. |
| 8,732,213 B2 | 5/2014 | Sowell et al. |
| 8,738,414 B1 | 5/2014 | Nagar et al. |
| 8,751,529 B2 | 6/2014 | Zhang et al. |
| 8,762,313 B2 | 6/2014 | Lahav et al. |
| 8,788,525 B2 | 7/2014 | Neels et al. |
| 8,793,225 B1 | 7/2014 | Bitincka et al. |
| 8,806,361 B1 | 8/2014 | Noel et al. |
| 8,825,752 B1 | 9/2014 | Madhavan |
| 8,898,277 B2 | 11/2014 | Chen |
| 8,948,369 B2 | 2/2015 | Shaffer et al. |
| 8,990,167 B2 | 3/2015 | Noor |
| 9,003,062 B1 | 4/2015 | Nampally et al. |
| 9,031,889 B1 | 5/2015 | Basu et al. |
| 9,031,901 B1 | 5/2015 | King et al. |
| 9,069,788 B2 | 6/2015 | Dutta et al. |
| 9,130,832 B1 | 9/2015 | Boe et al. |
| 9,130,860 B1 | 9/2015 | Boe et al. |
| 9,146,954 B1 | 9/2015 | Boe et al. |
| 9,146,962 B1 | 9/2015 | Boe et al. |
| 9,158,811 B1 | 10/2015 | Choudhary et al. |
| 9,204,319 B2 | 12/2015 | Ouyang et al. |
| 9,208,463 B1 | 12/2015 | Bhide et al. |
| 9,210,056 B1 | 12/2015 | Choudhary et al. |
| 9,215,240 B2 | 12/2015 | Merza et al. |
| 9,218,676 B2 | 12/2015 | Brugler et al. |
| 9,274,668 B2 | 3/2016 | Powers et al. |
| 9,286,413 B1 | 3/2016 | Coates et al. |
| 9,294,361 B1 | 3/2016 | Choudhary et al. |
| 9,413,890 B2 | 8/2016 | McCormack et al. |
| 9,443,015 B1 | 9/2016 | Eischeid et al. |
| 9,521,052 B1 | 12/2016 | Nandyalam et al. |
| 9,584,374 B2 | 2/2017 | Bingham et al. |
| 9,639,662 B2 | 5/2017 | Sethumadhavan et al. |
| 10,097,597 B2 | 10/2018 | Chandrasekhara et al. |
| 10,127,258 B2 | 11/2018 | Lamas et al. |
| 10,152,561 B2 | 12/2018 | Choudhary et al. |
| 10,176,217 B1 | 1/2019 | Dang et al. |
| 10,417,108 B2 | 9/2019 | Tankersley et al. |
| 10,417,225 B2 | 9/2019 | Tankersley et al. |
| 10,346,744 B2 | 10/2019 | Dodson |
| 10,474,680 B2 | 11/2019 | Ramani et al. |
| 11,093,518 B1 | 8/2021 | Lu et al. |
| 11,106,442 B1 | 8/2021 | Hsiao et al. |
| 11,159,397 B2 | 10/2021 | Hardin et al. |
| 2001/0049682 A1 | 12/2001 | Vincent et al. |
| 2001/0051998 A1 | 12/2001 | Henderson |
| 2002/0091689 A1 | 7/2002 | Wiens et al. |
| 2002/0099578 A1 | 7/2002 | Eicher et al. |
| 2003/0005024 A1 | 1/2003 | Grumann |
| 2003/0033288 A1 | 2/2003 | Shanahan et al. |
| 2003/0083846 A1 | 5/2003 | Curtin et al. |
| 2003/0120764 A1 | 6/2003 | Laye et al. |
| 2003/0174173 A1 | 9/2003 | Nishiyama et al. |
| 2003/0181310 A1 | 9/2003 | Chamock et al. |
| 2003/0225549 A1 | 12/2003 | Shay et al. |
| 2004/0006556 A1 | 1/2004 | Kwoh |
| 2004/0024770 A1 | 2/2004 | Cardno |
| 2004/0030668 A1 | 2/2004 | Pawlowski et al. |
| 2004/0085907 A1 | 5/2004 | Daggett |
| 2004/0260566 A1 | 12/2004 | King |
| 2005/0021733 A1 | 1/2005 | Clinton et al. |
| 2005/0060048 A1 | 3/2005 | Pierre et al. |
| 2005/0081157 A1 | 4/2005 | Clark et al. |
| 2005/0086207 A1 | 4/2005 | Heuer et al. |
| 2005/0171833 A1 | 8/2005 | Jost et al. |
| 2005/0181835 A1 | 8/2005 | Lau et al. |
| 2005/0216831 A1 | 9/2005 | Guzik et al. |
| 2005/0234972 A1 | 10/2005 | Zeng et al. |
| 2005/0256766 A1 | 11/2005 | Garcia et al. |
| 2005/0289138 A1 | 12/2005 | Cheng et al. |
| 2006/0004624 A1 | 1/2006 | Melara et al. |
| 2006/0010164 A1 | 1/2006 | Netz |
| 2006/0050622 A1 | 3/2006 | So |
| 2006/0156250 A1 | 7/2006 | Chaudhri et al. |
| 2006/0159017 A1 | 7/2006 | Mun et al. |
| 2006/0221387 A1 | 10/2006 | Swift et al. |
| 2006/0224638 A1 | 10/2006 | Wald et al. |
| 2006/0288072 A1 | 12/2006 | Knapp et al. |
| 2007/0005388 A1 | 1/2007 | Busch et al. |
| 2007/0150480 A1 | 6/2007 | Hwang et al. |
| 2007/0191108 A1 | 8/2007 | Brunet De Courssou et al. |
| 2007/0192150 A1 | 8/2007 | Belkin et al. |
| 2007/0208601 A1 | 9/2007 | Pulianda |
| 2007/0234198 A1 | 10/2007 | Tien et al. |
| 2007/0260625 A1 | 11/2007 | Tien et al. |
| 2007/0276815 A1 | 11/2007 | Nabio et al. |

(56) References Cited

U.S. PATENT DOCUMENTS

| | | |
|---|---|---|
| 2007/0282912 A1 | 12/2007 | Reiner |
| 2008/0046414 A1 | 2/2008 | Haub et al. |
| 2008/0046457 A1 | 2/2008 | Haub et al. |
| 2008/0059258 A1 | 3/2008 | Lee et al. |
| 2008/0081632 A1 | 4/2008 | Malik |
| 2008/0097807 A1 | 4/2008 | Chang et al. |
| 2008/0120129 A1 | 5/2008 | Seubert et al. |
| 2008/0126417 A1 | 5/2008 | Mazurik |
| 2008/0140514 A1 | 6/2008 | Stenger |
| 2008/0163015 A1 | 7/2008 | Kagan et al. |
| 2008/0168376 A1 | 7/2008 | Tien et al. |
| 2008/0172629 A1 | 7/2008 | Tien et al. |
| 2008/0177595 A1 | 7/2008 | Wu et al. |
| 2008/0201397 A1 | 8/2008 | Peng et al. |
| 2008/0244453 A1 | 10/2008 | Cafer |
| 2008/0256516 A1 | 10/2008 | Chaar et al. |
| 2008/0313119 A1 | 12/2008 | Leskovec et al. |
| 2008/0317217 A1 | 12/2008 | Bernardini et al. |
| 2009/0013246 A1 | 1/2009 | Cudich et al. |
| 2009/0018996 A1 | 1/2009 | Hunt et al. |
| 2009/0064025 A1 | 3/2009 | Christ et al. |
| 2009/0083649 A1 | 3/2009 | Baier et al. |
| 2009/0112932 A1 | 4/2009 | Skierkowski et al. |
| 2009/0125577 A1 | 5/2009 | Kodama et al. |
| 2009/0187595 A1 | 7/2009 | Akiyama |
| 2009/0222749 A1 | 9/2009 | Marinescu et al. |
| 2009/0265637 A1 | 10/2009 | Lee et al. |
| 2009/0287694 A1 | 11/2009 | McGowan et al. |
| 2009/0313503 A1 | 12/2009 | Atluri et al. |
| 2009/0319320 A1 | 12/2009 | Daughtrey et al. |
| 2010/0023362 A1 | 1/2010 | Nguyen et al. |
| 2010/0031234 A1 | 2/2010 | Chaar et al. |
| 2010/0042680 A1 | 2/2010 | Czyzewicz et al. |
| 2010/0094676 A1 | 4/2010 | Perra et al. |
| 2010/0115389 A1 | 5/2010 | Gautestad |
| 2010/0123575 A1 | 5/2010 | Mittal et al. |
| 2010/0150139 A1 | 6/2010 | Lawson et al. |
| 2010/0185710 A1 | 7/2010 | Kiyama et al. |
| 2010/0185961 A1 | 7/2010 | Fisher et al. |
| 2010/0229096 A1 | 9/2010 | Maiocco et al. |
| 2010/0306229 A1 | 12/2010 | Timm et al. |
| 2010/0324927 A1 | 12/2010 | Tinsley |
| 2010/0324962 A1 | 12/2010 | Nesler et al. |
| 2010/0332466 A1 | 12/2010 | White et al. |
| 2011/0016123 A1 | 1/2011 | Pandey |
| 2011/0106453 A1 | 5/2011 | Krieflewirth |
| 2011/0113341 A1 | 5/2011 | Liensberger et al. |
| 2011/0178977 A1 | 7/2011 | Drees |
| 2011/0179368 A1 | 7/2011 | King et al. |
| 2011/0191314 A1 | 8/2011 | Howes et al. |
| 2011/0214081 A1 | 9/2011 | Dorbin et al. |
| 2011/0219045 A1 | 9/2011 | Yanai et al. |
| 2011/0261055 A1 | 10/2011 | Wong et al. |
| 2011/0264663 A1 | 10/2011 | Verkasalo |
| 2011/0313817 A1 | 12/2011 | Wang |
| 2012/0005581 A1 | 1/2012 | Tuner |
| 2012/0005593 A1 | 1/2012 | Redpath |
| 2012/0029977 A1 | 2/2012 | Alcorn et al. |
| 2012/0057688 A1 | 3/2012 | Pickering |
| 2012/0078903 A1 | 3/2012 | Bergstein et al. |
| 2012/0089650 A1 | 4/2012 | Gibbs et al. |
| 2012/0102024 A1 | 4/2012 | Campbell et al. |
| 2012/0131187 A1 | 5/2012 | Cancel et al. |
| 2012/0158521 A1 | 6/2012 | McCullen |
| 2012/0162265 A1 | 6/2012 | Heinrich et al. |
| 2012/0197934 A1 | 8/2012 | Zhang et al. |
| 2012/0259583 A1 | 10/2012 | Noboa et al. |
| 2012/0260306 A1 | 10/2012 | Niemanze et al. |
| 2012/0295633 A1 | 11/2012 | Tom-Tov et al. |
| 2013/0018686 A1 | 1/2013 | Wright et al. |
| 2013/0018703 A1 | 1/2013 | Majeed et al. |
| 2013/0110758 A1 | 5/2013 | Jung et al. |
| 2013/0137516 A1 | 5/2013 | Griswold |
| 2013/0142322 A1 | 6/2013 | Grasso et al. |
| 2013/0151370 A1 | 6/2013 | Round et al. |
| 2013/0155873 A1 | 6/2013 | Berg et al. |
| 2013/0157616 A1 | 6/2013 | Berg et al. |
| 2013/0166490 A1 | 6/2013 | Elkins et al. |
| 2013/0182700 A1 | 7/2013 | Figura et al. |
| 2013/0185306 A1 | 7/2013 | Botros |
| 2013/0185693 A1 | 7/2013 | Chaar et al. |
| 2013/0205023 A1 | 8/2013 | Bemardini et al. |
| 2013/0238403 A1 | 9/2013 | Benson |
| 2013/0262279 A1 | 10/2013 | Finley et al. |
| 2013/0262347 A1 | 10/2013 | Dodson |
| 2013/0318066 A1 | 11/2013 | Atherton |
| 2013/0318236 A1 | 11/2013 | Coates et al. |
| 2013/0318589 A1 | 11/2013 | Ford et al. |
| 2013/0318603 A1 | 11/2013 | Merza |
| 2013/0325147 A1 | 12/2013 | Kamouskos |
| 2013/0326620 A1 | 12/2013 | Merza et al. |
| 2013/0332472 A1 | 12/2013 | Vogel et al. |
| 2014/0012983 A1 | 1/2014 | Brown et al. |
| 2014/0038583 A1 | 2/2014 | Berg et al. |
| 2014/0040285 A1 | 2/2014 | Rubinstein et al. |
| 2014/0040306 A1 | 2/2014 | Peregrine et al. |
| 2014/0067836 A1 | 3/2014 | Holmes et al. |
| 2014/0072115 A1 | 3/2014 | Makagon et al. |
| 2014/0122176 A1 | 5/2014 | Olsen et al. |
| 2014/0122711 A1 | 5/2014 | Lientz |
| 2014/0129298 A1 | 5/2014 | Hulen et al. |
| 2014/0146648 A1 | 5/2014 | Alber et al. |
| 2014/0156323 A1 | 6/2014 | Prieto |
| 2014/0157142 A1 | 6/2014 | Heinrich et al. |
| 2014/0160238 A1 | 6/2014 | Yim et al. |
| 2014/0177819 A1* | 6/2014 | Vymenets ........... H04M 3/5175 379/265.09 |
| 2014/0181087 A1 | 6/2014 | Wu et al. |
| 2014/0229462 A1 | 8/2014 | Lo |
| 2014/0236889 A1 | 8/2014 | Vasan et al. |
| 2014/0236890 A1 | 8/2014 | Vasan et al. |
| 2014/0279942 A1 | 9/2014 | Siepmann et al. |
| 2014/0280175 A1 | 9/2014 | Gelfand |
| 2014/0282586 A1 | 9/2014 | Shear et al. |
| 2014/0282600 A1 | 9/2014 | Siepmann et al. |
| 2014/0324448 A1 | 10/2014 | Lacy et al. |
| 2014/0336984 A1 | 11/2014 | Starr |
| 2014/0337510 A1 | 11/2014 | Gesmann |
| 2014/0337871 A1 | 11/2014 | Garcia De Bias et al. |
| 2014/0337938 A1 | 11/2014 | Abhyanker |
| 2014/0364114 A1 | 12/2014 | Zhao |
| 2014/0375650 A1 | 12/2014 | Grundstrom et al. |
| 2014/0376710 A1 | 12/2014 | Shaffer et al. |
| 2015/0026156 A1 | 1/2015 | Meek et al. |
| 2015/0026167 A1 | 1/2015 | Neels et al. |
| 2015/0050637 A1 | 2/2015 | James-Hatter et al. |
| 2015/0067809 A1 | 3/2015 | Madami et al. |
| 2015/0085681 A1 | 3/2015 | Bowdery et al. |
| 2015/0088442 A1 | 3/2015 | Farrar et al. |
| 2015/0089274 A1 | 3/2015 | Mares et al. |
| 2015/0112700 A1 | 4/2015 | Sublett et al. |
| 2015/0200824 A1 | 7/2015 | Sadovsky et al. |
| 2015/0243123 A1 | 8/2015 | Borissov et al. |
| 2015/0248214 A1* | 9/2015 | Gilger .................. G06T 11/206 715/719 |
| 2015/0254955 A1 | 9/2015 | Fields et al. |
| 2015/0269617 A1 | 9/2015 | Mikurak |
| 2015/0288753 A1 | 10/2015 | He et al. |
| 2015/0294048 A1 | 10/2015 | Jones |
| 2015/0310061 A1 | 10/2015 | Hengstler et al. |
| 2015/0310371 A1 | 10/2015 | Byrne et al. |
| 2015/0314681 A1 | 11/2015 | Riley et al. |
| 2015/0347113 A1 | 12/2015 | Abdel-Fattah et al. |
| 2015/0356182 A1 | 12/2015 | Ivershen et al. |
| 2016/0011979 A1 | 1/2016 | Islam et al. |
| 2016/0057020 A1 | 2/2016 | Halmstad et al. |
| 2016/0087856 A1 | 3/2016 | Groenendijk et al. |
| 2016/0092601 A1 | 3/2016 | Lamas et al. |
| 2016/0093226 A1 | 3/2016 | Machluf et al. |
| 2016/0094411 A1 | 3/2016 | Brennan et al. |
| 2016/0103862 A1 | 4/2016 | Boe et al. |
| 2016/0103883 A1 | 4/2016 | Ramani et al. |
| 2016/0103890 A1 | 4/2016 | Boe et al. |
| 2016/0103891 A1 | 4/2016 | Choudhary et al. |

(56) References Cited

U.S. PATENT DOCUMENTS

| | | | |
|---|---|---|---|
| 2016/0105329 A1 | 4/2016 | Coates et al. | |
| 2016/0105334 A1* | 4/2016 | Boe | G06F 16/24 707/601 |
| 2016/0105335 A1 | 4/2016 | Choudhary et al. | |
| 2016/0132575 A1 | 5/2016 | Fletcher et al. | |
| 2016/0147380 A1 | 5/2016 | Coates et al. | |
| 2016/0216855 A1 | 7/2016 | Choudhary et al. | |
| 2016/0267420 A1 | 9/2016 | Budic | |
| 2016/0287987 A1 | 10/2016 | Onda et al. | |
| 2017/0046127 A1 | 2/2017 | Fletcher et al. | |
| 2017/0046181 A1 | 2/2017 | Williams et al. | |
| 2017/0046374 A1 | 2/2017 | Fletcher et al. | |
| 2017/0091007 A1 | 3/2017 | Dasari | |
| 2017/0113143 A1 | 4/2017 | Marr et al. | |
| 2017/0126486 A1 | 5/2017 | Prieto et al. | |
| 2017/0155540 A1 | 6/2017 | Tee et al. | |
| 2017/0155558 A1 | 6/2017 | Alekseyev et al. | |
| 2017/0195195 A1 | 7/2017 | Fletcher | |
| 2017/0308610 A1 | 10/2017 | Mullins et al. | |
| 2017/0329991 A1 | 11/2017 | Van Dyne et al. | |
| 2017/0331709 A1 | 11/2017 | Lam et al. | |
| 2018/0007081 A1 | 1/2018 | Friend et al. | |
| 2018/0024901 A1 | 1/2018 | Tankersley et al. | |
| 2018/0046926 A1 | 2/2018 | Achin et al. | |
| 2018/0089262 A1 | 3/2018 | Bhattacharjee et al. | |
| 2018/0113994 A1 | 4/2018 | Sexton et al. | |
| 2018/0167476 A1 | 6/2018 | Hoffner et al. | |
| 2018/0217395 A1 | 8/2018 | Lin et al. | |
| 2019/0026280 A1 | 1/2019 | Aviyam | |
| 2019/0095478 A1 | 3/2019 | Tankersley et al. | |
| 2019/0098106 A1 | 3/2019 | Mungel et al. | |
| 2019/0342307 A1 | 11/2019 | Gamble et al. | |
| 2020/0059483 A1 | 2/2020 | Weingarten et al. | |
| 2022/0045919 A1 | 2/2022 | Hardin | |

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carasso, David, "Exploring Splunk Search Processing Language (SPL) Primer and Cookbook", Splunk Inc., 2012, :;ITO Research, New York, 156 Pages.

Coates, "Cognitive Splunking", Splunk-blogs, Slogs-Security, 103. Sep. 17, 2012, http://blogs.splunk.com/2012/09/17 /cognitive-splunking/.

http://docs.splunk.com/Documentation/PCI/2.1.1/ [000119] User/IncidentReviewdashboard, 2 Pages (Last accessed Aug. 5, 2014).

SLAML 10 Reports, Workshop on Managing Systems via Log Analysis and Machine Learning Techniques, ;login: Feb. 2011 Conference Reports.

Splunk Enterprise 8.0.0 Overview, available online, retrieved May 20, 2020 from docs.splunk.com.

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

The OI Difference: Two Major Differences between OI & BI. Publisher: Vitria. Alleged Publication Date: Feb. 8, 2011. URL: http://www.vitria.com/blog/The-OI-Difference-Two-Major-Differences-Between-OI-BI/.

Vaid, Workshop on Managing Systems via log Analysis and Machine Learning Techniques (SLAML '10), ;login: vol. 36, No. 1, Oct. 3, 2010, Vancouver, BC, Canada.

Basnet, et al., "Analysis of Multifactorial Social Unrest Events with Spatio-Temporal k-Dimensional Tree-based DBSCAN," In Proc. of the 2nd ACM SIGSPATIAL Workshop o Analytics for Local Events and News, Asso. For Computing Machinery, Article 2, 1-10. <https://doi.org/10.1145/3282866.3282870>, Nov. 2018.

Schulz, et al., "Small-Scale Incident Detection based on Microposts," In Proc. of the 26th ACM Conference on Hypertext & Social Media. Asso. for Computing Machinery, 3-12 <https://doi.org/10.1145/2700171.2791038>, Aug. 2015.

U.S. Appl. No. 17/163,212, filed Jan. 29, 2021.

* cited by examiner

| Time 535 | Host 536 | Source 537 | Source Type 538 | Event 539 |
|---|---|---|---|---|
| 531 — 10/10/2000 1:55 p.m. | www1 | access.log | access_combined | 127.0.0.1 - - frank [10/Oct/2000:13:55:36-0700] "GET /apache.gif HTTP/1.0" 200 2326 [0.0947]<br>540  541  542  545<br>543 |
| 532 — 10/10/2000 1:56 p.m. | www2 | access.log | access_combined | 127.0.0.1 - - bob [10/Oct/2000:13:56:36-0700] "GET/ mickey_mouse.gif HTTP/1.0" 200 [2980] [0.0899]<br>546 |
| 533 — 10/10/2000 1:57 p.m. | www2 | access.log | access_combined | 127.0.0.1 - - carlos [10/Oct/2000:13:57:36-0700] "GET /donald_duck.gif HTTP/1.0" 200 2900 0.0857 |
| 534 — 10/10/2000 1:58 p.m. | www2 | error.log | apache_error | [Sunday Oct 10 1:58:33 2010] [error] [client 127.10.1.1.015] File does not exist: /home/reba/ public_html/images/daffy_duck.gif |

FIG. 5C

| Row | Time | | Host | Source | Source Type | Event |
|---|---|---|---|---|---|---|
| 55000 | 10/10/2016 | 1:55 p.m. | www1 | access.log | access_combined | 127.0.0.1 - frank [10/Oct/2016:13:55:36 -0700] "GET /apache.gif HTTP/1.0" 200 2326 0.0947  _731_ |
| 55001 | 10/10/2016 | 1:56 p.m. | www2 | access.log | access_combined | 127.0.0.2 - bob [10/Oct/2015:13:56:36 -0700] "GET /mickey_mouse.gif HTTP/1.0" 200 2980 0.0899  _732_ |
| 55002 | 10/10/2016 | 1:57 p.m. | www2 | access.log | access_combined | 127.0.0.1 - carlos [10/Oct/2016:13:57:36 -0700] "GET /donald_duck.gif HTTP/1.0" 200 2900 0.0857 |
| 55003 | 10/10/2016 | 1:58 p.m. | www2 | error.log | apache_error | [Sunday Oct 10 1:58:33 2016] [error] [client 127.10.1.1.015] File does not exist: /home/reba/public_html/images/daffy_duck.gif |
| 55004 | 10/10/2016 | 1:59 p.m. | www1 | access.log | access_combined | 127.0.0.3 - virgil [10/Oct/2016:13:59:36 -0700] "GET /donald_duck.gif HTTP/1.0" 200 2900 0.0887 |
| 55005 | 10/10/2016 | 2:00 p.m. | www1 | access.log | access_combined | 127.0.0.1 - matt [10/Oct/2016:14:00:36 -0700] "GET /goofy.gif HTTP/1.0" 200 2920 0.0987  _733_ |
| 55006 | 10/10/2016 | 2:01 p.m. | www2 | error.log | apache_error | [Sunday Oct 10 2:01:33 2016] [error] [client 127.10.1.1.03] File does not exist: /home/public_html/images/furby.gif |
| 55007 | 10/10/2016 | 2:02 p.m. | www1 | access.log | access_combined | 127.0.0.1 - jack [10/Oct/2016:14:02:36 -0700] "GET /muppets.gif HTTP/1.0" 200 5000 0.0667  _734_ |

_723_

| Event Reference Value | Field Name | Field Value |
|---|---|---|
| 55000 | clientip | 127.0.0.1 |
| 55002 | clientip | 127.0.0.1 |
| 55005 | clientip | 127.0.0.1 |
| 55007 | clientip | 127.0.0.1 |

_722_

| Event Reference Value | Field Name | Field Value | User ID |
|---|---|---|---|
| 55000 | clientip | 127.0.0.1 | frank |
| 55005 | clientip | 127.0.0.1 | matt |

| Data Summary | | | |
|---|---|---|---|
| Hosts (5) | Sources (8) | Sourcetypes (3) | | filter

| Host ⌄ | Count ⌄ | Last Update ⌄ |
|---|---|---|
| mailsv | 9,829 | 4/29/14 1:32:47.000 PM |
| vendor_sales | 30,244 | 4/29/14 1:32:46.000 PM |
| www1 | 24,221 | 4/29/14 1:32:44.000 PM |
| www2 | 22,595 | 4/29/14 1:32:47.000 PM |
| www3 | 22,975 | 4/29/14 1:32:45.000 PM |

New Pivot 1,966 events (before 9/22/13 5:19:02.000 PM)

Filters

Highest 10 product name by price

All time | Highest 10 produ...

Split Rows product name | price — 1201

— 1202

Save As... ▼ | Clear

Split Columns

Complete

— 1203

Column Values

Count of Success... | Sum of price

Successful_purchases ▼

Documentation

| product name ⇅ | price ⇅ | Count of Successful purchases ⇅ | Sum of price ▼ |
|---|---|---|---|
| Dream Crusher | 39.99 | 227 — 1204 | 9077.73 |
| Manganiello Bros. | 39.99 | 199 | 7958.01 |
| Orvil the Wolverine | 39.99 | 169 | 6758.31 |
| World of Cheese | 24.99 | 267 | 6672.33 |
| Mediocre Kingdoms | 24.99 | 250 — 1205 | 6247.50 |
| SIM Cubicle | 19.99 | 233 | 4657.67 |
| Final Sequel | 24.99 | 181 | 4523.19 |
| Benign Space Debris | 24.99 | 135 | 3373.65 |
| Curling 2014 | 19.99 | 126 | 2518.74 |
| Holy Blade of Gouda | 5.99 | 179 | 1072.21 |

| | |
|---|---|
| Entity Name: | database_instance |
| Entity Aliases: | IP addressA, MAC addressA |
| Entity Type: | Database Instance |
| Entity Fields: | database_instance, host, itsi_role, vendor, vendor_product, version, port, storage_engine, availability, character_set, collation |
| Subject Field for hosted_by: | database_instance |
| Object Field for hosted_by: | host |
| ... | |

Figure 51

| | |
|---|---|
| Relationship name: | host1 hosts database1 |
| Key | key_abc |
| Subject entity identifier | subject_identifier_S1 |
| Predicate | predicate_type_P1 |
| Object entity identifier | object_identifier_O1 |
| Create timestamp | create_time_CT1 |
| Create source | create_source_CS1 |

Figure 53

Configure Integrations

Linux | Follow the instructions to install an agent on our Linux machine.
Aws    ⓘ Supported OS types: RHEL 62.6.32+, RHEL 73.10.0+, Centos 7, Debian 8, Ubuntu 16.

① Specify configuration options

- Data to be collected   ◇ 6 Metrics +   ☐ 5 Log sources   Customize
- Dimensions [Filter Dimensions]
  Dimensions are key/value pairs used for troubleshooting, analysis, and filtering hosts, for example location:seattle or role: webserver.
- Monitoring [demo-sii.splunkoxygen.com]
  machine
  Specify the hostname or IP address and port of the machine you want to send data to, e.g. my.instance.domain.name:8088

② Copy and paste the following into the command line of your entity

This script must be run by user with root privileges, and it should also have the following dependencies available on the entity:
- wget
- apt-get (Debian and Ubuntu)
- yum (Redhat and Centos)
- Internet access

```
export SPLUNK_URL=demo-sii.splunkoxygen.com && export HEC_PORT=8088 && export RECEIVER_PORT=9997 && export HEC_TOKEN=8a156da5-f0e2-49a5-b408-364aa824fbd5 && export DIMENSIONS= METRIC_TYPES=cpu,df,disk,interface,load,memory METRIC_OPTS=cpu.by_cpu LOG_SOURCES=/etc/collectd/collectd.log%collectd,\$SPLUNK_HOME/var/log/splunk/*.log*%uf,/var/log/syslog%syslog,/var/log/daemon.log%syslog,/var/log/infrastructure/unix_agent/unix_agent.log%splunk_app_infrastructure https://demo-sii.splunkoxygen.com/en-US/static/app/splunk_app_infrastructure/unix_agent/unix-agent.tgz && wget -q unix-agent.tgz && cd unix-agent && bash install_uf.sh && bash install_agent.sh && cd .. && rm -rf unix-agent
```

③ Once the script finishes running, verify your data connection.
It may take up to 5 minutes to show entities in the UI.

FIG. 65

Customize Data Collection

6 Metrics Selected    Deselect All

Select All

- ☑ cpu
  - ⦿ Collect data for each CPU
  - ◯ Collect sum over all CPUs
- ☑ df
- ☑ disk
- ☑ interface
- ☑ load
- ☑ memory

5 Log Sources Selected

Select All    Deselect All

- ☑ > Collect internal logs for debugging
- ☑ /var/log/syslog
- ☑ /var/log/daemon.log
- ☑ /var/log/auth.log

[ Enter a valid log source ]    [ Sourcetype: Automatic ▾ ]

+ Add Custom Source

[ Cancel ] [ Save ]

Configure Integrations

Linux |
Aws

Follow the instructions to install an agent on our Linux machine.
① Supported OS types: RHEL 62.6.32+, RHEL 73.10.0+, Centos 7, Debian 8, Ubuntu 16.
① Specify configuration options

Data to be collected ◇ 6 Metrics + ☐ 5 Log sources   Customize

Dimensions [host:mysql-03 ✕] [instanceType: ✕]
Dimensions are key/value pairs used for troubleshooting, analysis, and filtering hosts, for example location:seattle or role: webserver.

Monitoring [demo-sii.splunkoxygen.com]
machine
Specify the hostname or IP address and port of the machine you want to send data to,
e.g. my.instance.domain.name:8088

② Copy and paste the following into the command line of your entity

This script must be run by user with root privileges, and it should also have the following dependencies available on the entity:
• wget
• apt-get (Debian and Ubuntu)
• yum (Redhat and Centos)
• Internet access

```
export SPLUNK_URL=demo-sii.splunkoxygen.com && export HEC_PORT=8088 && export RECEIVER_PORT=9997 && export HEC_TOKEN=8a156da5-f0e2-49a5-b408-364aa824fbd5 && export DIMENSIONS= METRIC_TYPES=cpu, df, disk, interface, load, memory METRIC_OPTS=cpu. by_cpu LOG_SOURCES=/etc/collectd/collectd.log%collectd, \$SPLUNK_HOME/var/log/splunk/*.log*%uf,/var/log/syslog%syslog,/var/log/daemon.log%syslog,/var/var/ && wget -q https://demo-sii.splunkoxygen.com/en-US/static/app/splunk_app_infrastructure/unix_agent/unix-agent.tgz && -xzf unix-agent.tgz && cd unix-agent && bash install_uf.sh && bash install_agent.sh && cd .. && rm -rf unix-agent
```

③ Once the script finishes running, verify your data connection.
It may take up to 5 minutes to show entities in the UI.

| Entity Name | Status | Last time data collected | Dimensions | | | Actions |
|---|---|---|---|---|---|---|
| appserver-01 | Active | Tue Jul 10 2018 16:43:40 GMT-0700 (Pacific Daylight Time) | host: appserver-01 \| ip: 10.2.1.133 os_version: 2.6.32-573.8.1.el6.x86_64 | os: Linux role: api | | Actions ▼ |
| appserver-02 | Active | Tue Jul 10 2018 16:43:40 GMT-0700 (Pacific Daylight Time) | host: appserver-02 \| ip: 10.2.1.134 os_version: 2.6.32-573.8.1.el6.x86_64 | os: Linux role: api | | Actions ▼ |
| appserver-03 | Active | Tue Jul 10 2018 16:43:40 GMT-0700 (Pacific Daylight Time) | host: appserver-03 \| ip: 10.2.1.135 os_version: 2.6.32-573.8.1.el6.x86_64 | os: Linux role: api | | Actions ▼ |
| bastion01 | Active | Tue Jul 10 2018 16:43:40 GMT-0700 (Pacific Daylight Time) | host: bastion01 \| ip: 10.157.236.239.38 os_version: 2.6.32-573.8.1.el6.x86_64 | os: Linux role: bastion | | Actions ▼ |
| bastion02 | Active | Tue Jul 10 2018 16:43:40 GMT-0700 (Pacific Daylight Time) | host: bastion02 \| ip: 10.96.65.166.119 os_version: 2.6.32-573.8.1.el6.x86_64 | os: Linux role: bastion | | Actions ▼ |
| dhcp-01 | Active | Tue Jul 10 2018 16:43:40 GMT-0700 (Pacific Daylight Time) | host: dhcp-01 \| ip: 10.2.0.12 os_version: 2.6.32-573.8.1.el6.x86_64 | os: Linux role: dhcp | | Actions ▼ |
| dns01 | Active | Tue Jul 10 2018 16:43:40 GMT-0700 (Pacific Daylight Time) | host: dns01 \| ip: 10.55.227.192 os_version: 2.6.32-573.8.1.el6.x86_64 | os: Linux role: dns | | Actions ▼ |
| dns02 | Active | Tue Jul 10 2018 16:43:40 GMT-0700 (Pacific Daylight Time) | host: dns02 \| ip: 10.120.95.237 os_version: 2.6.32-573.8.1.el6.x86_64 | os: Linux role: dns | | Actions ▼ |
| fs01 | Active | Tue Jul 10 2018 16:43:40 GMT-0700 (Pacific Daylight Time) | host: fs01 \| ip: 10.183.51.84 os_version: 2.6.32-573.8.1.el6.x86_64 | os: Linux role: file | | Actions ▼ |
| fs02 | Active | Tue Jul 10 2018 16:43:40 GMT-0700 (Pacific Daylight Time) | host: fs02 \| ip: 10.36.149.178 | os: Linux | | Actions ▼ |

DYNAMICALLY MONITORING AN INFORMATION TECHNOLOGY NETWORKED ENTITY

CROSS REFERENCE TO RELATED APPLICATIONS

This application is a continuation of U.S. patent application Ser. No. 16/049,628, entitled "Information Technology Networked Entity Monitoring with Dynamic Metric and Threshold Selection," filed Jul. 30, 2018, which is a continuation-in-part of U.S. patent application Ser. No. 15/885,632, entitled "Information Technology Networked Entity Monitoring with Automatic Reliability Scoring," filed Jan. 31, 2018, which claims the benefit of U.S. Provisional Patent Application 62/563,010, entitled "Information Technology Networked Entity Monitoring with Automatic Reliability Scoring," filed Sep. 25, 2017; and U.S. patent application Ser. No. 15/885,632 is a continuation-in-part of U.S. patent application Ser. No. 15/713,606, entitled "Automatic Entity Control in a Machine Data Driven Service Monitoring System," filed on Sep. 23, 2017; each of which is hereby incorporated by reference in its entirety for all valid purposes.

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

The present disclosure is illustrated by way of example, and not limitation, in the figures of the accompanying drawings, in which like reference numerals indicate similar elements and in which:

FIG. 5C provides a visual representation of the manner in which a pipelined search language or query operates, in accordance with example embodiments;

FIG. 7C illustrates an example of creating and using an inverted index, in accordance with example embodiments;

FIG. 8B is an interface diagram of an example user interface for a data summary dialog that enables a user to select various data sources, in accordance with example embodiments;

FIGS. 9-15 are interface diagrams of example report generation user interfaces, in accordance with example embodiments;

FIG. 17B is an interface diagram of an example user interface of an incident review dashboard, in accordance with example embodiments;

FIG. 51 is a conceptual diagram of an example of collected entity information included in an entity search result or entity definition for an entity, in accordance with one or more implementations of the present disclosure.

FIG. 53 illustrates an example of a schema for a relationship definition, in accordance with one or more implementations of the present disclosure;

FIG. 65 is an interface diagram of an example user interface to specify data to be collected prior to deployment in a lower-tier application of a data intake and query system, in accordance with example embodiments;

FIG. 66 is an interface diagram of an example user interface to create customized data collection prior to deployment in a lower-tier application of a data intake and query system, in accordance with example embodiments;

FIG. 67 is an interface diagram of an example user interface to create customized script for deployment in a lower-tier application of a data intake and query system, in accordance with example embodiments;

FIG. 68 is an interface diagram of an example user interface for an entity lister screen, in accordance with example embodiments;

FIG. 72 is an interface diagram of an example user interface for a custom alert screen, in accordance with example embodiments;

FIG. 76 is an interface diagram of an example user interface for an alert screen with a first alert threshold, in accordance with example embodiments;

FIG. 77 is an interface diagram of an example user interface for an alert screen with a second alert threshold, in accordance with example embodiments.

DETAILED DESCRIPTION

Figure 1:
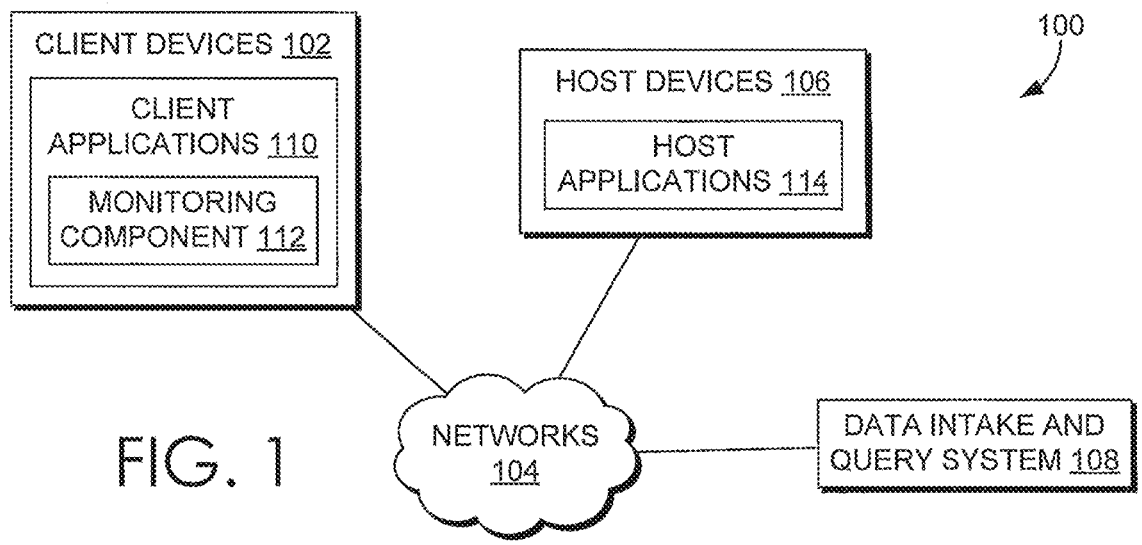
FIG. 1 is a block diagram of an example networked computer environment, in accordance with example embodiments.

The ensuing description provides exemplary embodiments only and is not intended to limit the scope, applicability, or configuration of the disclosure. Rather, the ensuing description of the exemplary embodiments will provide those skilled in the art with an enabling description for implementing a preferred exemplary embodiment. It is understood that various changes can be made in the function and arrangement of elements without departing from the spirit and scope as set forth in the appended claims.

In this description, references to "an embodiment," "one embodiment," or the like mean that the particular feature, function, structure or characteristic being described is included in at least one embodiment of the technique introduced herein. Occurrences of such phrases in this specification do not necessarily all refer to the same embodiment. On the other hand, the embodiments referred to are also not necessarily mutually exclusive.

1.0. GENERAL OVERVIEW

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 7A).

2.0. OPERATING ENVIRONMENT

FIG. 1 is a block diagram of an example networked computer environment 100, in accordance with example embodiments. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
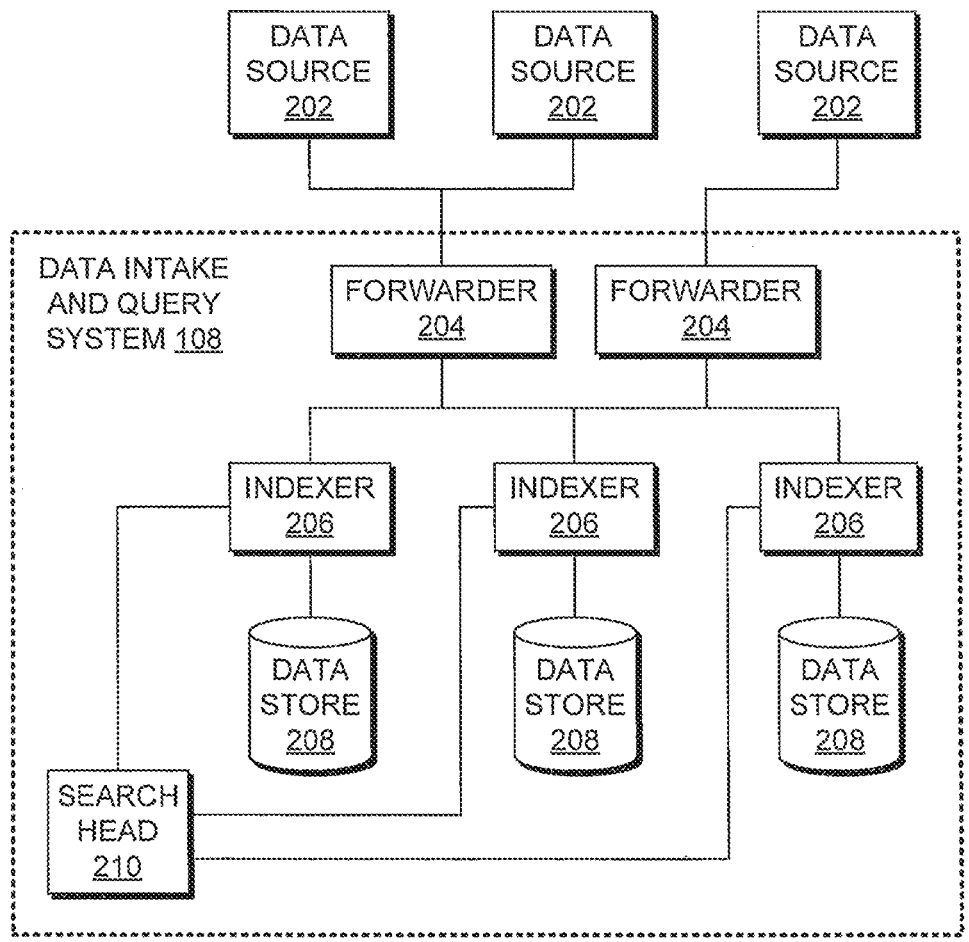
FIG. 2 is a block diagram of an example data intake and query system, in accordance with example embodiments.

FIG. 2 is a block diagram of an example data intake and query system 108, in accordance with example embodiments. System 108 includes one or more forwarders 204 that receive data from a variety of input data sources 202, and one or more indexers 206 that process and store the data in one or more data stores 208. These forwarders 204 and indexers 208 can comprise separate computer systems, or may alternatively comprise separate processes executing on one or more computer systems.

Each data source 202 broadly represents a distinct source of data that can be consumed by system 108. Examples of a data sources 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In some embodiments, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

2.5. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
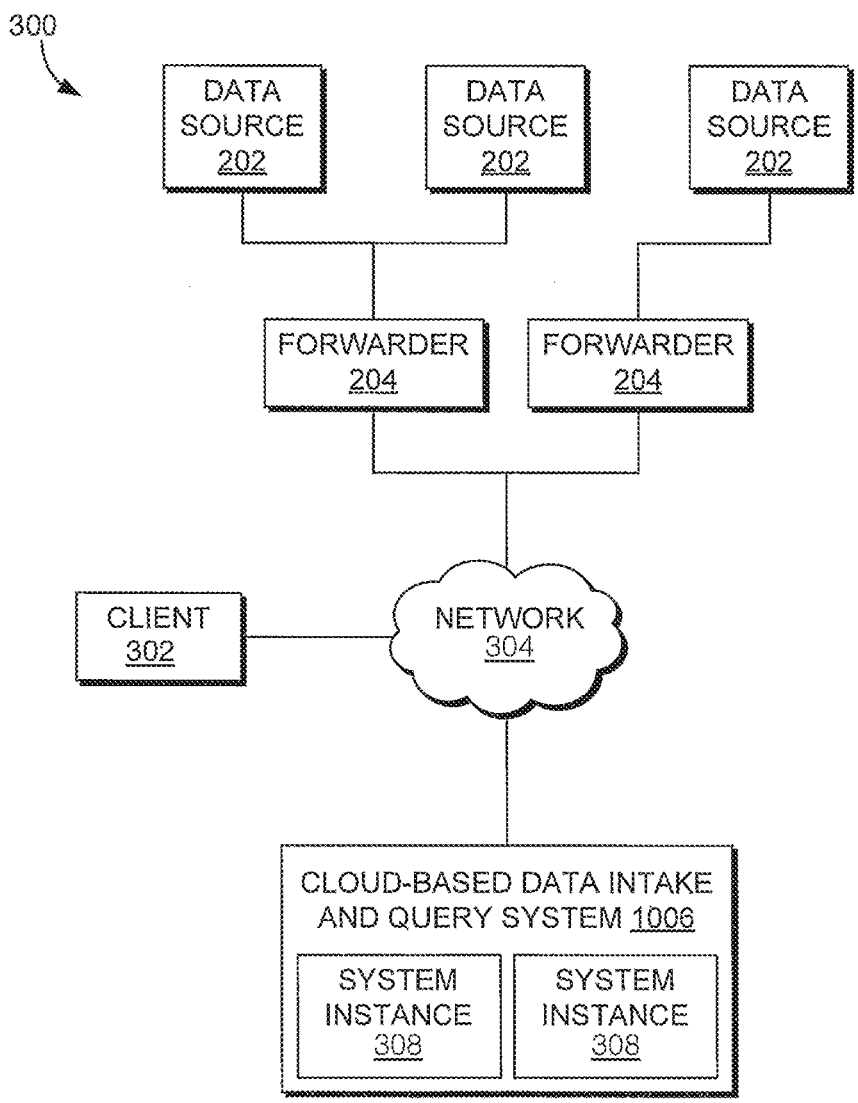
FIG. 3 is a block diagram of an example cloud-based data intake and query system, in accordance with example embodiments.

FIG. 3 illustrates a block diagram of an example cloud-based data intake and query system. Similar to the system of FIG. 2, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 38, each of the forwarders 204 may be configured to receive data from an input source and to forward the data to other components of the system 306 for further processing.

In some embodiments, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK CLOUD™, are centrally visible).

2.6. Searching Externally-Archived Data

Figure 4:
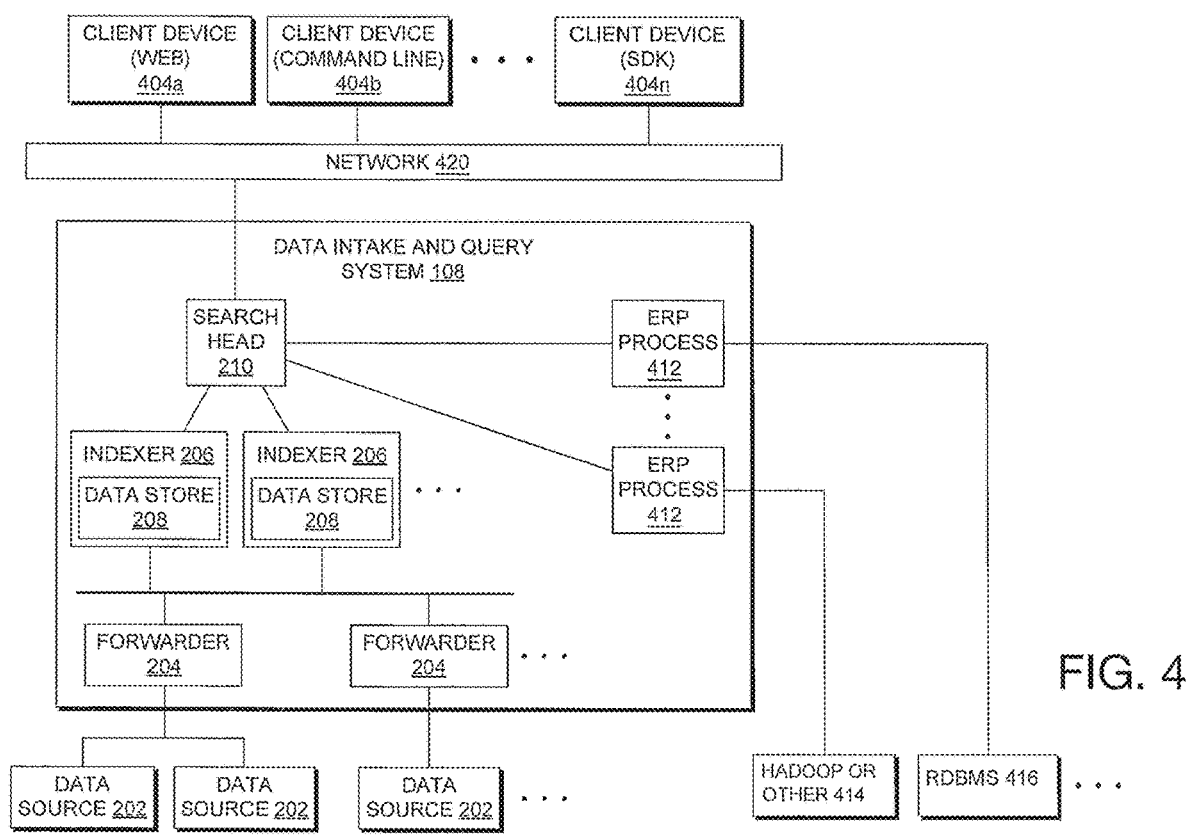
FIG. 4 is a block diagram of an example data intake and query system that performs searches across external data systems, in accordance with example embodiments.

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, California Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404a, 404b, . . . , 404n may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection. Indexers here, as elsewhere, may include functionality for processing multiple data types, such as events and metrics data types discussed in reference to Indexer 436 of FIG. 18, for example.

If the request parameters of the received search request reference an external data collection, which is not accessible to the indexers 206 of FIG. 4 or under the management of the data intake and query system, then the search head 210 can access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

2.6.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which can then process the results data (e.g., break the machine data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.7. Data Ingestion

Figure 5A:
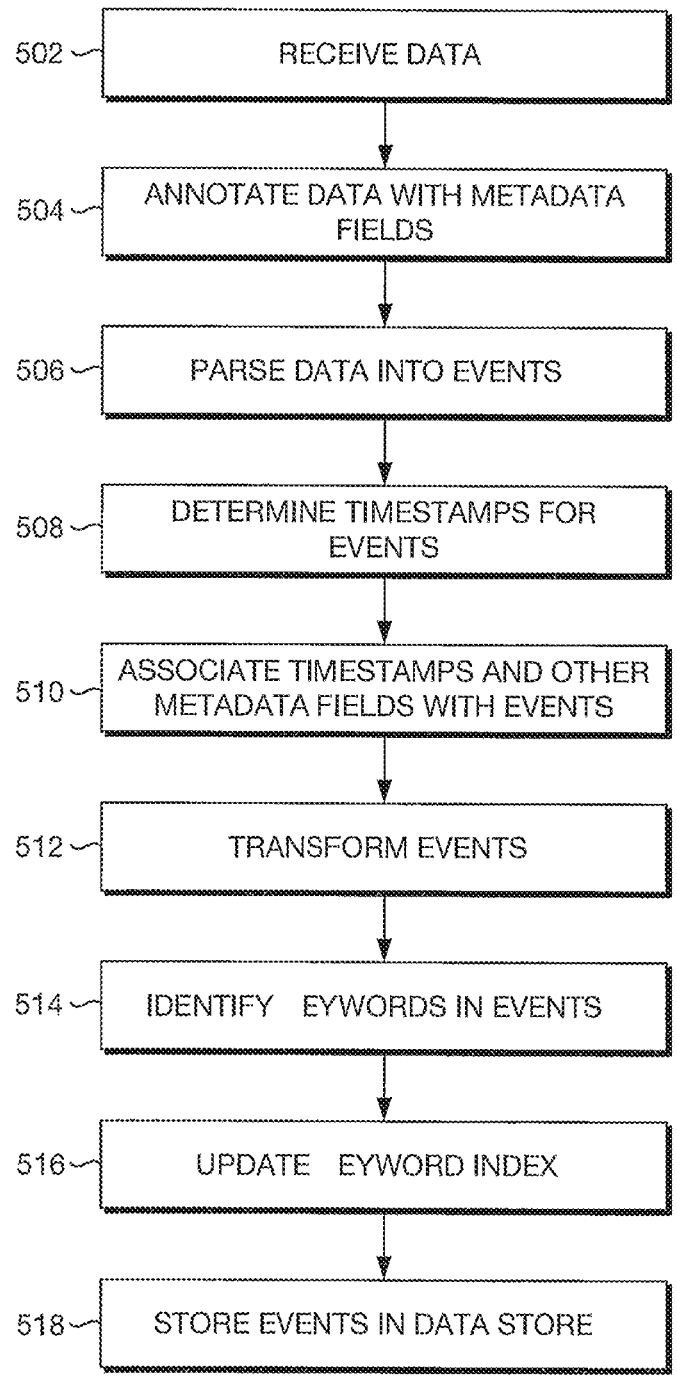
FIG. 5A is a flowchart of an example method that illustrates how indexers process, index, and store data received from forwarders, in accordance with example embodiments.

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

2.7.1. Input

At block 502, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some embodiments, a forwarder may contain the essential components needed to forward data. A forwarder can gather data from a variety of inputs and forward the data to an indexer for indexing and searching. A forwarder can also tag metadata (e.g., source, source type, host, etc.).

In some embodiments, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

2.7.2. Parsing

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 536, source 537, source type 538 and timestamps 535 can be generated for each event, and associated with a corresponding portion of machine data 539 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexer based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 536.

In the example shown in FIG. 5C, each of the events 531-534 is associated with a discrete request made from a client device. The raw machine data generated by the server and extracted from a server access log can include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds 544. As seen in FIG. 5C, all the raw machine data retrieved from the server access log is retained and stored as part of the corresponding events, 1221, 1222, and 1223 in the data store.

Event 534 is associated with an entry in a server error log, as indicated by "error.log" in the source column 537 that records errors that the server encountered when processing a client request. Similar to the events related to the server access log, all the raw machine data in the error log file pertaining to event 534 can be preserved and stored as part of the event 534.

Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

2.7.3. Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "SITE-BASED SEARCH AFFINITY", issued on 8 Sep. 2015, and in U.S. patent Ser. No. 14/266,817, entitled "MULTI-SITE CLUSTERING", issued on 1 Sep. 2015, each of which is hereby incorporated by reference in its entirety for all purposes.

Figure 5B:
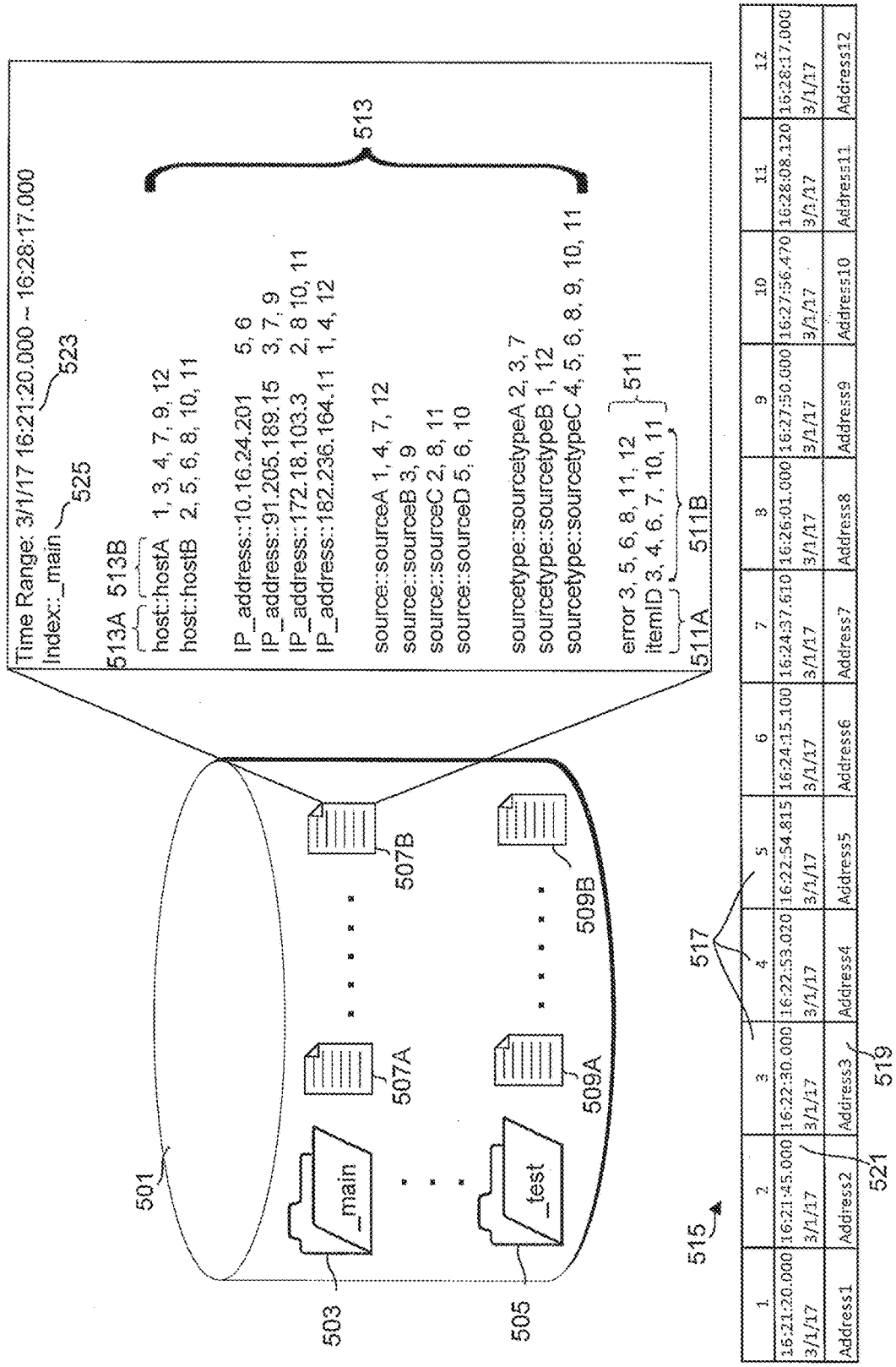
FIG. 5B is a block diagram of a data structure in which time-stamped event data can be stored in a data store, in accordance with example embodiments.

FIG. 5B is a block diagram of an example data store 501 that includes a directory for each index (or partition) that contains a portion of data managed by an indexer. FIG. 5B further illustrates details of an embodiment of an inverted index 507B and an event reference array 515 associated with inverted index 507B.

The data store 501 can correspond to a data store 208 that stores events managed by an indexer 206 or can correspond to a different data store associated with an indexer 206. In the illustrated embodiment, the data store 501 includes a_main directory 503 associated with a_main index and a_test directory 505 associated with a_test index. However, the data store 501 can include fewer or more directories. In some embodiments, multiple indexes can share a single directory or all indexes can share a common directory. Additionally, although illustrated as a single data store 501, it will be understood that the data store 501 can be implemented as multiple data stores storing different portions of the information shown in FIG. 5B. For example, a single index or partition can span multiple directories or multiple data stores, and can be indexed or searched by multiple corresponding indexers.

In the illustrated embodiment of FIG. 5B, the index-specific directories 503 and 505 include inverted indexes 507A, 507B and 509A, 509B, respectively. The inverted indexes 507A . . . 507B, and 509A . . . 509B can be keyword indexes or field-value pair indexes described herein and can include less or more information that depicted in FIG. 5B.

In some embodiments, the inverted index 507A . . . 507B, and 509A . . . 509B can correspond to a distinct time-series bucket that is managed by the indexer 206 and that contains events corresponding to the relevant index (e.g., _main index, _test index). As such, each inverted index can correspond to a particular range of time for an index. Additional files, such as high performance indexes for each time-series bucket of an index, can also be stored in the same directory as the inverted indexes 507A . . . 507B, and 509A . . . 509B. In some embodiments inverted index 507A . . . 507B, and 509A . . . 509B can correspond to multiple time-series buckets or inverted indexes 507A . . . 507B, and 509A . . . 509B can correspond to a single time-series bucket.

Each inverted index 507A . . . 507B, and 509A . . . 509B can include one or more entries, such as keyword (or token) entries or field-value pair entries. Furthermore, in certain embodiments, the inverted indexes 507A . . . 507B, and 509A . . . 509B can include additional information, such as a time range 523 associated with the inverted index or an index identifier 525 identifying the index associated with the inverted index 507A . . . 507B, and 509A . . . 509B. However, each inverted index 507A . . . 507B, and 509A . . . 509B can include less or more information than depicted.

Token entries, such as token entries 511 illustrated in inverted index 507B, can include a token 511A (e.g., "error," "itemID," etc.) and event references 511B indicative of events that include the token. For example, for the token "error," the corresponding token entry includes the token "error" and an event reference, or unique identifier, for each event stored in the corresponding time-series bucket that includes the token "error." In the illustrated embodiment of FIG. 5B, the error token entry includes the identifiers 3, 5, 6, 8, 11, and 12 corresponding to events managed by the indexer 206 and associated with the index_main 503 that are located in the time-series bucket associated with the inverted index 507B.

In some cases, some token entries can be default entries, automatically determined entries, or user specified entries. In some embodiments, the indexer 206 can identify each word or string in an event as a distinct token and generate a token entry for it. In some cases, the indexer 206 can identify the beginning and ending of tokens based on punctuation, spaces, as described in greater detail herein. In certain cases, the indexer 206 can rely on user input or a configuration file to identify tokens for token entries 511, etc. It will be understood that any combination of token entries can be included as a default, automatically determined, a or included based on user-specified criteria.

Similarly, field-value pair entries, such as field-value pair entries 513 shown in inverted index 507B, can include a field-value pair 513A and event references 513B indicative of events that include a field value that corresponds to the field-value pair. For example, for a field-value pair sourcetype::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 can be default entries, automatically determined entries, or user specified entries. As a non-limiting example, the field-value pair entries for the fields host, source, sourcetype can be included in the inverted indexes 507A . . . 507B, and 509A . . . 509B as a default. As such, all of the inverted indexes 507A . . . 507B, and 509A . . . 509B can include field-value pair entries for the fields host, source, sourcetype. As yet another non-limiting example, the field-value pair entries for the IP_address field can be user specified and may only appear in the inverted index 507B based on user-specified criteria. As another non-limiting example, as the indexer indexes the events, it can automatically identify field-value pairs and create field-value pair entries. For example, based on the indexers review of events, it can identify IP_address as a field in each event and add the IP_address field-value pair entries to the inverted index 507B. It will be understood that any combination of field-value pair entries can be included as a default, automatically determined, or included based on user-specified criteria.

Each unique identifier 517, or event reference, can correspond to a unique event located in the time series bucket. However, the same event reference can be located in multiple entries. For example if an event has a sourcetype splunkd, host www1 and token "warning," then the unique identifier for the event will appear in the field-value pair entries sourcetype::splunkd and host::www1, as well as the token entry "warning." With reference to the illustrated embodiment of FIG. 5B and the event that corresponds to the event reference 3, the event reference 3 is found in the field-value pair entries 513 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 can be used to locate the events in the corresponding bucket. For example, the inverted index can include, or be associated with, an event reference array 515. The event reference array 515 can include an array entry 517 for each event reference in the inverted index 507B. Each array entry 517 can include location information 519 of the event corresponding to the unique identifier (non-limiting example: seek address of the event), a timestamp 521 associated with the event, or additional information regarding the event associated with the event reference, etc.

For each token entry 511 or field-value pair entry 513, the event reference 501B or unique identifiers can be listed in chronological order or the value of the event reference can be assigned based on chronological data, such as a timestamp associated with the event referenced by the event reference. For example, the event reference 1 in the illustrated embodiment of FIG. 5B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 5B, the entries are sorted first by entry type and then alphabetically.

As a non-limiting example of how the inverted indexes 507A . . . 507B, and 509A . . . 509B can be used during a data categorization request command, the indexers can receive filter criteria indicating data that is to be categorized and categorization criteria indicating how the data is to be categorized. Example filter criteria can include, but is not limited to, indexes (or partitions), hosts, sources, sourcetypes, time ranges, field identifier, keywords, etc.

Using the filter criteria, the indexer identifies relevant inverted indexes to be searched. For example, if the filter criteria includes a set of partitions, the indexer can identify the inverted indexes stored in the directory corresponding to the particular partition as relevant inverted indexes. Other means can be used to identify inverted indexes associated with a partition of interest. For example, in some embodiments, the indexer can review an entry in the inverted indexes, such as an index-value pair entry 513 to determine if a particular inverted index is relevant. If the filter criteria does not identify any partition, then the indexer can identify all inverted indexes managed by the indexer as relevant inverted indexes.

Similarly, if the filter criteria includes a time range, the indexer can identify inverted indexes corresponding to buckets that satisfy at least a portion of the time range as relevant inverted indexes. For example, if the time range is last hour then the indexer can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria includes a partition main, then the indexer can determine that any events identified using inverted indexes within the partition main directory (or otherwise associated with the partition main) satisfy the index filter criterion.

Furthermore, based on the time range associated with each inverted index, the indexer can determine that that any events identified using a particular inverted index satisfies a time range filter criterion. For example, if a time range filter criterion is for the last hour and a particular inverted index corresponds to events within a time range of 50 minutes ago to 35 minutes ago, the indexer can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes, the indexer can identify event references (and therefore events) that satisfy the filter criteria. For example, if the token "error" is a filter criterion, the indexer can track all event references within the token entry "error." Similarly, the indexer can identify other event references located in other token entries or field-value pair entries that match the filter criteria. The system can identify event references located in all of the entries identified by the filter criteria. For example, if the filter criteria include the token "error" and field-value pair sourcetype::web_ui, the indexer can track the event references found in both the token entry "error" and the field-value pair entry sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The indexer can determine that the events associated with the identified event references satisfy the filter criteria.

In some cases, the indexer can further consult a timestamp associated with the event reference to determine whether an event satisfies the filter criteria. For example, if an inverted index corresponds to a time range that is partially outside of a time range filter criterion, then the indexer can consult a timestamp associated with the event reference to determine whether the corresponding event satisfies the time range criterion. In some embodiments, to identify events that satisfy a time range, the indexer can review an array, such as the event reference array 1614 that identifies the time associated with the events. Furthermore, as mentioned above using the known location of the directory in which the relevant inverted indexes are located (or other index identifier), the indexer can determine that any events identified using the relevant inverted indexes satisfy the index filter criterion.

In some cases, based on the filter criteria, the indexer reviews an extraction rule. In certain embodiments, if the filter criteria includes a field name that does not correspond to a field-value pair entry in an inverted index, the indexer can review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer can review an extraction rule that identifies how the sessionID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the indexer can then identify a field-value pair entry in the inverted index that includes a field value corresponding to the identity of the particular host, source, or sourcetype identified using the extraction rule.

Once the events that satisfy the filter criteria are identified, the system, such as the indexer 206 can categorize the results based on the categorization criteria. The categorization criteria can include categories for grouping the results, such as any combination of partition, source, sourcetype, or host, or other categories or fields as desired.

The indexer can use the categorization criteria to identify categorization criteria-value pairs or categorization criteria values by which to categorize or group the results. The categorization criteria-value pairs can correspond to one or more field-value pair entries stored in a relevant inverted index, one or more index-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The indexer can use the nineteen distinct field-value pair entries as categorization criteria-value pairs to group the results.

Specifically, the indexer can identify the location of the event references associated with the events that satisfy the filter criteria within the field-value pairs, and group the event references based on their location. As such, the indexer can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the indexer can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the indexer can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the indexer can generate up to thirty groups for the results that satisfy the filter criteria. Each group can be associated with a unique combination of categorization criteria-value pairs (e.g., unique combinations of partition value sourcetype value, and host value).

In addition, the indexer can count the number of events associated with each group based on the number of events that meet the unique combination of categorization criteria for a particular group (or match the categorization criteria-value pairs for the particular group). With continued reference to the example above, the indexer can count the number of events that meet the unique combination of partition, sourcetype, and host for a particular group.

Each indexer communicates the groupings to the search head. The search head can aggregate the groupings from the indexers and provide the groupings for display. In some cases, the groups are displayed based on at least one of the host, source, sourcetype, or partition associated with the groupings. In some embodiments, the search head can further display the groups based on display criteria, such as a display order or a sort order as described in greater detail above.

As a non-limiting example and with reference to FIG. 5B, consider a request received by an indexer 206 that includes the following filter criteria: keyword=error, partition=_main, time range=3/1/17 16:22.00.000-16:28.00.000, sourcetype=sourcetypeC, host=hostB, and the following categorization criteria: source.

Based on the above criteria, the indexer 206 identifies _main directory 503 and can ignore _test directory 505 and any other partition-specific directories. The indexer determines that inverted partition 507B is a relevant partition based on its location within the _main directory 503 and the time range associated with it. For sake of simplicity in this example, the indexer 206 determines that no other inverted indexes in the _main directory 503, such as inverted index 507A satisfy the time range criterion.

Having identified the relevant inverted index 507B, the indexer reviews the token entries 511 and the field-value pair entries 513 to identify event references, or events, that satisfy all of the filter criteria.

With respect to the token entries 511, the indexer can review the error token entry and identify event references 3, 5, 6, 8, 11, 12, indicating that the term "error" is found in the corresponding events. Similarly, the indexer can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer can ignore those field-value pair entries.

In addition to identifying event references found in at least one token entry or field-value pair entry (e.g., event references 3, 4, 5, 6, 8, 9, 10, 11, 12), the indexer can identify events (and corresponding event references) that satisfy the time range criterion using the event reference array 1614 (e.g., event references 2, 3, 4, 5, 6, 7, 8, 9, 10). Using the information obtained from the inverted index 507B (including the event reference array 515), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry source::sourceD (or have matching categorization criteria-value pairs) and event reference 8 is located in the field-value pair entry source::sourceC. Accordingly, the indexer can generate a sourceC group having a count of one corresponding to reference 8 and a sourceD group having a count of two corresponding to references 5 and 6. This information can be communicated to the search head. In turn the search head can aggregate the results from the various indexers and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, a request received by an indexer 206 that includes the following filter criteria: partition=_main, time range=3/1/17 3/1/17 16:21: 20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

Group 1 (hostA, sourceA, sourcetypeA): 1 (event reference 7)
Group 2 (hostA, sourceA, sourcetypeB): 2 (event references 1, 12)
Group 3 (hostA, sourceA, sourcetypeC): 1 (event reference 4)
Group 4 (hostA, sourceB, sourcetypeA): 1 (event reference 3)
Group 5 (hostA, sourceB, sourcetypeC): 1 (event reference 9)
Group 6 (hostB, sourceC, sourcetypeA): 1 (event reference 2)
Group 7 (hostB, sourceC, sourcetypeC): 2 (event references 8, 11)
Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer can include the categorization criteria-value pairs for each group and the count. In some embodiments, the indexer can include more or less information. For example, the indexer can include the event references associated with each group and other identifying information, such as the indexer or inverted index used to identify the groups.

As another non-limiting examples, a request received by an indexer 206 that includes the following filter criteria: partition=main, time range=3/1/17 3/1/17 16:21:20.000-16: 28:17.000, source=sourceA, sourceD, and keyword=itemID and the following categorization criteria: host, source, sourcetype would result in the indexer identifying event references 4, 7, and 10 as satisfying the filter criteria, and generate the following groups:

Group 1 (hostA, sourceA, sourcetypeC): 1 (event reference 4)
Group 2 (hostA, sourceA, sourcetypeA): 1 (event reference 7)
Group 3 (hostB, sourceD, sourcetypeC): 1 (event reference 10)

The indexer communicates the groups to the search head for aggregation with results received from other indexers. As will be understand there are myriad ways for filtering and categorizing the events and event references. For example, the indexer can review multiple inverted indexes associated with an partition or review the inverted indexes of multiple partitions, and categorize the data using any one or any combination of partition, host, source, sourcetype, or other category, as desired.

Further, if a user interacts with a particular group, the indexer can provide additional information regarding the group. For example, the indexer can perform a targeted search or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer can identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some embodiments, the indexer identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer can determine that it will analyze a sample of the events associated with the event references 4, 5, 6, 8, 10, 11. For example, the sample can include analyzing event data associated with the event references 5, 8, 10. In some embodiments, the indexer can use the event reference array 1616 to access the event data associated with the event references 5, 8, 10. Once accessed, the indexer can compile the relevant information and provide it to the search head for aggregation with results from other indexers. By identifying events and sampling event data using the inverted indexes, the indexer can reduce the amount of actual data this is analyzed and the number of events that are accessed in order to generate the summary of the group and provide a response in less time.

2.8. Query Processing

Figure 6A:
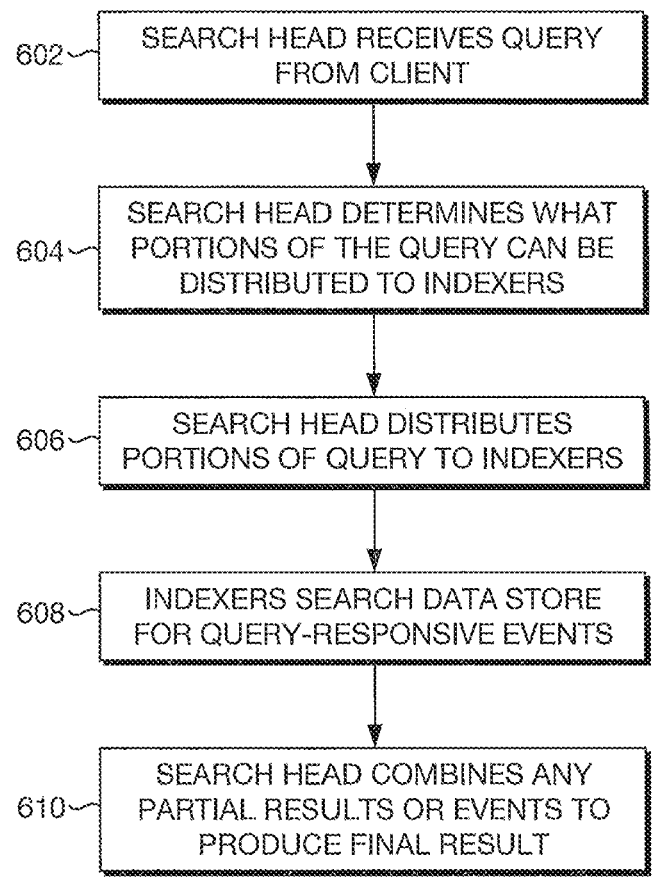
FIG. 6A is a flow diagram of an example method that illustrates how a search head and indexers perform a search query, in accordance with example embodiments.

FIG. 6A is a flow diagram of an example method that illustrates how a search head and indexers perform a search query, in accordance with example embodiments. At block 602, a search head receives a search query from a client. At block 604, the search head analyzes the search query to determine what portion(s) of the query can be delegated to indexers and what portions of the query can be executed locally by the search head. At block 606, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a cluster master, not shown in FIG. 2) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

2.9. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "I". In such embodiments, a set of data, such as a set of events, can be operated on by a first SPL command in the sequence, and then a subsequent SPL command following a pipe symbol "I" after the first SPL command operates on the results produced by the first SPL command or other set of data, and so on for any additional SPL commands in the sequence. As such, a query formulated using SPL comprises a series of consecutive commands that are delimited by pipe "I" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 6B:
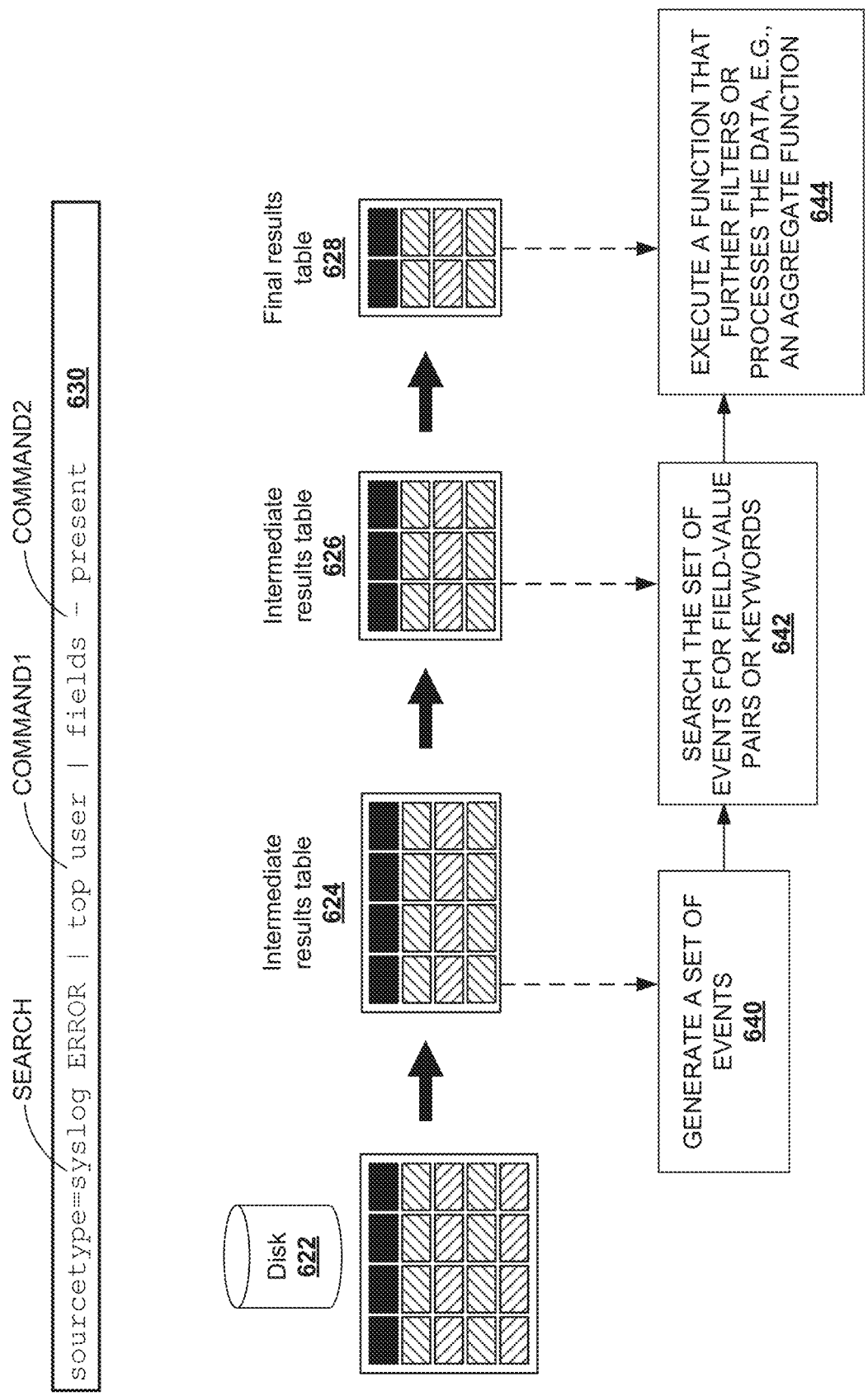
FIG. 6B provides a visual representation of an example manner in which a pipelined command language or query operates, in accordance with example embodiments.

FIG. 6B provides a visual representation of the manner in which a pipelined command language or query operates in accordance with the disclosed embodiments. The query 630 can be inputted by the user into a search. The query comprises a search, the results of which are piped to two commands (namely, command 1 and command 2) that follow the search step.

Disk 622 represents the event data in the raw record data store.

When a user query is processed, a search step will precede other queries in the pipeline in order to generate a set of events at block 640. For example, the query can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630. By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which summarizes the events into a list of the top 10 users and displays the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields-percent" part of command 630 removes the column that shows the percentage, thereby, leaving a final results table 628 without a percentage column. In different embodiments, other query languages, such as the Structured Query Language ("SQL"), can be used to create a query.

2.10. Field Extraction

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "I" operates on the results produced by the first command, and so on for additional commands. Other query languages, such as the Structured Query Language ("SQL"), can be used to create a query.

In response to receiving the search query, search head 210 uses extraction rules to extract values for fields in the events being searched. The search head 210 obtains extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 210 can apply the extraction rules to events that it receives from indexers 206. Indexers 206 may apply the extraction rules to events in an associated data store 208. Extraction rules can be applied to all the events in a data store or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

Figure 7A:
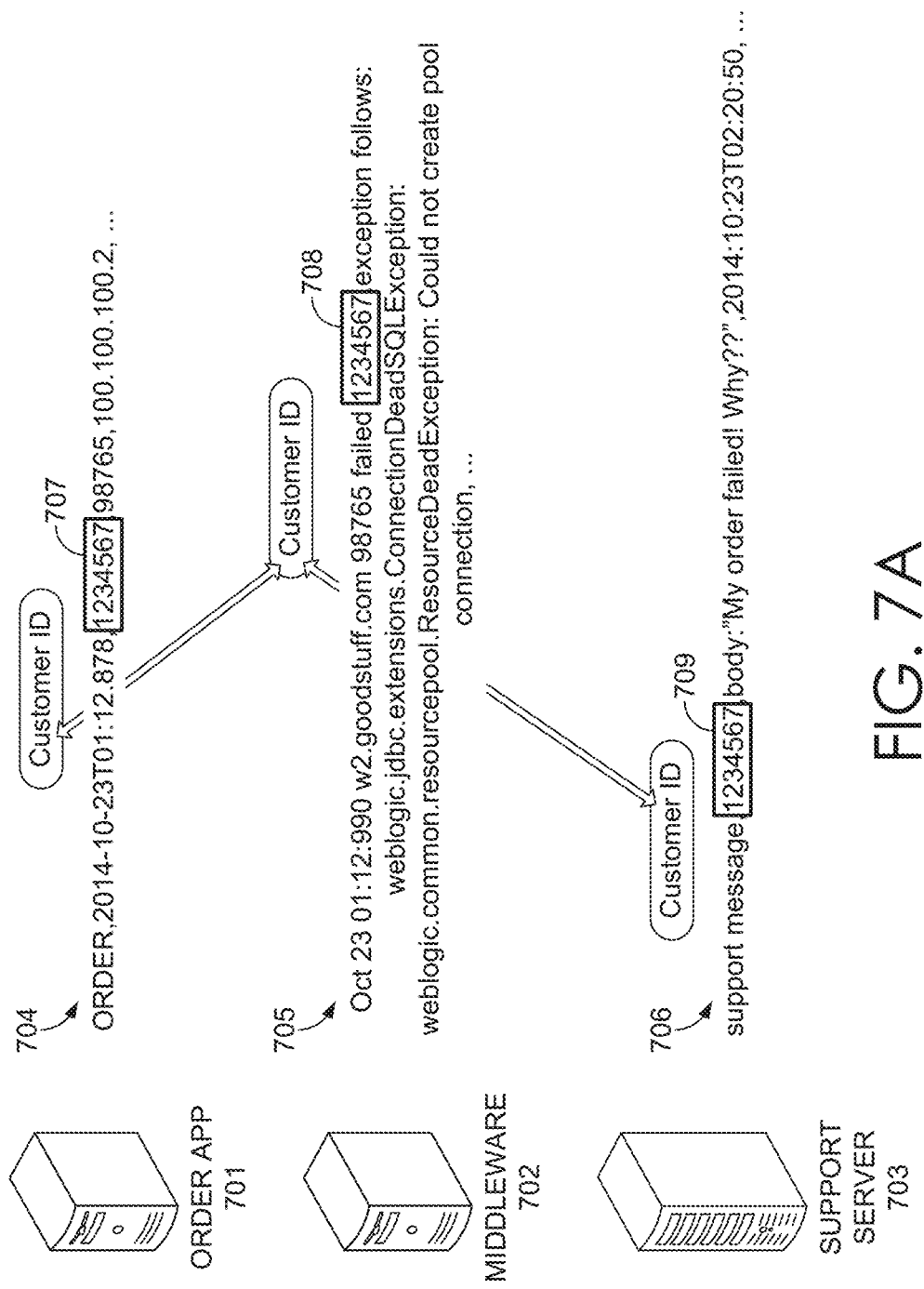
FIG. 7A is a diagram of an example scenario where a common customer identifier is found among log data received from three disparate data sources, in accordance with example embodiments.

FIG. 7A is a diagram of an example scenario where a common customer identifier is found among log data received from three disparate data sources, in accordance with example embodiments. In this example, a user submits an order for merchandise using a vendor's shopping application program 701 running on the user's system. In this example, the order was not delivered to the vendor's server due to a resource exception at the destination server that is detected by the middleware code 702. The user then sends a message to the customer support server 703 to complain about the order failing to complete. The three systems 701, 702, and 703 are disparate systems that do not have a common logging format. The order application 701 sends log data 704 to the data intake and query system in one format, the middleware code 702 sends error log data 705 in a second format, and the support server 703 sends log data 706 in a third format.

Using the log data received at one or more indexers 206 from the three systems, the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems. There is a semantic relationship between the customer ID field values generated by the three systems. The search head 210 requests events from the one or more indexers 206 to gather relevant events from the three systems. The search head 210 then applies extraction rules to the events in order to extract field values that it can correlate. The search head may apply a different extraction rule to each set of events from each system when the event format differs among systems. In this example, the user interface can display to the administrator the events corresponding to the common customer ID field values 707, 708, and 709, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

Figure 7B:
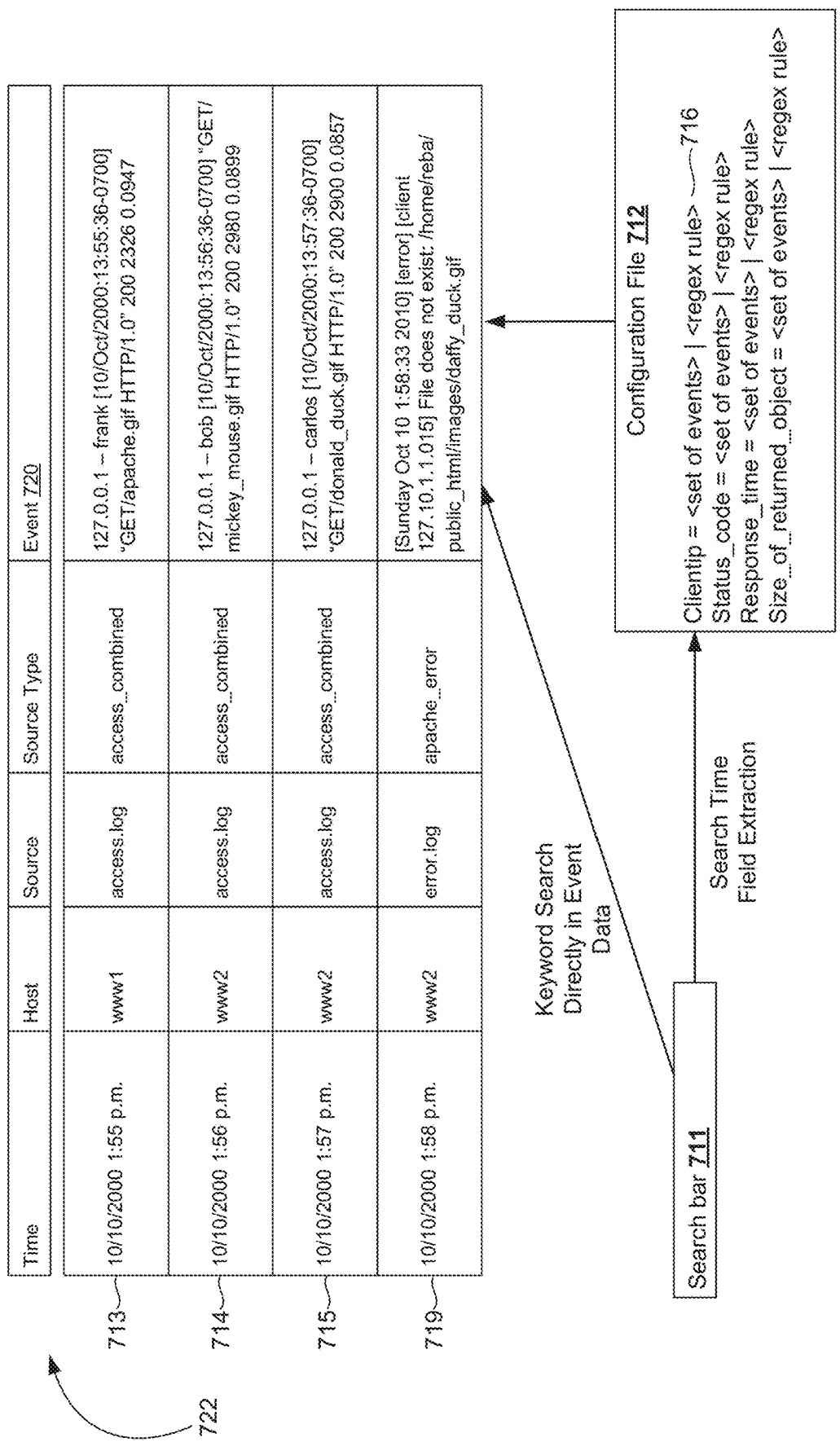
FIG. 7B illustrates an example of processing keyword searches and field searches, in accordance with disclosed embodiments.

The search system enables users to run queries against the stored data to retrieve events that meet criteria specified in a query, such as containing certain keywords or having specific values in defined fields. FIG. 7B illustrates the manner in which keyword searches and field searches are processed in accordance with disclosed embodiments.

If a user inputs a search query into search bar 1401 that includes only keywords (also known as "tokens"), e.g., the keyword "error" or "warning", the query search engine of the data intake and query system searches for those keywords directly in the event data 722 stored in the raw record data store. Note that while FIG. 7B only illustrates four events, the raw record data store (corresponding to data store 208 in FIG. 2) may contain records for millions of events.

As disclosed above, an indexer can optionally generate a keyword index to facilitate fast keyword searching for event data. The indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword. For example, if the keyword "HTTP" was indexed by the indexer at index time, and the user searches for the keyword "HTTP", events 713 to 715 will be identified based on the results returned from the keyword index. As noted above, the index contains reference pointers to the events containing the keyword, which allows for efficient retrieval of the relevant events from the raw record data store.

If a user searches for a keyword that has not been indexed by the indexer, the data intake and query system would nevertheless be able to retrieve the events by searching the event data for the keyword in the raw record data store directly as shown in FIG. 7B. For example, if a user searches for the keyword "frank", and the name "frank" has not been indexed at index time, the DATA INTAKE AND QUERY system will search the event data directly and return the first event 713. Note that whether the keyword has been indexed at index time or not, in both cases the raw data with the events 712 is accessed from the raw data record store to service the keyword search. In the case where the keyword has been indexed, the index will contain a reference pointer that will allow for a more efficient retrieval of the event data from the data store. If the keyword has not been indexed, the search engine will need to search through all the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the search engine does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 johnmedlock."

The data intake and query system advantageously allows for search time field extraction. In other words, fields can be extracted from the event data at search time using late-binding schema as opposed to at data ingestion time, which was a major limitation of the prior art systems.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 7B illustrates the manner in which configuration files may be used to configure custom fields at search time in accordance with the disclosed embodiments. In response to receiving a search query, the data intake and query system determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the search engine may, in one or more embodiments, need to locate configuration file 712 during the execution of the search as shown in FIG. 7B.

Configuration file 712 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system would then generate a regular expression that extracts those fields from similar events and store the regular expression as an extraction rule for the associated field in the configuration file 712.

In some embodiments, the indexers may automatically discover certain custom fields at index time and the regular expressions for those fields will be automatically generated at index time and stored as part of extraction rules in configuration file 712. For example, fields that appear in the event data as "key=value" pairs may be automatically extracted as part of an automatic field discovery process. Note that there may be several other ways of adding field definitions to configuration files in addition to the methods discussed herein.

The search head 210 can apply the extraction rules derived from configuration file 1402 to event data that it receives from indexers 206. Indexers 206 may apply the extraction rules from the configuration file to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 712 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 719 also contains "clientip" field, however, the "clientip" field is in a different format from events 713-715. To address the discrepancies in the format and content of the different types of events, the configuration file will also need to specify the set of events that an extraction rule applies to, e.g., extraction rule 716 specifies a rule for filtering by the type of event and contains a regular expression for parsing out the field value. Accordingly, each extraction rule will pertain to only a particular type of event. If a particular field, e.g., "clientip" occurs in multiple events, each of those types of events would need its own corresponding extraction rule in the configuration file 712 and each of the extraction rules would comprise a different regular expression to parse out the associated field value. The most common way to categorize events is by source type because events generated by a particular source can have the same format.

The field extraction rules stored in configuration file 712 perform search-time field extractions. For example, for a query that requests a list of events with source type "access_combined" where the "clientip" field equals "127.0.0.1," the query search engine would first locate the configuration file 712 to retrieve extraction rule 716 that would allow it to extract values associated with the "clientip" field from the event data 720 "where the source type is "access_combined. After the "clientip" field has been extracted from all the events comprising the "clientip" field where the source type is "access_combined," the query search engine can then execute the field criteria by performing the compare operation to filter out the events where the "clientip" field equals "127.0.0.1." In the example shown in FIG. 7B, events 713-715 would be returned in response to the user query. In this manner, the search engine can service queries containing field criteria in addition to queries containing keyword criteria (as explained above).

The configuration file can be created during indexing. It may either be manually created by the user or automatically generated with certain predetermined field extraction rules. As discussed above, the events may be distributed across several indexers, wherein each indexer may be responsible for storing and searching a subset of the events contained in a corresponding data store. In a distributed indexer system, each indexer would need to maintain a local copy of the configuration file that is synchronized periodically across the various indexers.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the data intake and query system to search and correlate data across heterogeneous sources flexibly and efficiently.

Further, by providing the field definitions for the queried fields at search time, the configuration file 712 allows the record data store 712 to be field searchable. In other words, the raw record data store 712 can be searched using keywords as well as fields, wherein the fields are searchable name/value pairings that distinguish one event from another and can be defined in configuration file 1402 using extraction rules. In comparison to a search containing field names, a keyword search does not need the configuration file and can search the event data directly as shown in FIG. 7B.

It should also be noted that any events filtered out by performing a search-time field extraction using a configuration file can be further processed by directing the results of the filtering step to a processing step using a pipelined search language. Using the prior example, a user could pipeline the results of the compare step to an aggregate function by asking the query search engine to count the number of events where the "clientip" field equals "127.0.0.1."

2.11. Example Search Screen

Figure 8A:
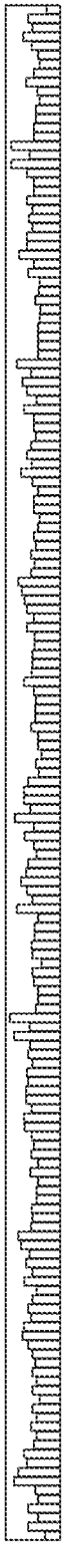
FIG. 8A is an interface diagram of an example user interface for a search screen, in accordance with example embodiments.

FIG. 8A is an interface diagram of an example user interface for a search screen 800, in accordance with example embodiments. Search screen 800 includes a search bar 802 that accepts user input in the form of a search string. It also includes a time range picker 812 that enables the user to specify a time range for the search. For historical searches (e.g., searches based on a particular historical time range), the user can select a specific time range, or alternatively a relative time range, such as "today," "yesterday" or "last week." For real-time searches (e.g., searches whose results are based on data received in real-time), the user can select the size of a preceding time window to search for real-time events. Search screen 800 also initially displays a "data summary" dialog as is illustrated in FIG. 8B that enables the user to select different sources for the events, such as by selecting specific hosts and log files.

After the search is executed, the search screen 800 in FIG. 8A can display the results through search results tabs 804, wherein search results tabs 804 includes: an "events tab" that displays various information about events returned by the search; a "statistics tab" that displays statistics about the search results; and a "visualization tab" that displays various visualizations of the search results. The events tab illustrated in FIG. 8A displays a timeline graph 805 that graphically illustrates the number of events that occurred in one-hour intervals over the selected time range. The events tab also displays an events list 808 that enables a user to view the machine data in each of the returned events.

The events tab additionally displays a sidebar that is an interactive field picker 806. The field picker 806 may be displayed to a user in response to the search being executed and allows the user to further analyze the search results based on the fields in the events of the search results. The field picker 806 includes field names that reference fields present in the events in the search results. The field picker may display any Selected Fields 820 that a user has pre-selected for display (e.g., host, source, sourcetype) and may also display any Interesting Fields 822 that the system determines may be interesting to the user based on pre-specified criteria (e.g., action, bytes, categoryid, clientip, date_hour, date_mday, date_minute, etc.). The field picker also provides an option to display field names for all the fields present in the events of the search results using the All Fields control 824.

Each field name in the field picker 806 has a value type identifier to the left of the field name, such as value type identifier 826. A value type identifier identifies the type of value for the respective field, such as an "a" for fields that include literal values or a "#" for fields that include numerical values.

Each field name in the field picker also has a unique value count to the right of the field name, such as unique value count 828. The unique value count indicates the number of unique values for the respective field in the events of the search results.

Each field name is selectable to view the events in the search results that have the field referenced by that field name. For example, a user can select the "host" field name, and the events shown in the events list 808 will be updated with events in the search results that have the field that is reference by the field name "host."

2.12. Data Models

A data model is a hierarchically structured search-time mapping of semantic knowledge about one or more datasets. It encodes the domain knowledge used to build a variety of specialized searches of those datasets. Those searches, in turn, can be used to generate reports.

A data model is composed of one or more "objects" (or "data model objects") that define or otherwise correspond to a specific set of data. An object is defined by constraints and attributes. An object's constraints are search criteria that define the set of events to be operated on by running a search having that search criteria at the time the data model is selected. An object's attributes are the set of fields to be exposed for operating on that set of events generated by the search criteria.

Objects in data models can be arranged hierarchically in parent/child relationships. Each child object represents a subset of the dataset covered by its parent object. The top-level objects in data models are collectively referred to as "root objects."

Child objects have inheritance. Child objects inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user can simply select an "e-mail activity" data model object to access a dataset relating to e-mails generally (e.g., sent or received), or select an "e-mails sent" data model object (or data sub-model object) to access a dataset relating to e-mails sent.

Because a data model object is defined by its constraints (e.g., a set of search criteria) and attributes (e.g., a set of fields), a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. A user iteratively applies a model development tool (not shown in FIG. 8A) to prepare a query that defines a subset of events and assigns an object name to that subset. A child subset is created by further limiting a query that generated a parent subset.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. Pat. No. 9,128,980, entitled "GENERATION OF A DATA MODEL APPLIED TO QUERIES", issued on 8 Sep. 2015, and U.S. Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model can also include reports. One or more report formats can be associated with a particular data model and be made available to run against the data model. A user can use child objects to design reports with object datasets that already have extraneous data pre-filtered out. In some embodiments, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also can be generated in a variety of formats, by reference to the data model. Reports, data visualizations, and data model objects can be saved and associated with the data model for future use. The data model object may be used to perform searches of other data.

FIGS. 9-15 are interface diagrams of example report generation user interfaces, in accordance with example embodiments. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 9:
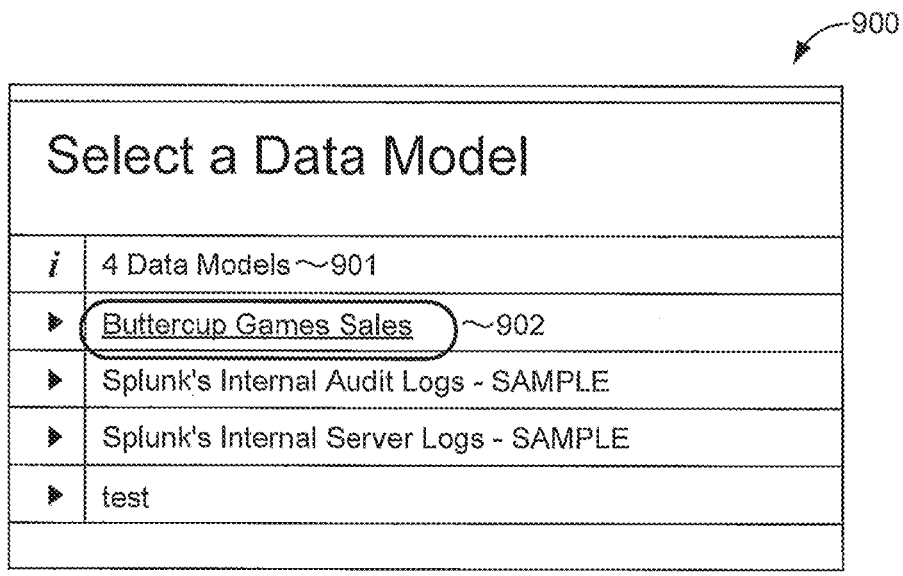

The selection of a data model object for use in driving a report generation may be facilitated by a data model object selection interface. FIG. 9 illustrates an example interactive data model selection graphical user interface 900 of a report editor that displays a listing of available data models 901. The user may select one of the data models 902.

Figure 10:
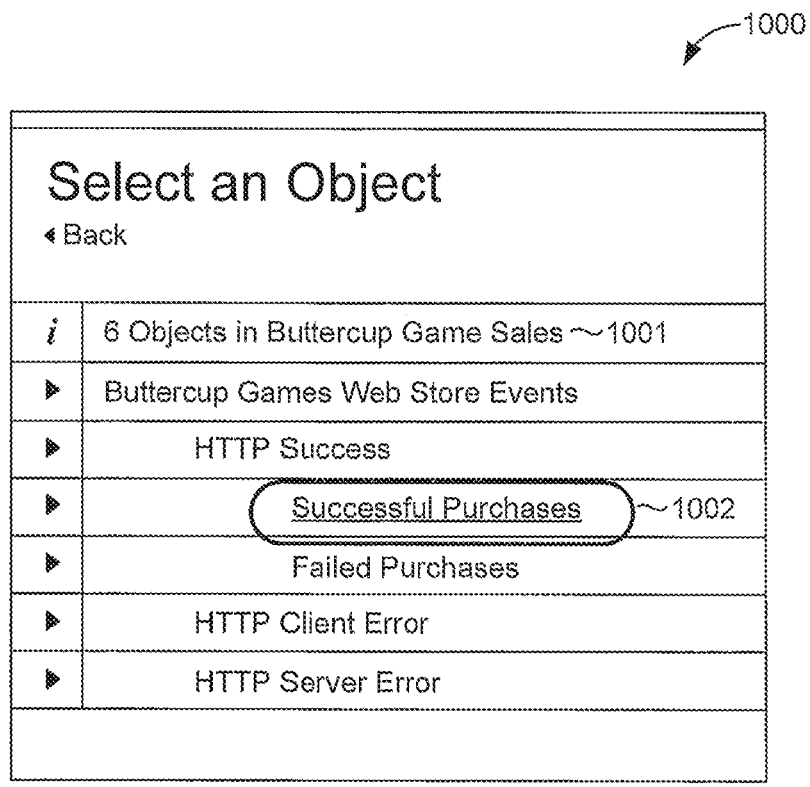

FIG. 10 illustrates an example data model object selection graphical user interface 1000 that displays available data objects 1001 for the selected data object model 902. The user may select one of the displayed data model objects 1002 for use in driving the report generation process.

Figure 11A:
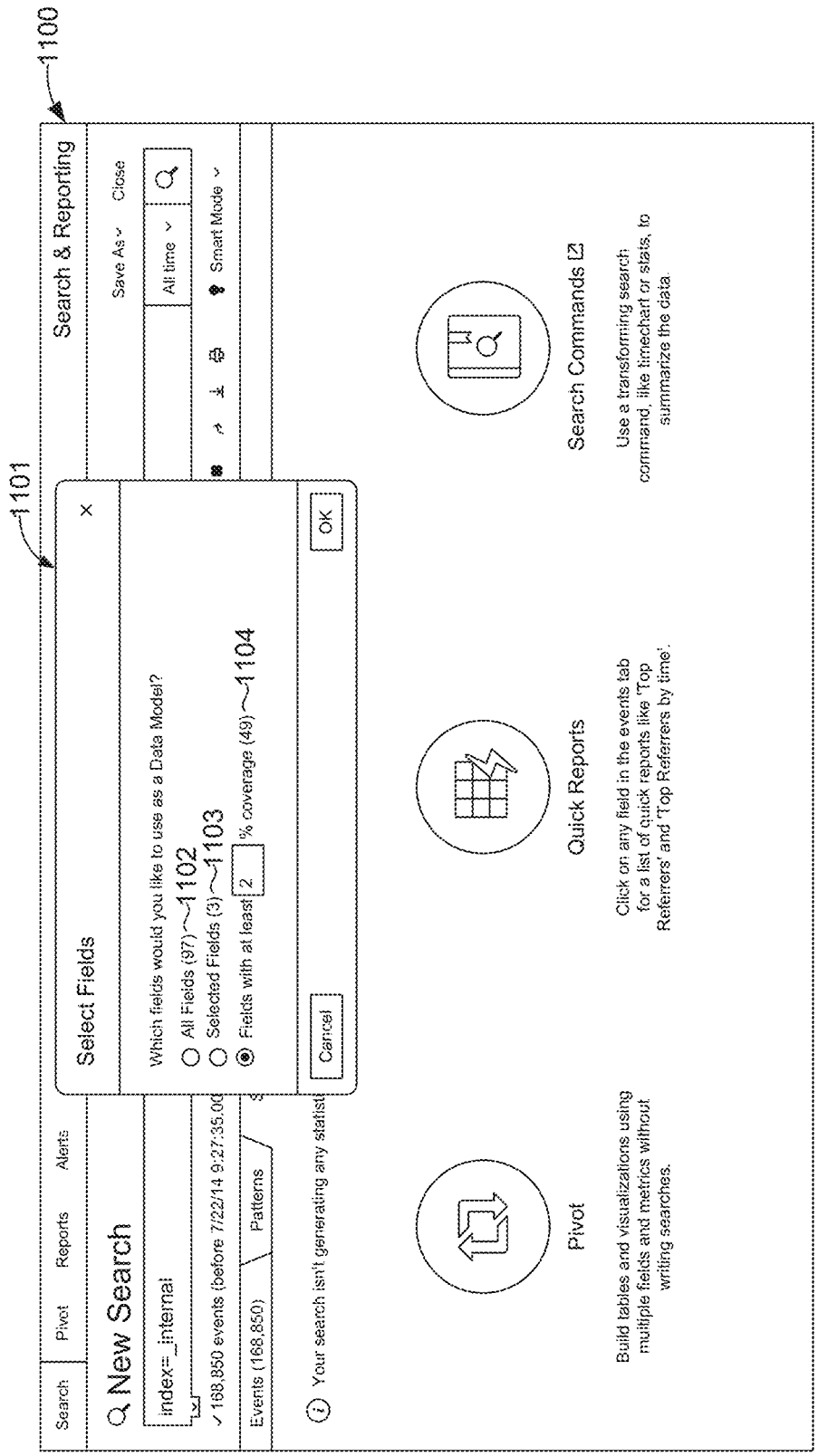

Once a data model object is selected by the user, a user interface screen 1100 shown in FIG. 11A may display an interactive listing of automatic field identification options 1101 based on the selected data model object. For example, a user may select one of the three illustrated options (e.g., the "All Fields" option 1102, the "Selected Fields" option 1103, or the "Coverage" option (e.g., fields with at least a specified % of coverage) 1104). If the user selects the "All Fields" option 1102, all of the fields identified from the events that were returned in response to an initial search query may be selected. That is, for example, all of the fields of the identified data model object fields may be selected. If the user selects the "Selected Fields" option 1103, only the fields from the fields of the identified data model object fields that are selected by the user may be used. If the user selects the "Coverage" option 1104, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 1102 indicates that 97 fields will be selected if the "All Fields" option is selected. The "3" displayed next to the "Selected Fields" option 1103 indicates that 3 of the 97 fields will be selected if the "Selected Fields" option is selected. The "49" displayed next to the "Coverage" option 1104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 11B:
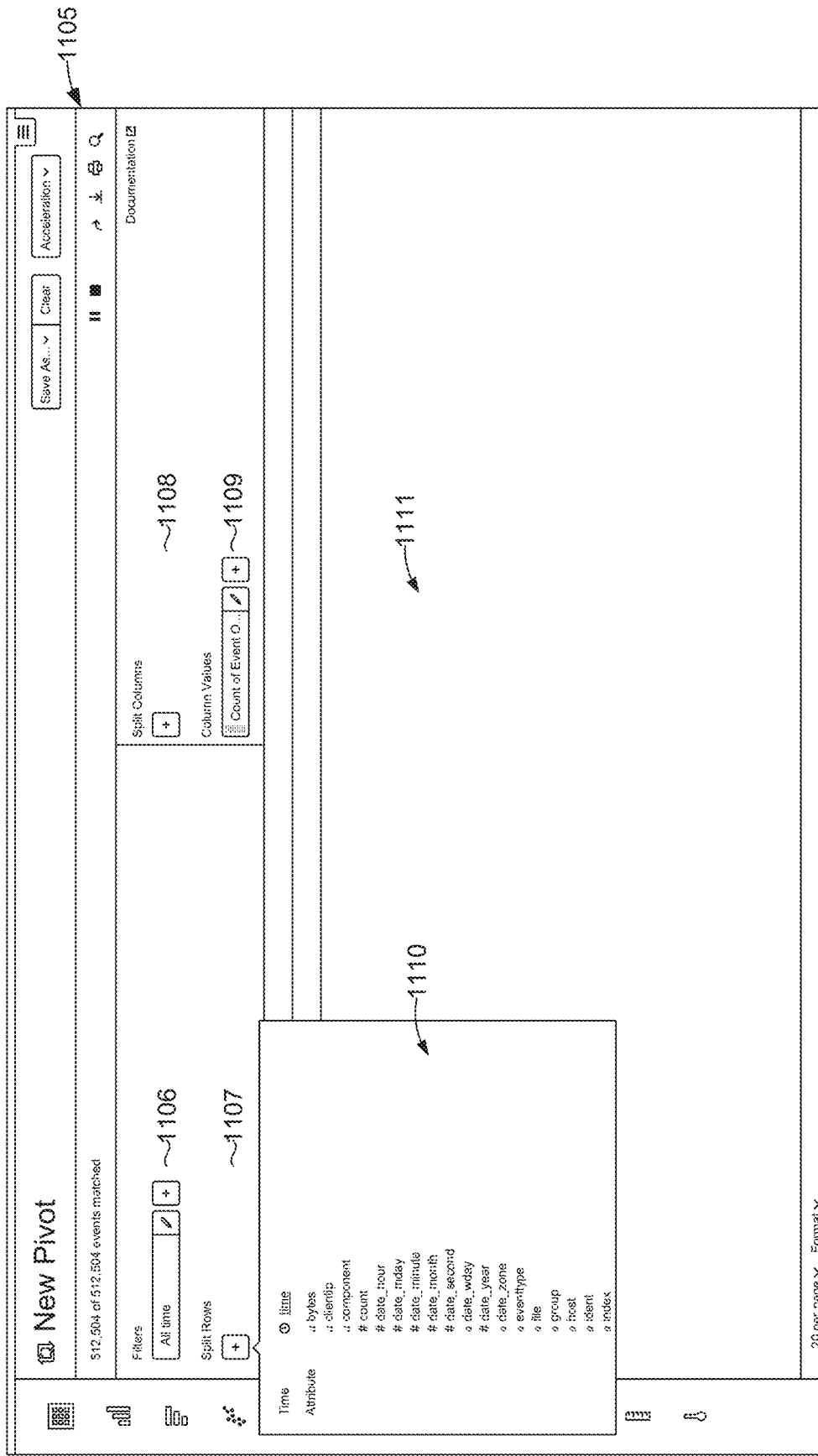
Figure 11C:
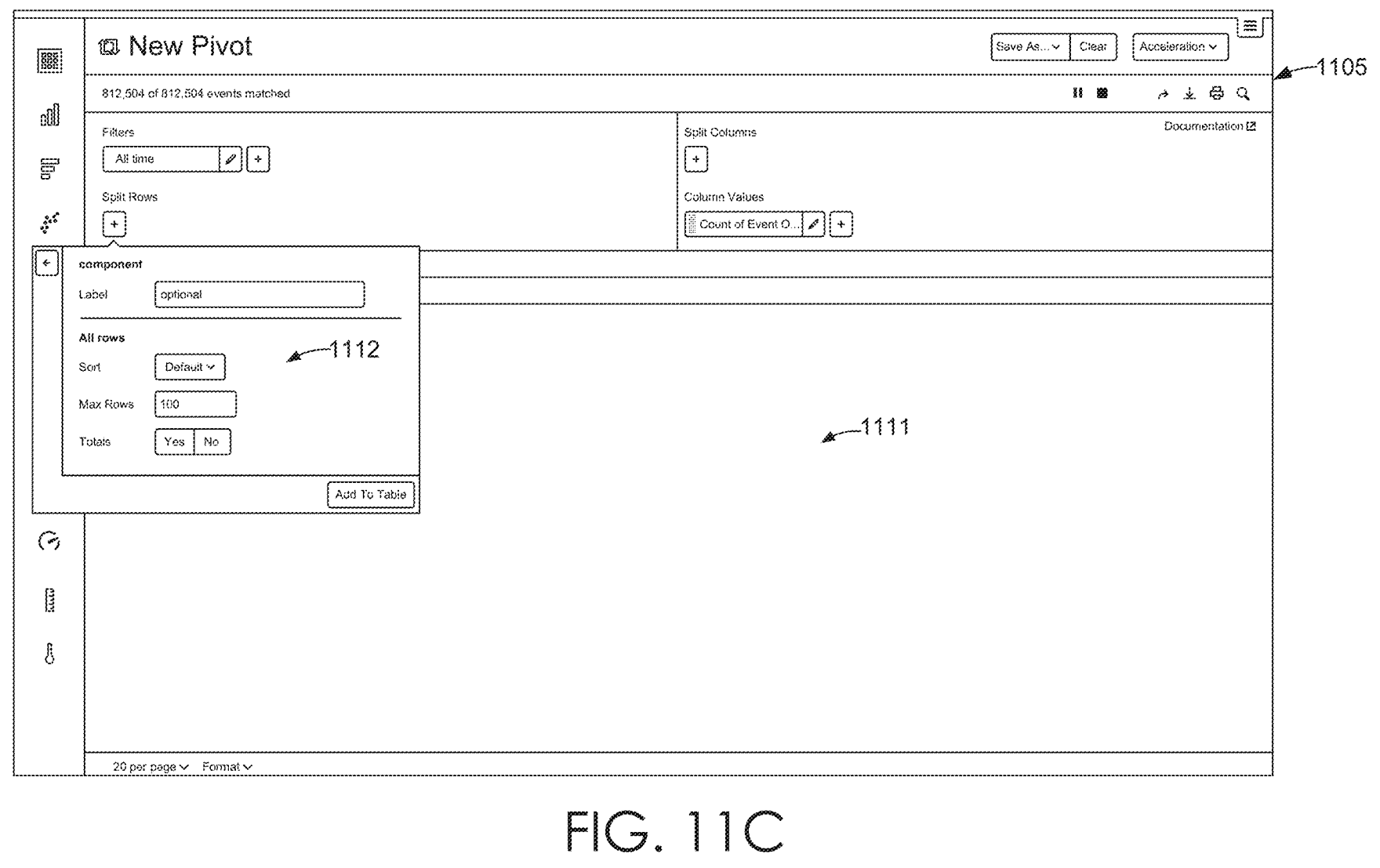

FIG. 11B illustrates an example graphical user interface screen 1105 displaying the reporting application's "Report Editor" page. The screen may display interactive elements for defining various elements of a report. For example, the page includes a "Filters" element 1106, a "Split Rows" element 1107, a "Split Columns" element 1108, and a "Column Values" element 1109. The page may include a list of search results 1111. In this example, the Split Rows element 1107 is expanded, revealing a listing of fields 1110 that can be used to define additional criteria (e.g., reporting criteria). The listing of fields 1110 may correspond to the selected fields. That is, the listing of fields 1110 may list only the fields previously selected, either automatically and/or manually by a user. FIG. 11C illustrates a formatting dialogue 1112 that may be displayed upon selecting a field from the listing of fields 1110. The dialogue can be used to format the display of the results of the selection (e.g., label the column for the selected field to be displayed as "component").

Figure 11D:
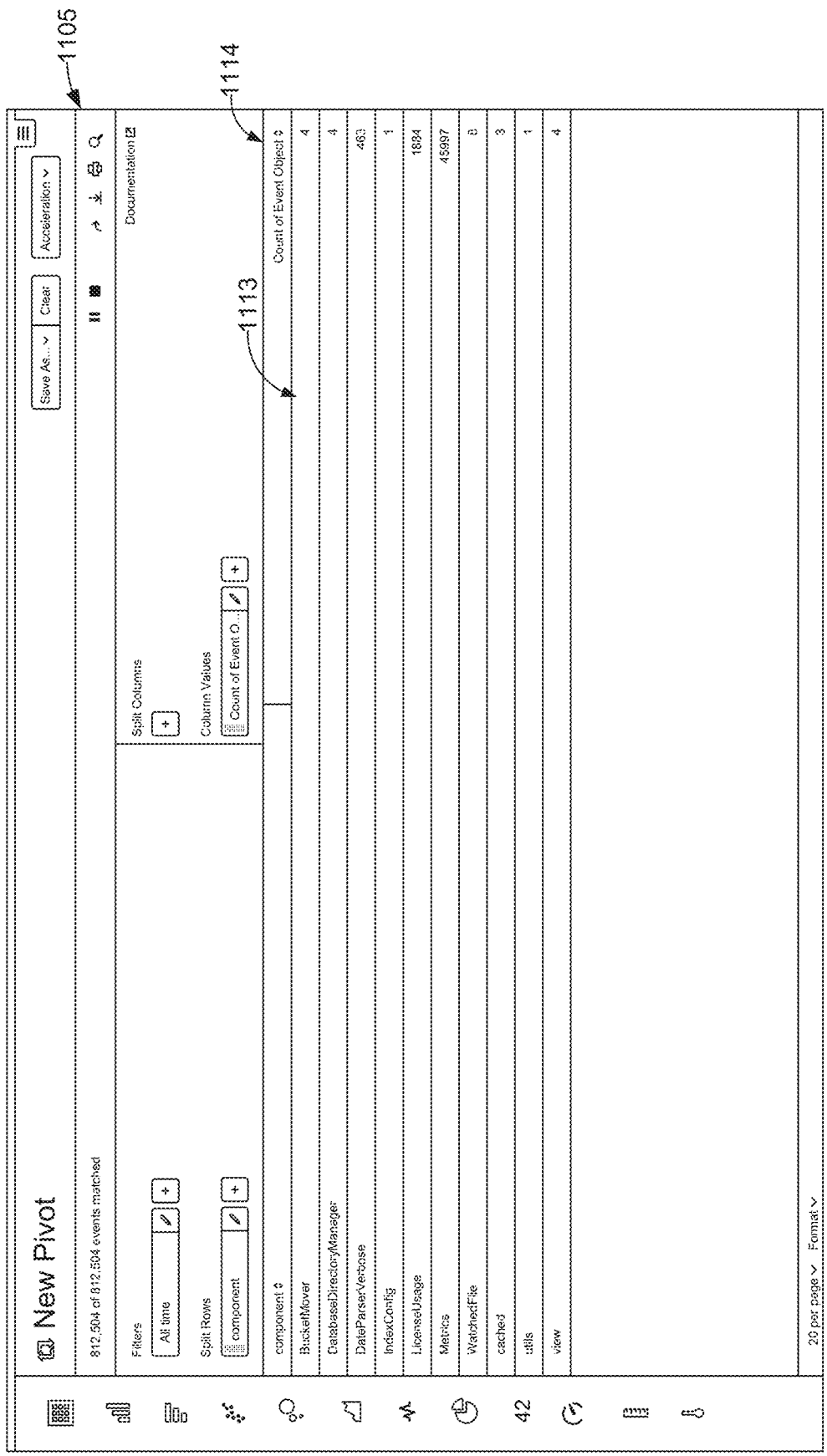

FIG. 11D illustrates an example graphical user interface screen 1105 including a table of results 1113 based on the selected criteria including splitting the rows by the "component" field. A column 1114 having an associated count for each component listed in the table may be displayed that indicates an aggregate count of the number of times that the particular field-value pair (e.g., the value in a row for a particular field, such as the value "BucketMover" for the field "component") occurs in the set of events responsive to the initial search query.

FIG. 12 illustrates an example graphical user interface screen 1200 that allows the user to filter search results and to perform statistical analysis on values extracted from specific fields in the set of events. In this example, the top ten product names ranked by price are selected as a filter 1201 that causes the display of the ten most popular products sorted by price. Each row is displayed by product name and price 1202. This results in each product displayed in a column labeled "product name" along with an associated price in a column labeled "price" 1206. Statistical analysis of other fields in the events associated with the ten most popular products have been specified as column values 1203. A count of the number of successful purchases for each product is displayed in column 1204. These statistics may be produced by filtering the search results by the product name, finding all occurrences of a successful purchase in a field within the events and generating a total of the number of occurrences. A sum of the total sales is displayed in column 1205, which is a result of the multiplication of the price and the number of successful purchases for each product.

Figure 13:
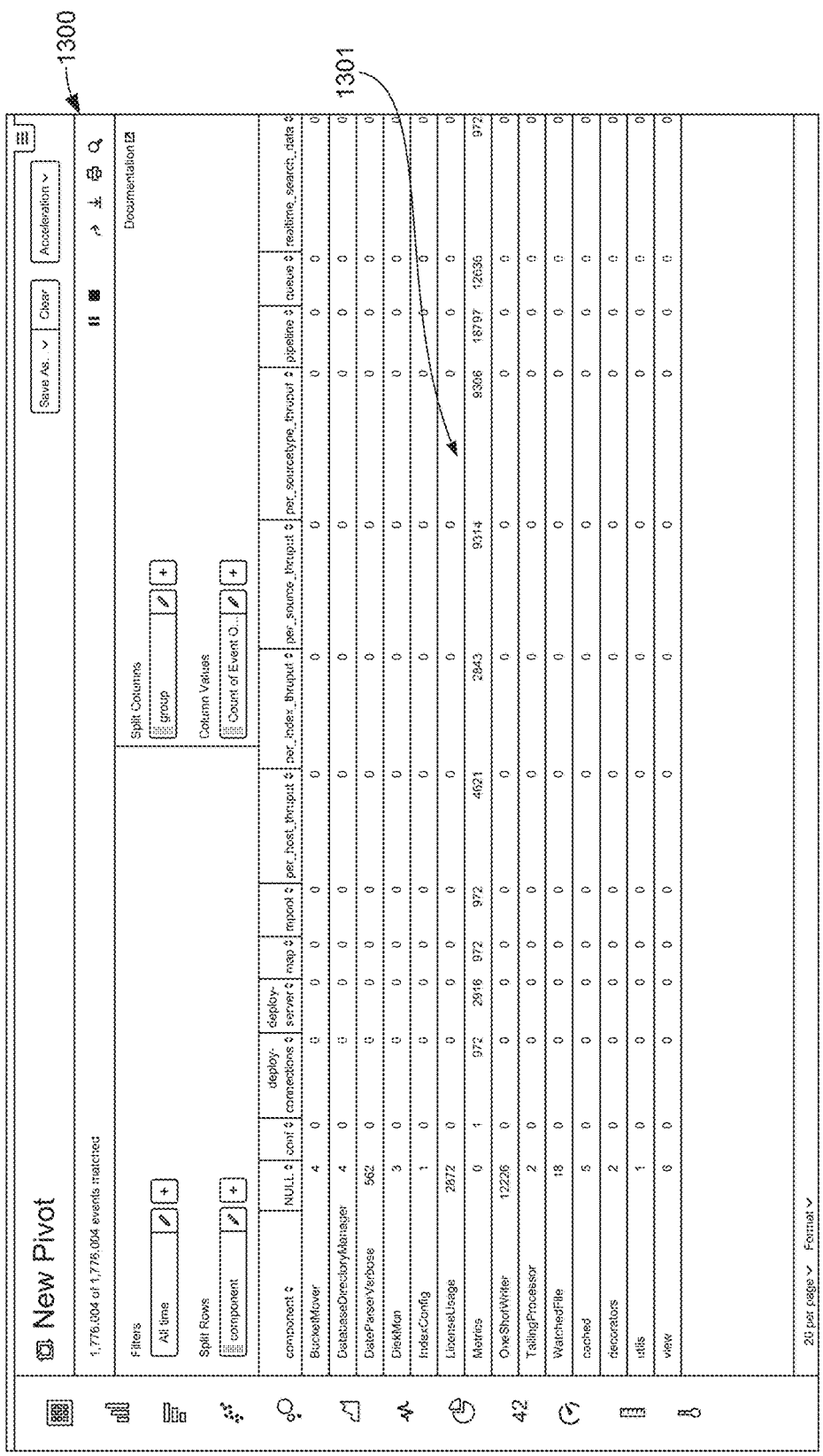
Figure 14:
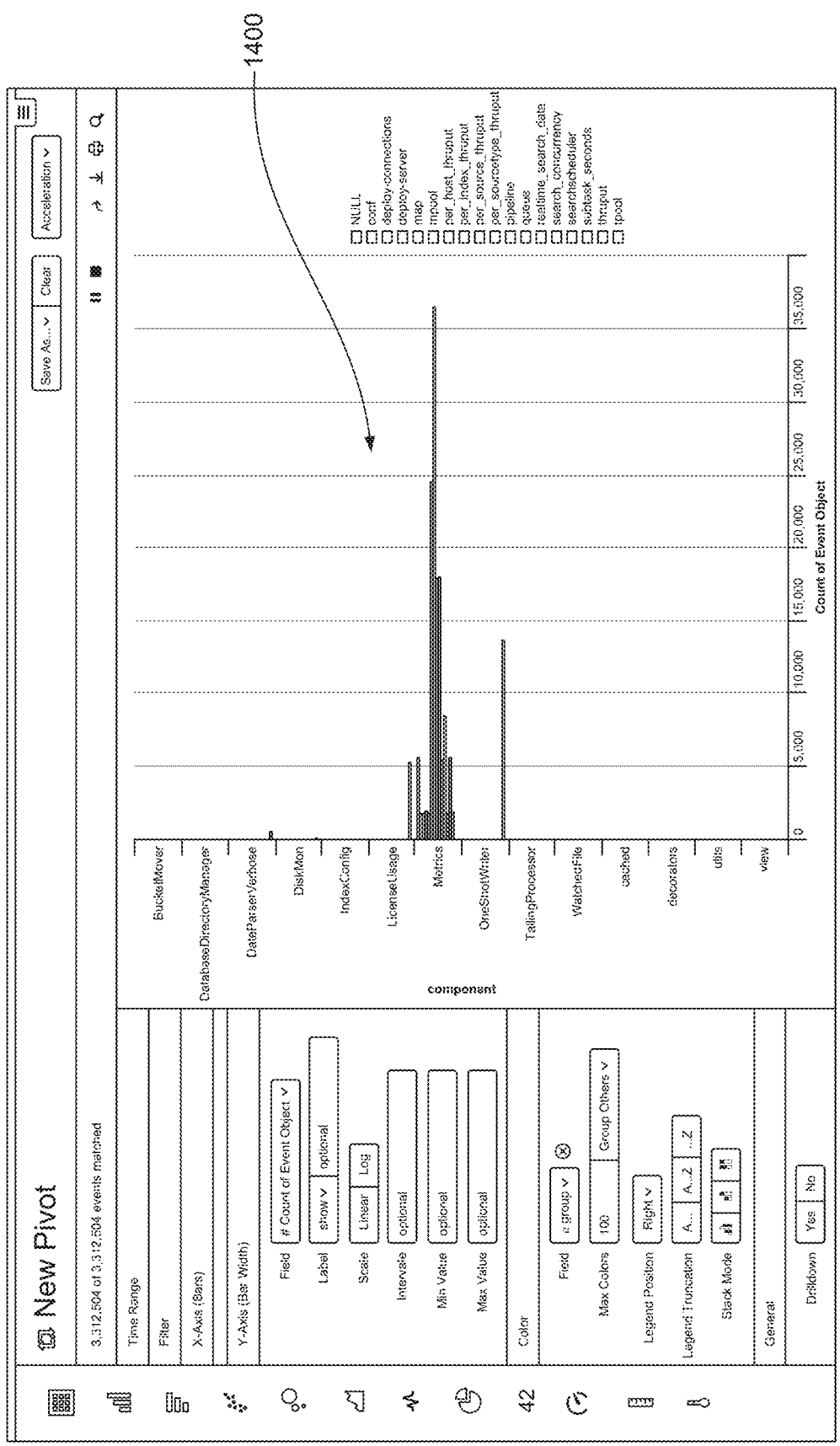
Figure 15:
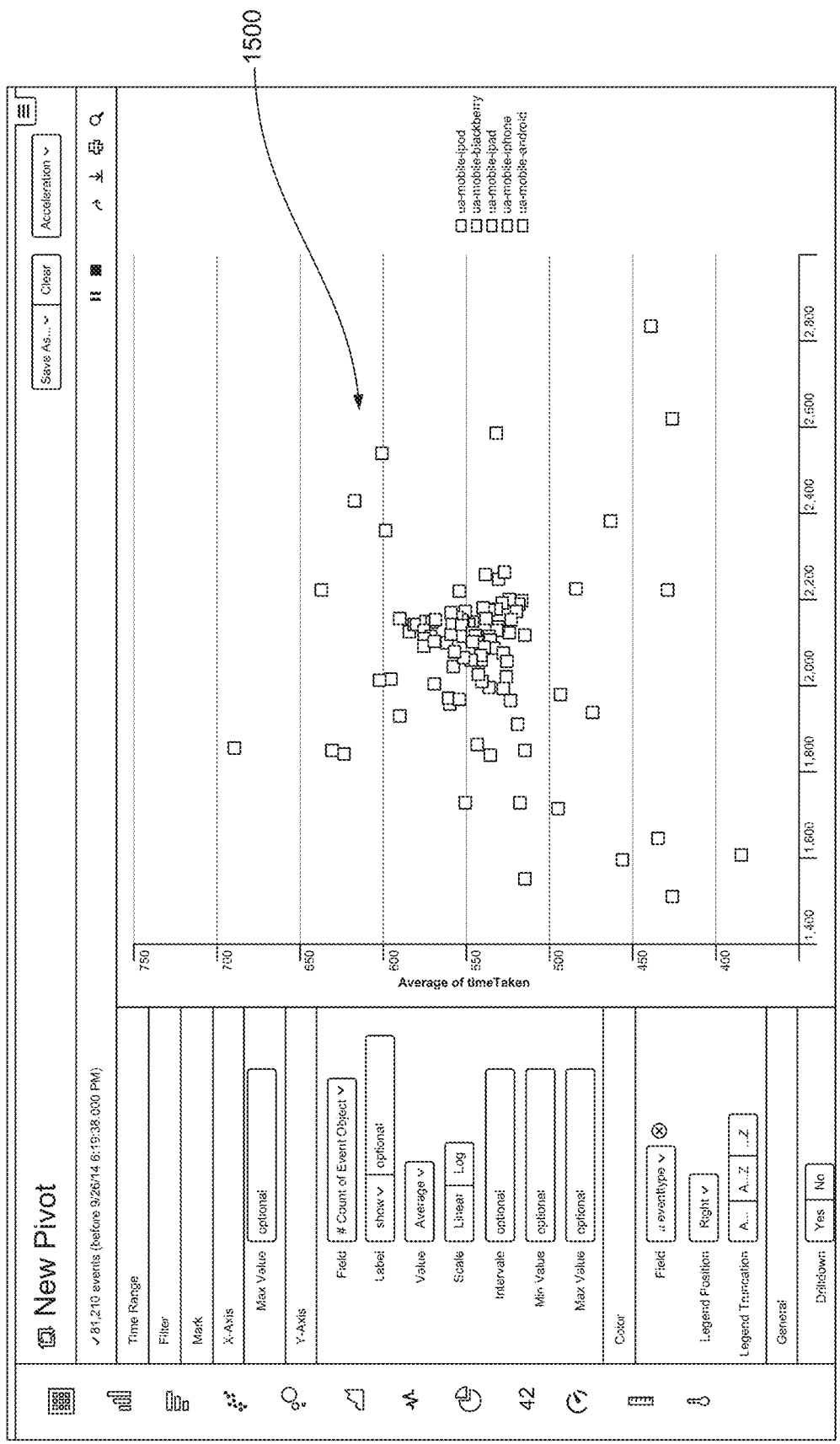

The reporting application allows the user to create graphical visualizations of the statistics generated for a report. For example, FIG. 13 illustrates an example graphical user interface screen 1300 that displays a set of components and associated statistics 1301. The reporting application allows the user to select a visualization of the statistics in a graph (e.g., bar chart, scatter plot, area chart, line chart, pie chart, radial gauge, marker gauge, filler gauge, etc.), where the format of the graph may be selected using the user interface controls 1302 along the left panel of the user interface 1300. FIG. 14 illustrates an example of a bar chart visualization 1400 of an aspect of the statistical data 1301. FIG. 15 illustrates a scatter plot visualization 1500 of an aspect of the statistical data 1301.

2.13. Acceleration Technique

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time. However, performing extraction and analysis operations at search time can involve a large amount of data and require a large number of computational operations, which can cause delays in processing the queries. Advantageously, the data intake and query system also employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.13.1. Aggregation Technique

Figure 16:
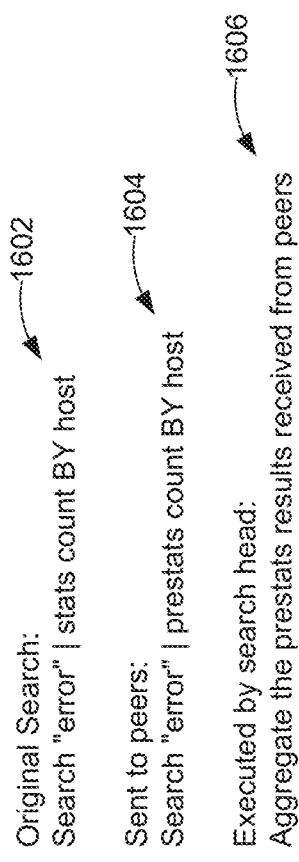
FIG. 16 is an example search query received from a client and executed by search peers, in accordance with example embodiments.

To facilitate faster query processing, a query can be structured such that multiple indexers perform the query in parallel, while aggregation of search results from the multiple indexers is performed locally at the search head. For example, FIG. 16 is an example search query received from a client and executed by search peers, in accordance with example embodiments. FIG. 16 illustrates how a search query 1602 received from a client at a search head 210 can split into two phases, including: (1) subtasks 1604 (e.g., data retrieval or simple filtering) that may be performed in parallel by indexers 206 for execution, and (2) a search results aggregation operation 1606 to be executed by the search head when the results are ultimately collected from the indexers.

During operation, upon receiving search query 1602, a search head 210 determines that a portion of the operations involved with the search query may be performed locally by the search head. The search head modifies search query 1602 by substituting "stats" (create aggregate statistics over results sets received from the indexers at the search head) with "prestats" (create statistics by the indexer from local results set) to produce search query 1604, and then distributes search query 1604 to distributed indexers, which are also referred to as "search peers" or "peer indexers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 6A, or may alternatively distribute a modified version (e.g., a more restricted version) of the search query to the search peers. In this example, the indexers are responsible for producing the results and sending them to the search head. After the indexers return the results to the search head, the search head aggregates the received results 1606 to form a single search result set. By executing the query in this manner, the system effectively distributes the computational operations across the indexers while minimizing data transfers.

2.13.2. Keyword Index

As described above with reference to the flow charts in FIG. 5A and FIG. 6A, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.13.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the events and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815,973, entitled "GENERATING AND STORING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some embodiments of system 108 create a high performance analytics store, which is referred to as a "summarization table," (also referred to as a "lexicon" or "inverted index") that contains entries for specific field-value pairs. Each of these entries keeps track of instances of a specific value in a specific field in the event data and includes references to events containing the specific value in the specific field. For example, an example entry in an inverted index can keep track of occurrences of the value "94107" in a "ZIP code" field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in most embodiments, the search engine will employ the inverted index separate from the raw record data store to generate responses to the received queries.

Note that the term "summarization table" or "inverted index" as used herein is a data structure that may be generated by an indexer that includes at least field names and field values that have been extracted and/or indexed from event records. An inverted index may also include reference values that point to the location(s) in the field searchable data store where the event records that include the field may be found. Also, an inverted index may be stored using well-know compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searchable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index. A collection query is not the same as a query that is used to call up or invoke a pre-existing inverted index. In one or more embodiment, a query can comprise an initial step that calls up a pre-generated inverted index on which further filtering and processing can be performed. For example, referring back to FIG. 13, a set of events generated at block 1320 by either using a "collection" query to create a new inverted index or by calling up a pre-generated inverted index. A query with several pipelined steps will start with a pre-generated index to accelerate the query.

FIG. 7C illustrates the manner in which an inverted index is created and used in accordance with the disclosed embodiments. As shown in FIG. 7C, an inverted index 722 can be created in response to a user-initiated collection query using the event data 723 stored in the raw record data store. For example, a non-limiting example of a collection query may include "collect clientip=127.0.0.1" which may result in an inverted index 722 being generated from the event data 723 as shown in FIG. 7C. Each entry in invertex index 722 includes an event reference value that references the location of a source record in the field searchable data store. The reference value may be used to access the original event record directly from the field searchable data store.

In one or more embodiments, if one or more of the queries is a collection query, the responsive indexers may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, e.g., using regex rules. In FIG. 7C, prior to running the collection query that generates the inverted index 722, the field name "clientip" may need to be defined in a configuration file by specifying the "access_combined" source type and a regular expression rule to parse out the client IP address. Alternatively, the collection query may contain an explicit definition for the field name "clientip" which may obviate the need to reference the configuration file at search time.

In one or more embodiments, collection queries may be saved and scheduled to run periodically. These scheduled collection queries may periodically update the summarization information corresponding to the query. For example, if the collection query that generates inverted index 722 is scheduled to run periodically, one or more indexers would periodically search through the relevant buckets to update inverted index 722 with event data for any new events with the "clientip" value of "127.0.0.1."

In some embodiments, the inverted indexes that include fields, values, and reference value (e.g., inverted index 722) for event records may be included in the summarization information provided to the user. In other embodiments, a user may not be interested in specific fields and values contained in the inverted index, but may need to perform a statistical query on the data in the inverted index. For example, referencing the example of FIG. 7C rather than viewing the fields within summarization table 722, a user may want to generate a count of all client requests from IP address "127.0.0.1." In this case, the search engine would simply return a result of "4" rather than including details about the inverted index 722 in the information provided to the user.

The pipelined search language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index, a "stats" query may generate their result sets rapidly from the summarization information available in the inverted index rather than directly scanning event records. For example, the contents of inverted index 722 can be pipelined to a stats query, e.g., a "count" function that counts the number of entries in the inverted index and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the system can examine the entry in the inverted index to count instances of the specific value in the field without having to go through the individual events or perform data extractions at search time.

In some embodiments, the system maintains a separate inverted index for each of the above-described time-specific buckets that stores events for a specific time range. A bucket-specific inverted index includes entries for specific field-value combinations that occur in events in the specific bucket. Alternatively, the system can maintain a separate inverted index for each indexer. The indexer-specific inverted index includes entries for the events in a data store that are managed by the specific indexer. Indexer-specific inverted indexes may also be bucket-specific. In at least one or more embodiments, if one or more of the queries is a stats query, each indexer may generate a partial result set from previously generated summarization information. The partial result sets may be returned to the search head that received the query and combined into a single result set for the query As mentioned above, the inverted index can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination. In some embodiments, if summarization information is absent from an indexer that includes responsive event records, further actions may be taken, such as, the summarization information may generated on the fly, warnings may be provided the user, the collection query operation may be halted, the absence of summarization information may be ignored, or the like, or combination thereof.

In one or more embodiments, an inverted index may be set up to update continually. For example, the query may ask for the inverted index to update its result periodically, e.g., every hour. In such instances, the inverted index may be a dynamic data structure that is regularly updated to include information regarding incoming events.

In some cases, e.g., where a query is executed before an inverted index updates, when the inverted index may not cover all of the events that are relevant to a query, the system can use the inverted index to obtain partial results for the events that are covered by inverted index, but may also have to search through other events that are not covered by the inverted index to produce additional results on the fly. In other words, an indexer would need to search through event data on the data store to supplement the partial results. These additional results can then be combined with the partial results to produce a final set of results for the query. Note that in typical instances where an inverted index is not completely up to date, the number of events that an indexer would need to search through to supplement the results from the inverted index would be relatively small. In other words, the search to get the most recent results can be quick and efficient because only a small number of event records will be searched through to supplement the information from the inverted index. The inverted index and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.13.3.1. Extracting Event Data Using Posting

In one or more embodiments, if the system needs to process all events that have a specific field-value combination, the system can use the references in the inverted index entry to directly access the events to extract further information without having to search all of the events to find the specific field-value combination at search time. In other words, the system can use the reference values to locate the associated event data in the field searchable data store and extract further information from those events, e.g., extract further field values from the events for purposes of filtering or processing or both.

The information extracted from the event data using the reference values can be directed for further filtering or processing in a query using the pipeline search language. The pipelined search language will, in one embodiment, include syntax that can direct the initial filtering step in a query to an inverted index. In one embodiment, a user would include syntax in the query that explicitly directs the initial searching or filtering step to the inverted index.

Referencing the example in FIG. 15, if the user determines that she needs the user id fields associated with the client requests from IP address "127.0.0.1," instead of incurring the computational overhead of performing a brand new search or re-generating the inverted index with an additional field, the user can generate a query that explicitly directs or pipes the contents of the already generated inverted index 1502 to another filtering step requesting the user ids for the entries in inverted index 1502 where the server response time is greater than "0.0900" microseconds. The search engine would use the reference values stored in inverted index 722 to retrieve the event data from the field searchable data store, filter the results based on the "response time" field values and, further, extract the user id field from the resulting event data to return to the user. In the present instance, the user ids "frank" and "carlos" would be returned to the user from the generated results table 722.

In one embodiment, the same methodology can be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the search engine would again use the reference values stored in inverted index 722 to retrieve the event data from the field searchable data store and, further, extract the object size field values from the associated events 731, 732, 733 and 734. Once, the corresponding object sizes have been extracted (i.e. 2326, 2900, 2920, and 5000), the average can be computed and returned to the user.

In one embodiment, instead of explicitly invoking the inverted index in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 722. The search engine, in this case, would automatically determine that an inverted index 722 already exists in the system that could expedite this query. In one embodiment, prior to running any search comprising a field-value pair, for example, a search engine may search though all the existing inverted indexes to determine if a pre-generated inverted index could be used to expedite the search comprising the field-value pair. Accordingly, the search engine would automatically use the pre-generated inverted index, e.g., index 722 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new search.

The data intake and query system includes one or more forwarders that receive raw machine data from a variety of input data sources, and one or more indexers that process and store the data in one or more data stores. By distributing events among the indexers and data stores, the indexers can analyze events for a query in parallel. In one or more embodiments, a multiple indexer implementation of the search system would maintain a separate and respective inverted index for each of the above-described time-specific buckets that stores events for a specific time range. A bucket-specific inverted index includes entries for specific field-value combinations that occur in events in the specific bucket. As explained above, a search head would be able to correlate and synthesize data from across the various buckets and indexers.

This feature advantageously expedites searches because instead of performing a computationally intensive search in a centrally located inverted index that catalogues all the relevant events, an indexer is able to directly search an inverted index stored in a bucket associated with the time-range specified in the query. This allows the search to be performed in parallel across the various indexers. Further, if the query requests further filtering or processing to be conducted on the event data referenced by the locally stored bucket-specific inverted index, the indexer is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index, or if the search engine automatically determines that using an inverted index would expedite the processing of the query, the indexers will search through each of the inverted indexes associated with the buckets for the specified time-range. This feature allows the High Performance Analytics Store to be scaled easily.

In certain instances, where a query is executed before a bucket-specific inverted index updates, when the bucket-specific inverted index may not cover all of the events that are relevant to a query, the system can use the bucket-specific inverted index to obtain partial results for the events that are covered by bucket-specific inverted index, but may also have to search through the event data in the bucket associated with the bucket-specific inverted index to produce additional results on the fly. In other words, an indexer would need to search through event data stored in the bucket (that was not yet processed by the indexer for the corresponding inverted index) to supplement the partial results from the bucket-specific inverted index.

Figure 7D:
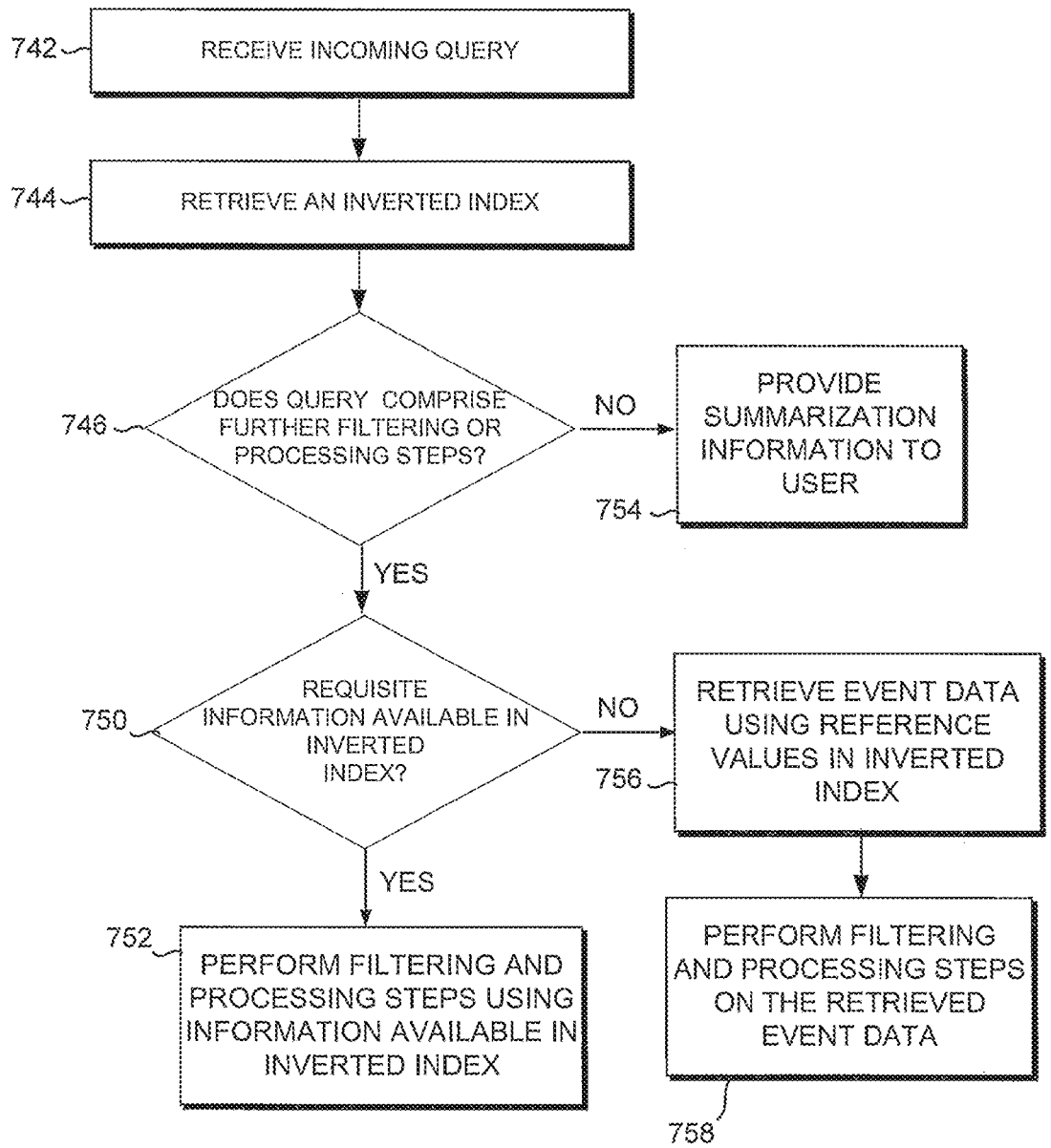
FIG. 7D depicts a flowchart of example use of an inverted index in a pipelined search query, in accordance with example embodiments.

FIG. 7D presents a flowchart illustrating how an inverted index in a pipelined search query can be used to determine a set of event data that can be further limited by filtering or processing in accordance with the disclosed embodiments.

At block 742, a query is received by a data intake and query system. In some embodiments, the query can be receive as a user generated query entered into a search bar of a graphical user search interface. The search interface also includes a time range control element that enables specification of a time range for the query.

At block 744, an inverted index is retrieved. Note, that the inverted index can be retrieved in response to an explicit user search command inputted as part of the user generated query. Alternatively, the search engine can be configured to automatically use an inverted index if it determines that using the inverted index would expedite the servicing of the user generated query. Each of the entries in an inverted index keeps track of instances of a specific value in a specific field in the event data and includes references to events containing the specific value in the specific field. In order to expedite queries, in most embodiments, the search engine will employ the inverted index separate from the raw record data store to generate responses to the received queries.

At block 746, the query engine determines if the query contains further filtering and processing steps. If the query contains no further commands, then, in one embodiment, summarization information can be provided to the user at block 754.

If, however, the query does contain further filtering and processing commands, then at block 750, the query engine determines if the commands relate to further filtering or processing of the data extracted as part of the inverted index or whether the commands are directed to using the inverted index as an initial filtering step to further filter and process event data referenced by the entries in the inverted index. If the query can be completed using data already in the generated inverted index, then the further filtering or processing steps, e.g., a "count" number of records function, "average" number of records per hour etc. are performed and the results are provided to the user at block 752.

If, however, the query references fields that are not extracted in the inverted index, then the indexers will access event data pointed to by the reference values in the inverted index to retrieve any further information required at block 756. Subsequently, any further filtering or processing steps are performed on the fields extracted directly from the event data and the results are provided to the user at step 758.

2.13.4. Accelerating Report Generation

In some embodiments, a data server system such as the data intake and query system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on these additional events. Then, the results returned by this query on the additional events, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer events needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

2.14. Security Features

The data intake and query system provides various schemas, dashboards, and visualizations that simplify developers' tasks to create applications with additional capabilities. One such application is the an enterprise security application, such as SPLUNK® ENTERPRISE SECURITY, which performs monitoring and alerting operations and includes analytics to facilitate identifying both known and unknown security threats based on large volumes of data stored by the data intake and query system. The enterprise security application provides the security practitioner with visibility into security-relevant threats found in the enterprise infrastructure by capturing, monitoring, and reporting on data from enterprise security devices, systems, and applications. Through the use of the data intake and query system searching and reporting capabilities, the enterprise security application provides a top-down and bottom-up view of an organization's security posture.

The enterprise security application leverages the data intake and query system search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (SIEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application provides pre-specified schemas for extracting relevant values from the different types of security-related events and enables a user to define such schemas.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the enterprise security application facilitates detecting "notable events" that are likely to indicate a security threat. A notable event represents one or more anomalous incidents, the occurrence of which can be identified based on one or more events (e.g., time stamped portions of raw machine data) fulfilling pre-specified and/or dynamically-determined (e.g., based on machine-learning) criteria defined for that notable event. Examples of notable events include the repeated occurrence of an abnormal spike in network usage over a period of time, a single occurrence of unauthorized access to system, a host communicating with a server on a known threat list, and the like. These notable events can be detected in a number of ways, such as: (1) a user can notice a correlation in events and can manually identify that a corresponding group of one or more events amounts to a notable event; or (2) a user can define a "correlation search" specifying criteria for a notable event, and every time one or more events satisfy the criteria, the application can indicate that the one or more events correspond to a notable event; and the like. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 17A:
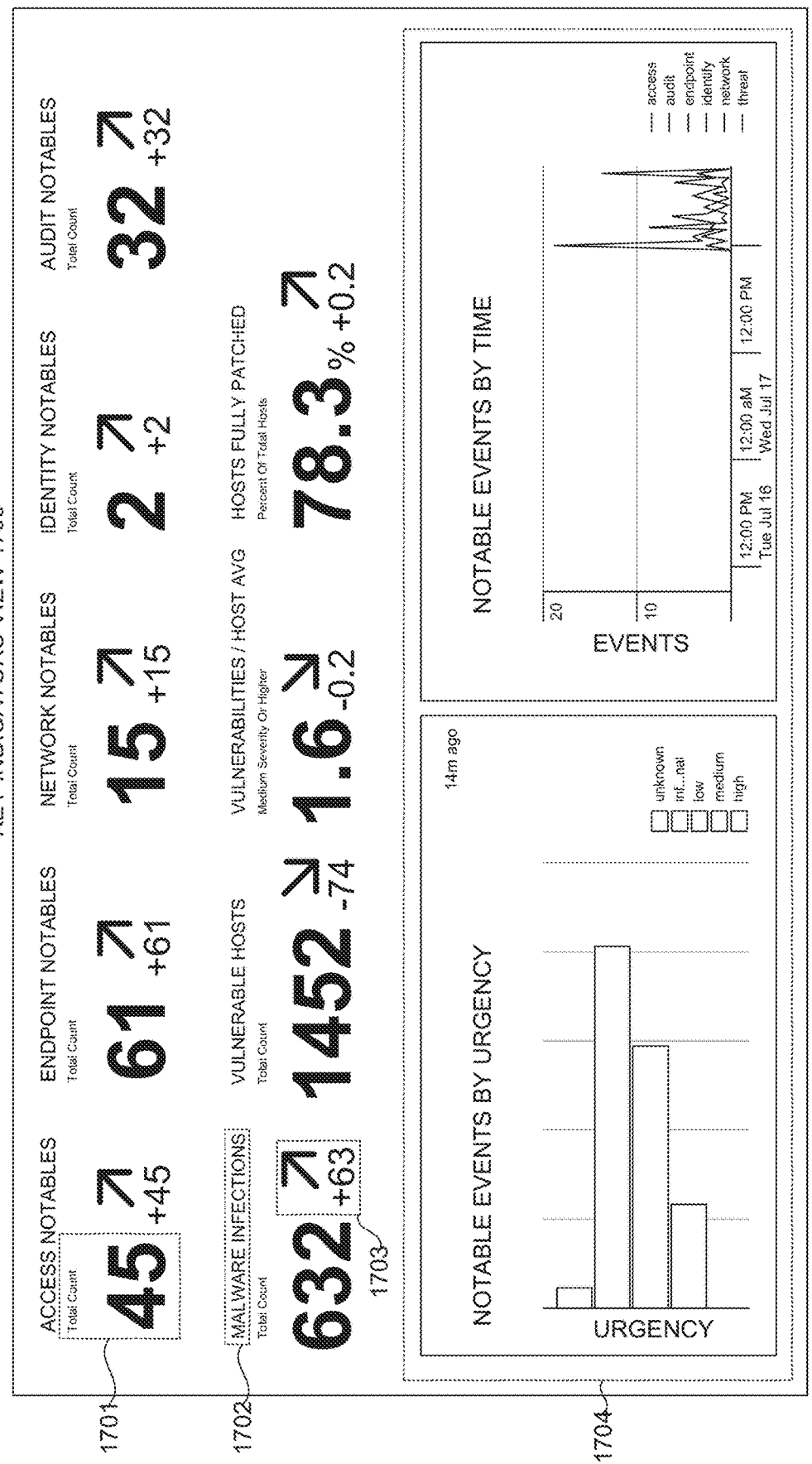
FIG. 17A is an interface diagram of an example user interface of a key indicators view, in accordance with example embodiments.

The enterprise security application provides various visualizations to aid in discovering security threats, such as a "key indicators view" that enables a user to view security metrics, such as counts of different types of notable events. For example, FIG. 17A illustrates an example key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 17B:
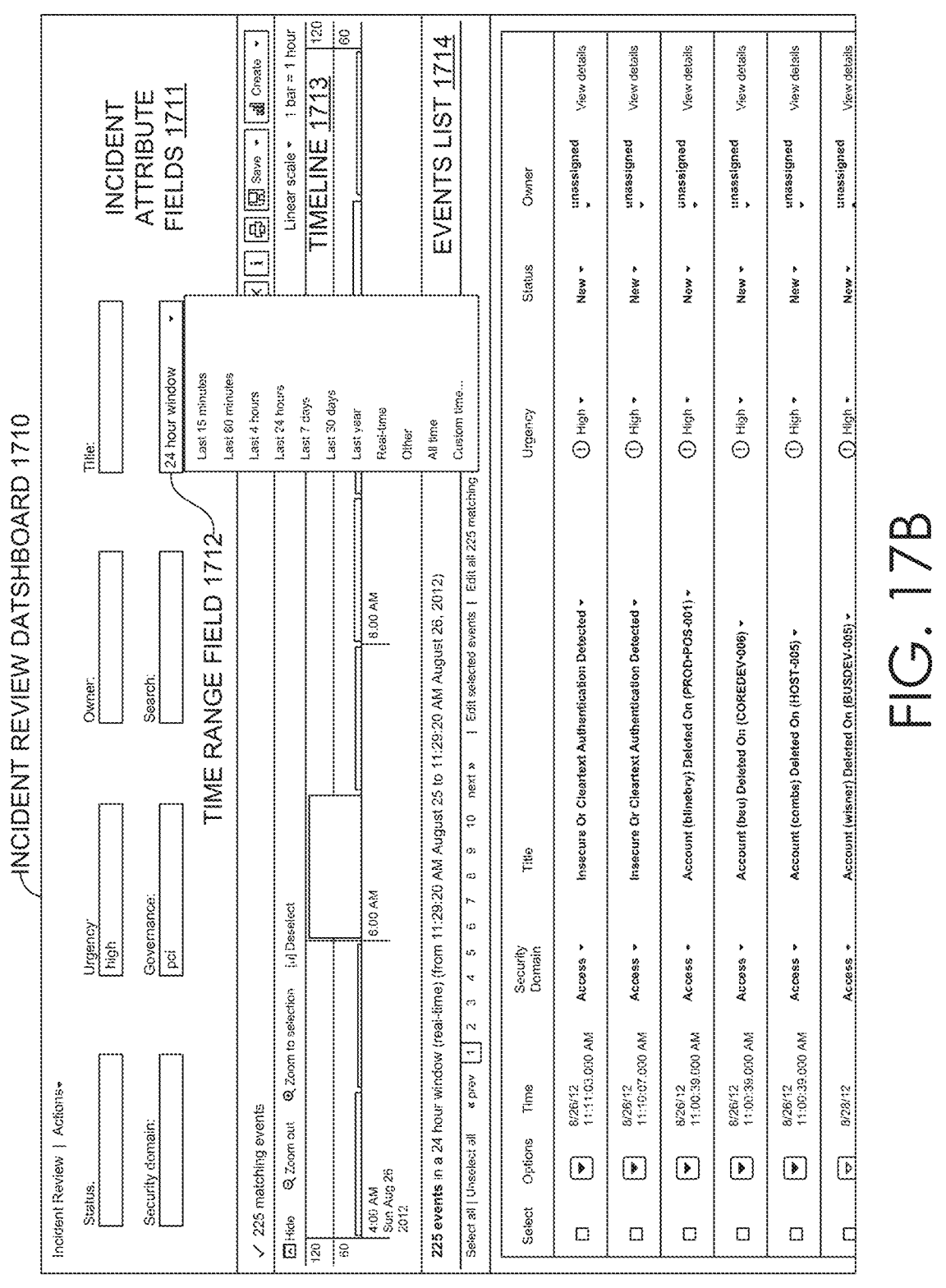

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 17B illustrates an example incident review dashboard 1710 that includes a set of incident attribute fields 1711 that, for example, enables a user to specify a time range field 1712 for the displayed events. It also includes a timeline 1713 that graphically illustrates the number of incidents that occurred in time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.15. Data Center Monitoring

As mentioned above, the data intake and query platform provides various features that simplify the developer's task to create various applications. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the virtual machine monitoring application stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the virtual machine monitoring application provides pre-specified schemas for extracting relevant values from different types of performance-related events, and also enables a user to define such schemas.

Figure 17C:
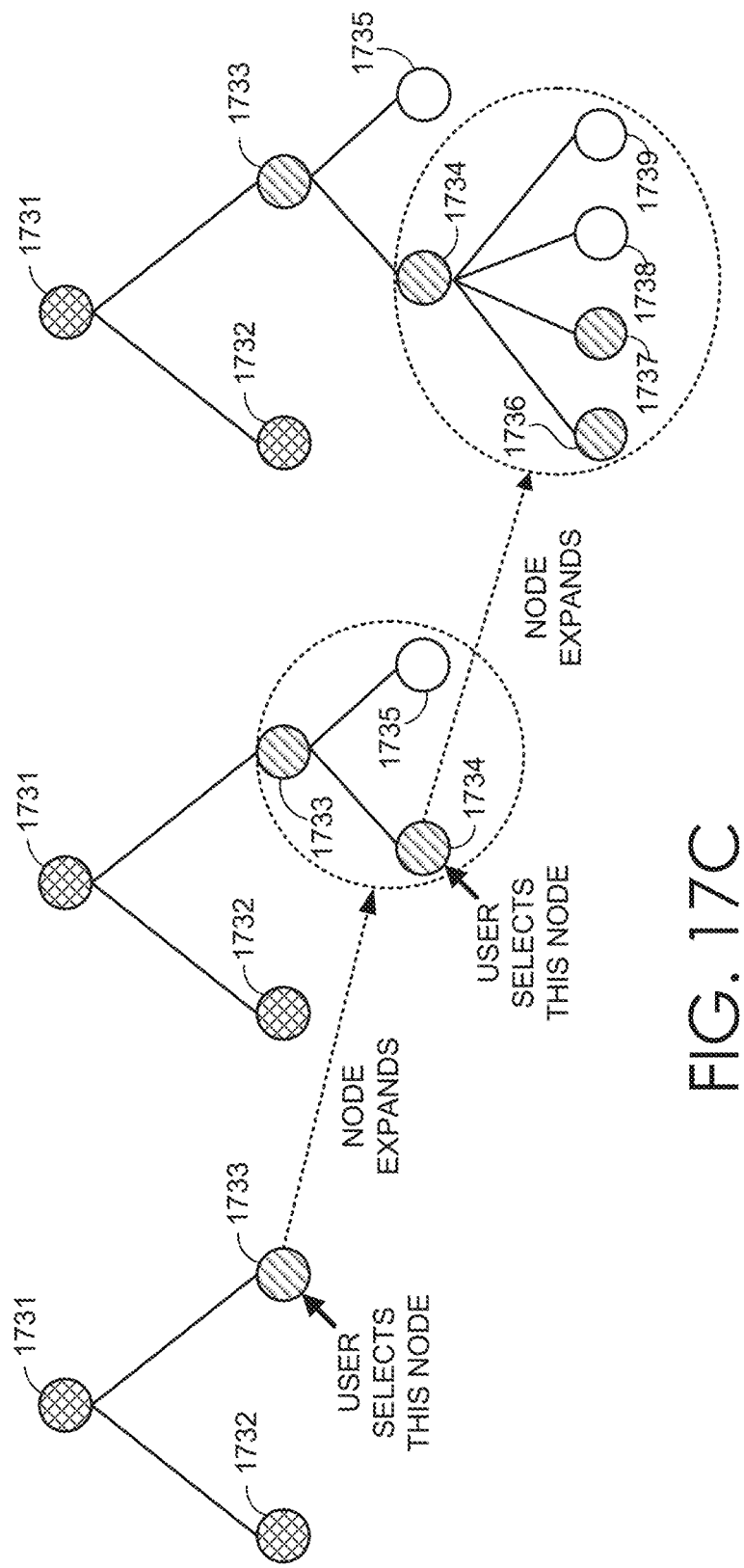
FIG. 17C is a tree diagram of an example a proactive monitoring tree, in accordance with example embodiments.

The virtual machine monitoring application additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 17C, wherein nodes 1733 and 1734 are selectively expanded. Note that nodes 1731-1739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes.

Figure 17D:
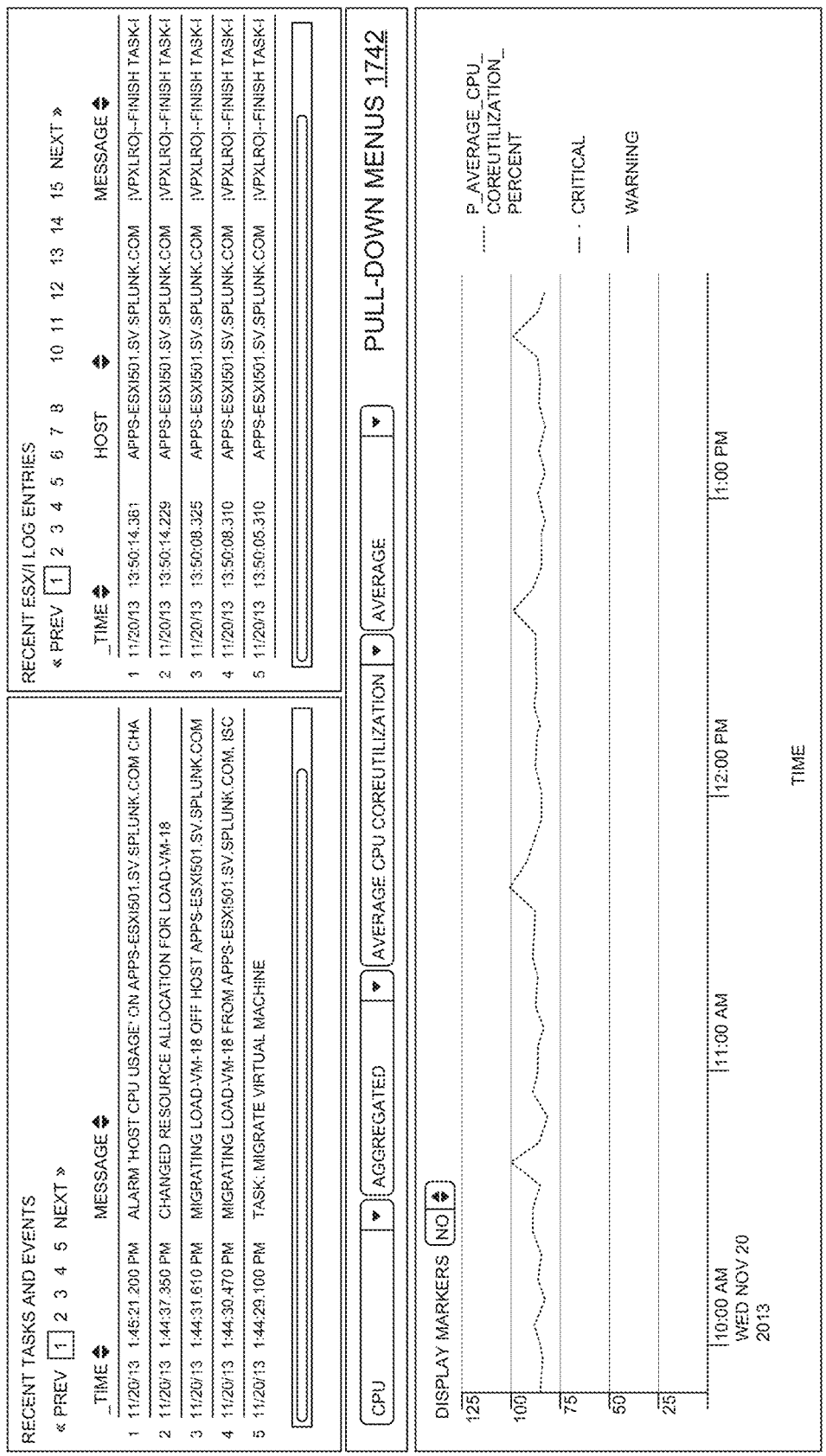
FIG. 17D is an interface diagram of an example a user interface displaying both log data and performance data, in accordance with example embodiments.

The virtual machine monitoring application also provides a user interface that enables a user to select a specific time range and then view heterogeneous data comprising events, log data, and associated performance metrics for the selected time range. For example, the screen illustrated in FIG. 17D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes. One of skill should consider, generally, the usefulness of the correlation of metrics and log (event) data for time ranges with embodiments described herein that relate to processing timeframes or time ranges of data.

2.16. IT Service Monitoring

As previously mentioned, the data intake and query platform provides various schemas, dashboards and visualizations that make it easy for developers to create applications to provide additional capabilities. One such application is an IT monitoring application, such as SPLUNK® IT SERVICE INTELLIGENCE™, which performs monitoring and alerting operations. The IT monitoring application also includes analytics to help an analyst diagnose the root cause of performance problems based on large volumes of data stored by the data intake and query system as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

One or more Key Performance Indicators (KPI's) are defined for a service within the IT monitoring application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

The IT monitoring application facilitates the production of meaningful aggregate KPI's through a system of KPI thresholds and state values. Different KPI definitions may produce values in different ranges, and so the same value may mean something very different from one KPI definition to another. To address this, the IT monitoring application implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. The IT monitoring application can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in the IT monitoring application can include informational fields that can serve as metadata, implied data fields, or attributed data fields for the events identified by other aspects of the entity definition. Entity definitions in the IT monitoring application can also be created and updated by an import of tabular data (as represented in a CSV, another delimited file, or a search query result set). The import may be GUI-mediated or processed using import parameters from a GUI-based import definition process. Entity definitions in the IT monitoring application can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, the IT monitoring application can recognize notable events that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, California SPLUNK® IT SERVICE INTELLIGENCE™ provides various visualizations built on its service-centric organization of events and the KPI values generated and collected. Visualizations can be particularly useful for monitoring or investigating service performance. The IT monitoring application provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

The IT monitoring application provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

The IT monitoring application provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

The IT monitoring application provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

The IT monitoring application provides pre-specified schemas for extracting relevant values from the different types of service-related events. It also enables a user to define such schemas.

2.17. Multi-Tier Architecture

An architecture supporting multi-tier deployment may be advantageous in focusing the resources of an enterprise. An enterprise may have different system users, or groups of users, at different locations, with different roles and responsibilities. A multi-tier architecture may permit effective and efficient deployment of data input and query system (DIQS) instances with user-appropriate applications. DIQS instances supporting lower-tier, focused, work group oriented applications, for example, may be tailored to meet the specific needs of the associated application(s). Such tailoring may reduce installation size and operating burden both in terms of computing resources, space resources, and administrative overhead. Further DIQS instances for lower-tiers may be tightly packaged with a related lower-tier application, such that each is preconfigured for integrated operation with the other in an optimal way. Such integrated instances may all but eliminate administrative requirements for deployment that are not site-dependent.

Such lower-tier deployments may have interfaces to higher-tier deployments to reduce duplications of computing and human effort, to share functionality across the boundary, and to interoperate to provide feature integrations, for example. An illustrative example may be helpful. In the example, an enterprise may have deployed a lower-tier Entity Monitor application (EMA) that provides entity monitoring to a local workgroup of users tasked with the reliable operation of a bank of server racks. That same enterprise may have deployed a higher-tier service monitoring system (SMS) application that is used by the staff of a networks operation center to monitor major services provided by the enterprise information technology (IT) environment. (SPLUNK® IT SERVICE INTELLIGENCE™ is an example of such an SMS.) Enterprise email and customer-facing web page delivery may be examples of such services, and the services are performed by entities such as the servers in the racks monitored by the EMA. In the example enterprise, the deployed EMA may maintain a collection of entity definitions having information about the server entities, and the EMA may perform analytics against machine data pertaining to the entities a produce valuable metrics or representations reflective of the entities. Similarly, the deployed SMS may maintain its own collection of entity definitions having information about a broad set of entities including the server entities, and the SMS may perform analytics against machine data pertaining to the entities and produce valuable metrics or representations reflective of the entities in a broader context, such as the importance of an entity to maintaining the operation of a critical system service. The EMA and the SMS each has information the other does not, and may not be able to produce on its own, regarding an overlapping set of entities. Interfaces enable synergistic operational combinations.

In an embodiment, the lower-tier applications and the higher-tier applications interface to provide: one or more of mapped groupings of entities to the higher-tier services, both automatically and manually, business-level metrics which can be tied to data from the lower-tier application to create an end-to-end analysis of infrastructure impact on business outcomes; multiple lower-tier application instances together with other tools and custom data in the higher-tier application; identification of anomalous entities in the higher-tier application for correlation across the enterprise, improved interface at the higher-tier application for management of entities, and end to end navigation for monitoring and troubleshooting issues (service to entity).

In an embodiment, lower-tier monitoring applications integrate natively with the higher-tier application to provide one or more entity sharing, transition from services to entity metrics analysis, management and actions on alerts from entities in a Notable Events framework, and application of advanced machine language available in the higher-level monitoring application to entities for clustering and reliability forecasting.

Users, such as system administrators and site reliability engineers, for example, are tasked with maintaining the overall health, availability, reliability and performance of one or more entities within an enterprise system in an information technology (IT) environment. Each entity may be a computing device, a virtual computing device, a group of computing devices or a group of virtual computing devices at a specific site or multiple sites within the enterprise system. Typically, these users monitor approximately entities of 800 to 1,000 computing devices.

Lower-tier applications, programs, or solutions of an event-based data intake and query system provide an analytics driven tool for infrastructure monitoring and troubleshooting of the entities that represent a subset of the enterprise system. While a higher-tier application of an event-based data intake and query system, such as the SPLUNK® ENTERPRISE system developed by Splunk Inc. of San Francisco, California can analyze machine data across the enterprise system, the lower-tier application searches the machine data from the entities and provides entity-level metrics related to the performance of the selected entities within the enterprise system.

Embodiments of the lower-tier application are directed to monitoring performance of an entity at an entity-level using key performance indicators derived from machine data from the entity. Implementations of the lower-tier application provide users with metrics related to the performance of a monitored entity within an enterprise system in an information technology environment. The lower-tier-tier application allows users to monitor entities from a bottom-up perspective and provide visualization to trouble shoot entity related issues.

In an embodiment, lower-tier applications provide an analytic-driven IT operations tool that unifies metrics and logs for trouble shooting and monitoring hybrid IT infrastructure.

In a further embodiment, the lower-tier applications are single team focused and provide simple tagging and grouping, reliability scoring on entities and groups anomaly detection and adaptive thresholding for easy tuning; 24 hours of alerts and notifications with ability to mute alerts; metrics analysis workspace built into product; in-application collection guidance; self-service, and easy deployment.

In an embodiment, the lower-tier applications and the higher-tier applications interface to provide one or more of map groupings of entities to the higher-tier services, both automatically and manually, business-level metrics which can be tied to data from the lower-tier application to create an end to end analysis of infrastructure impact on business outcomes; multiple lower-tier application instances together with other tools and custom data in the higher-tier application; identification of anomalous entities in the higher-tier application for correlation across the enterprise, improved interface at the higher-tier application for management of entities, and end to end navigation for monitoring and troubleshooting issues (service to entity).

In an embodiment, lower-tier monitoring applications integrate natively with the higher-tier application to provide one or more entity sharing, transition from services to entity metrics analysis, management and actions on alerts from entities in a Notable Events framework, and application of advanced machine language available in the higher-level monitoring application to entities for clustering and reliability forecasting.

In some embodiments, the lower-tier application does not permit clustering. Further, the user is not permitted to write applications that use the search engine, but is provided with graphic user interfaces for visualization of the entity-level metrics. The lower-tier applications comprise a single use, single channel solution.

Lower-tier applications may generally be considered to have more focused functionality than a higher-tiered application. Accordingly, a data input and query system (DIQS) with the functionality to sustain a higher-tiered application has no difficulty sustaining a lower-tiered application. However, it may be advantageous for a DIQS deployment strictly supporting a lower-tier application, or applications, to have no more complexity than what is required to support those lower-tier applications. Such a tailoring of the DIQS may simplify deployment, and reduce ongoing administration and overhead and operational costs.

Figure 18:
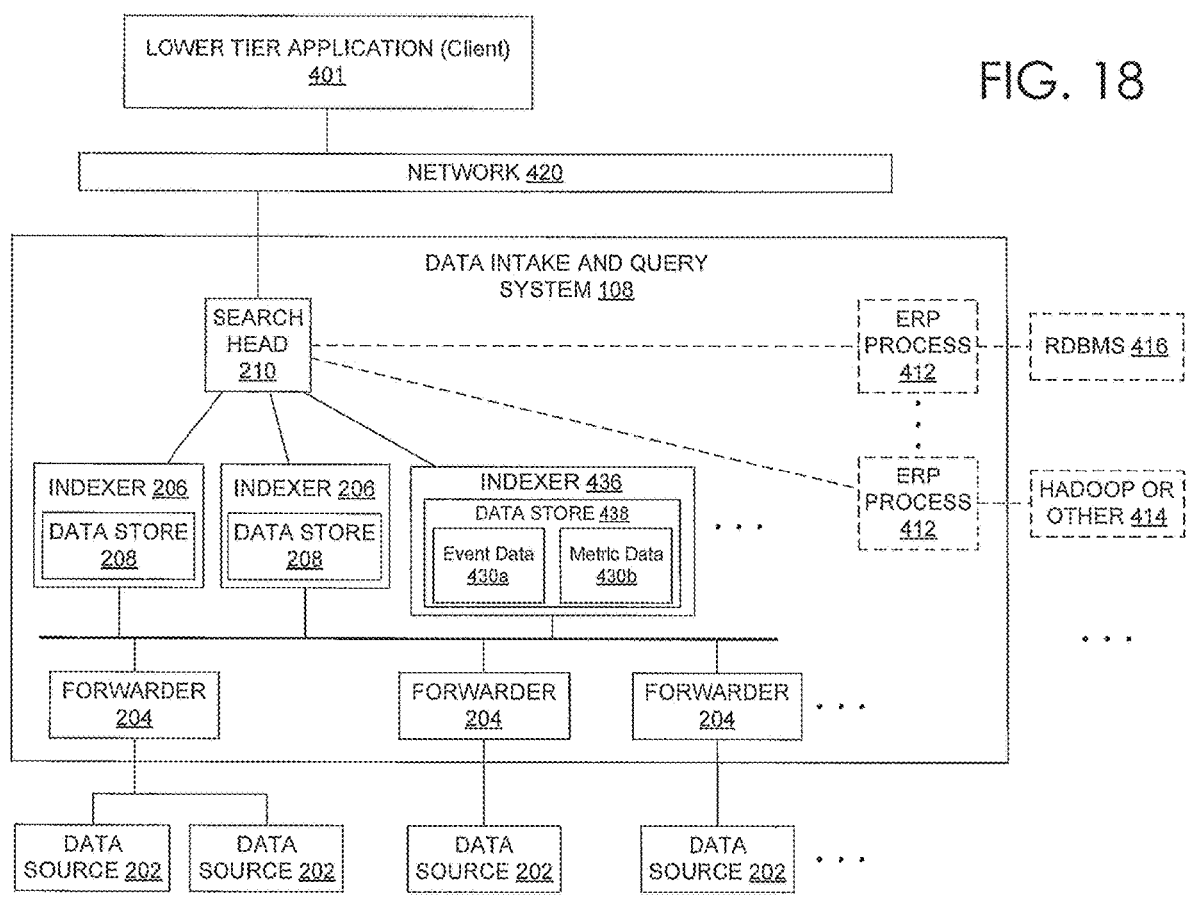
FIG. 18 is a block diagram of an example of a data intake and query system that supports the application level functionality of a lower-tier application, in accordance with example embodiments.

FIG. 18 shows a block diagram of an example of a data intake and query system 108 that supports the application level functionality of a lower-tier application in one embodiment. FIG. 18 represents an adaptation of the data input and query system 108 of FIG. 4 and like elements have common numbering as between the two figures, and the descriptions thereof are not repeated here. Notable differences for the example embodiment illustrated in FIG. 18 are described now. Client devices 404a, 404b, and 404n, of FIG. 4 are replaced in FIG. 18 by lower tier application 401 which acts as the client in relation to the underlying data input and query system (DIQS) 108. High functionality, direct user access to the underlying DIQS may generally not be provided. The DIQS may be adapted, supplied, configured, and provisioned to effect support for requests presented by the lower tier application, in an embodiment. As one example, DIQS 108 of FIG. 18 may exclude support for External Result Provider (ERP) processing as indicated by the dashed lines around and connecting ERP processes 412, RDBMS ERP 416, and Hadoop ERP 414. In one embodiment, a developer or provider of the lower-tier application may configure the DIQS functionality to only include what is required by the lower-tier application, perhaps through a user interface directed to building a customized DIQS configuration instance. In one embodiment, a customized DIQS instance may be able to be shared by a number of lower-tier applications such as 401.

In comparison to the DIQS 108 of FIG. 4, the DIQS 108 of FIG. 18 is shown to also include indexer instance 436 having data store 438. Indexer 436 and data store 438 operate just as described for indexers 206 and data stores 208 of FIG. 4—and any indexer 206 and data store 208 may comport with the details next described for indexer 436 and data store 438 of FIG. 18. Indexer 436 of FIG. 18 when processing the data of its associated data store 438 may distinguish and discriminate between different types or classes of data in its data store. Data store 438 is shown to include Event Data 430a storing data of an event data type and Metric Data 430b of metric data type. Event type data is already described in detail elsewhere in this written description. Metric type data may be data that is characteristically small per occurrence, high in volume, primarily numeric, and perhaps highly structured. An example of data with those characteristics may be performance or parameter measurements being constantly reported by networked devices such as computing machines in information technology environments, automated machinery on the shop floor of a factory, or sensors on the windmills of an energy farm. An indexer such as 436 having multiple data type capability may use functional processing specialized to the data type when responding to requests from search head 210 or receiving data from a forwarder 204. For example, indexer 436 may use different processing to effect the formatting, storage, indexing, retrieval, consolidation, aggregation, and such, of metric type data than it does for event type data in order to maximize or optimize the processing of each type of data to improve overall DIQS performance and functionality. Lower tier application 401 may invoke the processing of DIQS 108 for multiple types of data and, in one embodiment, the types of data supported by the indexers (206, 436) may be configurable for an instance of DIQS 108 customized to the lower tier application. These and other embodiments are possible.

Embodiments of the higher-tier application are directed to monitoring performance of a system at a service-level using key performance indicators derived from machine language. Implementations of the higher-tier application provide users with metrics related to the performance of a monitored service, such as services pertaining to an information technology environment. The higher-tier application allows users to monitor services from a top-down perspective and provide through customizable graphic user interfaces visualization to trouble shoot service related issues. Higher-tier applications permit clustering and users are permitted to create customer applications that use the search engine.

One example of a higher-tier application is an IT monitoring application, such as SPLUNK® IT SERVICE INTELLIGENCE™, which performs monitoring and alerting operations. U.S. Patent Publication No. US2017/0147681A1, entitled "Portable Control Modules in a Machine Data Driven Service Monitoring System, filed on Jan. 9, 2017, provides robust description of the IT SERVICE INTELLIGENCE™ higher-tier application, and is hereby incorporated by reference in its entirety.

2.17.1. Lower-Tier Application of a Data Intake and Query System

Operational machine components of an information technology (IT) environment generate disparate forms of machine data. Network connections are established between these components and processors of an automatic data intake and query system (DIQS). The DIQS conducts network transactions on a periodic and/or continuous basis with the machine components to receive the disparate data and ingest certain of the data as entries of a DIQS datastore that is searchable for DIQS query processing.

An IT environment may have different system users, or groups of users, at different locations, with different roles and responsibilities. A multi-tier DIQS architecture may permit effective and efficient deployment of DIQS instances with user-appropriate applications. A higher-tiered DIQS application may receive search queries to process against the received and ingested data via a network interface, and display the results of the search queries on the network interface.

DIQS instances supporting lower-tier, focused, work group oriented applications may be tailored to meet the specific needs of the users.

2.17.1.1. Configuration Prior to Deployment of Data Collection

In the DIQS supporting the higher-tier application (the higher-tier DIQS), ingested raw data is divided into segments of raw data delineated by time segments (e.g., blocks of raw data, each associated with a specific time frame). The segments of raw data are indexed as timestamped events, corresponding to their respective time segments. The system stores the timestamped events in a data store, as described in detail herein. A user prepares search queries to process against the received and ingested data via a network interface. This occurs after deploying collectors, such as the forwarders 204. The DIQS supporting the higher-tier application displays the results of the search queries on the network interface.

The DIQS supporting the lower-tier application (the lower-tier DIQS) can simplify the user's participation in preparing search criteria and still be tailored to meet the needs of the user. Rather than offer pre-configured options for the lower-tier applications, the lower-tier DIQS offers the user the ability to customize data collection before deploying the collectors for host entities within the IT environment. The lower-tier DIQS provides user interfaces to permit users to tailor the display of the customized data collection for their needs.

In one embodiment, the lower-tier DIQS comprises computer-executable instructions that, when executed by a computer system, cause the computer system to provide a graphic user inter (GUI), which the user uses to select metric(s) for data collection and/or log source(s) for event collection. Once the user has selected the metric(s) and/or log source(s), the lower-tier DIQS generates custom script that the user enters into the command line of the lower-tier DIQS application on the host entity. When the lower-tier DIQS executes on the host entity, the custom script causes the collection of the user-specified data and events from the monitored entities. The lower-tier DIQS displays the collected data and events for trouble shooting and analysis.

In one embodiment, the lower-tier DIQS causes the display of an interface enabling a user to indicate a selection of machine data factors for ingestion by the lower-tier DIQS instance from a targeted execution platform, receives user input via the interface comprising indications of the selection, and adapts the content of an installation script for the targeted execution platform based at least in part on the received indications. In an embodiment the installation script is a single installation script. Such a targeted execution platform, in an embodiment, may be a data source machine in relation to the DIQS.

The lower-tier DIQS can cause the performance of the installation script at the targeted execution platform. The lower-tier DIQS can cause the performance of the installation script at the targeted execution platform to thereby configure and initiate processing at the targeted execution platform to supply machine data as indicated by the user input, and receive machine data at the DIQS for ingestion from the targeted execution platform in accordance with the performance of the installation script. The user input can include an indication of a recipient of the machine data. The lower-tier DIQS can display a representation of the adapted content of the installation script in the interface. The installation script can install software on the host entity, create configuration files, or modify configuration files. The installation script can install a collection agent at the targeted execution platform to collect machine data as indicated by the user input. The installation script can determine an operating system associated with the targeted execution platform and install a collection agent based on the determined operating system. The installation script can install a forwarder. The targeted execution platform can be a host computing platform of an information technology (IT) environment.

The machine data factors comprise metrics that can include one or more of CPU-related performance metrics, disk free-related performance metrics, disk-related performance metrics, interface-related performance metrics, load-related performance metrics, and memory-related performance metrics. The machine data factors comprise metrics and log sources.

The interface can further enable the user to indicate metadata factors for association with each of the machine data factors ingested by the DIQS instance from the targeted execution platform where the metadata factors can comprise key/value pairs to add dimensions to the machine data. The user input can include signifiers of the metadata factors. The metadata factors can comprise one or more of an environment of the targeted execution platform, a physical location of a machine associated with the targeted execution platform, an owner of the machine associated with the targeted execution platform, and an escalation priority of the machine associated with the targeted execution platform. The performance of the installation script can automatically cause at least one metadata factor to be associated with each of the machine data factors ingested by the DIQS instance from the targeted execution platform. The at least one automatically associated metadata factor can comprises at least one of an operating system of a machine associated with the targeted execution platform, a version of the operating system, and a system IP address of the targeted execution platform. The lower-tier DIQS can adapt the content of the installation script based at least in part on the received signifiers. The installation script can create or modify the configuration information of the DIQS instance to thereby cause the association of the metadata factors with ingested machine data factors.

In one embodiment, the lower-tier DIQS causes a display of an interface having a set of fields for indicating metrics be used for data collection on a data source machine, the metrics comprising one or more of CPU-related metrics, disk-related metrics, network interface-related metrics, data traffic-related metrics, and memory-related metrics, receives at the interface data collection information from a user, where the data collection information comprises at least one metric to be used for the data collection on the data source machine, and generates, based on the received data collection information, a command operable to establish data sourcing functionality on the data source machine.

The data collection information can include at least one log source and/or key/value pairs. Establishing data source functionality can comprise installation and configuration of a forwarder operable on the data source machine. Establishing data source functionality can configure and/or cause transmission of source data having the at least one metric from the data source machine in due course.

Figure 63:
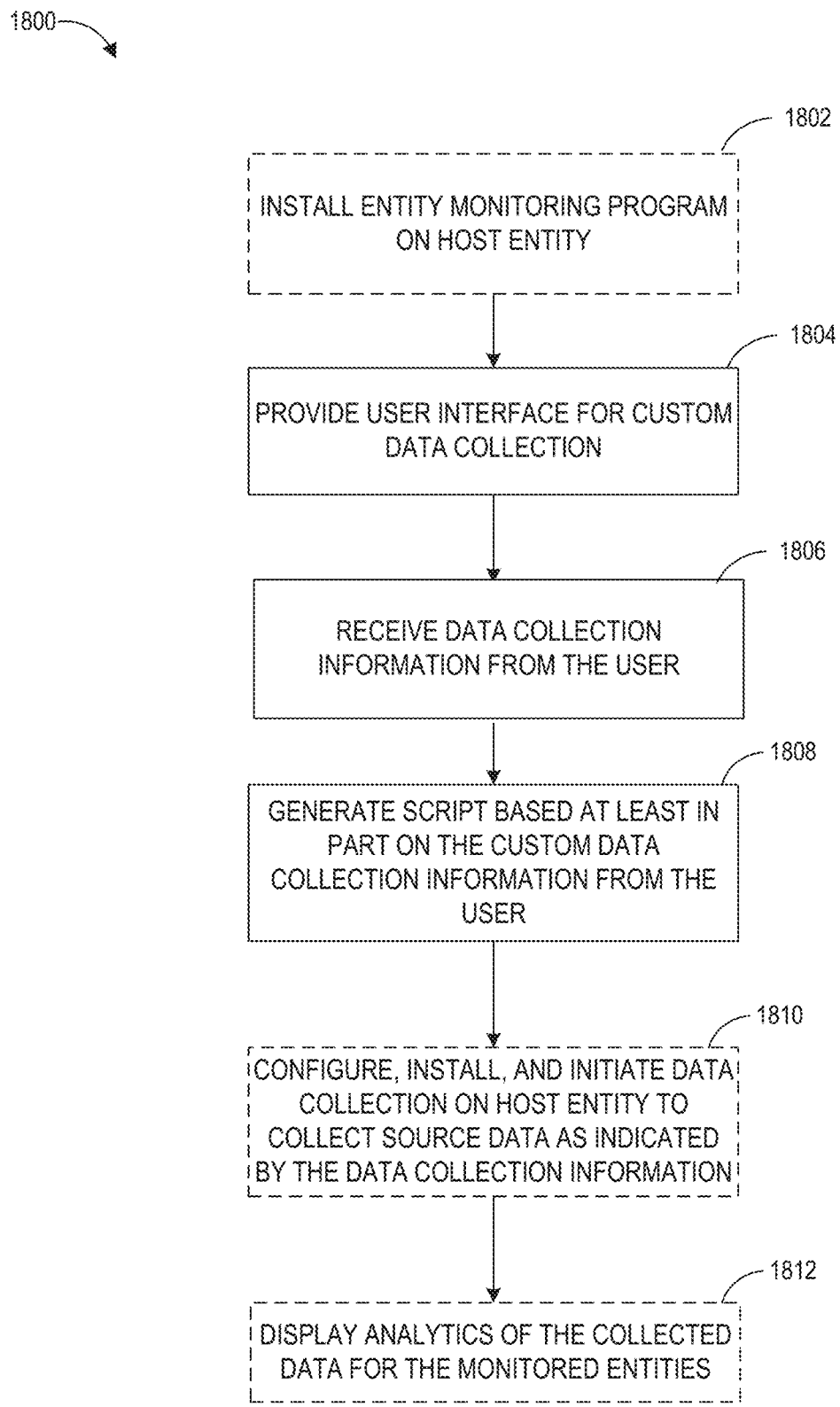
FIG. 63 is a flowchart of an example method for selecting metrics prior to deployment in a lower-tier application of a data intake and query system, in accordance with example embodiments.
Figure 64:
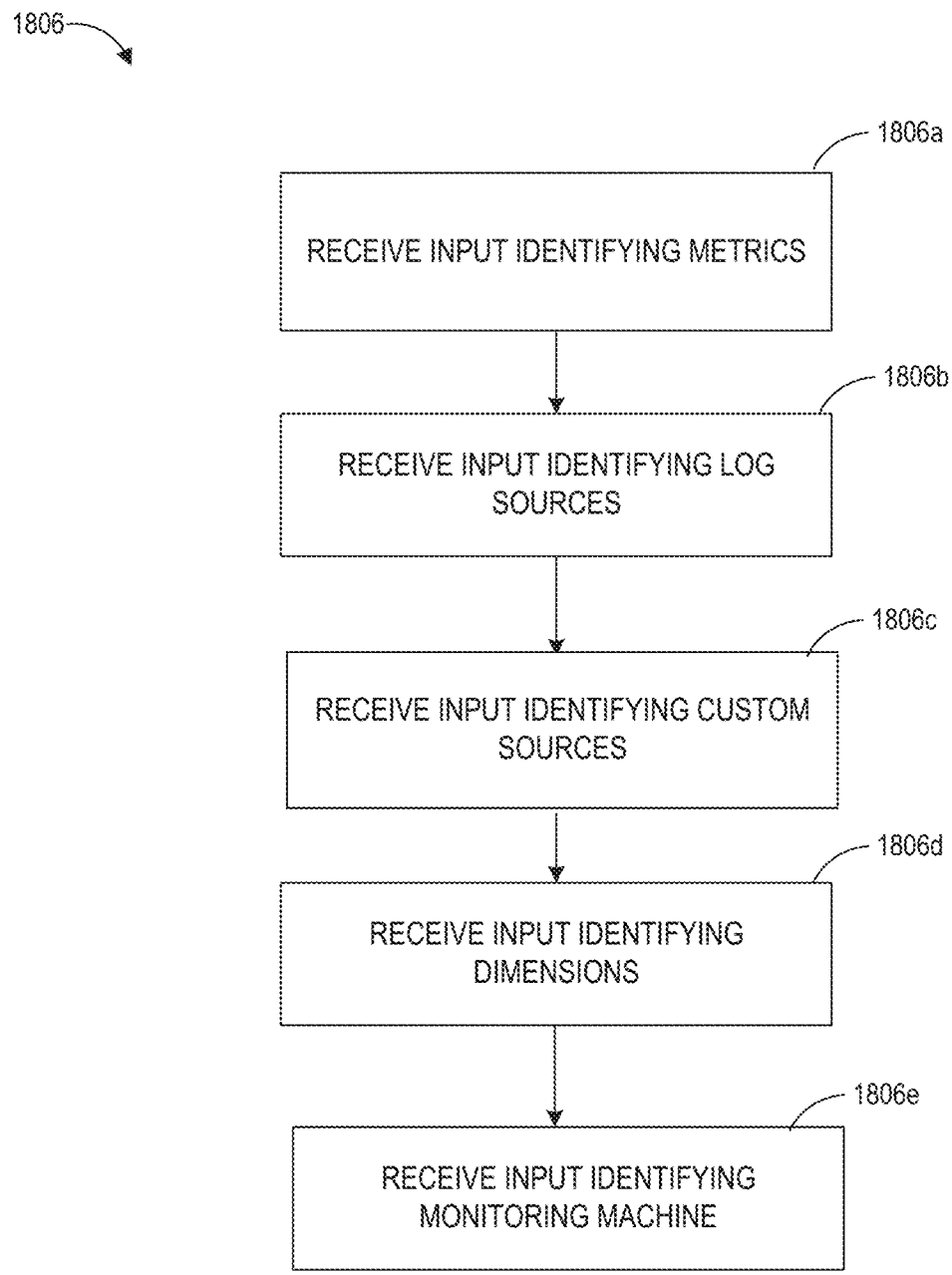
FIG. 64 is a flowchart of an example method for selecting configuration data prior to deployment in a lower-tier application of a data intake and query system, in accordance with example embodiments.

FIGS. 63 and 64 illustrate example processes to configure data collection before collection deployment and FIGS.

65-70 are interface diagrams of example user interfaces used to configure data collection before collection deployment in accordance with DIQS instances supporting the lower-tier DIQS application.

FIG. 63 is a flowchart of an example process 1800 for selecting metrics prior to deployment in a lower-tier application of a data intake and query system, in accordance with example embodiments. At block 1802, the process 1800 installs the entity monitoring program on a host entity. For example, the user logs into the host entity and downloads the monitoring program, such as SPLUNK Insights for Infrastructure® developed by Splunk Inc. of San Francisco, California In an embodiment, the host entity is associated with one or more monitored entities. After initializing the monitoring program and navigating to the instance via the web browser, the user can customize data collection before deploying the data collectors.

At block 1804, the lower-tier DIQS provides the user interfaces that the user will use to customize data collection. For example, the user added entities by selecting "add entities" after installing the monitoring program on the host entity and the lower-tier DIQS provides a user interface allowing the user to add data types for collection. FIG. 65 is an interface diagram of an example user interface 1814 for creating a custom command script, for example, to effect the collection of metrics from source data and events from log sources as specified by the user. The user interface 1814 includes a dimensions field 1814b where the user can indicate metadata dimensions or tags, possibly as key/value pairs, and as may be used for trouble shooting, analysis, and filtering of the collected data. The user interface 1814 further includes a monitoring machine field 1814c for specifying the host name or IP address of the machine that will receive the collected data as first transmitted or conveyed from the monitored entity. In an embodiment, the collected data can be sent to an ingestion function of the DIQS via a load balancer, a forwarder, or the like.

The user interface 1814 further includes an indication 1814a of the data to be collected. In one embodiment, the data to be collected is initially specified by predefined metrics and log sources. In the illustrated example user interface 1814, there are 6 predefined metrics and 5 log sources. In an embodiment, a script or command 1814d is generated by lower-tier DIQS and displayed in the example user interface 1814. In one embodiment, the script 1814d is configured to collect data from all of the predefined metric and log sources. In another embodiment, the user can select "Customize" to tailor the data collection to data that meets the user's needs. When the entries and selections are saved, the lower-tier DIQS updates the script 1814d according to the custom data collection.

At block 1806 of FIG. 63, the lower-tier DIQS receives indications of the user's data collection information, which comprises customized data selections for the selected host. FIG. 64 provides examples of user data selections received at block 1806. In an embodiment, the lower-tier DIQS receives user input identifying metrics at block 1806a; user input identifying log sources at block 1806b; user input identifying custom sources at block 1806c; user input identifying dimension or key/value pairs at block 1806d; and user input identifying the monitoring machine at block 1806e.

FIG. 66 is an interface diagram of an example user interface 1816 for customizing data collection. For example, the user selects the "Customize" option on user interface 1814 and the lower-tier DIQS provides a custom data collection user interface, such as the user interface 1816. The user interface 1816 illustrates a list of metrics that can be collected to monitor the performance of the host, a list of log sources, options to select all, deselect all, select one or more of the metrics and log sources, and a field to enter custom sources. In the illustrated embodiment of the user interface 1816, the user has the option to collect data having CPU-related performance metrics for each CPU or to sum the collected data for all of the CPUs into an aggregate metric. Examples of CPU-related performance metrics are, but not limited to:

| | |
|---|---|
| cpu.idle | CPU not being used by a process; |
| cpu.interrupt | CPU used to service hardware interrupts-immediately interrupts user and system processes; |
| cpu.nice | CPU used to service processes that have been given higher priority by the user; |
| cpu.softirq | CPU used to service software interrupts; |
| cpu.steal | CPU reclaimed by hypervisor to service other hosts; |
| cpu.system | CPU used to service system processes; |
| cpu.user | CPU used to service user processes; and |
| cpu.wait | CPU time waiting for available CPU to run system or user processes. |

In the illustrated embodiment of the user interface 1816, the user can select disk free related performance metrics, disk-related performance metrics; interface-related performance metrics; load-related performance metrics; and memory-related performance metrics. In other embodiments, other metrics can be offered or selected. Examples of disk free-related performance metrics are, but not limited to:

| | |
|---|---|
| Df.free | Amount of disk available; |
| Df.reserved | Amount of disk reserved by the system not available to the user; and |
| Df.used | Amount of disk space used. |

Examples of disk-related performance metrics are, but not limited to:

| | |
|---|---|
| Disk.io_time | Time spent doing I/O operations in MS over the last minute; |
| Disk.weighted_io_time | Time spent completing I/O tasks + the accumulating I/O backlog; |
| Disk.merged.(read, write) | Count of the number of operations that could be merged in other operations; |
| Disk.octets(read, write) | Amount of I/O data being written and read from disk in octets per minute; |
| Disk.ops(read, write) | Number of I/O operations being processed; |
| Disk.pending_requests | Number of Disk requests that are waiting to be serviced; and |
| Disk.time(read, write) | The amount of time it took for an operation to complete. |

Examples of interface-related performance metrics are, but not limited to:

| | |
|---|---|
| Interface.dropped(rx, tx) | The number of packets dropped over time for both inbound (rx) and outbound (tx) network transmissions; |
| Interface.errors(rx. tx) | The number of networks errors received for both inbound (rx) and outbound (tx) network transmissions; |
| Interface.octets(rx, tx) | The amount of inbound (rx) and outbound (tx) data being transmitted; and |
| Interface.packets(rx, tx) | The amount of inbound (rx) and outbound (tx) packets being transmitted. |

Examples of load-related performance metrics are, but not limited to:

| | |
|---|---|
| Load.longterm | The average number of processes being executed or in a waiting state on average over the last 15 minutes; |
| Load.midterm | The average number of processes being executed or in a waiting state on average over the last 5 minutes; and |
| Load.shortterm | The average number of processes being executed or in a waiting state on average over the last 1 minute. |

Examples of memory-related performance metrics are, but not limited to:

| | |
|---|---|
| Memory.buffered | Amount of memory reserved for buffering I/O; |
| Memory.cached | Amount of memory used to store recently accessed files |
| Memory.free | The amount of memory available to be used by the system (total memory-(used+buffered+cached); |
| Memory.slab_reclaimed | Bytes of memory used for SLAB-allocation that can be reclaimed; |
| Memory.slab_unreclaimed | Bytes of memory used for SLAB-allocation that can't be reclaimed; and |
| Memory.used | Percentage of memory being used by the system. |

In the illustrated embodiment of the user interface 1816, the user can select internal logs, system logs, daemon logs, and authorization logs. In other embodiments, other log sources may be presented for user selection. In addition, the user can enter valid log source as well as custom sources. For example, the user can select data from the collection agent by adding the collection agent as a custom source. The collection agent is what can be deployed to collect the metrics for the host. An example of a collection agent is a Collectd implementation by SPLUNK Inc. of San Francisco, California, or other implementation of a Collectd daemon that collects, transfers, and stores performance data of computers and network equipment as described on webpages found by directing a browser to the "collectd.org" domain of the Internet using the "https://" protocol indicator or as distributed via the collectd project materials accessible by directing a browser to the "github.com/collectd/collectd" destination of the Internet using the "https://" protocol indicator.

Referring to FIG. 63, at block 1808, the lower-tier DIQS generates the script or command to reflect the user's data collection entries. For example, once the user has selected the metrics, log sources, and/or custom sources, the user saves the selections. The lower-tier DIQS provides an add data interface. FIG. 67 is an example of an add data interface displaying an interface diagram of an example user interface 1818. User interface 1818 displays a script 1818*d* that is an updated version of the script 1814*d*. Script 1818*d* has been updated to reflect the user's custom data collection entries and selections from the customize data collection user interface 1816.

User interface 1818 also includes a dimensions field 1818*b*, similar to the dimensions field 1814*b* of FIG. 65. The user can enter dimensions which are added to the metrics defined in the user interface 1816 of FIG. 66. The dimensions are key/value pairs to add dimension to the measurements coming from the instance. The dimensions can be used to create groups of entities and split data during the display and analysis of the collected data. Examples of dimensions are, but not limited to an environment in which the machine exists, a data center associated with the machine, physical location of the machine, an application, an owner of the machine, an escalation priority of the machine, the operating system of the host, the version of the operating system, the system IP address, and the like. After the dimensions are entered in the dimensions field 1818*b*, the script 1818*d* is updated to indicate addition of the dimensions to the instances of metrics and or log data that will be collected by the monitored entity for ingestion by the DIQS. In an embodiment, some key/value pairs such as the operating system of the host, the version of the operating system, the system IP address are auto-extracted and automatically added to the metrics.

The user provides the script to the host entity. For example, the user can copy and paste the script into an interface that effects a Secure Shell (SSH) window into the operating system command processing functionality of the host machine/entity that is to be monitored (the targeted execution platform), and start the execution thereof by the command processing shell.

At block 1810, the execution of the script, perhaps by the command processing shell, configures and installs data collection software on the host entity to collect source data from the virtual and physical infrastructure associated with the host entity. The collected source data is responsive to the data collection information from the user. For example, the lower-tier DIQS-created script of one embodiment downloads a software package on the host, determines the operating system of the host, a retrieves the appropriate collection agent for the host's operating system. The lower-tier DIQS-created script further configures the collection agent and installs a collector, such as a forwarder, heavy forwarder, or universal forwarder when data from log sources is to be collected and begins collecting data responsive to the data collection information from the user from the monitored entities. The data collection information includes the monitoring machine, metrics with dimensions, log sources, and custom sources entered by the user at user interfaces, such as user interfaces 1814, 1816, 1818.

FIG. 68 is an interface diagram of an example user interface 1820 for displaying the hosts discovered by the lower-tier DIQS instance. The DIQS may be said to have discovered a host by receiving metrics and/or log data from it as a result of having executed the customized DIQS-created installation script on the host. The user can select a host and open an entity analysis workspace to view information about the host.

Figure 69:
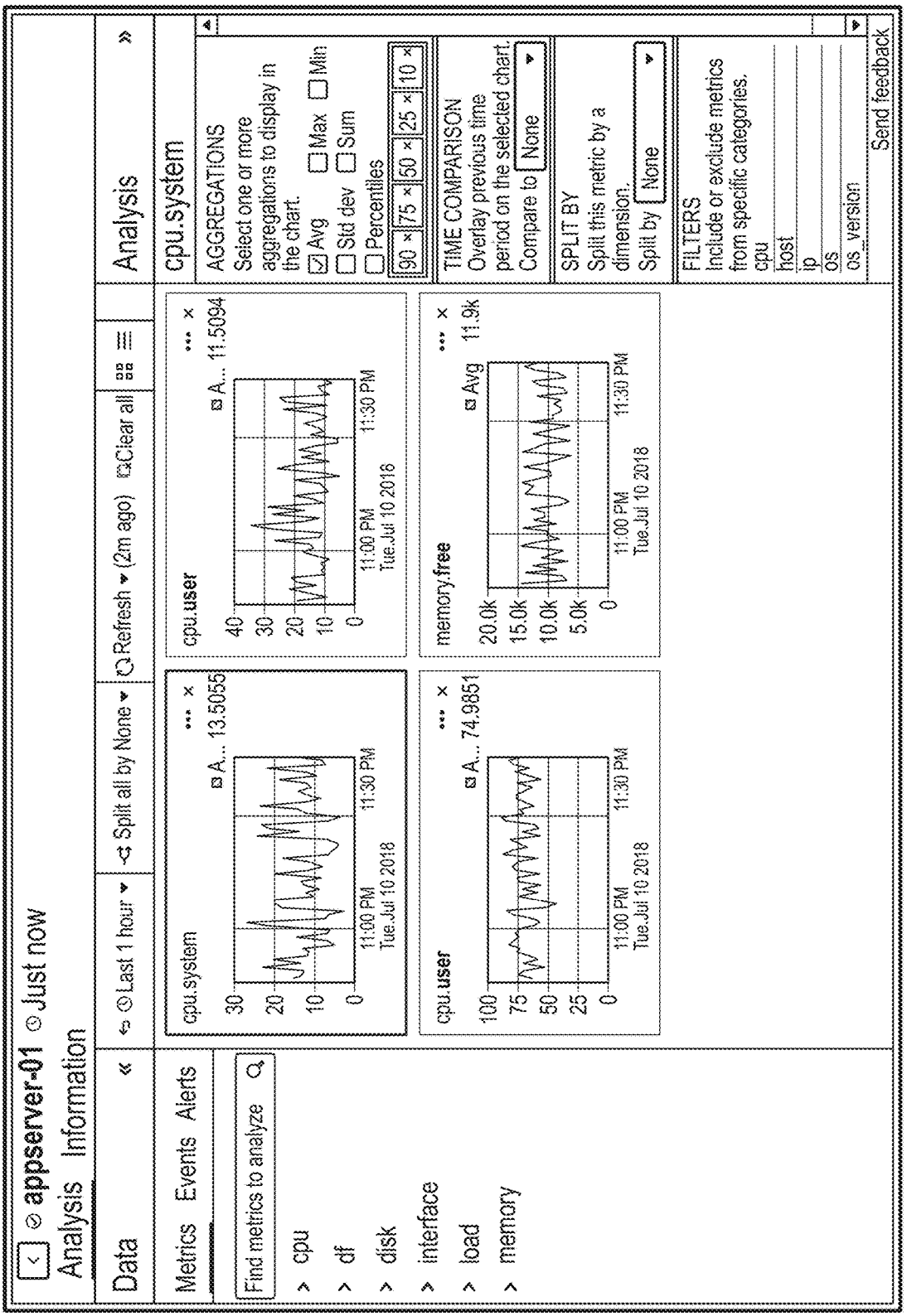
FIG. 69 is an interface diagram of an example user interface for an entity analysis workspace screen, in accordance with example embodiments.

FIG. 69 is an interface diagram of an example user interface 1822 for the entity analysis workspace associated with the entity "appserver-01." The illustrated interface 1822 is displaying visualizations for the CPU-related performance metrics, such as "cpu.system", "cpu.user", and "memory free" for an aggregation of the CPUs in the monitored entities. In an embodiment, the metrics can be split out by device. Other metrics, such as, but not limited to disk free-related performance metrics, disk-related performance metrics, interface-related performance metrics, and memory-related performance metrics, examples of which are described above, can be displayed. In the illustrated embodiment, the interface 1822 can also provide time comparisons, split the displayed metric by dimensions, such as the dimensions entered in the dimension field 1818*b*, and filter the metrics by including or excluding specific categories of metrics. Interface 1822 is presented as a non-limiting example of an entity analysis workspace. In other embodiments, other visualizations can be presented for analysis of the performance of the host.

Figure 70:
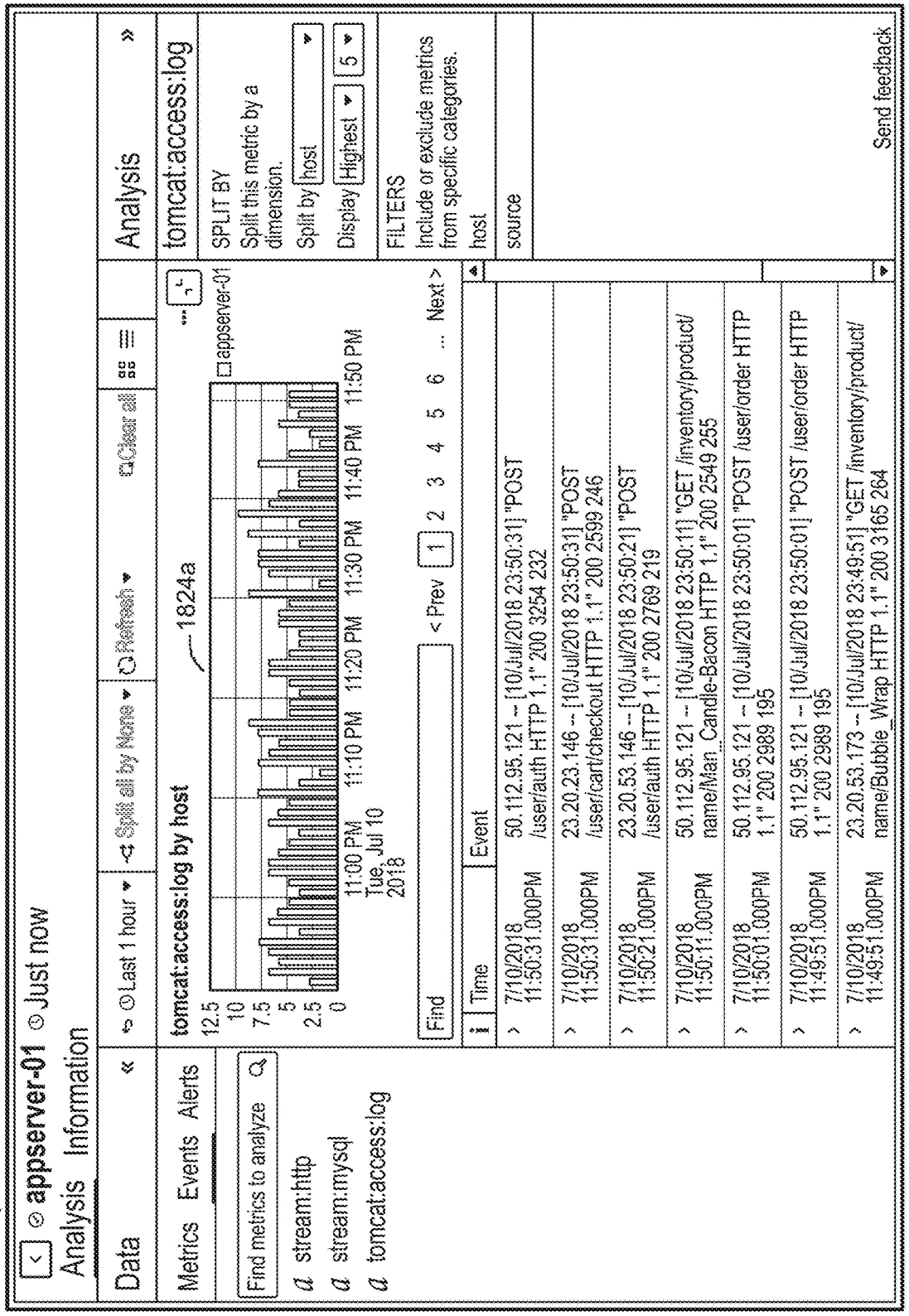
FIG. 70 is an interface diagram of an example user interface for an entity log file screen, in accordance with example embodiments.

FIG. 70 is an interface diagram of an example user interface 1824 for displaying events for the log files that were identified for collection in the script 1818*d*. Visualizations of metrics and log events associated with the user-specified data collection information are available for further analysis. Notably, one representation of collected log data includes a graphical representation of counts of log entries, items, or events for successive intervals or points over a time frame. Interface 1824 depicts such a representation as bar chart 1824*a*. Casting the generally textual log/event-type data into a numeric format, and even more into a time-series numerical format, facilitates the integration of an event-type data representation into a display that otherwise includes metrics-types data representations which naturally lend themselves to time-series numerical formats and visualizations.

FIGS. 63-70 illustrate example processes and user interfaces for automatically setting up a configuration file for user specified metrics and logs before deployment of the collection agent and the forwarders for the lower-tier DIQS application instances. The lower-tier DIQS-created script automatically installs and configures the collection agent, automatically installs the forwarder, and may automatically begin the collecting of the data that the user has specified through graphical user interfaces. The data that the user has specified through the graphical user interfaces is collected from the monitored entity(ies) for transmission to the DIQS. The DIQS collects the data transmitted to it from the monitored entity(ies) and analyzes the metrics and events for display to the user. In contrast, deploying entity data collection without the automatic script generation capabilities described in relation to a lower-tier DIQS may demand that the user manually install one or more collection agents, manually configure the collection agents, and manually install the one or more forwarders for the DIQS, and after the data is collected, the user may need to develop files to display and analyze the metrics and events that are of interest to the user. While described in relation to an embodiment including a lower-tier DIQS system, one of skill will appreciate that inventive aspects may be practicable and practiced in regards to a lower-tier DIQS operably coupled to a higher-tier DIQS, a lower-tier DIQS uncoupled from a higher-tier DIQS, a stand-alone DIQS, a DIQS that stands in relation to another as a higher-tier DIQS, a DIQS component of an integrated monitoring application or system, or other embodiment. While described in terms of an installation script, and illustrated as a text script representation in a command language format for an operating system shell, one of skill will appreciate that alternative forms and embodiments for representing blocks and sequences of executions, including conditional determinations and aspects thereof, and perhaps particularly such as relate to installation, configuration, and other deployment processing, may be used in the practice of inventive aspects taught herein.

2.17.1.2. Dynamic Metric and Threshold Selection for Dynamic Status Update of Monitored Entities In embodiments described herein, a graphical user interface (GUI) caused by operation of an entity monitoring system (EMS), perhaps within a lower-tier DIQS instance, displays the monitored entities as individual tiles. The user can dynamically select a specific metric to be displayed in the tiles and the boundaries for the metric. The user can select a threshold within the boundaries for the metric. Further, the user can specify whether the threshold is met when the metric is greater than or is less than the threshold. The EMS can process the metrics with respect to the threshold and display the tiles in distinctive colors, for example, such as red for entities that meet the threshold and as green for entities that do not meet the threshold. The user can easily manipulate a slider on the GUI to change the threshold for easy visualization of the metric for the group of monitored entities. The GUI also can provide the user with the ability to select an entity and click through to the entity analysis workspace for more detailed information.

In one embodiment, the lower-tier DIQS application comprises computer-executable instructions that, when executed by a computer system, cause the computer system to establish a source node network connection between a server group of a data intake and query system and each of one or more source network nodes, receive source data at the server group from at least one of the one or more source network nodes via the respective network connections, transform the source data to a plurality of timestamped entries of machine data searchable by the data input and query system, establish a search head network connection between an entity monitoring server and the search head server, and receive at least one search request message via the search head network connection at the search head server, where each search request message includes criteria of a search query identifying source data associated with an entity definition representing an entity. The entity is a component of an operating environment. The lower-tier DIQS application further executes the search query of each search request message at the search head server to produce corresponding search results, and receives at the entity monitoring server search result messages having information of the corresponding search results. The lower-tier DIQS further receives information from a user that includes one of the criteria and a threshold value for the one of the criteria, causes a display of an interface having a representation of each entity of the operating environment, where the representation of each entity includes a value of the one of the criteria and a status indication that is based on the threshold value and the value of the one of the criteria, receives a new threshold value from the user, and dynamically updates the representation of each entity on the interface based on the new threshold value. In regards to the monitoring functions, reference to "each entity of the operating environment" may be less than all of the physical entities in the operating environment and may refer to each of the defined entities, each of the defined entities of a certain quality (e.g., enabled for monitoring), each of the germane defined entities (e.g., having data for a particular metric represented in a visualization), meaningful combinations of these and other factors, and such.

In one embodiment, the lower-tier DIQS further causes display of an interface enabling a user to indicate a selection of one of the criteria and a threshold value for the selected one of the criteria, receives user input, via the interface, comprising indications of the selections, dynamically processes the information to determine a status of each entity of the operating system for the selected one of the criteria in accordance with the threshold value and a value of the selected one of the criteria for the respective entity, receives, via the interface, a new threshold value for the selected one of the criteria from the user, and dynamically updates the status of each entity based on the new threshold value.

The lower-tier DIQS can display on the interface a representation of each entity of the operating environment. In regards to the monitoring functions, shorthand reference to "each entity of the operating environment" may be less than all of the physical entities in the operating environment and may refer to each of the defined entities, each of the defined entities of a certain quality (e.g., enabled for monitoring), each of the germane defined entities (e.g., having data for a particular metric represented in a visualization), meaningful combinations of these and other factors, and such. The representation of each entity may comprise a tile. The representation can include an indication of the value of the selected one of the criteria for the respective entity. The representation of each entity can including a status indicator indicating the status. The status can have one of two states. A first state of the two status states can indicate that the value of the selected one of the criteria crosses a boundary set by the threshold value and a second state of the two status states can indicate that the value of the selected one of the criteria does not cross the boundary set by the threshold value. The status indicator of a first state of the two status states can be visually distinct from the status indicator indicating a second state of the two status states. The interface can include a threshold value field for receiving the threshold value from the user. The threshold field can comprises a representation of a slider bar. User manipulation of the representation of the slider bar can permit the user to change the threshold value and can cause dynamic adjustment of the status indicator for the representation of each entity responsive to the changed threshold value. The interface can further enable the user to indicate metadata factors associated with the criteria. The lower-tier DIQS can receive the metadata factors, can filter the corresponding search results responsive to the metadata factors, and can cause display of the interface enabling the user to indicate the selection of the one of the criteria associated with the metadata factors and the threshold value for the selected one of the criteria associated with the metadata factors. The metadata factors can comprise one or more of an environment of the entity definition, a physical location of a machine associated with the entity definition, an owner of the machine associated with entity definition, and an escalation priority of the machine associated with the entity definition. The metadata factors can comprise one or more of an operating system of a machine associated with the entity definition, a version of the operating system, and a system IP address of the entity definition. The lower-tier DIQS can dynamically process the information to determine the status of each entity of the operating system for the selected one of the criteria in accordance with the threshold value, the minimum and maximum values for the selected one of the criteria, and the value of the selected one of the criteria for the respective entity.

The interface can receive a new selected one of the criteria from the user and the lower-tier DIQS can dynamically process the information to determine a new status of each entity of the operating system for the new selected one of the criteria based at least in part on value of the new selected one of the criteria for the respective entity. The lower-tier DIQS can dynamically update the status of each entity based on the new selected one of the criteria. The lower-tier DIQS can display on the interface the representation of each entity of the operating environment which includes the status indicator indicating the new status. The criteria can comprise metrics and/or source logs. The metrics can include one or more of CPU-related performance metrics, disk free-related performance metrics, disk-related performance metrics, interface-related performance metrics, load-related performance metrics, and memory-related performance metrics.

Example processes and user interfaces for dynamically selecting thresholds and metrics for real-time or near real-time status update of the monitored entities are described in further detail with respect to FIGS. 71-77.

Figure 71:
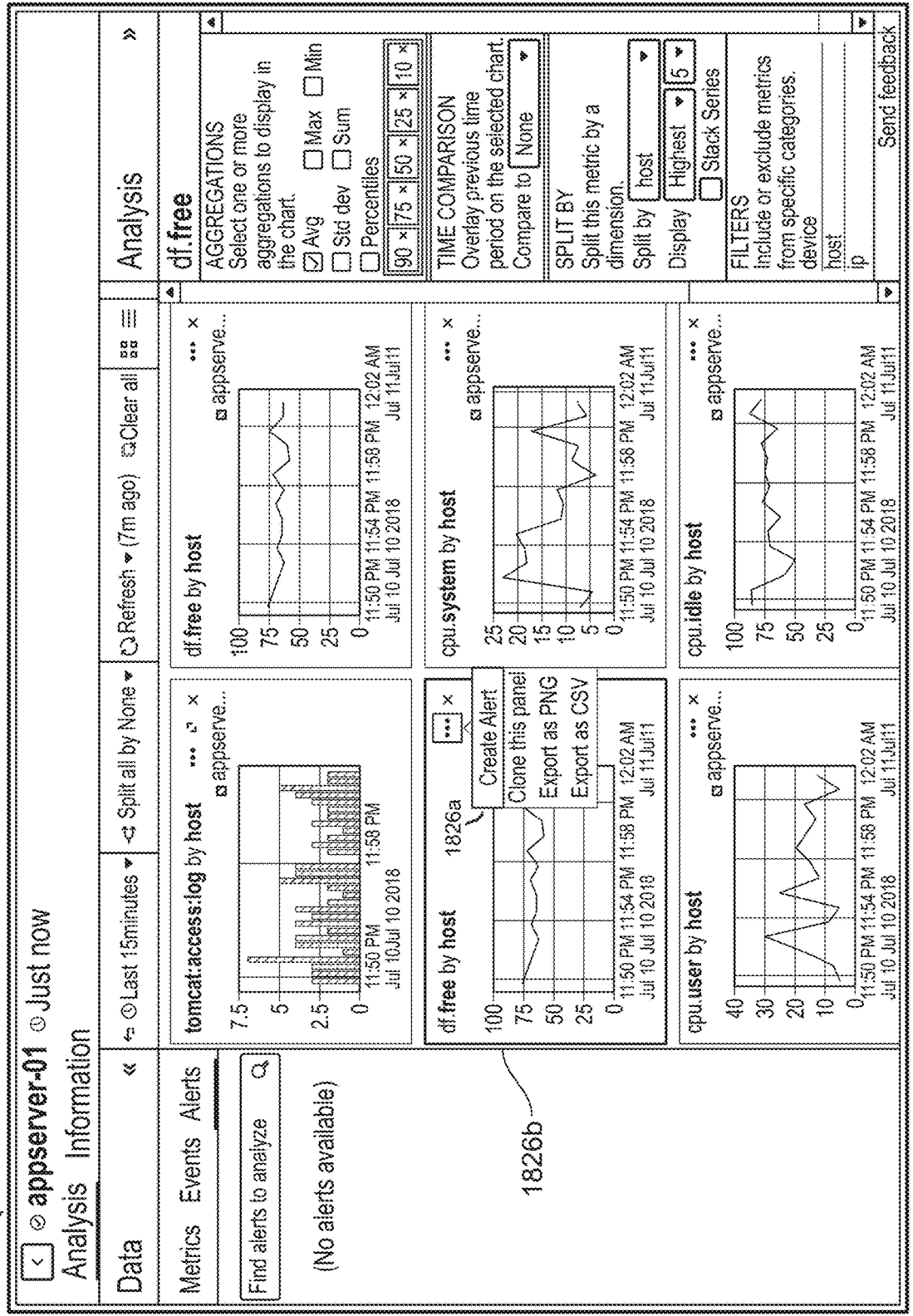
FIG. 71 is an interface diagram of an example user interface to create an alert, in accordance with example embodiments.
Figure 72:
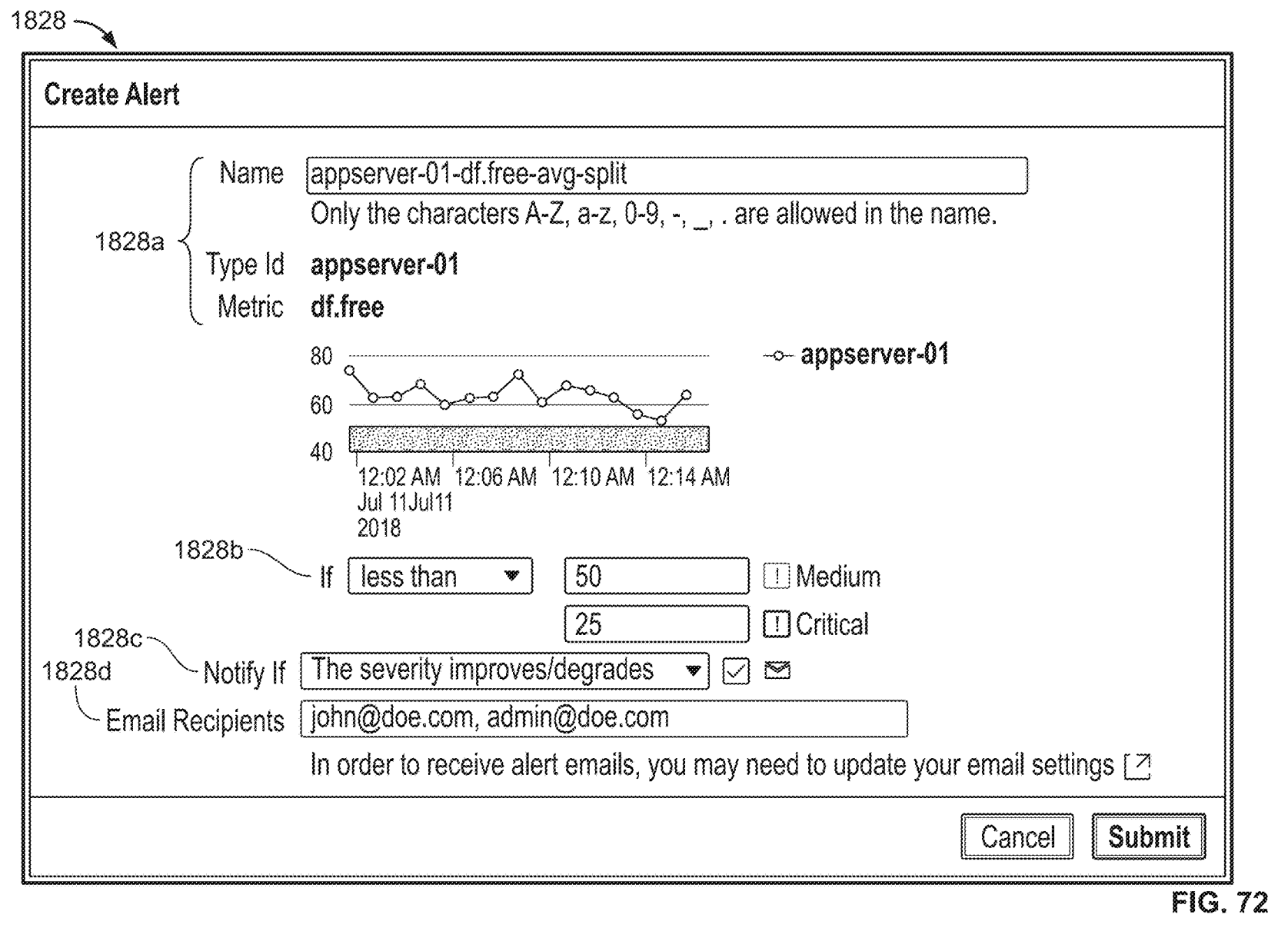

FIGS. 71-72 are interface diagrams of example user interfaces for dynamically selecting thresholds and metrics for real-time or near real-time status update from an entity analysis workspace.

FIG. 71 is an interface diagram of an example user interface 1826 that illustrates an entity analysis workspace for the host "appserver-01" comprising metric visualizations for the disk-free metric. In the illustrated user interface 1826, the example metric visualizations include "access.log by host"; "df.free by host"; "cpu.system by host"; cpu.user by host"; and "cpu.idle by host." In other embodiments, other metrics can be visualized.

In one embodiment, the user can create an alert definition for a selected metric from the user interface 1826. By selecting create alert 1826a at a selected metric visualization 1826b, the DIQS lower-tier provides a user interface for creating an alert. FIG. 72 is an interface diagram of an example user interface 1828 for creating an alert definition. The illustrated user interface 1828 includes a field 1828a for naming the alert (appserver-01-df.free-avg-split), and identifies the type (appserver-01) and metric (df.free) associated with the alert. The illustrated user interface 1828 further includes alert criteria 1828b, such as whether to alert if the metric is less than or greater than the threshold, the threshold associated with a medium alert, the threshold associated with a critical alert, a field for when to notify 1828c, and a field for notification recipients 1828d.

For example, the alert definition that has been created at the user interface 1828 of FIG. 72 will cause the lower-tier DIQS-based monitoring application that directs its operational processing by reference to the alert definition to notify the notification recipient when there is a trigger of the alert condition. The alert is a medium alert when the disk-free metric falls below 50% and the alert is a critical alert when the disk-free metric falls below 25% for the monitored entities. The alert threshold can be edited directly from the entity analysis workspace. In other embodiments, other user interfaces 1828 can be provided for creating alert definitions from the entity analysis workspace.

Figure 73:
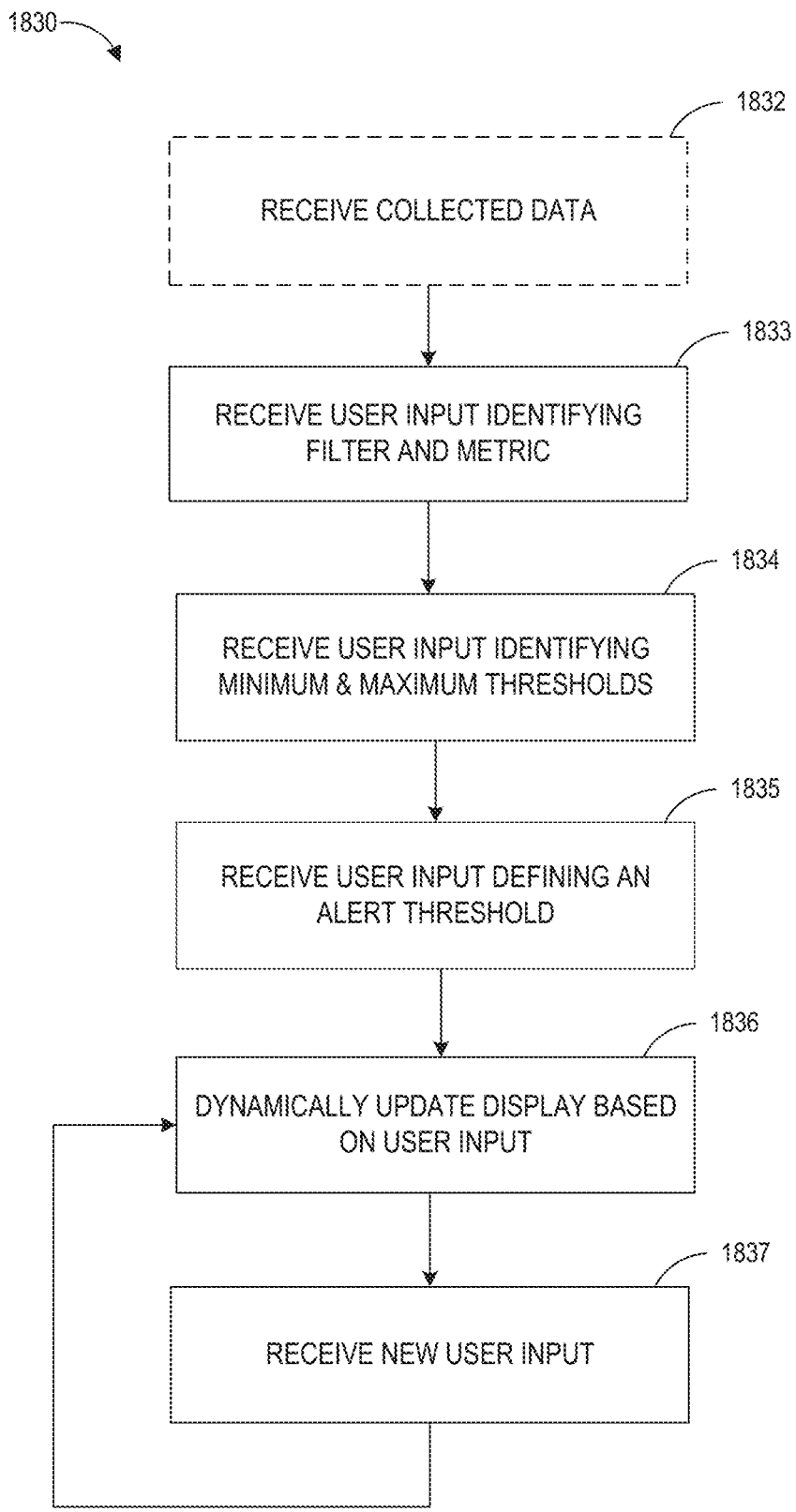
FIG. 73 is a flowchart of an example method for dynamically updating an entity display based on alert threshold selection for a lower-tier application of a data intake and query system, in accordance with example embodiments.

Alert definition information can also be created or modified in other ways that provide dynamic threshold manipulation which results in dynamic status update of the monitored entities in accordance with the newly specified threshold. FIGS. 73-77 illustrate example processes and interface diagrams of example user interfaces for dynamically selecting, identifying, indicating, specifying, or the like, thresholds and metrics for real-time or near real-time status update of a user interface displaying an overview of the monitored entities, such as an infrastructure overview interface. FIG. 73 is a flowchart of a process 1830 for dynamically updating an entity display based on alert threshold selection for the lower-tier DIQS application instance in accordance with example embodiments. At block 1832, the lower-tier DIQS receives the collected data. The collected data can be displayed, for example, as illustrated in FIGS. 68-70 for monitoring and troubleshooting the monitored entities. In other embodiments, a selected metric may be displayed in a representation of each entity of the monitored entities.

Figure 74:
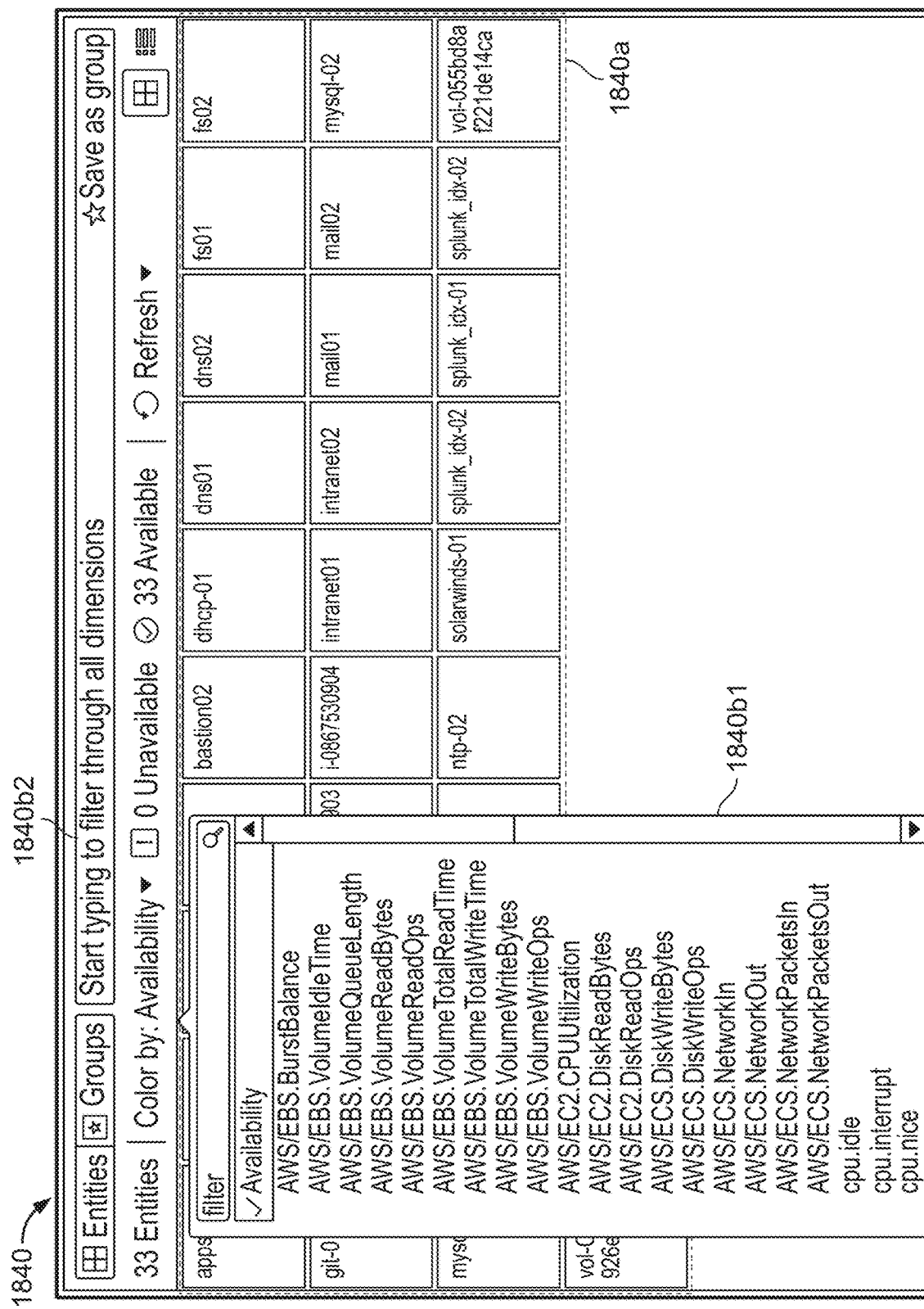
FIG. 74 is an interface diagram of an example user interface to select a data filter and set filter thresholds, in accordance with example embodiments.

FIG. 74 is an interface diagram of an example infrastructure overview user interface 1840. The illustrated user interface 1840 includes a representation region 1840a that includes a plurality of representations where each individual representation corresponds to a particular entity. Each representation can present information associated with the particular entity. In an embodiment, the representation is a tile. In an embodiment, the default representation of each entity is by availability. For example, if the monitored entity is available or sending data, then the entity is available. In an embodiment, the representations of the available entities are colored green and the representations of the unavailable entities are colored red.

At block 1833, the lower-tier DIQS receives user input identifying a filter. Referring to FIG. 74, the user interface 1840 further includes a filter field 1840b2 for receiving user input defining a filter and a filtered field list component 1840b1 that can display a drop down menu of metrics for the hosts satisfying the specified filter. The filter can be a dimension or key/value pair that was added to the user selected metrics before deployment of the data collection, as described in FIGS. 64-67. The lower-tier DIQS filters the data in real-time or near real-time. Once the collected data is filtered, the drop-down menu of the filter field 1840b1 includes the metrics that are available for the filtered data, corresponding to data from the hosts satisfying the dimensions specified in filter filed 1840b1. If no filters are specified, in an embodiment, the drop down menu can include all of the available metrics across the monitored entities.

The user selects a metric from the filtered field list 1840b1. In an embodiment, the user can enter a metric in the filter field 1840b1. The lower-tier DIQS dynamically filters the collected data for the selected metric. In an embodiment, the lower-tier DIQS-based monitoring application causes the display of a value of the selected metric for the particular entity within the representation associated with the particular entity.

Figure 75:
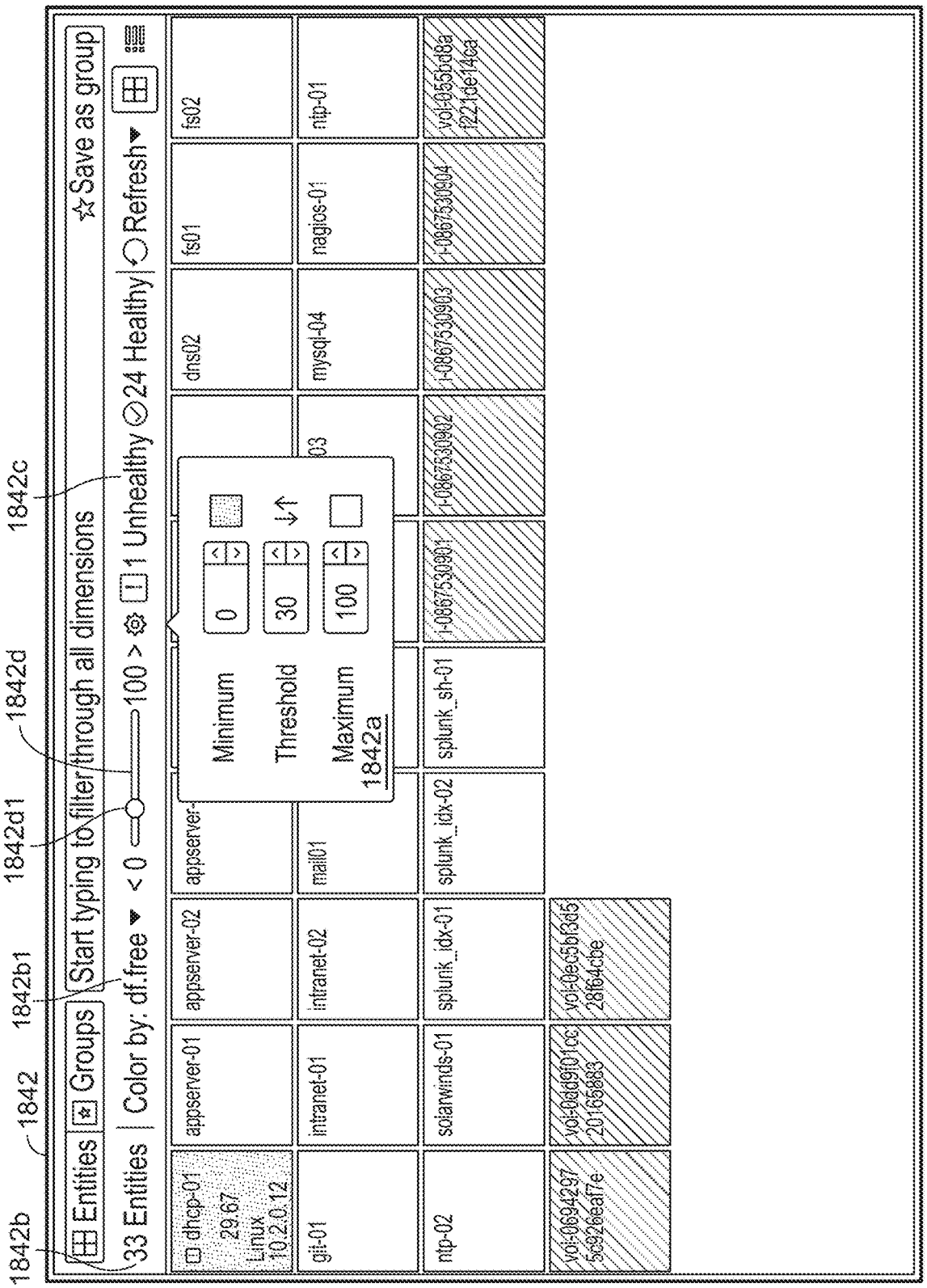
FIG. 75 is an interface diagram of an example user interface to set filter thresholds, in accordance with example embodiments.

FIG. 75 is an interface diagram of an example user interface 1842 for dynamically setting an alert for monitored entities. The illustrated user interface 1842 includes alert setting fields 1842a. In an embodiment, the user can select the setting icon on the user interface 1842 and the lower-tier DIQS-based monitoring application provides the alert setting fields 1842a. The illustrated alert setting fields 1842a includes fields for entering minimum and maximum thresholds, and a field for entering an alert threshold. The alert settings fields can further include an indication of whether the alert occurs when the value of the metric is greater than 1 or less than 1, the alert threshold value. In the illustrated embodiment, these are indicated as selectable up and down arrows within the alert setting fields 1842a. The user interface 1842 further includes a graphical representation of a slider bar 1842d. Initially, the monitoring application displays the minimum value and the maximum value from the collected data within the selected filter and selected metric as the minimum and maximum thresholds and as the low and high endpoints of the slider bar 1840d. Also, initially, the monitoring application displays the average value from the collected data within the selected filter and selected metric as the alert threshold value and as the location of the threshold indicator 1842d1 on the slider bar 1842d.

The minimum, maximum, and alert threshold values are user configurable. As the user manipulates the alert threshold value, the lower-tier DIQS analyzes the data in real-time or near real-time to update the display of the monitored entities. This gives the user a quick understanding to the performance of the monitored infrastructure looking in aggregate across multiple hosts.

At block 1834, the lower-tier DIQS receives user input defining minimum and maximum thresholds. At block 1835, the lower-tier DIQS receives user input defining the alert threshold for the selected metric. The alert threshold value is compared with the value of the selected metric to determine the status displayed in the representation.

The example user interface 1842 further includes an indication of the number of monitored entities 1842b, an indication 1842c that includes a number of entities having the metric value that crosses the boundary set by the alert threshold (unhealthy) and a number of entities having a metric value that does not cross the boundary set by the alert threshold (healthy), and a graphical representation of a slider bar 1842d. The slider bar 1842d can be manipulated by the user to change the alert threshold without entering an alert threshold value in the alert setting fields 1842a.

At block 1836, the lower-tier DIQS analyzes the collected data at least according to the filter, the selected metric and the alert threshold value and dynamically updates the display. For example, in the illustrated user interface 1842, the selected metric is "disk-free", which is indicated by the "Color by: df.free" field 1842b1. The units of the disk-free metric can be percent. In other embodiments, the units of the selected metric can be milliseconds, number of operations, number of octets, number of operations, number of packets, number of network errors, and the like. In the illustrated user interface 1842, the value of the minimum threshold is 0% (no available space on the disk), the value of the maximum threshold is 100% (all space on the disk is available), and the alert threshold value is 30%. Because the selected metric is disk-free, the less than indication 1 is selected to provide status indications when the disk free space is less than 30% of the space on the disk.

Referring to FIG. 75, the lower-tier DIQS application instance found 33 entities, each entity represented by a tile or square on the user interface 1842. Eight entities are indicated, such as by being greyed out, for example, as not being associated with the selected metric. Twenty-five of the entities are associated with the selected metric. One entity, "dhcp-01" has 29.67% available disk space, which is less than the 30% threshold. The disk-free metric of the remaining 24 entities is not less than the 30% threshold. In an embodiment, the representations of the entities that cross the boundary set by the threshold alert can be distinguished from the representations of the entities that do not cross the boundary set by the alert threshold. In an embodiment, the status of entities that cross the boundary set by the threshold alert can be indicated as "unhealthy" and the status of the entities that do not cross the boundary set by the threshold alert can be indicated as "healthy". In some embodiments, the representations of the entities can be displayed in distinctive colors to easily identify the status of the entity. For example, the representations of the entities having the metric value that crosses the boundary set by the alert threshold (unhealthy) can be displayed with a red background, and those that do not (healthy) can be displayed with a green background.

After dynamically updating the representations of the entities, the process 1830 moves to block 1837. At block 1837, the lower-tier DIQS waits for new user input. The new user input can be one or more of a new metric having new minimum and maximum thresholds, and a new alert threshold. When new user input is received, the process 1830 moves to block 1836, where the display of the representations of the monitored entities is dynamically updated to reflect the new user input.

Figure 76:
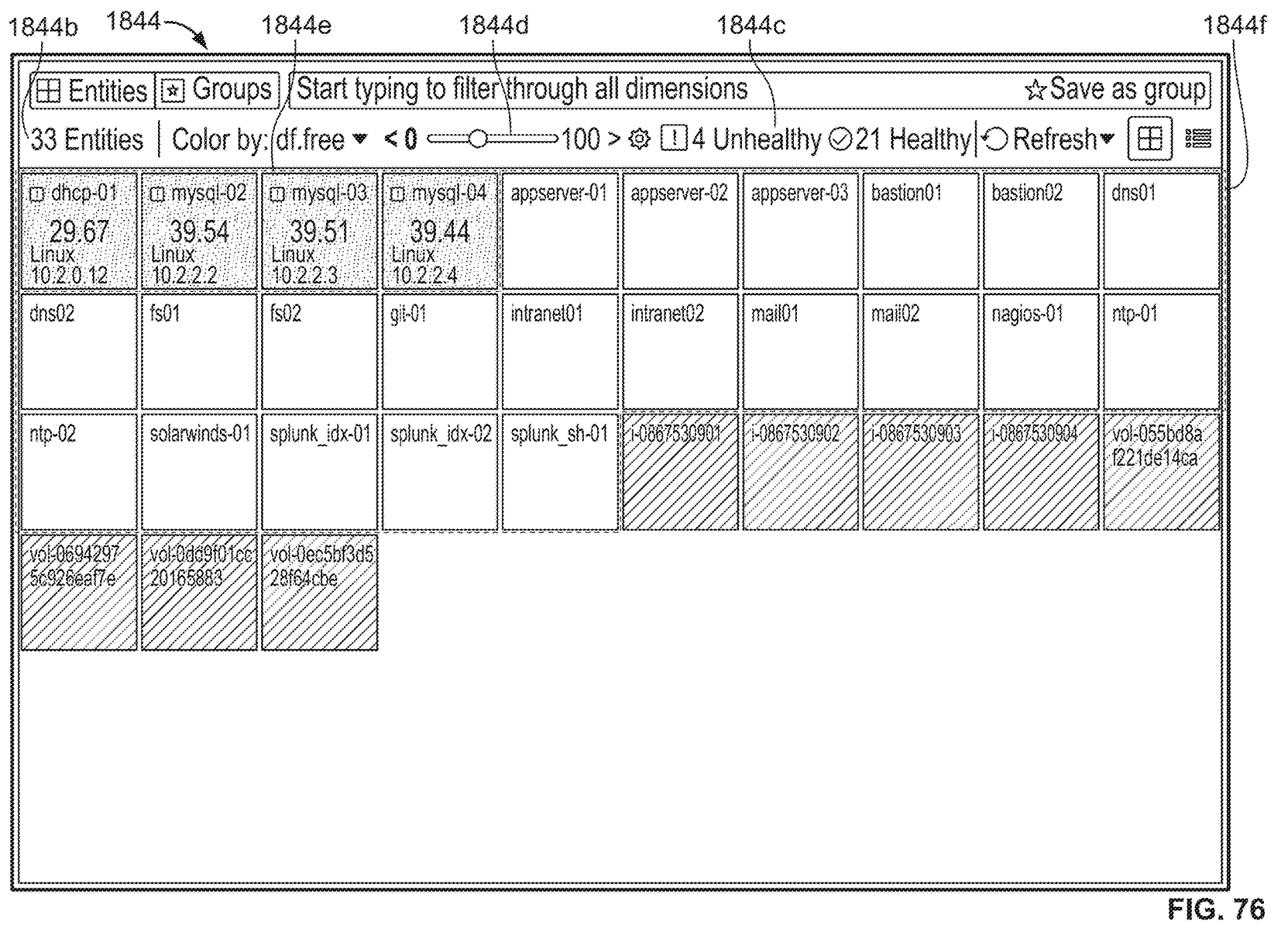
Figure 77:
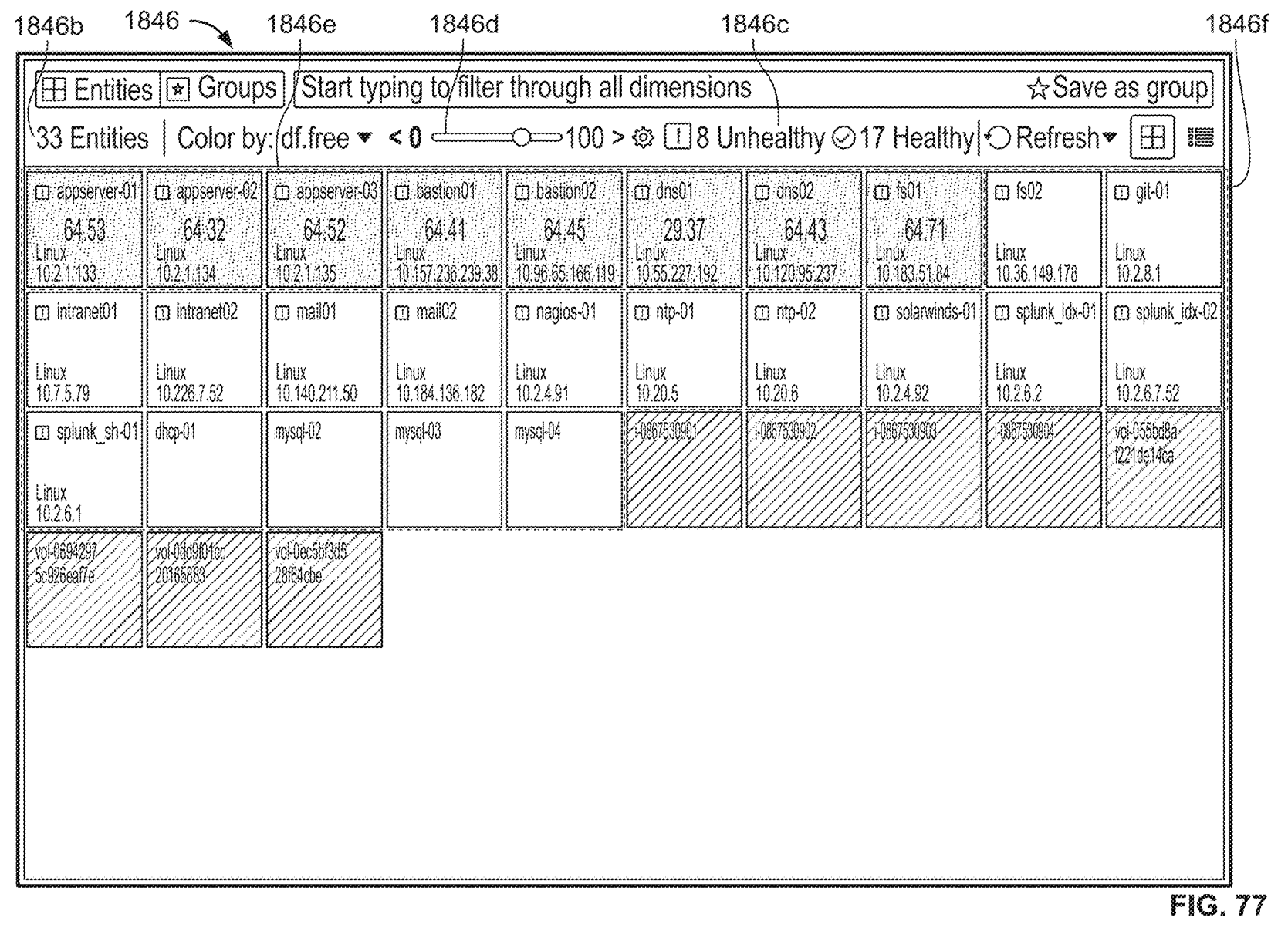

FIGS. 76-77 are interface diagrams of example user interfaces that illustrate the dynamic updating to reflect new alert thresholds. In an embodiment, the user manipulates the graphical representation of the slider bar to provide new alert threshold values.

FIG. 76 is an interface diagram of an example user interface 1844 comprising an indication of the number of monitored entities 1844*b*, an indication 1844*c* that includes a number of entities having the metric value that crosses the boundary set by the alert threshold (unhealthy) and a number of entities having a metric value that does not cross the boundary set by the alert threshold (healthy), and a graphical representation of a slider bar 1844*d*. For example, in the illustrated user interface 1844, the lower-tier DIQS application instance found 33 monitored entities 1844*b*. Twenty-five of the monitored entities are associated with the selected metric, disk-free, 4 of the monitored entities have a disk-free value that crosses the boundary set by the alert threshold (unhealthy) and 21 of the monitored entities have a disk-free value that does not cross the boundary set by the alert threshold (healthy) as indicated by field 1844*c*. The alert threshold is indicated by the position of the slider bar 1844*d*. The user interface 1844 displays the representations of the 4 unhealthy entities in a first set or group 1844*e* and the representations of the 21 healthy entities in a second set or group 1844*f*. In one embodiment, the first and second sets 1844*e*, 1844*f* can be displayed in a manner which easily distinguishes the first set 1844*e* from the second set 1844*f*. For example, the tiles of the first set 1844*e* can be colored red and the tiles of the second set 1844*f* can be colored green. In other embodiments, other distinctions can be made to distinguish between the first and second sets 1844*e*, 1844*f*.

FIG. 77 is an interface diagram of an example user interface 1846 illustrating the changes to the user interface 1844 that occur when the lower-tier DIQS-based application receives a new alert threshold. In an embodiment, the user has manipulated the slider bar 1844*d* to a new position indicated by the slider bar 1846*d*. For example, in the illustrated user interface 1846, the lower-tier DIQS application instance found 33 monitored entities 1846*b*. Twenty-five of the monitored entities are associated with the selected metric, disk-free, as also indicated in the user interface 1844. The user has manipulated the slider bar 1846*d* to a new position, which creates a new alert threshold for the selected metric, disk-free in the illustrated embodiment. In response to the new alert threshold, the lower-tier DIQS analyzes the collected data and dynamically updates the user interface 1846 to indicate that the indication that 8 of the monitored entities have a disk-free value that crosses the boundary set by the new alert threshold (unhealthy) and 17 of the monitored entities have a disk-free value that does not cross the boundary set by the alert threshold (healthy) as shown by field 1846*c*. The user interface 1846 further dynamically updates the status of the representations of the 8 unhealthy entities in a first set or group 1846*e* and the status of the representations of the 17 healthy entities in a second set or group 1846*f*. The first set 1846*e* is larger than the first set 1844*e* and the second set 1846*f* is smaller than the second set 1844*f* due to the change in the alert threshold. This can be easily conveyed to the user. For example, the status of the first set 1846*e* can be indicated by red tiles representing the entities in the first set 1846*e* and the status of the second set 1846*f* can be indicated by green tiles representing the entities in the second set 1846*f*. Further, the value of the selected metric can be displayed with the representation.

In other embodiments, the user selects a different metric and the lower-tier DIQS dynamically analyzes (in real-time or in near-real-time) the collected data and dynamically updates the user interface 1844, 1846 to present the user with a visualization of the status of the monitored entities for the new metric according to the alert threshold value.

In addition to easily visualizing the status of the monitored entities with respect to different metrics and revised alert thresholds, the user can select a specific entity and access additional detail for the selected entity in the entity analysis workspace, for example.

3.0. MULTIMODAL DATA INTAKE AND QUERY SYSTEMS

Additional embodiments related to Data Intake and Query Systems are next described, particularly as relating to a Data Intake and Query System which supports multimodal data, such as a mixture of event mode data and metric mode data. Such a multimodal Data Intake and Query System has already been implicated or discussed in reference to FIGS. 17D and 18, for example, and is now elaborated by the discussion of FIGS. 19-31.

A data intake and query system in one embodiment can index and store data in data stores of indexers and can process search queries causing a search of the indexers to obtain search results. The data indexed and stored by the data intake and query system typically includes non-metrics data, such as raw machine-generated data (e.g., application logs). The raw data may include metrics data. In some cases, the data intake and query system can receive structured metrics data including, for example, a time series of metrics generated for a computing resource.

The metrics data and non-metrics data provide insights into the operations and performance of computing resources. In some cases, the insights obtained by analyzing metrics data may complement the insights obtained by analyzing non-metrics data. Moreover, the diverse nature of the metrics and non-metrics data can further enrich an analysis of computing resources to obtain useful insights into the operations and performance of computing resources. However, analyzing metrics and non-metrics data is often complex and requires using different technical tools, thereby creating a significant cognitive burden on analysts.

The disclosed embodiments overcome these drawbacks with a data intake and query system that can process metrics and non-metrics data to obtain useful and meaningful insights into the operations and performance of computing resources. The disclosed embodiments also include techniques that improve intake, storage, and querying of metrics data alone, separate from non-metrics data. As such, the disclosed embodiments reduce the cognitive burden on analysts to obtain useful insights of a computing system based on metrics data alone, or in combination with non-metrics data.

Figure 19:
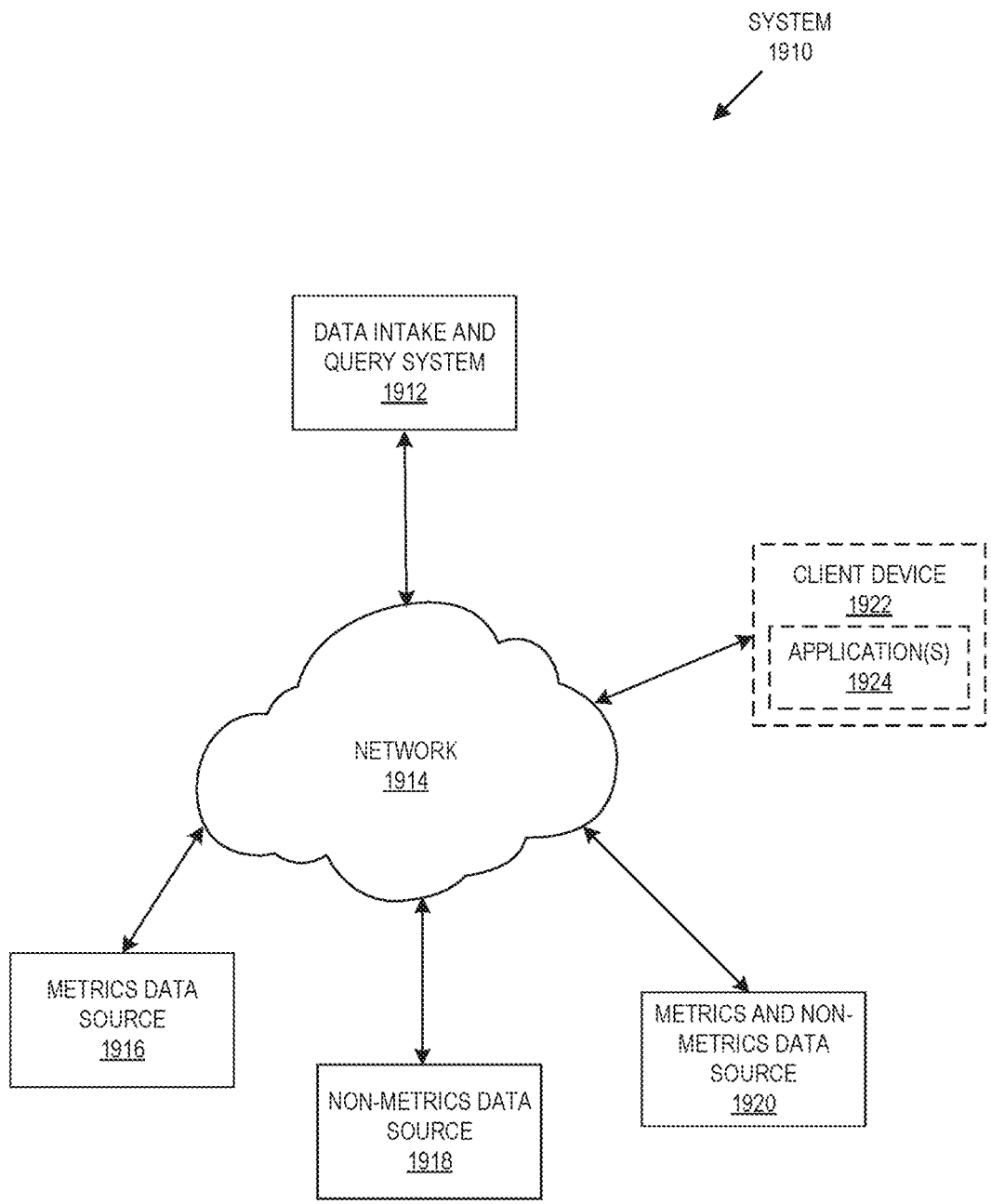
FIG. 19 is a high-level system diagram in which an embodiment may be implemented.

FIG. 19 is a high-level system diagram in which an embodiment may be implemented. One of skill can consider the reasonable correlation between aspects of system 1910 of FIG. 19 and system 100 of FIG. 1 including, for example, a correlation between data intake and query system (DIQS) 1912 of FIG. 19 and DIQS 108 of FIG. 1. Such reasonable consideration and correlation may extend to embodiments of DIQS 108 as may be reflected in FIGS. 2, 4, and 18, for example. The system 1910 of FIG. 19 includes data intake and query system 1912 interconnected to various components over a network 1914. The components include a source 1916 of metrics data, another source 1918 of non-metrics data, and another source 1920 of both metrics and non-metrics data. The sources 1916, 1918, and/or 1920 ("the sources") include computing resources that can generate data (e.g., log data) or are the basis from which data can be generated (e.g., measured performance). The data from these sources can be transferred to the data intake and query system 1912 over the network 1914.

The metrics data may include unstructured raw data, semi-structured data, or structured data. "Structured data" may refer to information with a high degree of organization, such that inclusion in a relational database is seamless and readily searchable by simple, straightforward search engine algorithms or other search operations. "Semi-structured data" may refer to a form of structured data that does not conform with the formal structure of data models typically associated with relational databases or other forms of data tables, but nonetheless contains tags or other markers to separate semantic elements and enforce hierarchies of records and fields within the data. Lastly, "unstructured data" may refer to information that either does not have a pre-defined data model or is not organized in a pre-defined manner.

The non-metrics data may include raw machine data. The system 1910 can also include a client device 1922 running one or more client applications 1924. The client device 1922 may access the data intake and query system 1912 or any other components of the system 1910. For example, the client device may include a user interface (UI) rendered on a display device that provides an interactive platform to access and control components of the system 1910 over the network 1914.

The volume of data generated or collected of the sources can grow at very high rates as the number of transactions and diverse computing resources grows. A portion of this large volume of data could be processed and stored by the data intake and query system 1912 while other portions could be stored in any of the sources. In an effort to reduce the vast amounts of data generated in this data ecosystem, some systems (e.g., the sources) may pre-process the raw data based on anticipated data analysis needs, store the pre-processed data, and discard any remaining raw data. However, discarding massive amounts of raw data can result in the loss of valuable insights that could have been obtained by searching all of the raw data.

Figure 20:
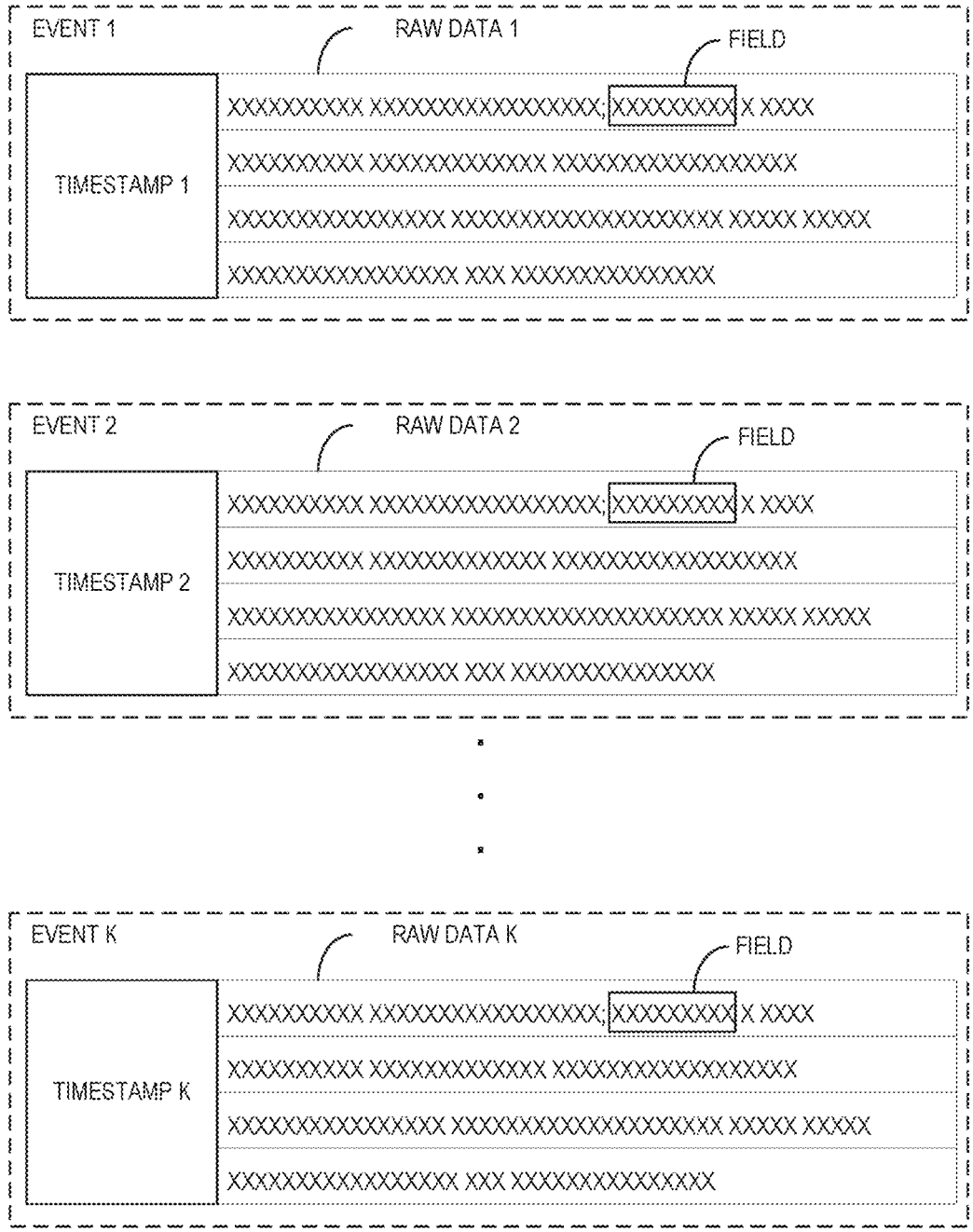
FIG. 20 is a block diagram illustrating a series of events including raw data according to some embodiments of the present disclosure.

In contrast, the data intake and query system 1912 can address some of these challenges by collecting and storing raw data as structured "events." FIG. 20 is a block diagram illustrating a series of events, including raw data, according to some embodiments of the present disclosure. An event includes a portion of raw data and is associated with a specific point in time. For example, events may be derived from "time series data," where the time series data comprises a sequence of data points (e.g., performance measurements from a computer system) that are associated with successive points in time.

As shown, each event 1 through K can be associated with a timestamp 1 through K that can be derived from the raw data in the respective event, determined through interpolation between temporally proximate events having known timestamps, or determined based on other configurable rules for associating timestamps with events. During operation of the data intake and query system 1912, ingested raw data is divided into segments of raw data delineated by time segments (e.g., blocks of raw data, each associated with a specific time frame). The segments of raw data are indexed as timestamped events, corresponding to their respective time segments as shown in FIG. 20. The system stores the timestamped events in a data store.

In some instances, data systems can store raw data in a predefined format, where data items with specific data formats are stored at predefined locations in the data. For example, the raw data may include data stored as fields. In other instances, raw data may not have a predefined format; that is, the data is not at fixed, predefined locations, but the data does have repeatable patterns and is not random. This means that some raw data can comprise various data items of different data types that may be stored at different locations within the raw data. As shown in FIG. 20, each event 1 through K includes a field that is nine characters in length beginning after a semicolon on a first line of the raw data, for example. In certain embodiments, these fields can be queried to extract their contents.

In some embodiments, systems can store raw data as events that are indexed by timestamps but are also associated with predetermined data items. This structure is essentially a modification of database systems that require pre-determining data items for subsequent searches. These systems can be modified to retain the remaining raw data for subsequent re-processing for other predetermined data items.

Specifically, the raw data can be divided into segments and indexed by timestamps. The predetermined data items can be associated with the events indexed by timestamps. The events can be searched only for the predetermined data items during search time; the events can be re-processed later in time to re-index the raw data, and generate events with new predetermined data items. As such, the data systems of the system 1910 can store related data in a variety of pre-processed data and raw data in a variety of structures.

In some cases, the sources can generate, process, and/or store semi-structured or structured metrics data. The metrics data includes at least one metric, which includes at least one or only one numerical value that represents a performance measurement of a characteristic of a computing resource. The data intake and query system can obtain the metrics data from the sources over the network 1914 via a variety of mechanism, which are described in greater detail below. However, existing data intake and query systems that can handle metrics data and non-metrics data underperform systems that only handle one type of data. This is caused, in part, because metrics data is uniquely different from other types of data. Additionally, the processes for handling non-metric data can be incompatible with processes for handing metrics data.

For example, each metric includes at least one or possibly only one numerical value that represents the metric's measure. Each numerical value can be a highly precise floating point number. Hence, the cardinality of metrics data is exceedingly large compared to other types of data. That is, each metric tends to have a uniquely different measure compared to other metrics, except for the possible repeating value of zero. As such, existing systems that are designed to efficiently handle non-metrics data cannot efficiently handle metrics data the same way, which causes the overall processing of metrics to be less efficient compared to systems that process only metrics data. However, using independent systems to process and analyze metrics and non-metrics data fails to exploit relationships between these types of data to obtain new, useful, and meaning insights into the operations and performance of systems.

A number of tools are available to separately process, store, search, and analyze metrics data and non-metrics data from diverse systems. As such, an analyst can use a first tool to process metrics data from the source 1916 and a second tool to process the non-metrics data from the source 1918. The analyst then has the choice of using different tools to process the metrics data and non-metrics data separately and to manually derive correlations between the metrics and non-metrics data, or to use a single underperforming tool to process both metrics data and non-metrics data; however, the analyst is still required to manually derive correlations between the metrics and non-metrics types of data. Thus, existing tools cannot obtain valuable insights from diverse types of metric data alone, or combinations of diverse types of metrics data and non-metrics data. Examples of these valuable insights may include correlations between metrics data and non-metrics data. The disclosed embodiments overcome at least these drawbacks.

3.1. Data Ingestion

Figure 21:
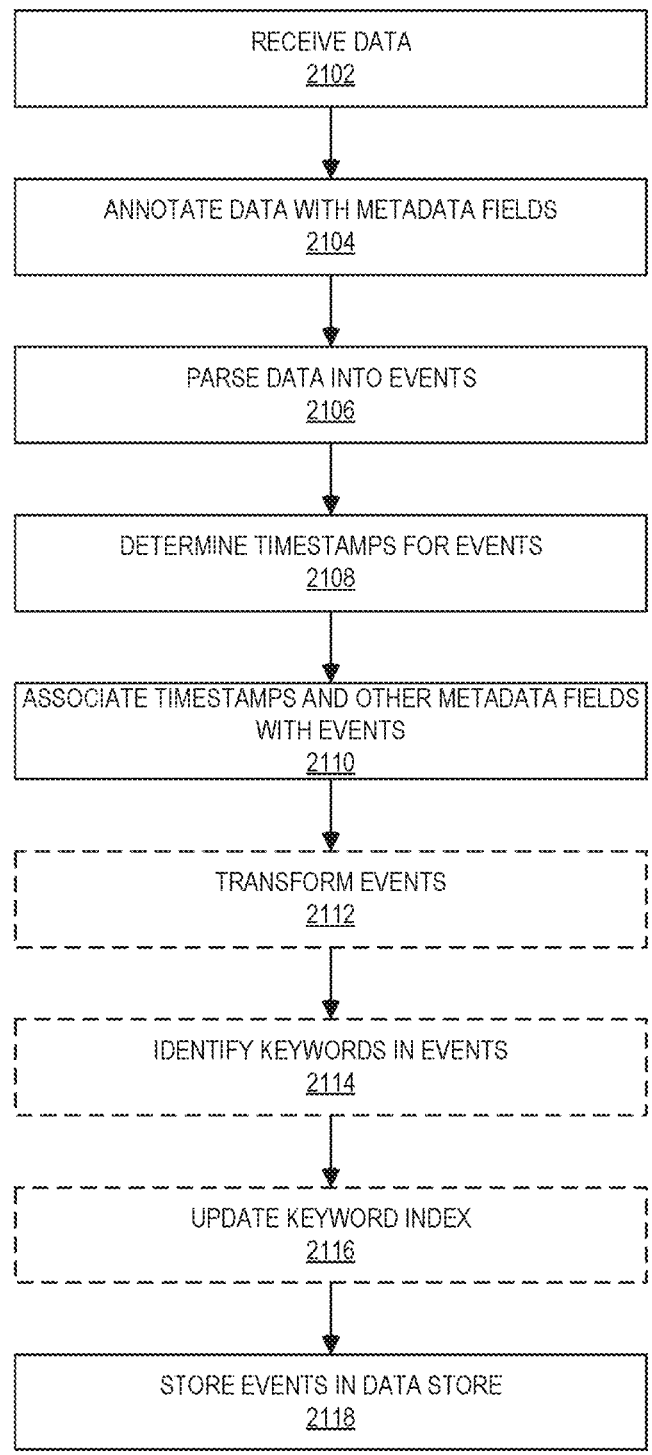
FIG. 21 is a flow diagram illustrating how indexers process, index, and store data received from forwarders according to some embodiments of the present disclosure.

FIG. 21 depicts a flow chart illustrating an example data flow performed by data intake and query system 108, in accordance with the disclosed embodiments. The data flow illustrated in FIG. 21 is provided for illustrative purposes only; those skilled in the art would understand that one or more of the steps of the processes illustrated in FIG. 21 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

3.1.1. Input

At step 2002, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At step 2004, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

3.1.2. Parsing

At step 2006, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At step 2008, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or to use any other rules for determining timestamps.

At step 2010, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at step 2004, the default metadata fields associated with each event may include a host, source, and source type field including or in addition to a field storing the timestamp.

At step 2012, an indexer may optionally apply one or more transformations to data included in the events created at step 2006. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

3.1.3. Indexing

At steps 2014 and 2016, an indexer can optionally generate a keyword index to facilitate fast keyword searching for event data. To build a keyword index, at step 2014, the indexer identifies a set of keywords in each event. At step 2016, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At step 2018, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

3.2. Query Processing

Figure 22:
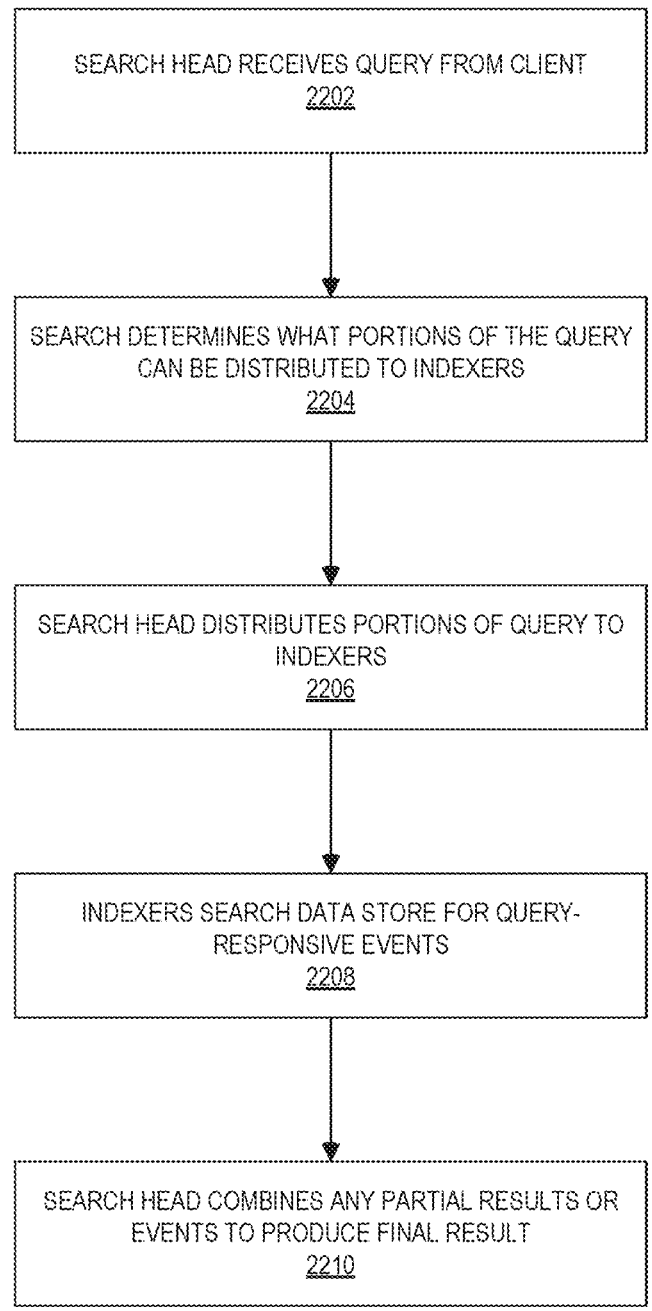
FIG. 22 is a flow diagram illustrating how a search head and indexers perform a search query according to some embodiments of the present disclosure.

FIG. 22 is a flow diagram that illustrates an exemplary process that a search head and one or more indexers may perform during a search query. At step 602, a search head receives a search query from a client. At step 604, the search head analyzes the search query to determine what portion(s) of the query can be delegated to indexers and what portions of the query can be executed locally by the search head. At step 606, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in FIG. 2, for example) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At step 608, the indexers to which the query was distributed search data stores associated with them for events and/or aspects of events (such as performance metrics derived from the events, dimensions of the performance metrics, logs, etc.) that are responsive to the query. To determine which events (or aspects of an event) are responsive to the query, the indexer searches for machine data that match the criteria specified in the query. These criteria can include matching keywords or specific values for certain fields. The searching operations at step 608 may use the late-binding schema to extract values for specified fields from events at the time the query is processed. In an embodiment, one or more rules for extracting field values may be specified as part of a source type definition. The indexers may then either send the relevant results back to the search head, or use the results to determine a partial result, and send the partial result back to the search head.

At step 610, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready and then returns the complete set of results to the client. In another technique, certain results are stored as "search jobs," and the client may retrieve the results by referring to the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

3.3. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "I" operates on the results produced by the first command, and so on, for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

4.0. SYSTEM FOR STORING AND ANALYZING METRICS DATA

Figure 23:
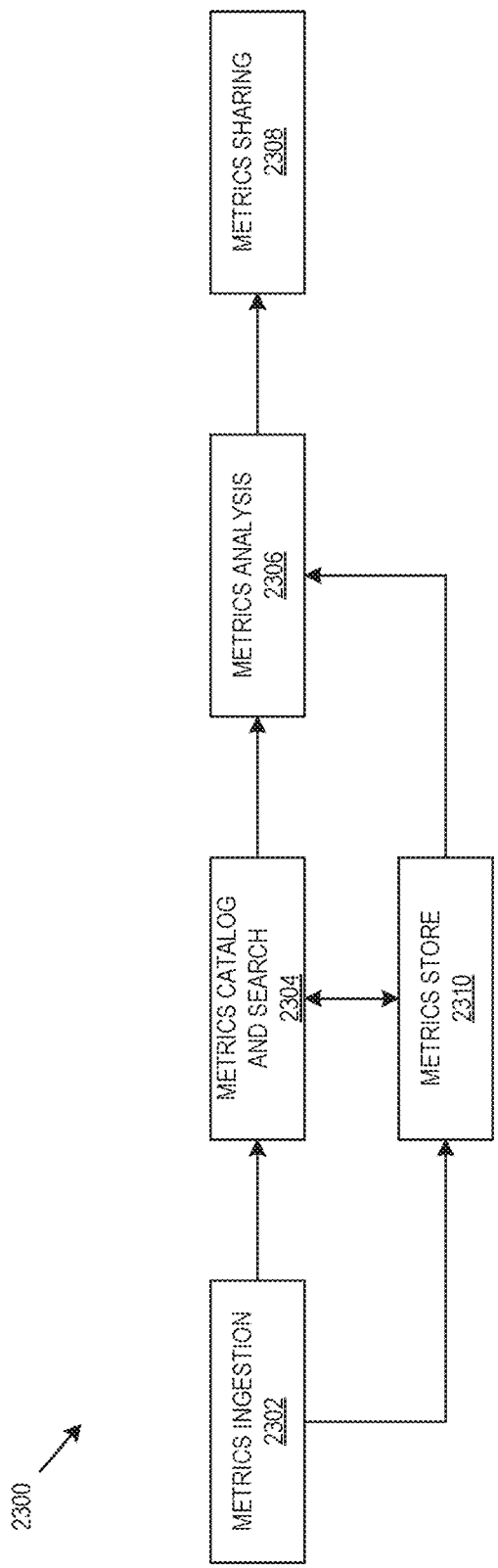
FIG. 23 is a block diagram of a system that can support storing and analyzing metrics data according to some embodiments of the present disclosure.

FIG. 23 is a block diagram of a system that can support storing and analyzing metrics data according to some embodiments of the present disclosure. The block diagram depicts components of the system 2300 as functionally separate. However, it will be apparent to one of ordinary skill in the art that the components of FIG. 23 can be combined or divided into separate software, firmware and/or hardware components. Furthermore, it will also be apparent to one of ordinary skill in the art that such components, regardless of how they are combined or divided, can execute on the same host or multiple hosts, and the multiple hosts can be connected by one or more networks. The reader is further directed to U.S. patent application Ser. No. 15/339,899, entitled "METRICS-AWARE USER INTERFACE", filed on Oct. 31, 2016, which is hereby incorporated by reference for all valid purposes, and which illustrates the existence and use of multiple data types including an event data type and a metric data type, the metric data type perhaps offering certain advantages for the representation of measurement data for metrics.

The system 2300 of FIG. 23 includes at least a metrics ingestion component 2302, a metrics catalog and search component 2304 ("metrics catalog 2304" or "catalog 2304"), a metrics analysis component 2306, a metrics sharing component 2308, and a metrics store component 2310.

Each component may include one or more components discussed in greater detail below. Generally, the ingestion component 2302 is communicatively coupled to the metrics store 2310, to store ingested metrics data in indexes of the metrics store 2310. The metrics analysis component 2306 includes features that enable analyzing metrics data or data related to metrics data in the metrics store 2310 and the metrics catalog 2304. For example, a metrics-aware user interface (UI) may be communicatively coupled to the metrics analysis component 2306. A user can input search and/or analysis commands via the metrics-aware UI to the metrics analysis component 2306, which may retrieve data from either the metrics store 2310 in secondary memory or the metrics catalog and search component 2304 in primary memory (e.g., an in memory). Lastly, the metrics sharing component 2308 can enable users to share the analysis results with other users.

As used herein, the term component or module may refer to software, firmware, hardware, combinations thereof, or another component that is used to effectuate a purpose, and it will typically include a computing device, appliance, or host having processors and software instructions that are stored in a storage device, such as a non-volatile memory (also referred to as secondary memory) of the computing device for practicing one or more objectives. When the software instructions are executed by the processor(s), at least a subset of the software instructions is loaded into a memory (also referred to as primary memory) by the computing device, wherein the computing device becomes a special purpose computing device for practicing the objectives. When implemented on a general-purpose computing device, the computer program code segments configure the computing device to create specific logic circuits.

In the example of FIG. 23, each component can run on one or more nodes (e.g., hosting devices). As used herein, the term host may refer to a computing device, a communication device, a storage device, or any electronic device capable of running a software component. For example, a computing device can be, but is not limited to, a laptop personal computer ("PC"), a desktop PC, a tablet PC, or a server machine. A storage device can be, but is not limited to, a hard disk drive, a flash memory drive, or any portable storage device. A communication device can be, but is not limited to, a mobile phone.

4.1. Metrics Collection

Figure 24:
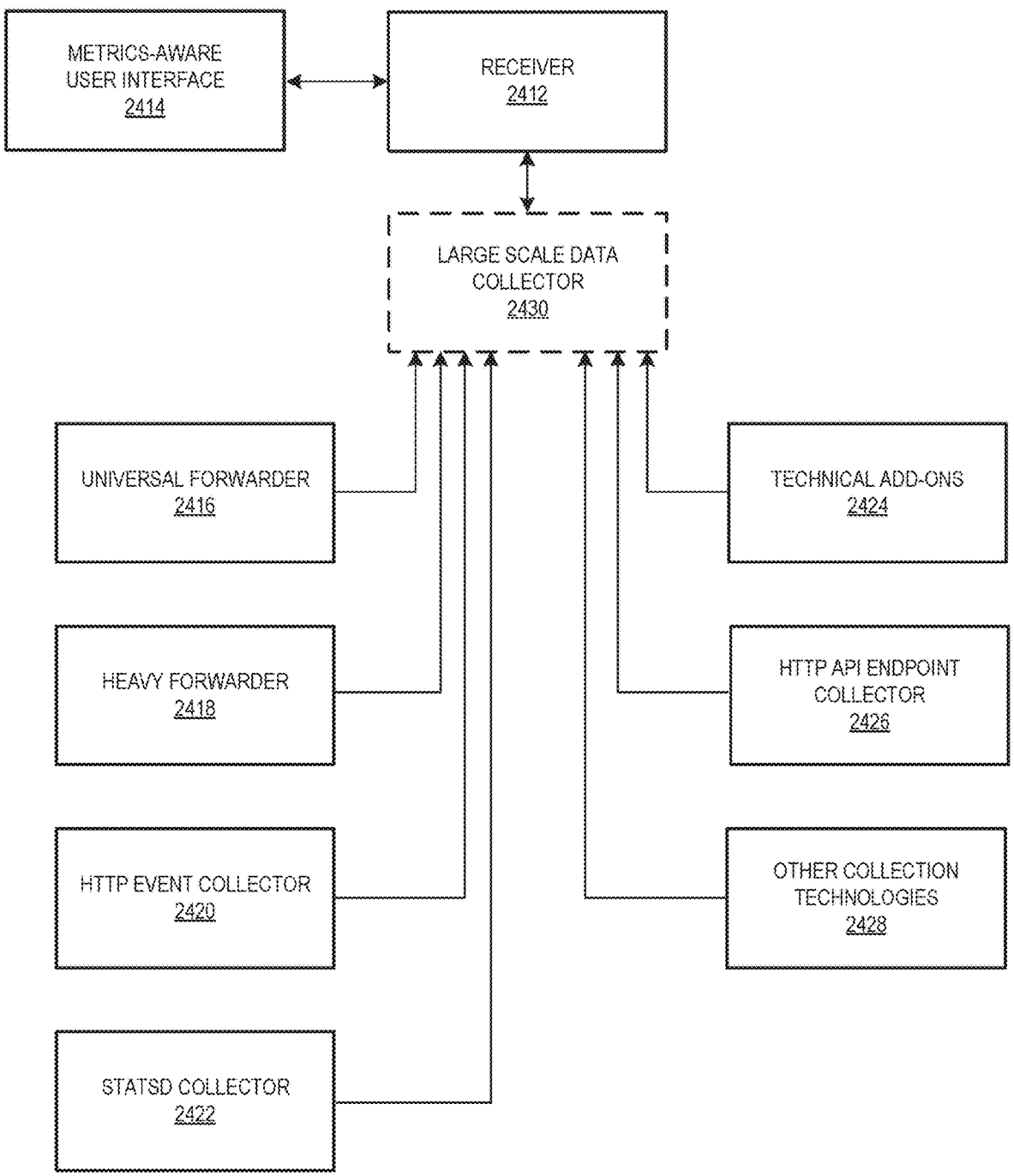
FIG. 24 is a block diagram illustrating different types of collection mechanisms that can transfer metrics or non-metrics data to a receiver of a data intake and query system according to some embodiments of the present disclosure.

The metrics ingestion component 2302 can include a getting data in (GDI) mechanism that enables collecting metrics data from local or remote systems over a computer network. The GDI mechanism can include different collection mechanisms for collecting diverse types of metric and non-metric data from different resources. FIG. 24 is a block diagram illustrating various collection mechanisms that can transfer metric or non-metrics data to a receiver of a data intake and query system according to some embodiments of the present disclosure. In some embodiments, the receiver 2412 can be an indexer or a forwarder of a data intake and query system. In some embodiments, a metrics-aware UI 2414 can be used to configure the receiver 2412, or configure any of the collection mechanisms over a computer network.

Examples of collection mechanisms include a universal forwarder 2416, a heavy forwarder 2418, an HTTP event collector (HEC) 2420, a StatsD collector 2422, a technical add-on 2424, an HTTP API endpoint collector 2426, and other collection technologies 2428. In some embodiments, a large scale data collector (LSDC) 2430 that supports metrics can coordinate the collection mechanisms to improve ingestion by mitigating congestion. Other technologies that can be implemented to enhance the operations of the metrics system 2300 include IT service intelligence (ITSI) and key performance indicator (KPI) support for metrics, and machine learning techniques.

In some embodiments, the collection mechanisms can be selected or enabled via the metrics-aware UI 2414 displayed on a display device. The metrics-aware UI 2414 may include a list of available collection mechanisms, data types, and other options to customize collections operations by the data intake and query system. In some embodiments, these operations are presented in a user selectable format. Examples of data types include unstructured, semi-structured, or structured metrics data or non-metrics data (e.g., machine-generated data) from particular sources. Examples of the other user-selectable options include a customizable scheduler of the LSDC that can enable certain collection mechanisms for certain types of data or resources at certain times in accordance with a schedule. As such, a user can customize collections of metrics data and non-metrics data by the receiver 2412 via the metrics-aware UI 2414.

4.1.1. Universal Forwarder

The universal forwarder 2416 may collect data securely from one or more remote sources over a computer network and forward the collected data to the receiver 2412 of a data intake and query system for processing, storage, and analysis. For example, the universal forwarder 2416 can collect and forward application log data alone, log and metrics data, or metrics data alone. The metrics data may include metrics collected from various computing resources over one or more computer networks. As indicated above, each metric includes a numerical value indicative of a measured characteristic of a computing resource. A metric may be collected as structured data, semi-structured data, or unstructured data, and forwarded to the receiver 2412 for ingestion. The process for ingesting and storing metrics data by the receiver 2412 of the data intake and query system is described further below.

The universal forwarder 2416 can be a streamlined, dedicated component of the data intake and query system that contains only essential components needed to forward data to the receiver 2412. As such, the universal forwarder 2416 may not expose a metrics-ware UI. In some embodiments, the universal forwarder 2416 is an executable such as an instance running on a node that collects and sends data to the receiver 2412 such as an indexer, another instance, or to a third-party system. In some embodiments, the universal forwarder 2416 may be the best or preferred way to forward metrics data to the receiver 2412. In some embodiments, the universal forwarder 2416 may only collect and forward non-metrics data (e.g., machine-generated raw data) to the receiver 2412. In some embodiments, the universal forwarder 2416 can only collect and forward metrics data (e.g., structured or semi-structured metrics data) to the receiver 2412. In some embodiments, the universal forwarder 2416 can route either metrics data or non-metrics data to the receiver 2412.

The universal forwarder 2416 can be scaled to collect relatively large amounts of data (e.g., terabytes) from relatively large amounts of remote systems (e.g., tens of thousands) with minimal impact on performance. However, the universal forwarder 2416 may not have capabilities to index data locally before routing the collected data elsewhere. The universal forwarder 2416 can provide a robust solution for metrics data forwarding compared to conventional network feeds. The universal forwarder may include capabilities for tagging metadata (e.g., source, source type, and host), configurable buffering, data compression, SSL security, and use of any available network ports. Multiple universal forwarders can be used to perform functions like data consolidation and load balancing across forwarders.

Although the universal forwarder 2416 may not be accessible by the metrics-aware UI 2414 in the streamlined version, it may still be configured, managed, and scaled by editing configuration files or by using a forwarder management or distributed management console (DMC) interface. Hence, a user can selectably enable the universal forwarder 2416 to collect and forward data from specified sources, of specified source type, and of specified data type (e.g., metric or non-metrics data).

4.1.2. Heavy Forwarder

The heavy forwarder 2418 can be an entirely separate, full instance of a streamlined executable with certain features disabled. The heavy forwarder 2418 has a larger footprint than the universal forwarder 2416, and retains indexer capabilities, except that it lacks the ability to perform distributed searches. Much of its default functionality, such as a web interface, can be disabled, if necessary, to reduce the footprint size on the machine on which it runs.

Unlike the universal forwarder 2416, the heavy forwarder 2418 can parse data before forwarding it and can route data based on criteria such as source or type of event. The heavy forwarder 2418 can index data locally, as well as forward data to another system instance. A user can enable these capability on, which may be disabled by default. In some embodiments, the heavy forwarder 2418 can search stored data, and generate alerts as configured by users. In some embodiments, the heavy forwarder 2418 can be accessed over a computer network via the metrics-aware UI 2414. As a result, a user can selectably enable the heavy forwarder 2418 to collect and forward a specified data type from a specified source of a specified source type via the metrics-aware UI 2414. Thus, a user can configure, manage, and scale heavy forwarders online.

4.1.3. Http Event Collector

An HTTP event collector (HEC) 2420 provides a fast and efficient way for developers to send application log data or metrics data over HTTP or HTTPs to the receiver 2412. The HEC 2420 requires only a few lines of code added to an application, causing it to send the log and/or metrics data to the receiver 2412. The HEC 2420 is token-based such that hard-coding of credentials in the application or supporting files is not required to enable sending data. In operation, the HEC 2420 can be turned on at the endpoint machine. An HEC token is generated, a POST request is created on the client that will post data to the HEC, and the client's authentication header is set to include the HEC token. Then data is posted to the HEC token receiver.

The HEC 2420 can support metric protocols to send metrics data over HTTP or HTTPS to various destinations such as metrics stores in the cloud, such as SPLUNK® ENTERPRISE or SPLUNK® CLOUD, in an efficient and secure manner. The HEC 2420 can also take advantage of a distributed deployment of a data intake and query system to distribute and index very large amounts of data. Further, various kinds of data can be sent to the receiver 2412 through the HEC 2420. For example, event data sent by the HEC 2420 can be raw text or formatted within a JSON object. In some embodiments, one of the logging libraries of the HEC 2420 can automatically package and send data from the HEC 2420 in a selected format. The HEC 2420 also supports assigning different source types, indexes, and groups of indexers such that a user can customize where and how data gets ingested by the data intake and query system.

In some embodiments, the HEC 2420 can be customized by changing its configuration files.

4.1.4. StatsD Collector

The StatsD collector 2422 is a daemon (i.e., background process) that can collect metrics data and forward it to the receiver 2412. Unlike the HEC 2420, the StatsD collector 2422 runs outside an application from which it collects data, and uses UDP protocol. Hence, the StatSD collector can avoid crashing the application from which is collects data. The StatsD collector can include a front-end proxy for a set of tools that can be used to send, collect, and/or aggregate metrics based on the StatsD protocol. The StatsD protocol can be a simple, text-oriented protocol, which enables the StatsD collector to reliably interact with the backend components independent of languages and frameworks. It can also ensure strict isolation between the StatsD collector 2422 and the rest of the components of a computer system from which it collects data.

The StatsD collector 2422 enables a user to invoke or utilize the tools as well as many StatsD libraries to meet the user's needs. Specifically, applications are instrumented by developers using language-specific client libraries. The libraries communicate with the StatsD daemon using the StatsD protocol, and the daemon can generate aggregate metrics, and route data to the receiver 2412. More specifically, the StatsD daemon can listen for UDP traffic from all application libraries, aggregate metrics data over time and then flush the metrics data. In some cases, the protocol used between the StatsD daemon and the backend of the data intake and query system may be HTTP-based.

The StatsD collector 2422 can capture different types of metrics data including gauges, counters, timing summary statistics, and sets. As indicated above, the StatsD collector 2422 can also aggregate and summarize metrics data that has been previously summarized and reported by a StatsD collector 2422. The StatsD collector 2422 may create new metrics by applying, for example, different aggregations (e.g., average, minimum, maximum, median) to multiple reported metrics (e.g., metrics data points). In some embodiments, after metrics are collected by another collector (e.g., the universal forwarder 216), the StatsD collector can then aggregate the collected metrics and route the aggregated metrics to the receiver 2412. The aggregated metrics may be routed on regular intervals for further processing.

4.1.5. Batch and Streaming Data Extraction

In some embodiments, metrics are extracted and logged in batches according to a schedule. For example, each metric can be batched prior to being sent to the HEC 2420, and then subsequently routed over an HTTP-based protocol to the receiver 2412. In some embodiments, batching can be automatically enabled by specifying one or more batching-specific properties, and then queue metrics to be sent to the HEC 2420 according to those properties. For example, a token property can be a required property to use for batching, and an interval can be set to flush metrics at specified time intervals, such as every second, when a specific number of metrics have been queued, or when the size of queued metrics equals or exceeds a threshold amount. In some embodiments, the batching can be performed manually. In some embodiments, data is extracted and streamed to create a metric of the data for subsequent analysis.

4.1.6. Technical Add-Ons and Build Support

The technical add-ons ("add-ons") 2424 can support metrics data. Add-ons can generally import and enrich data from any source, creating a rich data set that is ready for direct analysis or use in an application. The add-ons 2424 can also be used to extend the capabilities of a data intake and query system. The add-ons 2424 can be proprietary or open source technologies. In particular, an add-on is a reusable software component like an application but does not contain a navigable view. A single add-on can be used in multiple applications, suites, or solutions. The add-ons 2424 can include any combination of custom configurations, scripts, data inputs, custom reports or views, and themes that can change the look, feel, and operation of metrics ingestion.

More specifically, the add-ons 2424 can help to collect, transform, and normalize data fields from various sources. Examples of add-ons include Amazon Web Services (AWS) CloudWatch, Containerization (e.g., cAdvisor/Heapster), and Docker Remote API. In some embodiments, the add-ons 2424 can adopt open platform communication (OPC), which is a platform-independent interoperability standard for secure and reliable exchange of data among diverse platforms from multiple vendors. OPC can enable seamless integration of those platforms without costly, time-consuming software development. In some embodiments, Google Cloud Platform (GCP) StackDriver Monitoring API can be adopted to collect metrics and metadata from, for example, AWS, hosted uptime probes, application instrumentation, and a variety of application components including Cassandra, Nginx, and Apache Web Server.

The disclosed embodiments include an add-on builder ("builder"), which is an application that helps users build and validate the add-ons 2424 for a deployment. The builder can guide a user through all the steps necessary to create an add-on, including building alert actions, adaptive response actions, etc. In some embodiments, the builder uses best practices and naming conventions, maintains CIM compliance to reduce development and testing time while maintaining quality of add-ons. The builder can be used to validate and test an add-on to check for readiness and to identify limitations such as compatibilities and dependencies, and to maintain a consistent look and feel while still making it easy to add branding.

4.1.7. HTTP API Endpoint

In some embodiments, an HTTP API endpoint collector 2426 is part of a modular subsystem that allows for creating custom scripts to access metrics using APIs of third-party vendors to stream the metrics data to the receiver 2412.

4.1.8. Large Scale Data Collector Support for Metrics

The disclosed collections technologies may optionally include the large scale data collector (LSDC) 2430 that supports metrics data. For example, the data intake and query system may include numerous modular input mechanism to stream metrics data from different collectors over one or more computer networks. A module input mechanism may include custom scripts that can call third-party APIs to pull large volumes of metrics data from distributed computing sources. For example, a data intake and query system may include multiple add-ons and HECs that are operable to collect metrics and/or non-metrics data.

The data intake and query system may experience congestion caused by the multiple data streams being communicated from multiple sources over networks to different modular inputs of the receiver 2412. In some cases, congestion can be mitigated by using alternate routes to communicate the data to the receiver 2412. However, congestion may persist due to receiving the multiple data streams by the same destination at the same time.

The LSDC 2430 overcomes the drawbacks caused by collecting large amounts of data (e.g., metrics or non-metrics data) from numerous different computing sources over one or more networks. Specifically, the LSDC 2430 can be a centralized process that manages multiple modular inputs that can receive multiple data streams from different sources. The LSDC 2430 is a distributed task scheduler that can manage different APIs to coordinate scheduling across multiple collectors for one or more indexers, which can result in significant performance improvements. For example, the LSDC 2430 can coordinate scheduling of various types of collectors such as any combination of add-ons and HECs. Thus, the LSDC 2430 can avoid congested links and coordinate a uniform transfer schedule to improve utilization of available resources.

4.1.9. IT Services for Metrics Data

The disclosed embodiments include metrics data IT service intelligence (MITSI) services. MITSI services can be invoked to monitor metrics data for service health, to perform root cause analysis, to receive alerts, and to ensure that IT operations are in compliance with business service-level agreements (SLAs). MITSI services enable analysts to define services that model IT infrastructure or computing resources.

The MITSI services can perform monitoring and alerting operations and can help an analyst diagnose the root cause of performance problems based on large volumes of metrics data correlated to the various services an IT organization provides. In particular, the MITSI services can store large volumes of metrics-related data at ingestion time for later retrieval and analysis at search time, to perform regular monitoring or to investigate a service issue. An analyst can define an IT operations infrastructure from the perspective of the services it provides. A service can be defined in terms of entities used to provide the service, such as host machines and network devices. An entity is defined to include information identifying all metrics data that pertains to the entity, whether produced by the entity or another machine, and considering the ways that the entity may be identified by metrics data (e.g., source name, source type, and host). The service and entity definitions can organize metrics data around a service so that all metrics data pertaining to the service can be identified. This capability enables implementing metric key performance indicators (MKPIs).

MKPIs are defined for a service within an MITSI application. Each MKPI measures an aspect of service performance at a point in time or over a period of time. Each MKPI is defined by a search query that derives a MKPI value from the metrics data associated with the entities that provide the service. Information in the entity definitions may be used to identify the appropriate metrics at the time a MKPI is defined or whenever a MKPI value is determined. The MKPI values derived over time may be stored to build a repository of current and historical performance information for the service, and the repository itself may be subject to search query processing. Aggregate MKPIs may be defined to provide a measure of service performance calculated from a set of MKPI values; this aggregate may be taken across defined timeframes and/or multiple services. A service may have an aggregate MKPI derived from substantially all the service's MKPIs to indicate an overall health score for the service.

The MITSI services can facilitate producing meaningful aggregate MKPIs based on thresholds and state values. Different MKPI definitions may produce values in different ranges and, as such, the same value may indicate something different for different MKPI definitions. For example, an MITSI service can translate individual MKPI values into a common domain of "state" values such as "critical," "warning," "normal," and "informational." Thresholds set for particular MKPI definitions determine ranges of values for that MKPI that correspond to various state values. For example, a first range of MKPI values may be set as a "critical" state in the state domain. MKPI values from disparate MKPIs can be processed uniformly once they are translated into the common state values using the thresholds. For example, "normal 80% of the time" can be applied across various MKPIs. To provide meaningful aggregate MKPIs, a weighting value can be assigned to each MKPI so that its influence on the calculated aggregate MKPI value is increased or decreased relative to the other MKPIs.

During operation, MITSI services can recognize "notable metrics" that may indicate a service performance problem or other situation of interest. The notable metrics can be recognized by a "correlation search" specifying trigger criteria for a notable metric. For example, every time MKPI values satisfy a criteria, an application indicates a notable metric. A severity level for the notable metric may also be specified. Furthermore, when trigger criteria are satisfied, a correlation search may cause the creation of a service ticket in a metric IT service management (MITSM) system.

MITSI services can be particularly useful for monitoring or investigating service performance. Moreover, a metrics-aware UI can include interactive and navigable visualizations of MKPI information. Lastly, MITSI services can provide pre-specified schemas for extracting relevant values from different types of service-related metrics data. The disclosed embodiments enable users to define such schemas. In some embodiments, the metrics ingestion component can adopt machine learning methods to monitor and analyze the metrics data.

4.2. Metrics-Aware User Interface

A metrics-aware user interface (UI) (e.g., metrics-aware UI 214) is a means by which users and a data intake and query system interact. The metrics-aware UI can have interactive components that allow users to customize a deployment of the data intake and query system. The metrics-aware UI can include controls for users to configure operations of the data intake and query system involving a combination of collection mechanisms, data sources, and data types. For example, a user can selectively enable an HEC to collect application log data from a remote source and enable a StatsD collector to collect only metrics data from another remote source.

The metrics-aware UI can enable users to interact with any of the components of metric system 2300. For example, the metrics-aware UI can enable users to interact with the metrics catalog 2304, which can further interact with the other components of the system 2300. As such, the metrics-aware UI can provide a user with an onboarding metrics management experience. As shown by the numerous illustrations discussed in greater detail below, the metrics-aware UI enables users to view, manage, add, and delete metrics-related data. For example, a user can select multiple options and mechanisms via the metrics-aware UI such as metrics dimensions to be collected or analyzed. In another example, the metrics-aware UI can also be used to enable or schedule ingestion times or search times.

A user can use the metrics-aware UI to request an analysis of any number of measures of any number or series of characteristics or dimension values, based on catalog or field extraction rules defined by the metrics catalog and search component 2304. In some embodiments, the options available via the metrics-aware UI can be configured or monitored by another component of the data intake and query system. In some embodiments, a user can use the metrics-aware UI to define or specify options for metrics to be collected or analyzed. For example, the metrics-aware UI may enable users to define metric dimensions used by collection mechanisms to collect metrics data with the user-defined dimensions. A distributed management console (DMC) separate from, or included in, the metrics-aware UI can monitor a variety of performance information of the data intake and query system.

4.3. Metrics Ingestion

During ingestion, metrics data can be acquired over computer networks from remote computer systems. The metrics data can be ingested in any format and transformed into a multi-dimensional structure. The transformed metrics data may be referred to as pipelined metrics data, which typically includes numerous key values that populate the dimensions of the multi-dimensional structure. Ingestion can include techniques for processing metrics data received via collectors by receivers, such as indexers. The metrics data may include numerous metrics, where each metric has at least one or only one numerical value that represents a measurement. The received metrics may be structured data, semi-structured data, or unstructured data.

In some embodiments, a metric includes multiple key values and only a single numerical value that represents the measured characteristic of a computing resource. The numerical value can be a floating point value with multiple decimal place values depending on the precision of the measurement. Examples of a characteristic of a computing resource includes a utilization of a processor, a temperature of an electronic component, or a voltage reading of an electronic component. Unlike key values, numerical values (except zero) tend to be unique among all metrics.

In some embodiments, metrics can include any suitable measureable metric of one or more computing components. For example, a temperature metric can include dimensions such as time, location (latitude/longitude), and a value (e.g., in degrees); a pressure metric can include dimensions such as time, valve IDs, and a pressure value (e.g., in psi); IT monitoring metrics can include dimensions such as time, host, PID, and IT values such as CPU utilization or memory usage; an internal metric can include dimensions such as time, user, and a value such as search count; and a web access metric can include dimensions such as requestor IP, requestor method, requestor URL, and a value such as request duration or count. However, the embodiments are not limited to these types of metrics. Instead, the metrics can include any suitable performance measurement.

Figure 25:
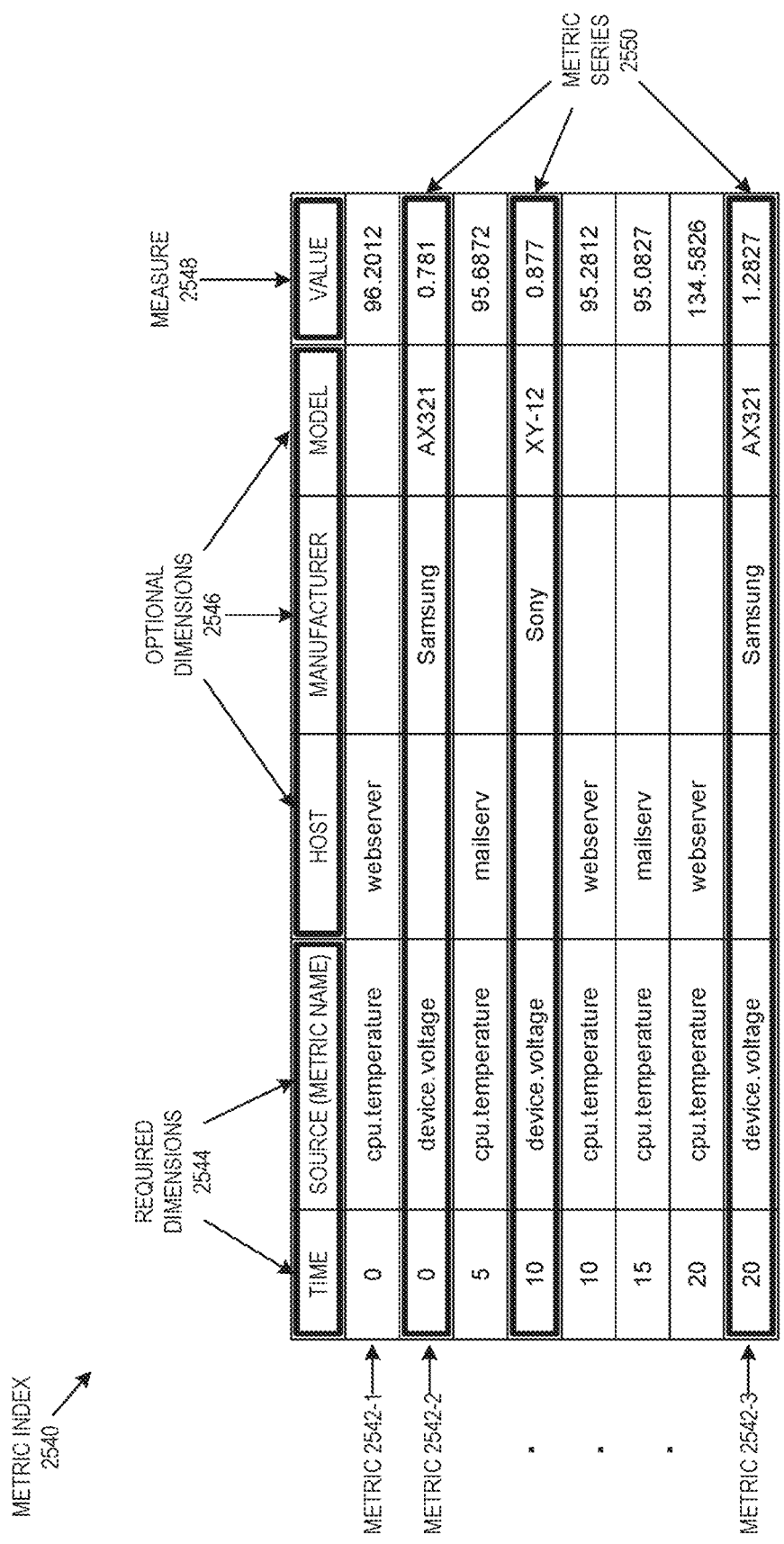
FIG. 25 illustrates an example of a metric index including ingested metrics according to some embodiments of the present disclosure.

FIG. 25 illustrates an example of a metric index 2540 including multiple metrics according to some embodiments of the present disclosure. As shown, each metric 2542 can be structured as an n-tuple record including required dimensions 2544, optional dimensions 2546, and a measure value 2548. Examples of the required dimensions 2544 include a time dimension or a name dimension. The time dimension includes a value indicative of a time when the measure value was taken. The name dimension includes a value indicative of a computing resource and the characteristic of that computing resource that was measured to obtain the measure value. The name dimension essentially repurposes the source field of time-indexed events to further enable the data intake and query to interchangeably handle metrics and non-metrics data seamlessly. In some embodiments, a user can set a dimension as a required dimension. For example, a source type dimension can be a required dimension by default or as set by a user.

Examples of the optional dimensions 2546 include a host dimension, a manufacturer dimension, and a model dimension. The manufacturer and model dimensions are indicative of a manufacturer and a model of an electronic device used to obtain a measure value. Other examples of the optional dimensions 2546 include geographical or relative descriptions of sources of metrics data such as a data center dimension with values that can include east, west, etc. Another example of an optional dimension is an address of the computing resource from which the measurement was taken. FIG. 25 merely shows examples of required or optional dimensions. However, the disclosed embodiments are not so limited. For example, the host or model dimensions may be required dimensions. In another example, the time or name dimensions may be considered dimensions.

The values of a required or optional dimension can include a string literal having a dotted hierarchy that represents a tag or name that provides metadata about the metric (e.g., technology—nginx, cloud environment—aws, cloud region—us-east-1a). For example, values of the name dimension can include "cpu.temperature" and "device.voltage." The metrics can be of different types, such as count, timing, sample, gauge, and/or sets (e.g., unique occurrences of events). The numerical values (i.e., measure values) of metrics can also be calculated values for a specific time resolution (e.g., count of 5xx errors for the last minute, sum, mean, upper 90th, lower 10th, etc.).

The metric index 2540 illustrates an example of a structure for storing multiple metrics. The metrics ingestion component 2302 can define any number of metric indexes for storing any number of ingested metrics. The metric index 2540 is depicted in a table format and includes references to metrics data including required dimensions, optional dimensions, and measured values. In some embodiments, the metric index may be defined to analyze a set of metric values of interest to a user.

The metric index 2540 includes a metric in each row of the table. The distinct metric of each row includes dimensions that are common to all the metrics of the index and some values for some of the dimensions. The dimension values correspond to key values included in the ingested metrics data. Each metric includes dimension values for each required dimension and measured values. The metrics also include optional dimensions, which can be defined by a user via, for example, a metrics-aware UI. In some embodiments, the user-specified dimensions may include the host, manufacturer, or model of machines (e.g., servers) used at the datacenter to take measurements. The user-specified dimensions may also include metadata.

The dimension values (i.e., metric key values) for each metric 2542 include time values in the first leftmost column of the metric index 2540, source values of the metrics in the adjacent column, some user-defined dimension values in the third through fifth columns, and the measurement numerical value 2548 in the last rightmost column of the metric index. As indicated above, the source dimension may also be referred to as the metric name, which is indicative of the source of the measured value and/or the type of measured value. The optional dimensions of the metric index are a host, manufacturer, and model, which are associated with machines used to obtain the measured values.

In the metric index 2540, a first metric entry has a measured CPU temperature value of 96.2012, at time 0 for a webserver. The webserver value is the only optional dimension value of this metric. The next metric entry is a device voltage value of 0.781, at time 0 of an unknown host, measured by a device manufactured by Samsung having a model number AX321. The metric index includes six other metric entries having values for each required dimension and measure, and some values for some optional dimensions.

The metric index 2540 also includes different series of metrics for respective computing resources. Specifically, the metric index 2540 includes a device.voltage series 2550 of measurements taken by different devices at times 0, 10, and 20. The metric index also includes a cpu.temperature series of measurements of a webserver at times 0, 10, and 20. As shown, each series has time ordered values, and a particular series has different values for optional dimensions. For example, the device.voltage series has different user-specified dimension values (e.g., manufacturer and model values).

Thus, the metrics can collected and routed to receivers of the data intake and query system are ingested and processed to store in structures such as multi-dimensional metric indexes. Examples of receivers include indexers that receive metrics data routed from forwarders or any other collection mechanism. Another example of a receiver is the forwarder itself, which may also have capabilities to index metrics data. Although shown collectively in a metric index, the ingested key values that are used to populate dimensions may be stored separately or can be included in multiple indexes. For example, the ingested key values of each metric may be stored separately and can be collectively displayed in one or more metric indexes. In another example, the key values for each metric may be stored separately on a per key basis.

During ingestion, the pipelined metrics can be tagged with index values indicative of the indexes where the metrics are to be stored. An index value can be used by the data intake and query system to group metrics together into a metric index used for subsequent search and analytics operations. Then, during indexing, an indexer (or other receiver with indexing capabilities), such as the indexer 206 of FIG. 2, can index the metrics using similar operations that are described in connection with machine data discussed with respect to FIG. 2.

In some embodiments, the pipelined metrics are streamed to index processors, which can handle metrics in different ways. For example, for active real-time searches, separate real-time search processes connect the index processers to a management port, to route the metrics satisfying the real-time searches as streams from the index processors to the management port as search results. The process for real-time searches is described in greater detail below.

In some embodiments, the pipelined metrics can be alternatively or additionally written to a journal structure on a disk. In some embodiments, the journal is structured as a list of metrics that can be compressed or optimized to reduce the required amount of storage. A metric-series index (msidx) file can be populated with key-values and numerical values of the metrics. For example, the metrics can be asynchronously batched into a msidx file for an indexer. The msidx file is used to process subsequent historical searches. The process for performing historical searches is described in greater detail below.

The data received by a receiver may include metrics or non-metrics data including meta values indicative of a source, source type, or host from which the data was obtained. As such, metrics data represents a subset of all the types of data that can be ingested by the data intake and query system. In some embodiments, the meta values can be used to determine how to process the data. For example, data having different source types may be processed differently, and data having the same source type may be grouped and processed the same way.

The ingested metrics data can be distinguished over non-metrics data because metrics data has unique properties that are different from other types of data. For example, the source values of metrics map to metric names indicative of a type of measurement and computing resource. In contrast, the source values of other types of data can be merely indicative of physical or logical structure from which the data was obtained. Moreover, metrics can be structured or semi-structured data that does not include raw data. In contrast, other types of data that are processed into events include raw data. Thus, metrics may not be or include unstructured data or may be constrained to have certain necessary or optional dimensions.

In operation, receivers of the data intake and query system can open network ports that receive metrics data from collectors such as a StatsD collector or a universal forwarder. As metrics stream into the opened ports, rules based data extraction capabilities are used to delineate the metrics, transform them into a specified structure, and move them to specified locations. In some embodiments, the data intake and query system may include operators specifically designed to exclusively process structured metrics data, rather than using general processing techniques that can process non-metrics and metrics data. For example, operators can be designed specifically to process StatsD data. In some embodiments, operators enable tagging ingested metrics data to improve or expand processing or search capabilities.

The received metrics data from different collectors is parsed to extract key values mapped to the multi-dimensional data model for metrics described above. For example, each time, source, source type, and host associated with a measured value is mapped into the dimensions of a metric. As a result, the data intake and query system can ingest very large volumes of data, having metrics structured in different formats, and convert all of them into the same common format described above. The formatted metrics can then be arranged into one or more metric indexes for subsequent processing, search, and analysis. For example, the metrics or data derived from the metrics can be catalogued for subsequent search and analysis of metrics data and non-metrics data in a uniform manner, as described in greater detail below.

Figure 26:
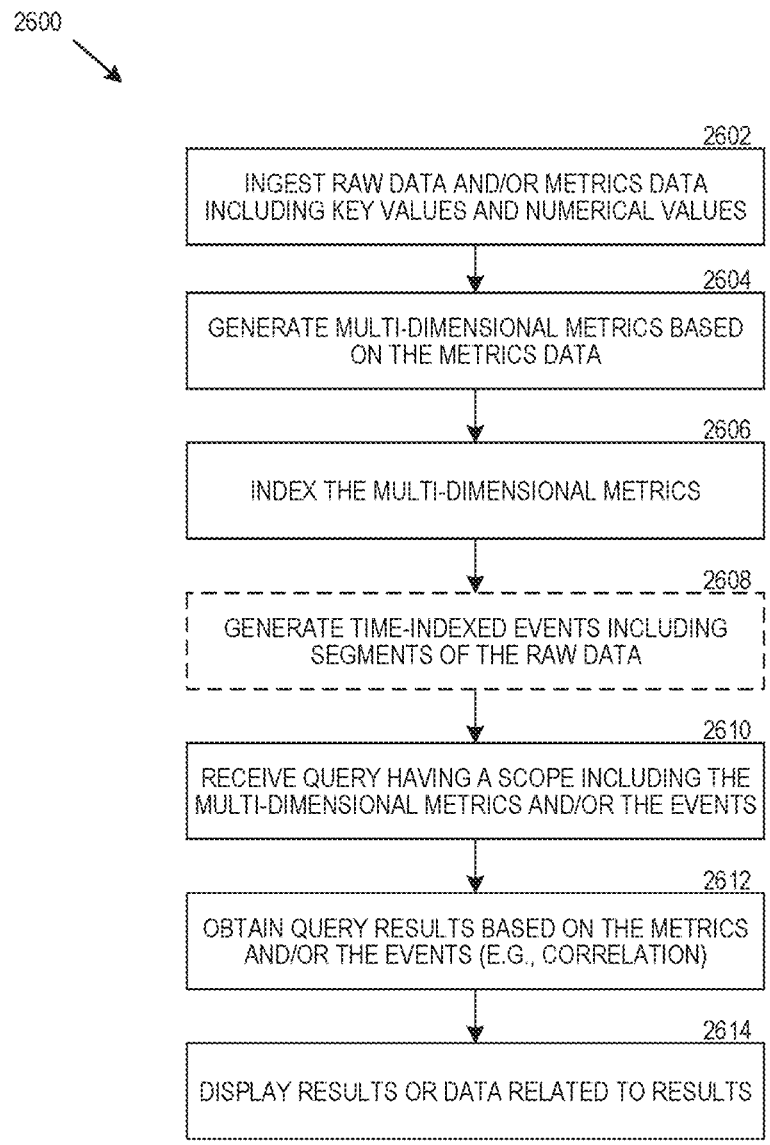
FIG. 26 is a flow diagram illustrating a method for ingesting metrics data according to some embodiments of the present disclosure.

FIG. 26 is a flow diagram illustrating a method for ingesting metrics data (e.g., semi-structured data or structured metric data) according to some embodiments of the present disclosure. The method 2600 is performed, at least in part, by a data intake and query system. In step 2602, a data intake and query system ingests collected data including metrics data including key values and numerical values, where each numerical value (e.g., floating point value) is indicative of a measured characteristic of a computing resource. Examples of a characteristic of a computing resource include a utilization of a processor, a temperature of an electronic component, or a voltage reading of an electronic component. In some embodiments, the metrics data is received by the data intake and query system over a computer network from remote computer systems.

In some embodiments, the data intake and query system can cause the collection of the data from different sources by using different types of collection mechanisms. For example, a universal forwarder can be configured to collect the data selected from a group consisting of only raw data, raw data and structured metrics data, and only structured metrics data. In some embodiments, a heavy forwarder can be configured to collect and locally index collected data selected from a group consisting of only raw data, raw data and structured metrics data, and only structured metrics data.

The universal or heavy forwarders can then forward the collected data to the data intake and query system.

In some embodiments, a collection mechanism includes a script running on a remote computer system configured to collect the metrics data from an application running on the remote computer system, where the script is included in the application (e.g., an HEC). The data intake and query system then receives the metrics data over an HTTP-based connection of a computer network.

In some embodiments, a collection mechanism includes a background process (e.g., daemon) of a remote computer system configured to collect the metrics data from an application running on the remote computing system, where the background process is independent of the application. The data intake and query system then receives the metrics data over a computer network.

In some embodiments, the collection mechanism includes a StatsD collector running on a remote computer system configured to collect metrics data and/or aggregate metrics data from the remote computing system. The data intake and query system then receives the metrics data and/or aggregate metrics data over a computer network.

In some embodiments, the collection mechanism is an add-on reusable software component. The data intake and query system then receives the collected metrics data over a computer network. In some embodiments, the collection mechanism involves calling an API of a remote computer system to send the metrics data to the data intake and query system over a computer network.

In some embodiments, the data intake and query system can use a large scale data collector (LSDC) to coordinate the collection of data from different sources. For example, the LSDC can schedule the transfer of the metrics data collected by multiple collectors from multiple remote computer systems, and the data intake and query system can then collect the metrics data over a computer network in accordance with the schedule.

In step 2604, the data intake and query system generates metrics from the metrics data, where each metric has dimensions populated with at least some of the key values and at least one or only one of the numerical values. Further, one of the dimensions is a name dimension indicative of the measured characteristic and the computing resource of the at least one or only one numerical value.

In step 2606, the data intake and query system indexes the metrics by at least one of the dimensions. In some embodiments, the dimensions are required dimensions that must have values and/or optional dimensions that can have values. An example of required dimensions is a time dimension including a value indicative of when a measured characteristic was measured. Examples of optional dimensions include a host dimension, a manufacturer dimension, or a model dimension. In some embodiments, the optional dimensions were specified by a user before or after ingestion of the metrics data. Moreover, in some embodiments, at least some of the numerical values are indicative of a time series of measured characteristics of the same computing resource.

In some embodiments, the data ingested by the data intake and query system can be machine-generated data. As such, in step 2608, the data intake and query system can also generate events indexed by timestamps, where each of the events includes a respective segment of the raw machine data.

In step 2610, the data intake and query system can receive a search query having criteria indicative of a queried dimension. In some embodiments, the search query is input by a user and expressed as an SPL command.

In step 2612, the data intake and query system can obtain search query results based on the queried dimension. In some embodiments, the queried dimension is a required dimension or an optional dimension.

In some embodiments, the query results may require a correlation of metrics data and data from the time-indexed event. As such, the data intake and query system can extract field values from the segments of raw data of the events based on the criteria and correlate the extracted field values and the search query results to obtain correlation results. Lastly, in step 2614, the search results (or correlation results) or data indicative of the search results (or correlation results) can be displayed on a display device.

In some embodiments, metrics can be generated from ingested time-indexed events that include raw data. Specifically, raw data received by the data intake and query system is processed to create events that are time-indexed and stored as detailed above. Then, the events can be further processed to create multi-dimensional metrics as shown in FIG. 25. For example, a query applied to time-indexed events can extract key values from fields of raw data included in the events. The extracted key values can be used to populate dimension values and numerical values of metrics. Hence, the metrics created from unstructured data can have the same multi-dimensional structure as events generated from structured data.

Specifically, ingested raw data can be processed into metrics having an n-tuple of elements including a timestamp, a metric name, a measured numerical value, and many other dimensions as represented in FIG. 25. For example, log data can be stored as time-indexed events and then processed to extract field values used to populate metric dimensions. In some embodiments, the extracted field values from time-indexed events can be incorporated into metrics that have the same format as the structured metrics collected from remote sources. By processing the structured metrics and/or raw data to obtain metrics having the same specified format, resulting metrics can be correlated to obtain new insights about, for example, the performance of computing resources.

Figure 27:
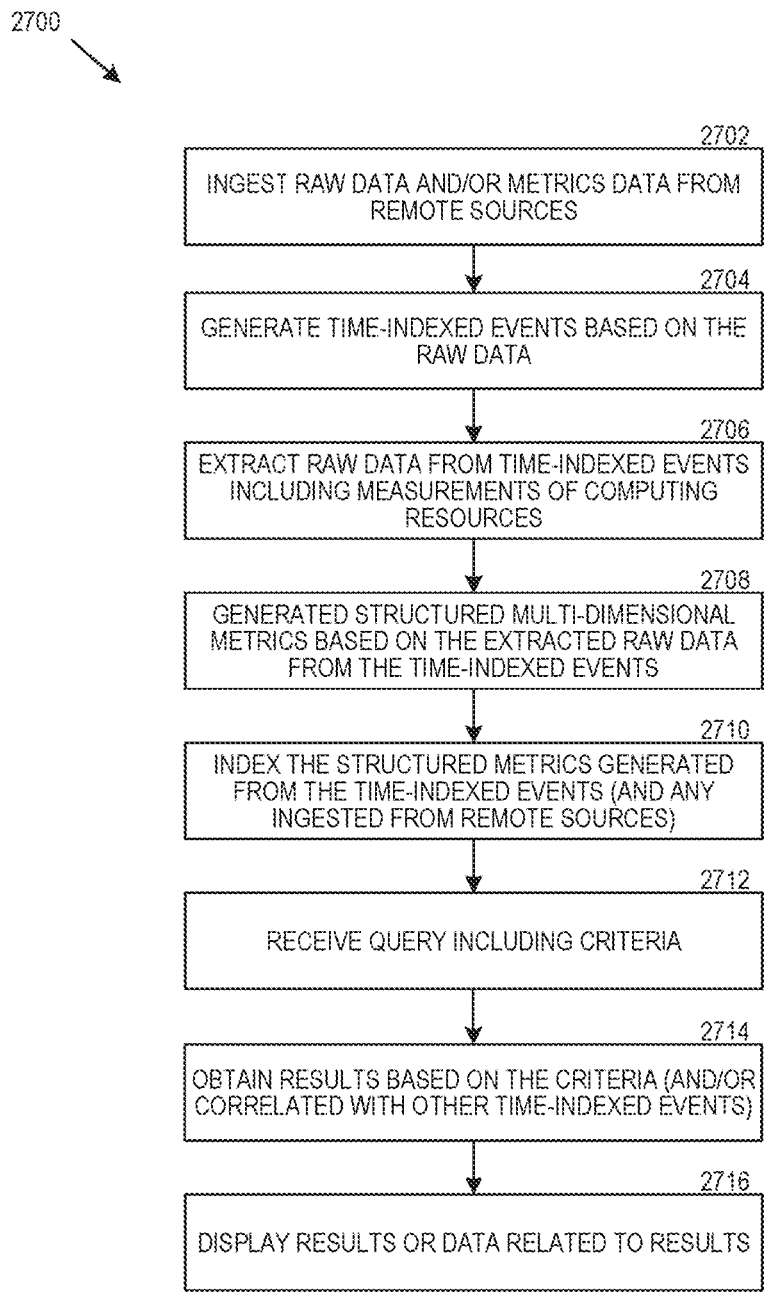
FIG. 27 is a flow diagram illustrating a method for creating metrics data from ingested events according to some embodiments of the present disclosure.

FIG. 27 is a flow diagram illustrating a method for creating metrics data from ingested events according to some embodiments of the present disclosure. The method 2700 is performed, at least in part, by a data intake and query system. In step 2702, the data intake and query system ingests data obtained over a computer network from remote computer systems. The data can include raw data (e.g., machine-generated data) and can additionally include structured metrics data.

In some embodiments, the data is collected using different types of collection mechanisms running on, for example, the remote computer systems. The collected data is then forwarded to the data intake and query system. For example, a universal forwarder running on a remote computer system can be configured to collect raw data and/or structured metrics data. In some embodiments, a heavy forwarder running on a remote computer system can be configured to collect and locally index the collected data, where the collected data is raw data and/or structured metrics data. The universal or heavy forwarders then forward the collected data to the data intake and query system.

In some embodiments, a collection mechanism (e.g., an HEC) includes a script running on a remote computer system configured to collect raw data and/or structured metrics data from an application running on the remote computer system, where the script is included in the application. The data intake and query system then receives the raw data and/or structured metrics data over an HTTP-based connection of a computer network.

In some embodiments, a collection mechanism includes a background process (e.g., daemon) of a remote computer system configured to collect raw data and/or structured metrics data from an application running on the remote computing system, where the background process is independent of the application. The data intake and query system then receives the raw data and/or structured metrics data over a computer network.

In some embodiments, the collection mechanism includes a StatsD collector running on a remote computer system configured to collect metrics data and/or aggregate metrics data from the remote computing system. The data intake and query system then receives the metrics data and/or aggregate metrics data over a computer network.

In some embodiments, the collection mechanism is an add-on reusable software component, and the data intake and query system receives the collected metrics data over a computer network. In some embodiments, the collection mechanism involves calling an API of a remote computer system to send the metrics data to the data intake and query system over a computer network.

In some embodiments, the data intake and query system can use a large scale data collector (LSDC) to coordinate the collection of data from different sources. For example, the LSDC can schedule the transfer of the data collected by multiple collectors from multiple remote computer systems, and the data intake and query system can then collect the data over a computer network in accordance with the schedule.

In step 2704, the data intake and query system generates time-indexed events from the received raw data. In particular, each event has a timestamp and a segment of the raw data. The events can be indexed by their timestamps. In some embodiments, the timestamp of a time-indexed event is derived from the raw data it contains.

In step 2706, the data intake and query system extracts field values from the raw data of the time-indexed events. The extracted field values include numerical values (e.g., floating point values), and each numerical value is indicative of a measured characteristic of a computing resource. Examples of a measured characteristic of a computing resource include a utilization of a processor, a temperature of an electronic component, or a voltage reading of an electronic component.

In step 2708, the data intake and query system generates structured metrics based on extracted field values of the time-indexed events. Each structured metric has multiple dimensions that are populated with the extracted field values, and includes at least one or only one of the numerical values. A name (i.e., source) dimension of the multiple dimensions is indicative of a measured characteristic and a computing resource of the numerical value. In some embodiments, the data intake and query system re-purposes its processing of the source field of time-indexed events to process the name dimension of the metrics.

In some embodiments, the dimensions are required dimensions that must have values and/or optional dimensions that can have values. An example of a required dimension is a time dimension including a value indicative of when a measured characteristic was measured. Examples of optional dimensions include a host dimension, a manufacturer dimension, or a model dimension. In some embodiments, the optional dimensions are specified by a user before or after ingestion of the data. Moreover, in some embodiments, at least some of the numerical values are indicative of a time series of measured characteristics of the same computing resource.

In step 2710, the data intake and query system indexes the structured metrics. For example, the structured metrics may be indexed by the values of their name dimensions. In some embodiments, the data intake and query system can index both the structured metrics generated based on the time-indexed events and any other structured metrics that have been structured in the multi-dimensional format described above.

In step 2712, the data intake and query system receives a search query having criteria indicative of a queried dimension of the multiple dimensions. For example, the search query may be input by a user and expressed in a pipelined search language. In some embodiments, the scope of the search query may include time-indexed events and/or metrics data.

In step 2714, the data intake and query system obtains search results based on, for example, the queried dimension. In some embodiments, the search is performed on either or both the structured metrics generated based on the time-indexed evens and structured metrics received from other sources over, for example, a computer network. In some embodiments, the search results involve performing a correlation of the search results from the metrics and time-indexed events other than the time-indexed events from which the metrics were generated. Lastly, in step 2716, the search results (e.g., correlation results) or data indicative of the search results are displayed on a display device.

The ability of the data intake and query system to process unstructured, semi-structured, and structured data improves performance and scalability over existing systems that process unstructured data separately from other systems that process structured data. As a result, the disclosed technology expands the capabilities of data intake and query systems to provide insights into metrics data or non-metrics data, as well as correlations of metrics and non-metrics data to better understand system performance, instabilities, and vulnerabilities.

4.4. Hash Bucketing

As an indexer indexes data, it can create a number of files that collectively constitute an index. The files can include tsidx or msidx and/or journal files that reside in directories referred to as buckets. An index can reside across many buckets. Buckets can contain newly indexed data or previously indexed data. A bucket may have a time range defined for the data it can contain. The bucket can move through several stages as its data ages in accordance with aging policies. The stages may include "hot," "warm," "cold," "frozen," and "thawed." The aging policies may be index-specific.

As buckets age, they "roll" from one stage to the next. Data actively being indexed goes to a hot bucket, which is searchable. The hot bucket "rolls to warm" when certain conditions occur (e.g., hot bucket reaches a maximum size), and a new hot bucket is created. Warm buckets are searchable, but are not actively written to. When other conditions occur (e.g., index reaches maximum number of warm buckets), the warm bucket "rolls to cold." The oldest warm bucket is typically rolled to cold. After a set period, a cold bucket rolls to frozen such that it gets either archived or deleted. If the frozen bucket is archived, it can later be thawed. Thawed buckets are searchable.

An indexer can index data across many indexes, where each index can define a partition of the data. Each index can have its own directories with subdirectories that categorize buckets by stage (e.g., hot, warm, cold, thawed). The buckets are subdirectories within those directories. The paths for the hot, warm, cold, and thawed buckets may be configurable such that cold buckets can be stored in a separate location (e.g., in secondary memory) from hot or warm buckets (e.g., in primary memory).

Buckets can be clustered or non-clustered. A standalone indexer creates non-clustered buckets. An indexer that is part of an indexer cluster creates clustered buckets. A clustered bucket can have multiple copies. A naming convention used for clustered buckets can distinguish between types of copies (e.g., originating or replicated). A variety of naming conventions can be used to identify a bucket, its stage, and whether it is clustered. For example, a name of a non-clustered hot bucket may have the format "hot_v1_<localid>", where "<localid>" is an identifier of the bucket. In another example, naming conventions for clustered buckets in a particular stage may additionally include timestamp information indicating the age of data in a bucket, and a globally unique identifier (e.g., unique to the deployed system).

The data intake and query system may implement various policies for creating hot buckets. The policies may limit the number of hot buckets and/or a time range per bucket, which constrains creating hot buckets at ingest time. The data intake and query system can implement heuristics to determine the creation of hot buckets in light of these and other constraints. The hot buckets are created along a time dimension to facilitate processing time based queries by avoiding the need to search buckets that are not part of the queries. Thus, the heuristics are implemented at ingest time to create hot buckets, when necessary, by a time dimension.

During search time, a search head can search buckets of a number of indexes to retrieve query results. By organizing data into one or more indexes having one or more buckets, each spanning a certain time range and organized by age, the data intake and query system can search particular buckets while avoiding the need to search other buckets. Since queries are typically targeted at specific time ranges, having buckets partition by time ranges avoids the need to search buckets not including the specified range. For example, in some embodiments, only hot or warm buckets having a time range overlapping the time range of the search query would be searched. A search head can search several indexers having particular indexes (i.e., partitions of data) to a hot path (e.g., hot buckets in primary memory) and/or a cold path (e.g., cold buckets in secondary memory).

The use of time-based buckets improves processing of time-based queries. Specifically, a data intake and query system can store non-metric data such as time-indexed events in buckets having limited time ranges. As a result, the data intake and query system only needs to search certain time-indexed events in certain time-based buckets for certain time-based queries. However, the nature of metrics data is such that users may seek to query for metrics along a dimension other than time. For example, an analyst may seek to search metrics by source. As a result, searching metrics by source in time-based buckets can be complex and inefficient because metrics from the same source can be indexed in different time buckets at index time.

To overcome these drawbacks, the disclosed embodiments include at least one hash bucketing technique. A hash bucket is hashed-based rather than time-based. In particular, a hash bucket is associated with a hash value for a primary partition key. Examples of a primary partition key can include a source, a source type, a host, an arbitrary key, or combinations thereof. In some embodiments, a primary partition key and/or combinations of primary partition keys are specified by a user before ingestion.

The data intake and query system can implement policies for creating hash buckets based on primary partition keys. For example, user-selected primary partition keys can be added to policies used at index time to create hash buckets. At index time, the data intake and query system can run a hashing algorithm to generate hash values from primary partition key values of data being ingested. Each hash value can define the scope of data written to its hash bucket. Subsequently ingested data that has the same hash values can be written to the same hash bucket.

In some embodiments, the primary partition key can be determined before index time or dynamically at index time depending on the type of data being ingested. For example, the disclosed hash bucket techniques may be enabled only when metrics data is being ingested (e.g., as detected) or otherwise disable by default when non-metrics data is being ingested.

For example, the data intake and query system can hash a source key, rather than using a time dimension to partition buckets. Then, metric data having the same source values can be written to the same hash buckets. In these cases, the use of hash buckets can improve query processing compared to using time buckets, when data is searched for the primary partition key rather than the time dimension.

In some embodiments, hash buckets can be partitioned by time in addition to one or more primary partition keys. As such, multiple hash buckets with different time range values that are associated with the same primary partition key value can coexist. For example, source-based hash buckets can be limited by a time range such that metrics data from the same source can be written to different source-based hash buckets having different time ranges. In some embodiments, however, hash bucketing techniques are enabled only when time coherent data is being ingested. For example, metrics data may be received in real-time such that there is a natural time coherence to the metric data. As such, partitioning buckets by time may be unnecessary.

During index time, heuristics determine when to create new hash buckets that will store the data being ingested. The heuristics implement the policies setting the primary partition keys used for generating hash values of the hash buckets. In some embodiments, the heuristics can be relatively simple or complex algorithms that consider various constraints when determining whether to create hash buckets and/or the size of the hash buckets. For example, the heuristics may include constraints by policies that limit the number of active hash buckets and size of each hash bucket. The heuristics may consider other rules, limits, or constraints such as computing resource constraints, processing constraints, or any user specified constraints to determine when to create new hash buckets.

The disclosed embodiments can also include a quarantine bucket. During ingestion, the quarantine bucket collects data having anomalous time values. For example, data that has a time value substantially or significantly greater than the median time value of data being ingested could be relegated to a quarantine bucket. In some embodiments, an anomalous time value may be determined relative to a preselected time value or preselected range of a hash bucket or expressed as a rule in a time policy. In some embodiments, the quarantine bucket does not hash on a primary partition key. As such, for example, when the primary partition key is a source key, metrics data of different sources can be written to the same quarantine bucket.

During search time, a search head can search the hash buckets of a number of indexes. By implementing a quarantine bucket, anomalous data can be excluded from searching, which can minimize the amount of data being searched and avoid obtaining skewed search results. In some embodiments, the quarantine bucket can also be searched at search time to retrieve the anomalous data associated with the primary partition key. In some embodiments, any data retrieved from the quarantine bucket can be tagged to distinguish that data from other search results to facilitate understanding the relative significance of the anomalous data.

Hash bucketing can be implemented for metrics data or non-metrics data. By organizing data into one or more indexes having one or more hash buckets organized by age, the data intake and query system can efficiently search particular hash buckets and avoid the need to search other hash buckets. Specifically, partitioning buckets by a primary partition key dimension can avoid the need to search buckets that are not relevant to search criteria. A hash bucket can be rolled from one stage to a next stage depending on whether certain conditions (e.g., age or size of bucket) occur. Similar to hot buckets, hash buckets can be searchable and actively being written to. In some embodiments, the hash buckets can be rolled into warm, cold, frozen, or thawed, and/or clustered in a similar manner as described above. In some embodiments, the naming conventions used for hash buckets may involve appending data indicative of the hash values to distinguish hash buckets from non-hash buckets.

Figure 28:
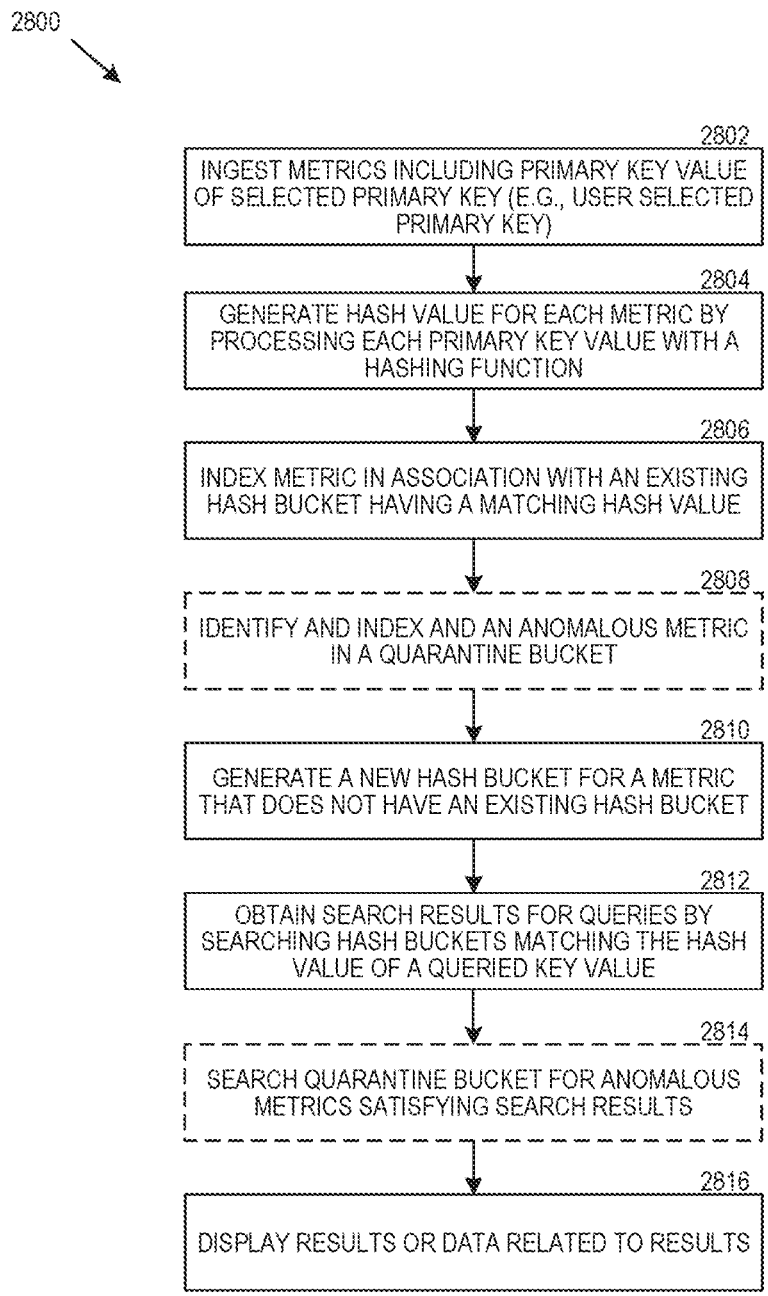
FIG. 28 is a flow diagram illustrating a method for hash bucketing according to some embodiments of the present disclosure.

FIG. 28 is a flow diagram illustrating a method for hash bucketing according to some embodiments of the present disclosure. Although described in the context of metrics data, the method illustrated in FIG. 28 can be implemented with any type of data including time-indexed events. The method 2800 is performed, at least in part, by a data intake and query system. In step 2802, the data intake and query system ingests metrics including key values and measured values. Each metric may include a primary key value of a selected primary key. For example, the selected primary key may be a source key, a host key, a source type key, or any arbitrary key selected by a user. In some embodiments, the selected primary key is included in a policy defining conditions for subsequently generating new hash buckets. In some embodiments, the primary key is not a time key. In other words, the hash buckets may not be partitioned in a time dimension.

In step 2804, a hash value is generated for each metric by processing each primary key value with a hashing function. The hashing function can be any hashing function known or not yet known to persons skilled in the art.

In step 2806, a metric can be indexed in association with an existing hash bucket having a matching hash value. In other words, a hash bucket that has a particular hash value associated with it can receive all the metrics having the same have value. As a result, the hash buckets of the data intake and query system can have a number of hash buckets partitioned by hash values of primary key values of the selected primary key. In some embodiments, the hash buckets age and can be rolled from hot to warm, and so on, when the hash buckets satisfy aging conditions.

In some embodiments, a quarantine bucket can be used to handle anomalous metrics. For example, in step 2808, the data intake and query system can identify an anomalous metric including an outlier key value relative to key values of other metrics. For example, a time value of a metric may be several standard deviations away from time values of related metrics. The anomalous metric can be stored in the quarantine bucket along with other anomalous metrics, irrespective of the hash values of any anomalous metrics.

In step 2810, the data intake and query system can generate a new hash bucket for a metric having a hash value that does not match an existing hash bucket. The new hash bucket can receive that metric and other metrics that have a hash value matching the hash value of the hash bucket. In some embodiments, the new hash bucket is generated in accordance with heuristics defining conditions that must be satisfied before generating the new hash bucket. The heuristics may be based on or related to user policies defining when to create new hash buckets.

In some embodiments, a new hash bucket is generated even if an existing hash bucket has a matching hash value when, for example, the size of the existing hash bucket exceeds a threshold value. In other words, a new hash bucket for the same primary source key value can be generated when an existing hash bucket is full. In some embodiments, a new hash bucket is generated even if an existing hash bucket has a matching hash value when, for example, a time value of a metric is not within a time range of the existing hash bucket. In other words, a hash bucket may be partitioned by time in addition to being partitioned by a primary key value. A new hash bucket may be created when a new metric having a matching hash value has a time value that is not within a designated time range of the matching hash bucket.

As a result, the data intake and query system can process subsequent queries by searching hash buckets having matching hash values of primary keys. For example, in step 2812, search results satisfying a search query indicative of a queried key value can be obtained by searching hash buckets matching the hash value of the queried key value. For example, a search query may specify a source, and the data intake and query system can search only through the hash buckets of that source, and avoid searching through other hash buckets that are not for that source.

In some embodiments, in step 2814, the data intake and query system can also search the quarantine bucket in addition to the hash buckets matching the hash value of the queried key value to obtain the search results. Lastly, in step 2816, the search results or data indicative of the search results can be displayed on a display device.

4.5. Metrics Stores

The metrics store component 2310 can interact with the metrics ingestion component 202, the catalog and search component 2304, and the metrics analysis component 2306 to store metrics data and maintain and perform backend operations on metrics data, a catalog, and search and analysis results. In some embodiments, the metrics store component 2310 includes one or more metrics stores analogous to the data stores for time-indexed events described above with respect to FIG. 2, for example. The metrics stores can store metrics in accordance with the metric index data model described above. That is, ingested metrics can be stored in the metric index 2340.

A metrics store may contain a number of metric indexes. The scope of each metric index may be defined by a user before ingestion of metrics data. For example, a metric index may have a scope limited by a range of time, a set of source types, or any dimension or data derived from a dimension. The metrics indexes of the metric store can be accessed by the system when performing queries with criteria that specifies metrics data. Moreover, the metrics indexes can be the basis for an in memory catalog of metadata, including data derived from the metrics, which enables rapid lookup, extraction, and analysis of metrics data contained in the metrics indexes.

4.6. Metrics Catalog

Figure 29:
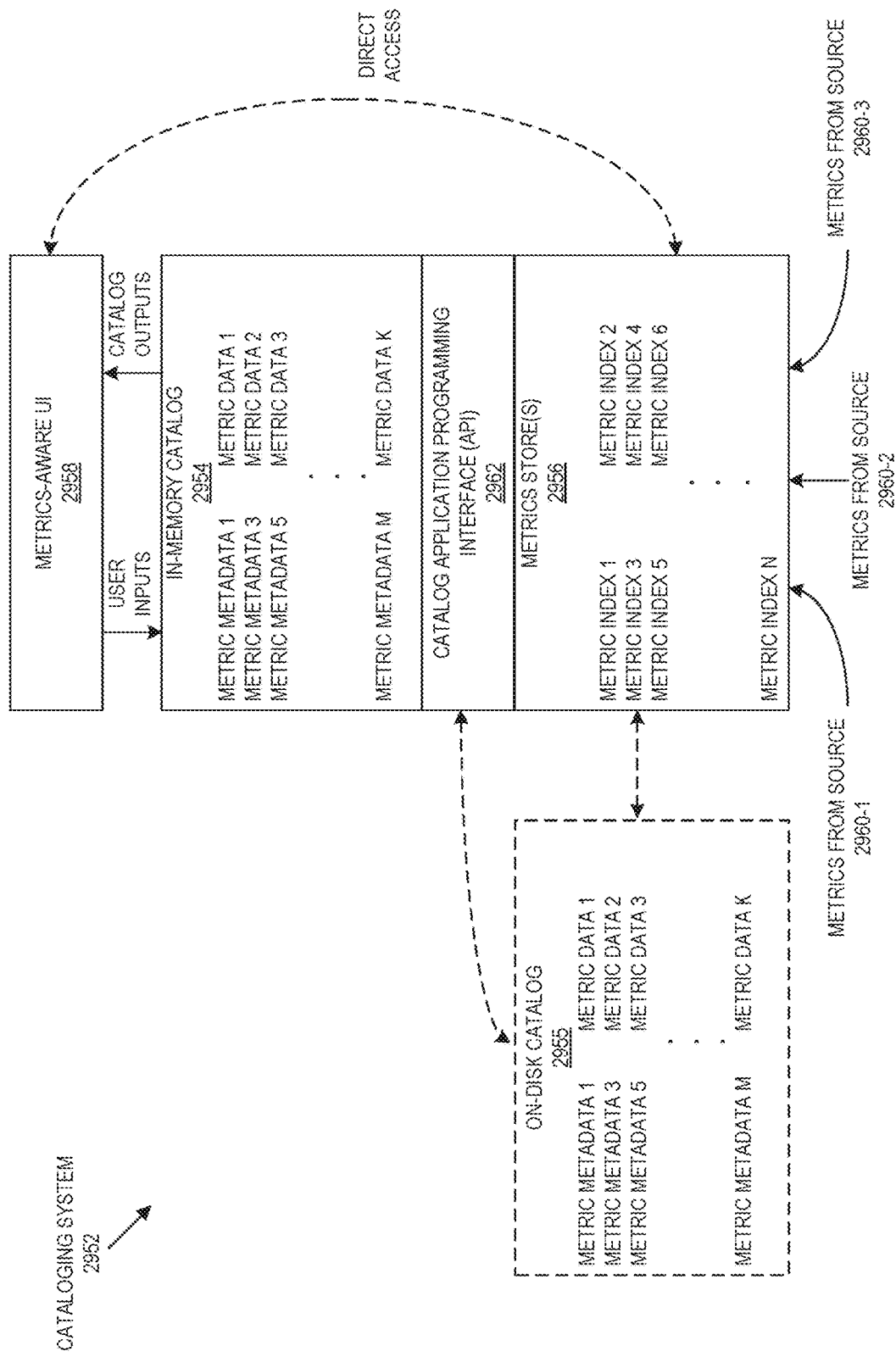
FIG. 29 is a block diagram illustrating a metrics cataloging system used to search and monitor metrics data according to some embodiments of the present disclosure.

The catalog and search component 2304 can facilitate and improve search and analysis of metrics data stored in metrics stores. Further, the catalog is customizable to enable monitoring metrics and alerting users of monitored metrics. For example, FIG. 29 is a block diagram illustrating a metrics catalog system operable to search and monitor metrics data according to some embodiments of the present disclosure. The cataloging system 2952 includes an in-memory catalog 2954 ("catalog 254") that caches a catalog including metadata related to metrics data stored in a metrics store 2956. The cataloging system 2952 may also include an on-disk catalog including metadata related to metrics data stored in the metrics store 2956. The metadata may be selected or defined by a user via the metrics-aware UI 2958. The metrics-aware UI 2958 sends user inputs to the catalog 2954 and receives outputs from the catalog 2954.

The user inputs may include queries submitted by a user as text input in a search field or by selecting controls or options displayed on metrics-aware UI 2958. The metrics-aware UI 2958 can return the outputs such as query results, which can be rendered in a variety of formats including visualizations that reduce the cognitive burden on users to understand and appreciate the insights obtained via the catalog 2954. Details of the metrics-aware UI 2958 and related use cases are provided further below.

The metrics data received from numerous sources 2960 can be ingested and stored in one or more metric indexes of the metrics store 2956 on secondary memory. As described above, a user can input an SPL command into a search field of the metric-aware UI 2958 to directly access the metrics data stored in the metrics store 2956, without using the catalog 2954. However, the catalog 2954 provides at least two improvements over techniques for directly accessing the metrics data from the metrics store 2956. First, the catalog 2954 provides in memory caching to enable rapid access to metrics or metrics related data. Second, the catalog 2954 can store metadata to augment or enrich the metrics data contained the metrics store 2956.

The catalog 2954 can cache metrics data from the metric store 2956 by calling an application programming interface (API) 2962 to subsequently provide rapid access to the cached metrics data by reducing the need to access the metric store 2956. The metadata stored in the catalog 2954 can include user defined conditions (e.g., preferences, thresholds, or ranges) or rules related to the metrics data of the metrics store 2956 such as schedule for monitoring metrics data, and/or alerts to notify a user about metrics that satisfy conditions. As such, the catalog 2954 provides rapid access that can enrich the user experience of the metrics store 2956, and the API 2962 can be used to retrieve data from the metrics store 2956 in accordance with the metadata stored in the catalog 2954.

In some embodiments, the API 2962 only manages operations related to the metadata. For example, the API 2962 may manage read and write operations of metrics data (e.g., metadata) from the metrics store. Further, metric values can be retrieved from the metrics store by running searches in accordance with search commands (e.g., running SPL searches with mstats search commands). The cataloging system 2952 may first try to obtain metadata directly from the in-memory cache; this process does not need to run a SPL-based query. However, the separate periodic process, which updates the on-disk metadata, may involve a SPL-based query.

In some embodiments, the cataloging system 2952 may also include the on-disk catalog 2955, in addition to the in-memory catalog 2954. The data included in the in-memory catalog 2954 may be related to the data included in the on-disk catalog 2955. For example, the in-memory catalog 2954 may have least some data in common with the on-disk catalog 2955. In some embodiments, the API 2962 only retrieves metadata from the in-memory catalog 2954 or the on-disk catalog 2955. In some embodiments, the data included in the on-disk catalog 2955 can be retrieved from the metrics store 2956. In some embodiments, the metrics-aware UI 2958 can run mstats (and/or other SPL commands) queries behind the scenes to retrieve metric data from metric store 2956 or the in-memory catalog 2954 on the fly (e.g., for hot data, or real-time searches).

Using the on disk catalog 2955 is advantageous for metadata that needs to run computationally expensive queries to get data from metrics index and configuration files. As such, the cataloging system 2952 can store metadata in a separate system on disk, e.g. a file, a relational DB, a NOSQL data store, etc. The in-3memory and on-disk metadata can be updated periodically with data from a metrics index and configuration files.

The cataloged metadata may have been directly extracted from the metrics store 2956 or input via the metrics-aware UI 2958 by users to customize the functionality of the cataloging system 2952. Examples of the metadata extracted from the metrics store 2956 may include dimensions or measure values. Examples of the metadata input by users includes rules or conditions causing retrieval of metric data from the metric store or reporting of particular metrics data that satisfies user specified conditions. For example, the catalog 2954 may enable a user to navigate all dimensions of the metrics stored in the catalog 2954 and to search across all of the metrics data by name and/or dimension metadata stored in the catalog 2954. Further, the catalog 2954 can integrate the search results with the analysis of other data, such as log events, to answer complex queries.

In another example, the user specified metadata may designate extraction rules for dimension values of metrics received from specified sources. The metadata input by users may also set thresholds or alerts for reporting metrics to the users that meet or exceed those thresholds. For example, user specified metadata may include a rule to alert a user when the measurement value of a named metric exceeds a threshold value. Thus, cataloging metadata enables searching for specified dimensions of metrics rapidly without needing to access the metric store 2956 with every search.

In some embodiments, a user can submit a query for the catalog 2954 as a number of commands expressed in SPL input to a search bar of the metrics-aware UI 2958. In some cases, the SPL commands can be used to retrieve metrics data directly from the metrics store. In other cases, a user can submit a query in a non-SPL command to access data from the catalog but not the from the metrics store. The scope of the query may include metrics data and non-metrics data (e.g., time-indexed events). The catalog 2954 can then determine whether to search the metrics data or non-metrics data or both, and further decompose the query to search the metrics data catalog 2954 or store 2956 and/or non-metrics data stores (not shown).

The catalog 2954 understands the structure of a metric, including dimensions, time chart, and metadata and/or descriptions. As such, the catalog 2954 can integrate the search results with an analysis of the metrics data and/or non-metrics data to answer queries, such as the dimensions available for a specified metric series, what metric series share a particular dimension, what logs are related to a particular metric series, what are the units for a particular measurement, etcetera.

The cataloging system 2952 may enable users to perform management operations on metrics data. Examples of the management operations include editing and deleting metrics. In particular, the metrics-aware UI 2958 can access the catalog 2954 and enable a user to edit or delete selected metrics or related data. For example, a user can edit dimensions and/or dimension values of metrics. In response, the catalog 2954 can store metadata such as flags indicating that metrics have been edited or deleted. Hence, the original metrics data stored in the metrics store 2956 may persist despite being edited or deleted and will appear edited or deleted to users of the catalog 2954. The catalog 2954 can also enable a user to edit and delete metrics data such as dimensions, unit of measurements, scales, and other data.

The management operations include adding metrics metadata such as dimensions, unit of measurement, scaling information, and the like. For example, the catalog 2954 can enable users to define or specify optional dimensions. A user-defined catalog configuration can be used to enhance one or more of the user experience (e.g., preferred visualization widget and configuration of widget), the type of aggregations or metric evaluation (e.g., using an evaluation command to convert bytes to GB) that can be applied to a series of measurements, or the type of analytics capability that can be applied (e.g., outliers, baseline, forecasting, etc.). In some embodiments, the catalog 2954 can enable users to perform a front end evaluation of the metrics and transform units of their measurements as necessary (e.g., bytes to GB).

The catalog 2954 can also enable a user to create metric metadata such as descriptions, relationships, and hierarchies of metrics or their parameters (e.g., dimensions or measures). For example, the catalog 2954 can establish relationships among metrics stored in the metrics store 2956. The catalog 2954 can cache these relationships as metadata. A user can then analyze the relationships among metrics data in accordance with the cached metadata to rapidly obtain insights.

A user can designate a hierarchical structure including an arrangements metrics or related parameters at different hierarchical levels. The metrics related parameters may include computing resources from which measurements are obtained. Thus, a subsequent search for metrics data from one of these computing resources can return hierarchical metrics data indicative of insights about the relationship among the computing resources. In some embodiments, metadata indicative of the hierarchy can be temporarily stored in the catalog as a metric derived from other metrics. Thus, the catalog 2954 can build an expanded set of metrics data from the original metrics data and store the expanded metrics data for subsequent searches and analysis.

The cataloging system 2952 can have various use cases. Examples of the use cases are illustrated further below in the context of the metrics-aware UI 2958. In one case, the catalog 2954 can search and return an enumerate list of dimensions that are compatible with the given metric name. For example, a user may submit the metric name "cpu_user," and the catalog may return "host" and "data center" as dimensions that are compatible with the "cpu_user" metric name. In another case, the catalog 2954 can search and enumerate metrics that have a given dimension. For example, a user can submit the dimension "data-center," and the catalog may return the metric names "cpu_user," "mem_free_bytes," and "disk_read_ops."

In another case, the catalog 2954 can search and return an enumerated list of given dimension values. For example, a user may submit the dimension "IP," and the catalog 2954 may return the values "10.1.2.3," "10.1.2.4," and "10.1.2.5." In other cases, a user can submit a query for all the metrics or dimensions available for inspection by that user, and the catalog 2954 may return enumerated lists of those metrics or dimensions. In another case, a user can submit search queries by any dimensions, dimension values, or metric names, and the catalog 2954 can return metrics data that satisfies the search queries. In yet another case, a user can submit a metric name, and the catalog 2954 may return an enumerated list of all the functions that can be used to aggregate the named metric.

In some embodiments, the metrics catalog 2954 can implement compression techniques for numerical values of metrics. Examples include delta-of-delta timestamps and XOR-based compression of the floating point values to reduce storage requirements and enable storing data in-memory, reducing latency, and improving query throughput.

Figure 30:
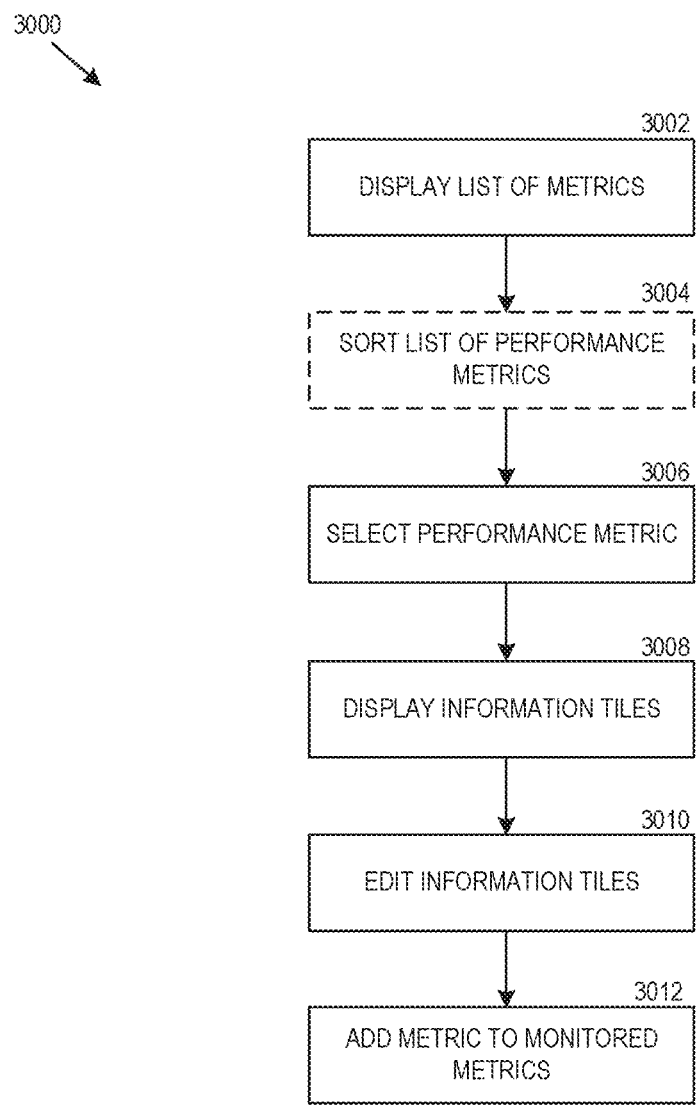
FIG. 30 is a flow diagram illustrating a method for using a catalog of metrics data according to some embodiments of the present disclosure.

FIG. 30 is a flow diagram illustrating a method for cataloging metrics data according to some embodiments of the present disclosure. The process 3000 is for selecting and configuring one or more metrics from a metric catalog for one or more components of an operational environment. In step 3002, a list of metrics is displayed on an interface to a user for selection. For example, the interface may be the metrics-aware UI 2958 displayed on a display device. The list of metrics can include metrics related to one or more elements of the components of an operational environment. In some embodiments, the list of metrics is predefined. The metrics can include any suitable metric type, such as, for example, gauges, counters, histograms, and/or any other suitable metric type. In some embodiments, histograms are configured as gauges. In some embodiments, a gauge metric includes any metric that has a value that can go up and/or down across multiple samples, and a counter metric includes any metric that has a value that only increases across multiple samples. Additional and/or alternative metric types can be included.

In some embodiments, each listed metric can be configured to support one or more values per metric. For example, each metric can be limited to a single value per metric to provide simplification of data storage (allowing easy storage of metrics data), simplification of configuration for keys, allowing a single key to be excluded from indexing such that all other keys can correspond to dimensions, and simplification of data ingestion, allowing a single key for input value. In some embodiments, each metric has multiple values per metric.

In an optional step 3004, a user can sort the displayed list of metrics using one or more sorting mechanisms, such as an alphabetic sort, sorting by one or more aspects of the metrics, using a user defined search/sort term, and/or any other suitable sorting mechanism. In step 3006, the user selects one of the metrics from the displayed list.

In step 3008, one or more tiles or charts for the selected metric are displayed on the display device to the user. The one or more tiles can include elements of the selected metric, such as, for example, general information, metric measurement values, related dimensions, tags, transaction and/or other information related to the selected metric.

In step 3010, the user can edit one or more of the tiles presented at step 3008. For example, in some embodiments, a general information tile includes one or more aspects of the selected metrics that can be edited by a user, such as a type of the metric (e.g., gauge, raw number, percentage), a default display of the metric (e.g., line, bar), a unit of the metric (e.g., count, cycles, MB, GB), collection frequency, and/or any other aspect of the metric. For example, a user can edit the general information tile to set a collection frequency at a higher/lower frequency than provided as a default collection frequency.

In step 3012, the selected metric is added to a set of metrics monitored by one or more systems, such as a user dashboard of a SPLUNK® IT SERVICE INTELLIGENCE system. In some embodiments, the selected metric is added to a user workspace, which includes a set of user-selected metrics that are monitored by the user.

Figure 31:
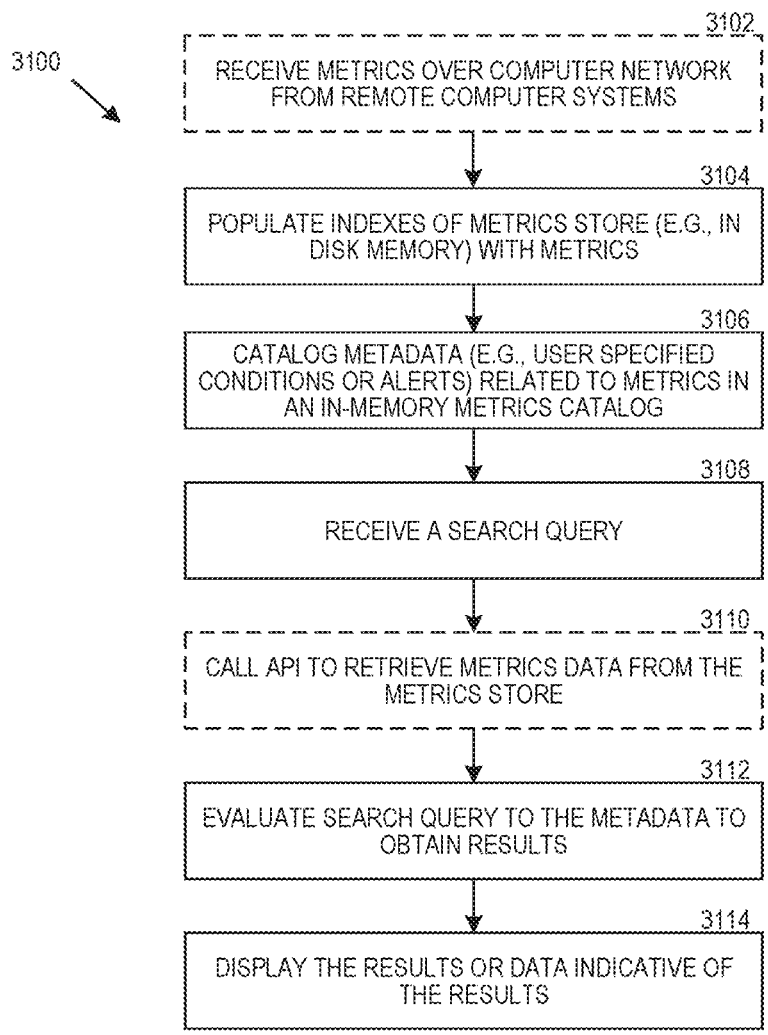
FIG. 31 is a flow diagram illustrating a method for in memory cataloging of data related to metrics in a metrics store according to some embodiments of the present disclosure.

FIG. 31 is a flow diagram illustrating a method for in memory cataloging of metadata related to metrics in a metrics store according to some embodiments of the present disclosure. The method 3100 is performed, at least in part, by a data intake and query system. The data intake and query system can obtain metrics data locally or from remote sources. For example, in step 3102, metrics are received by the data intake and query system over a computer network from remote computer systems.

In step 3104, indexes of the metrics store are populated with the received metrics, where each metric can include dimension values and a measure value. In step 3106, metadata is cataloged in an in-memory metrics catalog. The metadata is typically, but not always, related to the metrics in the metrics store.

In some embodiments, metadata is user specified and can indicate conditions causing the metrics catalog to automatically retrieve metrics data from the metrics store. In another example, the user specified metadata can include a threshold of a measure value for a particular metric, or a range of a measure value, or a preferred measure value for that metric. The metrics catalog can use these conditions to monitor metrics data in the metrics store, retrieve that metrics data for cataloging in the metrics catalog and, as such, make that monitored metrics data readily available for users via an in-memory system that avoids the need to access an in disk metrics store. In another example, the metadata can define a condition causing the display of an alert about a metric. As such, a user can be alerted when a measure value of a metric does or does not exceed a threshold value.

In some embodiments, the metrics catalog can be used to manage the metrics store. For example, a user can add, delete, or edit metrics data of a metrics store. However, rather than actually modifying the metrics store, metadata can be added to the metrics catalog that indicates a change to the metrics store. For example, deleting a metric of the metrics store via the metrics catalog may cause the metrics catalog to create and store metadata flagging that metric as being deleted without actually deleting the metric. The deleted metric will then appear as being deleted from the metrics store when using the metrics catalog, even though the metric has not been modified in the metrics store. In another example, metadata can indicate units (e.g., volts or millivolts) for a metric or type of metrics, which can be used to append related metrics or transform the units associated with that metric or type of metrics via the metrics catalog. In another example, the metadata may indicate a relationship (e.g., hierarchical relationship) between metrics in the metrics store such that the metrics catalog can present metrics data for the related metrics automatically to provide useful insights quickly.

In step 3108, the data intake and query system receives a query including search criteria. The query may be input by the user as an SPL command via a user interface. The data satisfying the search query can already be included in the metrics catalog. For example, data retrieved or derived from the metric store can be stored in the catalog or stored in the catalog. The data retrieved or derived from the metrics store can be obtained in accordance with a schedule such that metrics data is readily available for access from the in-memory catalog rather than needing to access the metric store, which may be in disk (or some other non-volatile memory).

For example, in step 3110, the data intake and query system can call an application programming interface (API) to retrieve metrics data from the metrics store, and the metrics data can then be cataloged in the in-memory metrics catalog. Although FIG. 31 shows metrics data being retrieved after a search query was received, the metrics data retrieved from the metrics store may be retrieved beforehand, in anticipation of the search query. For example, the metadata in the metrics catalog may indicate a metric or type of metric in the metrics store that should be monitored. Metrics data of that metric can be retrieved from the metrics stored in accordance with the metadata such that a subsequent query regarding that metric can be addressed without needing to access the metrics store.

As such, in step 3112, the search query can be evaluated by applying the search criteria to the metadata or metrics data of the metrics catalog, to obtain results that satisfy the search criteria. Lastly, in step 3114, the results or data indicative of the results can be displayed on a user interface of a display device.

4.7. Metrics Analysis

The metrics analysis component 2306 can generate a representation of metrics data for analysis such as one or more charts. Examples of charts include line charts, area charts, and column charts. In some embodiments, the metrics analysis component 2306 can add time annotations to metrics data by overlaying discrete notable event streams onto the charts. In some embodiments, the metrics analysis component 2306 can enable a user to visually correlate data across different generated charts.

In some embodiments, the metrics analysis component 2306 can alert a user about possible problems with the metrics data by integrating alerting existing capabilities of the data intake and query system and/or additional customized alert actions specific to the metrics data. In some embodiments, the metrics analysis component 2306 can set alerts by directly interacting with the generated charts.

Once the metrics data has been charted, the metrics analysis component 2306 can analyze the data across any combination of all or part of the metrics data and machine generated data in real time. In some embodiments, the metrics analysis component 2306 can perform statistical analyses of the metrics data based on the search results to generate advanced analytics on, for example, allocation, distribution, and utilization of the computing resources. In some embodiments, the metrics analysis component 2306 can identify statistical outliers and/or anomalies of the metrics data based on standard deviations of the data through the statistical analyses. In some embodiments, the metrics analysis component 2306 can forecast upcoming trends of, for example, the computing resources based on the statistical analyses of metrics data. In some embodiments, the metrics analysis component 2306 can further perform inline metric discovery from a metrics catalog of metrics data generated by the catalog and search module 2304.

4.8. Sharing of the Metrics Analysis

The metrics sharing component 2308 can utilize or extend export capabilities of a data intake and query system to share results of a metrics analysis with another device or another user. In some embodiments, the results of the metrics analysis include one or more of reports, dashboards, or metrics charts generated by the metrics analysis component 2306 in real time. The results of the metrics analysis can be exported in any format including, for example, CSV, PDF, PNG, and emails.

In some embodiments, the metrics sharing component 2308 can integrate a collaboration model that can, for example, connect people, tools, processes, and automation into a transparent workflow with an instant messenger (IM) and push the results of the metrics analysis in the form of images to IM channels, such as web-based group chart services, e.g., HipChat/Slack.

5.0. ENTITY RELIABILITY SCORING

The usefulness of a system employing a data intake and query system for monitoring an environment with hundreds, or thousands, or tens of thousands of operational components or entities, regarding which volumes of machine data are regularly generated, is already established. Reference is made to the discussion "2.15 Data Center Monitoring" in this description, for example. A further example is a Service Monitoring System (SMS) such as described and discussed in relation to FIGS. 36-61 as may be deployed to monitor an Information Technology (IT) environment. While an SMS monitors services provided in the IT environment, those services are ultimately performed by various ones and combinations of operational entities. Entity definitions or profiles may be maintained in such a system to identify the machine data reflecting the operation of each entity. Appropriate entities, via their definitions, can be associated with the services they perform to effectively link a service to the machine data representing its operation or some aspect of it. The entity definitions may include other information related to their respective entities as well. The eponymous goal of the SMS is, however, to monitor services, and the recognition and use of the entities is a means to that end. SMS's often heretofore offer little or only rudimentary monitoring of the entities as entities, perhaps relying on straightforward statistics of available entity performance measures. Other monitoring systems that specifically focus on entities, such as may be provided by a manufacturer of network equipment, for example, to monitor and report on all of its devices deployed in an environment may offer little more than slightly more complete or advanced statistics of available entity performance measures. Such a system that is entity and machine data rich can benefit from the implementation of entity reliability scoring mechanisms or aspects as next described in relation to FIG. 32-35.

The entity reliability scoring methods, apparatus, and articles discussed in relation to FIG. 32-35 result in improved computing machines for performing critical monitoring of large operating environments. Aspects may result in the creation of entity profiles having reliability information determined by a large context assessment of disparate entity data using artificial intelligence (AI), machine learning (ML), or other technologies, that supplants the need for substantial user investigation and analysis (which is slow and may be incomplete), and makes possible improved prioritization of entity processing based on reliability information. Improved prioritization based on reliability means a system with faster automated responses (which may include user notification) to address reliability concerns at the base operational level producing better overall system and service reliability. Moreover, the automated reliability assessment itself may be substantially more resource efficient than the combination of earlier reporting methods with user driven computer-based investigation and analysis. Accordingly, one or more aspects of the entity reliability scoring technologies now disclosed results in new profiles for operational entities that offer new processing possibilities for the automated entity monitoring, response, and control, and may achieve superior monitoring system results with fewer computing resources. These and other advantages will become understood by one of skill by consideration of the embodiments next discussed.

Figure 32:
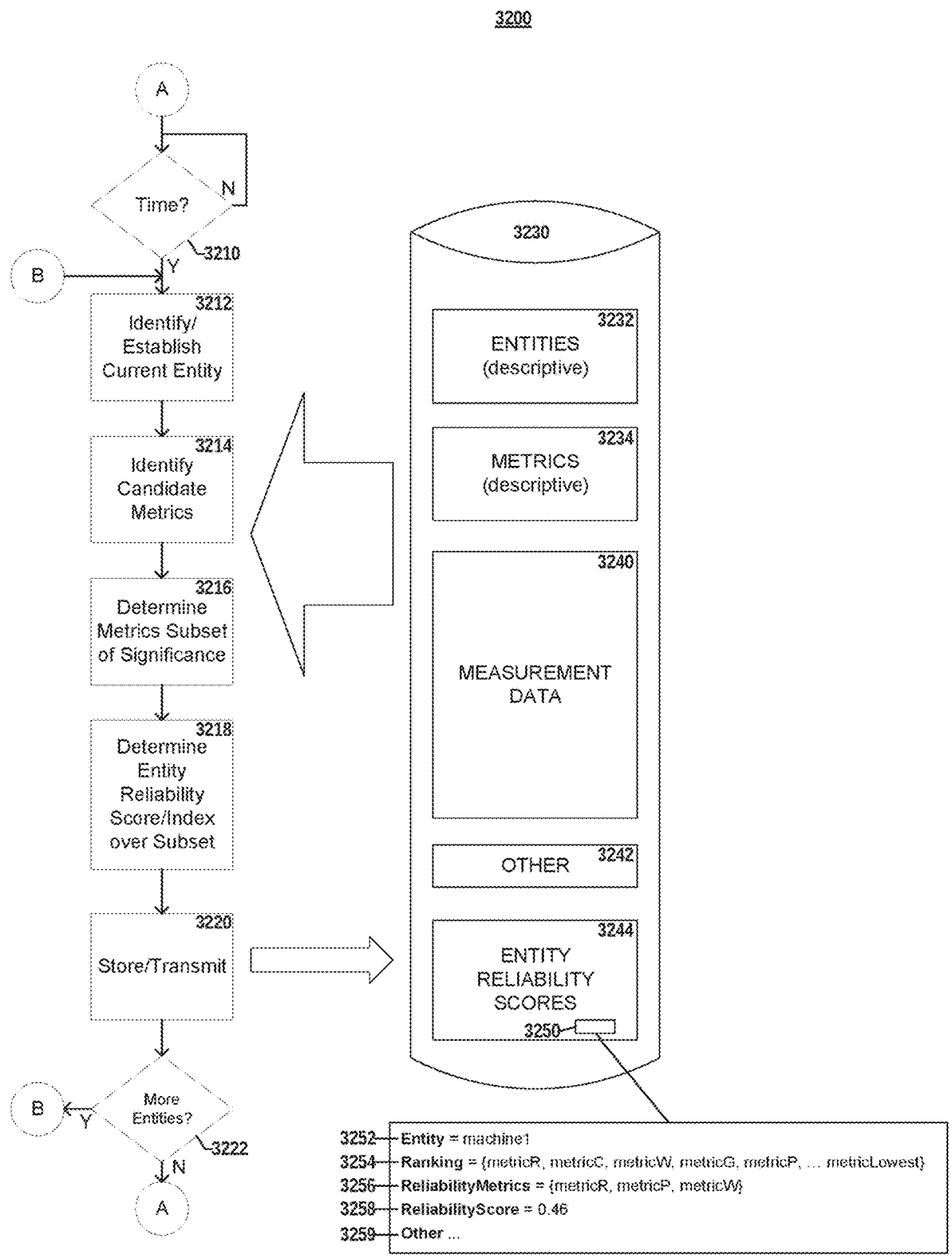
FIG. 32 is a flow diagram of an example deployment method that illustrates the relationship between the lower-tier application and the higher-tier application, in accordance with example embodiments.

FIG. 32 is a block diagram of a system with processing to produce reliability index scores for a collection of entities. System 3200 is shown to include data resources 3230 and certain processing represented by blocks 3210 through 3222. Data resources 3230 is shown to include descriptive and/or definitional entities data 3232, descriptive and/or definitional metrics data 3234, measurement data 3240, other data 3242, and entity reliability scores data 3244. Entity reliability scores data 3244 is shown to include example entity reliability score representation 3250 with a breakout to show the example contents thereof 3252-3259.

In one embodiment, the processing represented by blocks 3210 through 3222 may be performed on a server group together with other processing, such as the processing of a service monitoring system or a data intake and query system. In one embodiment the processing represented by block 3210 through 3222 may be performed on a dedicated server or group of servers. In any event, a server or server group performing the processing represented by blocks 3210 through 3222 may be identified as an entity monitoring server. Many embodiments are possible.

The processing of FIG. 32 is shown to begin at block 3210 where a determination is made whether a time criteria has been met. Block 3210 sits at the top of a processing loop to determine an entity reliability score or index for a collection of entities, and the processing of block 3210 is used in the illustrative embodiment to effect the processing at regular timed intervals. Accordingly, the processing of block 3210 may determine whether a particular time has been reached or whether a particular interval timer has expired, or such, and if so, processing proceeds to block 3212.

At block 3212, a particular entity for which a reliability index is to be determined in the current iteration of the processing loop is identified. In one embodiment, the processing of block 3212 may select the first of some list or sequence of entities or entity definitions for which reliability indexes are to be determined. In one embodiment, the processing of block 3212 may select the first entity represented in entities data 3232 and incrementally move through the entity representations found there for subsequent iterations. In one embodiment, entities data 3232 may include one or more definitions that each define an entity. Each entity definition may have information that describes the entity, metadata relating to it, and/or other information. For example, an entity definition may include a unique identifier for the entity, one or more aliases or identifiers that may be used to recognize information pertaining to the entity in machine data, location information, model and serial number information, and such. In one embodiment, the entities represented by the entity definitions of entities data 3232 is each a component in an information technology (IT) environment and may be, for example, a server, a network device, a client machine, a networked sensor, a virtual machine instance, a remote printer, or a network attached storage (NAS) device. These are but a few examples. The machine data identified by information of the entity definition may be ingested, stored, and searched using the functionality of a data input and query system (DIQS) such as DIQS 108 of FIG. 4, or DIQS 108 of FIG. 18. The entity definitions of 3232 may be related to or included in the entity definitions of a service monitoring system such as described by the disclosure of Appendix A. The processing of block 3212 identifies the first or subsequent entity for reliability index determination and establishes it as the particular entity targeted by the current iteration of processing. Processing may then proceed as shown to block 3214.

At block 3214, an embodiment may determine a set of candidate metrics for possible use in the determination of the reliability index for the entity. In one embodiment, the candidate metrics may include all metrics for which any measurement data exists in a relevant timeframe for the current entity. In one embodiment, the candidate metrics may include a list of associated metrics maintained in the definition of a metric as may be reflected in metrics data 3234. Such a list of associated metrics may include the metrics earlier identified as historically meaningful. In one embodiment, the candidate metrics may include all of the metrics in the list of associated metrics for which any measurement data exists in a relevant timeframe for the current entity. In one embodiment, the candidate metrics may include all of the metrics in the list of associated metrics for which at least some minimum threshold amount of measurement data exists in a relevant timeframe for the current entity. These and other embodiments are possible. Processing performed at block 3214 that limits the size of the candidate metric pool and/or focuses processing on a specific, known set of metric types, can lead to processing efficiencies. In example embodiment 3200 of FIG. 32, processing proceeds to block 3216 after the processing of block 3214 identifies the set of candidate metrics.

At block 3216, the computing machine performs processing to determine a subset of the candidate metrics designated as significant to producing a meaningful reliability index for the entity. One of skill will appreciate that the subset discussed here for purposes of illustration may in some embodiments be the entire set, or in some execution instances may be the entire set, rather than something less than the entire set, though referred to as a subset. Such details presented in describing this example are for the purpose of most clearly illustrating and teaching inventive aspects embodied here, and are not to be understood as limiting the practice of those inventive aspects. In one illustrative embodiment, the processing of block 3216 may first determine a metric of the entity that most strongly suggests the unreliability of the entity (the principal or primary reliability metric), and then determine one or more associate or companion metrics expected to likewise suggest unreliability (the secondary reliability metric(s)).

In one embodiment, the principal reliability metric may be determined by assessing anomalous measurements for the metrics—in number, in degree, or otherwise—and choosing the most anomalous metric as the principal reliability metric. Identifying and assessing the anomalous measurements may include comparing measurements with some reference to what is expected or predicted. In one embodiment, the measure of anomalous activity represented by the measurements of the metric may be assessed in multiple ways (e.g., multiple factor assessments) and integrated into a single measurement. In one embodiment, a single factor anomaly assessment is made for each metric. In one embodiment, a single factor anomaly assessment is made for each metric with the choice of factor based on its historical usefulness in producing valid reliability indexes. In one such embodiment, the choice of factor is updated on a regular basis by employing statistical, artificial intelligence (AI), and/or machine learning (ML) processing over a rolling corpus of historic data. These and other embodiments are possible. In one embodiment, factors used to identify a principal reliability metric may not include anomaly detection or assessment.

In one embodiment, the secondary reliability metrics may be determined by assessing some degree of closeness of relationship between other candidate metrics and the chosen principal reliability metric. In one embodiment, the 1, 2, 3, 4, or 5 candidate metrics exhibiting the highest degree of closeness of relationship to the principal reliability metric are identified as the secondary reliability metrics. In one embodiment, a list of related metrics included in the definition for the principal reliability metric in metrics data 3234 are identified as the secondary reliability metrics. In one embodiment, the degree of closeness of relationship between a candidate metric in the chosen principal reliability metric may be measured based on the covariance of its measurements with the measurements of the principal reliability metric for a relevant time period. These and other embodiments are possible. A more detailed description of one embodiment to effect the processing of block 3216 to determine the subset of significant metrics, i.e., the principal and secondary metrics, is found below in the consideration of FIG. 33.

At block 3218, a reliability index (RI) is determined for the current entity. In the illustrative embodiment now discussed, the entity RI is determined by generating reliability scores for the reliability metrics individually and combining those into an RI for the entity. Scores generated for the metrics may be based on one or more factors. In one embodiment, the same factor or set of factors may be used in scoring all metrics of the subset determined earlier. In one embodiment, different factors are used for scoring the primary reliability metric than for the secondary reliability metrics. In one embodiment, the factors used for scoring each metric are identified in its respective metric definition as found in metrics data 3234.

In one embodiment, three different anomaly detection factors are used to generate the score for each of the metrics in the reliability metrics subset (i.e., the subset made up of the principal reliability metric and the secondary reliability metrics). A first anomaly detection factor is determined from a trending anomaly detection process that compares the actual measurements for the metric to predictions for the metric based on historical data for a relevant timeframe. A second anomaly detection factor is determined from a coherent anomaly detection process that compares the actual measurements for the metric to predictions for the metric based on measurement data for one or more related metrics. The related metrics may or may not be the other metrics of the reliability metrics subset. A third anomaly detection factor is determined from a cohesive anomaly detection process that compares the actual measurements for the metric to the same metric for other entities in a cohort. Cohort membership criteria may vary among embodiments. For example, entity manufacturer and model information may determine cohort membership in one embodiment. As another example, a processor class attribute of an entity determines cohort membership in one embodiment. Embodiments may vary as to the determination of cohort membership. Known computing methods for preparing for and conducting anomaly detection may be used to implement processes for determining such reliability factors. Publicly available information tools may be utilized including, for example, the machine learning tool kit (MLTK), available at the time of this writing via an HTTP request to location //github.com/yinlou/mltk.

The factors determined for each metric are combined into a single reliability score/index for the metric. Such aggregate reliability scores for the metrics are combined into a single reliability index for the entity. Many methods may be employed to combine the various scores, for example, simple average, weighted average, sums, or other methods of varying complexities. A more detailed description of one embodiment to effect the processing of block 3218 to determine the entity RI is found below in the consideration of FIG. 34.

At block 3220, the entity reliability index (RI) from the processing of block 3218 is stored and/or transmitted, possibly including related information. In one embodiment, the entity RI may be transmitted via interprocess communication mechanisms to a local application program using entity RI's in its processing, perhaps to cause the display of its value or to use its value to determine or condition other processing. Such other processing may include transmitting command messages to network attached devices to cause actions to correct or otherwise address entity unreliability. For example, such processing may transmit a command message to an unreliable network router entity instructing it to perform a reboot operation. In one embodiment, the entity RI may be transmitted via external communication, such as via a network, to a remote host where it may be similarly utilized. In one embodiment, the entity RI and related information are reflected in the persistent storage of an entity reliability scores data store as may be exemplified by an entity reliability scores data 3244 of data resources 3230 of process 3200 of FIG. 32. The record, entry, reflection, object, or representation of the entity reliability score instance may be as illustrated in example 3250. Example reliability scores record 3250 is shown to include a representation for information of an Entity field 3252 having a value of "machine1", a representation for information of a Ranking field 3254 having an example value of "{metricR, metricC, metricW, metricG, metricP, . . . metricLowest}" which is an ordered list of the candidate metrics in the determination of this entity RI in a ranking factor order, a representation for information of a Reliability Metrics field 3256 having a value of "{metricR, metricP, metricW}" which is a list of the metrics in the reliability subset in the determination of this entity RI, with the principal reliability metric appearing first, a representation for information of a Reliability Score field 3258 having a value of "0.46" which is the entity RI determined in this instance, and a placeholder 3259 representing other information as may be desirable to include in the record of a determined entity reliability index.

In one embodiment, an entity profile or definition with improved functionality is created by combining data of an entity definition of 3232 with data such as the reliability score of a corresponding entity reliability score instance such as 3250. The resulting reliability-aware entity definition simplifies the prioritization of processing entities such that attention may first be directed to less reliable entities, for example, to improve overall system reliability and minimize downtime or substandard performance. Such a reliability-aware entity definition may be a logical construct in one embodiment and perhaps a physically contiguous storage construct in one embodiment. Many embodiments are possible.

At block 3222, determination is made whether another entity remains for which a reliability index should be determined in the current cycle. If so, processing returns to block 3212 where the setup is made to process the next entity. If not, processing returns to block 3210 where the system waits to begin another cycle of entity reliability index determinations.

Further consideration will now be made of the various components shown for data resources 3230 of system 3200 of FIG. 32. Entities data 3232 has already been discussed in some detail particularly in relation to block 3212. Metrics data 3234 has already been referred to in the description of the processing of system 3200 in regards to specific types of content it may contain. More generally, Metrics data 3234 may be a collection or repository of definitional and/or descriptive information about metrics for which measurement data may reside in a system. As discussed here, the metrics are not the individual measurement values of a particular type or meaning that occurred during system operation, but rather the metrics are those very types or meanings. Metrics, as discussed here are the categories, dimensions, types, classes, meaning designations, or the like to which the instances of measurement values belong. Accordingly, in one embodiment, Metric data 3234 may provide a normalized, common, or reference authority with taxonomical, ontological, and/or lexical properties for framing the measurement data pertaining to the entities. The measurement values data for the metrics represented in 3234 are reflected in Measurement data 3240, which in the illustrated embodiment represents an accumulation of some history of metric measurement data produced and collected during system operation. In one embodiment, Measurement data 3240 may be collected, ingested, stored, managed, and accessed, using the functionality of a data input and query system (DIQS), DIQS 108 of FIG. 4, or DIQS 108 of FIG. 18. Embodiments may vary as to the DIQS storage type used for measurement data. In one embodiment, all measurement data belongs to the DIQS metric data storage type. In one embodiment, all measurement data belongs to the DIQS event data storage type. In one embodiment, measurement data is mixed between the metric and event data storage types. Where Measurement data 3240 is implemented using a DIQS in an embodiment, and where the DIQS supports a data type such as a metric data type that may provide enhanced performance for high volumes of numeric data, the use of the metric data type for the measurement data may be advantageous. Many implementations are possible.

While described in terms of a serial loop, the processing of system 3200 can be implemented in many ways without departing from the practice of inventive aspects. For example, certain serial aspects may be amenable to processing in parallel. For example, processing described as multiple distinct operations to facilitate the understanding of the illustrative embodiment may be readily recombined into fewer or different distinct operations. For example, operations illustrated and described in a sequential order may be reordered or effected concurrently to implement an embodiment with inventive aspects. One of skill understands that such principles may generally apply to descriptions of processing as they appear throughout this written description to help teach the novel aspects contained herein.

Figure 33:
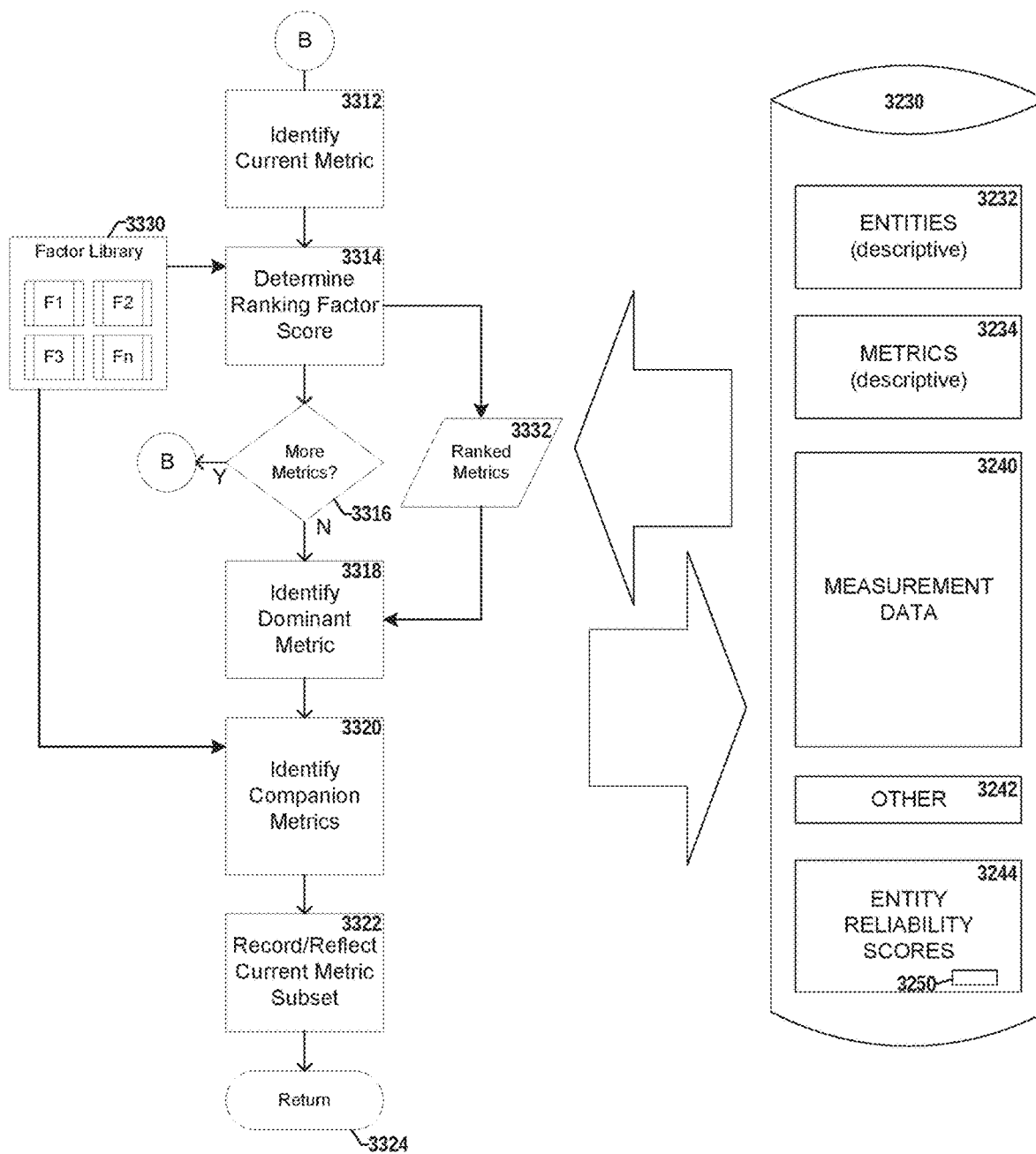
FIG. 33 is a flow diagram of another example deployment method that illustrates the relationship between the lower-tier application and the higher-tier application, in accordance with example embodiments.

FIG. 33 is a block diagram of a processing implementation to determine a metrics subset of significance to reliability scoring. Processing implementation 3300 of FIG. 33 depicts processing as may be utilized in one embodiment to effect the processing discussed in relation to block 3216 of FIG. 32; and the data resources 3230 of FIG. 32 are repeated here as the data resources 3230 of FIG. 33. The processing of implementation 3300 is entered with an identification of candidate metrics for use in determining a reliability index for an entity. Through its processing, implementation 3300 identifies a subset of the candidate metrics collection having a principal reliability metric and possibly one or more secondary reliability metrics, together, the reliability metrics or reliability metrics subset. The reliability metrics subset produced by the processing of implementation 3300 is used by subsequent processing to determine a reliability index for an entity.

Block 3312 appears at the top of a processing loop that cycles through the set of candidate metrics, determining a ranking score for each, from which the dominant, primary, or principal reliability metric is determined. At block 3312, a metric of the candidate metrics is identified and established as the current metric for an iteration of processing. At block 3314 a ranking factor score is determined for the current metric. The process for producing a value for the ranking factor score is constructed in an embodiment to process data, such as measurement data of 3240 as may be related to the current entity and the current metric, to result in some meaningful measure, indicator, or predictor of entity reliability; either good or bad, reliable or unreliable. The illustrative embodiment now discussed uses a single factor analysis to determine a ranking factor score for each metric. An embodiment may use a multiple factor analysis, or some other arrangement, to determine the ranking factor score for each metric. An embodiment employing a single factor analysis may contribute to the speed and resource efficiency of the reliability scoring process that subsumes it, particularly because a ranking factor score may be calculated in an embodiment for each of the candidate metrics, and the candidate metric pool may be quite large. The presently described illustrative embodiment uses an anomalous behavior measurement as its single analysis factor, attributing weight to the supposition that anomalous behavior evidences or portends unreliable behavior. Such embodiments may vary as to methods, mechanisms, and subject data used to identify a measure of anomalous behavior. For example, one embodiment may implement a trending type of anomaly detection. For example, one embodiment may implement a coherent type of anomaly detection. For example, one embodiment may implement a cohesive type of anomaly detection. These and other embodiments are possible, including embodiments using ranking factors that are not based on anomaly detection. Other factors may be better indicators of reliability.

The ranking factor score determination of block 3314 may utilize one or more factor determination processes from a set or collection of available factor determinations as represented by factor library 3330 of FIG. 33. An embodiment implementing a factor library such as illustrated by 3330 may implement a fixed library with all of its available factors predetermined. An embodiment implementing a factor library may implement an extensible library with a collection of factors that is manageable to add, change, and remove factors available in the library. Trending anomaly detection, coherent anomaly detection, and cohesive anomaly detection are examples of the three factor determination processes that may be made available in an embodiment by a factor library. A factor library, in an embodiment, may logically provide a common or centralized location and/or mechanism for accessing its resident factor determination processes. Inventive aspects may be practiced apart from the use of the factor library.

The ranking factor score determined at block 3314 for the current metric is stored as Ranked Metrics data 3332. Ranked Metrics data 3332 may reside in a volatile or temporary form of storage for its immediate use by the processing of implementation 3300. In one embodiment, Ranked Metrics data 3332 may be designated for a more persistent form of storage perhaps for use beyond the processing of implementation 3300; for example, perhaps for incorporation into Entity Reliability Score information such as 3252 (FIG. 32) of Entity Reliability Scores instance 3250 of Entity Reliability Scores data 3244. The ranking factor scores of Ranked Metrics data 3332 may be collated into a sorted order as each new ranking factor score is added, or once after the last ranking factor score is added. In one embodiment, the ranking factor scores for Ranked Metrics data 3332 are sorted such that the score indicating the greatest unreliability appears first. Other embodiments are possible.

At block 3316, determination is made whether there is another candidate metric for which a ranking factor score must be determined. If so, processing returns to the top of the loop at block 3312 where a subsequent metric is identified and established as the current metric. If not, processing proceeds to block 3318. At block 3318, a dominant or principal reliability metric is identified using the Ranked Metrics data 3332 produced by earlier processing. In one embodiment, the principal reliability metric is identified as the metric ranked as having the ranking factor score most indicative of unreliability. In one embodiment, the principal reliability metric is identified as the metric ranked as having the ranking factor score most indicative of reliability. In one embodiment, the principal reliability metric is identified in some other fashion.

At block 3320, companion metrics to the principal reliability metric are identified. The companion metrics become the secondary reliability metrics of the reliability metrics subset. In one embodiment, a selection of metrics adjacent to the principal reliability metric in the Ranked Metrics list of 3332 are identified as the secondary reliability metrics. In one embodiment, companion metrics are identified by looking for metrics having some other relationship to the principal reliability metric. In one such embodiment, the secondary reliability metrics are identified by determining some number of other metrics having measurement data most closely covariant with the measurement data of the principal reliability metric. In one embodiment, the secondary reliability metrics may be limited in number, such as by a target number that expresses a required or maximum number of secondary reliability metrics. In one embodiment, the secondary reliability metrics may be limited in proximity, i.e., the closeness of their relationship to the primary reliability metric. In one embodiment, the secondary reliability metrics may be limited to those metrics having at least a certain proximity to the principal reliability metric and may be limited to no more than a maximum number of secondary reliability metrics. These and other embodiments are possible.

At block 3322, the combination of the identified principal reliability metric and the identified secondary reliability metrics are recorded or reflected as the current reliability metric subset. In one embodiment, the identified current reliability metric subset is recorded as Other data 3242 of data resources 3230 for future use; for example, perhaps for incorporation as the value of Reliability Metrics field 3256 (FIG. 32) of entity reliability scores instance 3250 of Entity Reliability Scores data 3244. At block 3324 the processing of implementation 3300 is complete and the control flow of processing may return to a process that invoked it.

Figure 34:
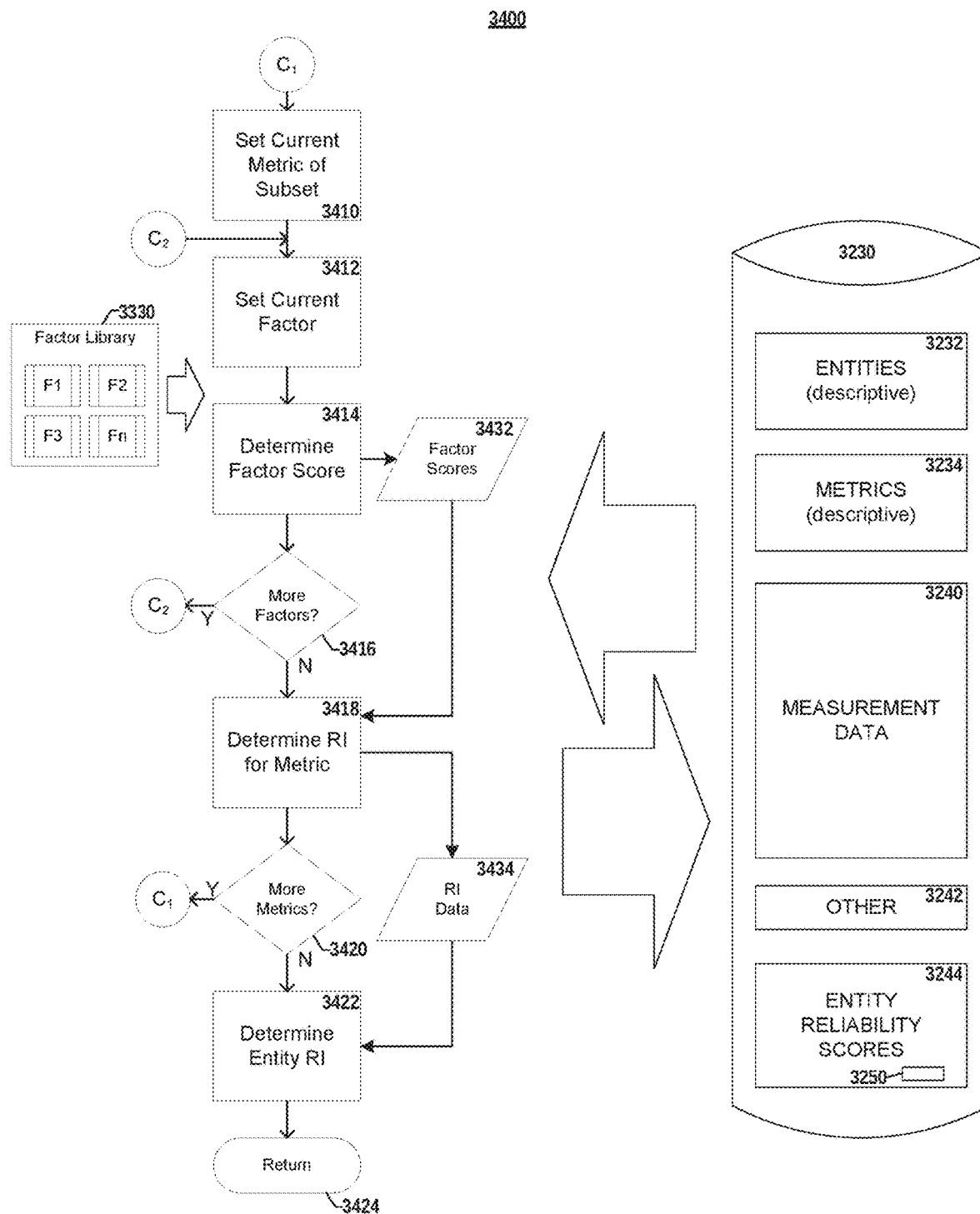
FIG. 34 is a flow diagram of an example deployment method that illustrates the relationship between the lower-tier entity-level monitoring component and the higher-tier system-level monitoring component, in accordance with example embodiments.

FIG. 34 is a block diagram of a processing implementation to determine an entity reliability index (RI) using an identified set of reliability metrics. Processing implementation 3400 of FIG. 34 depicts processing as may be utilized in one embodiment to effect the processing discussed in relation to block 3218 of FIG. 32; and the data resources 3230 of FIG. 32 are repeated here as the data resources 3230 of FIG. 34. The processing of implementation 3400 is entered with an identification of reliability metrics for use in determining a reliability index for an entity. Through its processing implementation 3400 determines the desired entity RI.

Block 3410 appears at the top of a processing loop that cycles through the set of reliability metrics, determining a reliability score/index for each. At block 3410, a first metric of the reliability metric subset is identified and established as the subject metric of the current iteration of processing. Processing may then proceed to block 3412.

Block 3412 appears at the top of a processing loop that cycles through some number of factor value determinations that are used to produce the reliability score/index for the metric. At block 3412 a particular factor is identified and established as the factor to be determined for the current iteration. In one embodiment, establishing the current factor may involve somehow selecting, activating, or identifying processing in factor library 3330 to be used to determine a value for the current factor.

At block 3414, factor determination processing is performed to determine a score for the current factor for the current metric. Such processing, in one embodiment, may utilize a selection of the factor processing available in factor library 3330. Determination of any single factor can be as simple or complex is desired. The factor score determined at block 3414 is reflected in the Factor Scores data 3432. In one embodiment, Factor Scores data 3432 is retained beyond the processing of implementation 3400 and may be utilized later, for example, perhaps for incorporation as the value of Other data 3259 (FIG. 32) of entity reliability scores instance 3250 of Entity Reliability Scores data 3244.

In one embodiment, determining a factor score includes applying a certain analysis process over measurement data of Measurement Data 3240. Measurement data may be restricted to a particular timeframe or time window. In one embodiment, the timeframe is delimited by the current time and a fixed backward offset from the current time. In one embodiment, the timeframe is delimited by a fixed backward offset and a time associated with a particular event, such as an activation or click of the time or referenced in Block 3210 of FIG. 32. In one embodiment, the timeframe is delimited based on interval parameter information associated with the current metric in Metrics data 3234. These and other embodiments are possible. Measurement data used in factor determination processing may be limited to measurement data strictly associated with the current entity and/or the current metric. In one embodiment measurement data used by factor determination processing may include measurement data associated with multiple entities and/or metrics. These and other embodiments are possible. In one embodiment, determination processing for a factor may utilize measurement data in combination with non-measurement data to produce the factor score. These and other embodiments are possible.

At block 3416, a determination is made whether any additional factor remains for which a score must be determined for the current metric. If so, processing returns to block 3412 where a subsequent factor is identified and established as the current factor for the subsequent iteration. If not, processing proceeds to block 3418.

At block 3418, a reliability score/index may be determined from Factor Scores 3432. Transformation of the Factor Scores 3432 into a reliability index for the metric can be as simple or complex is desired. Embodiments may use, for example, a simple average, weighted-average, summing, or some other process to combine the Factor Scores 3432 into a single value for the metric reliability score/index. The processing described here in relation to block 3418 may essentially be subsumed by the processing of block 3414 in an embodiment where a single factor is used to determine a reliability score for each of the individual metrics. Such adaptation is readily within the skill of one in the art. Reliability scores for metrics determined at block 3418 are stored as RI Data 3434. RI Data 3434 may be stored or reflected in a temporary or volatile storage mechanism for use in immediate processing. In one embodiment, RI Data 3434 may be stored more persistently, perhaps for integration into Reliability Metrics field information 3256 (FIG. 32) of entity reliability scores instance 3250 of Entity Reliability Scores data 3244. These and other embodiments are possible.

At block 3420, a determination is made whether any reliability metric remains for which a reliability score/index must be determined. If so, processing returns to block 3410 where a next metric is identified and established as the current metric for a subsequent iteration of processing. If not, processing proceeds to block 3422.

At block 3422, the reliability index is determined for the entity. Determination of the reliability index for the entity in one embodiment may be based at least in part on some combination of reliability scores for the reliability metrics reflected in RI Data 3434. In one embodiment, the reliability scores of RI Data 3434 are combined using a simple average to determine the reliability index for the entity. In one embodiment, the reliability scores of RI Data 3434 are combined using a weighted average to determine the reliability index for the entity. In one embodiment, the reliability scores of RI Data 3434 are combined by summing to determine the reliability index for the entity. In one embodiment, more complex processing is used to derive an entity RI from the reliability scores of RI Data 3434. These and other embodiments are possible.

At block 3424, the processing flow of the computing machine may return to the point from which implementation 3400 was entered.

Figure 35:
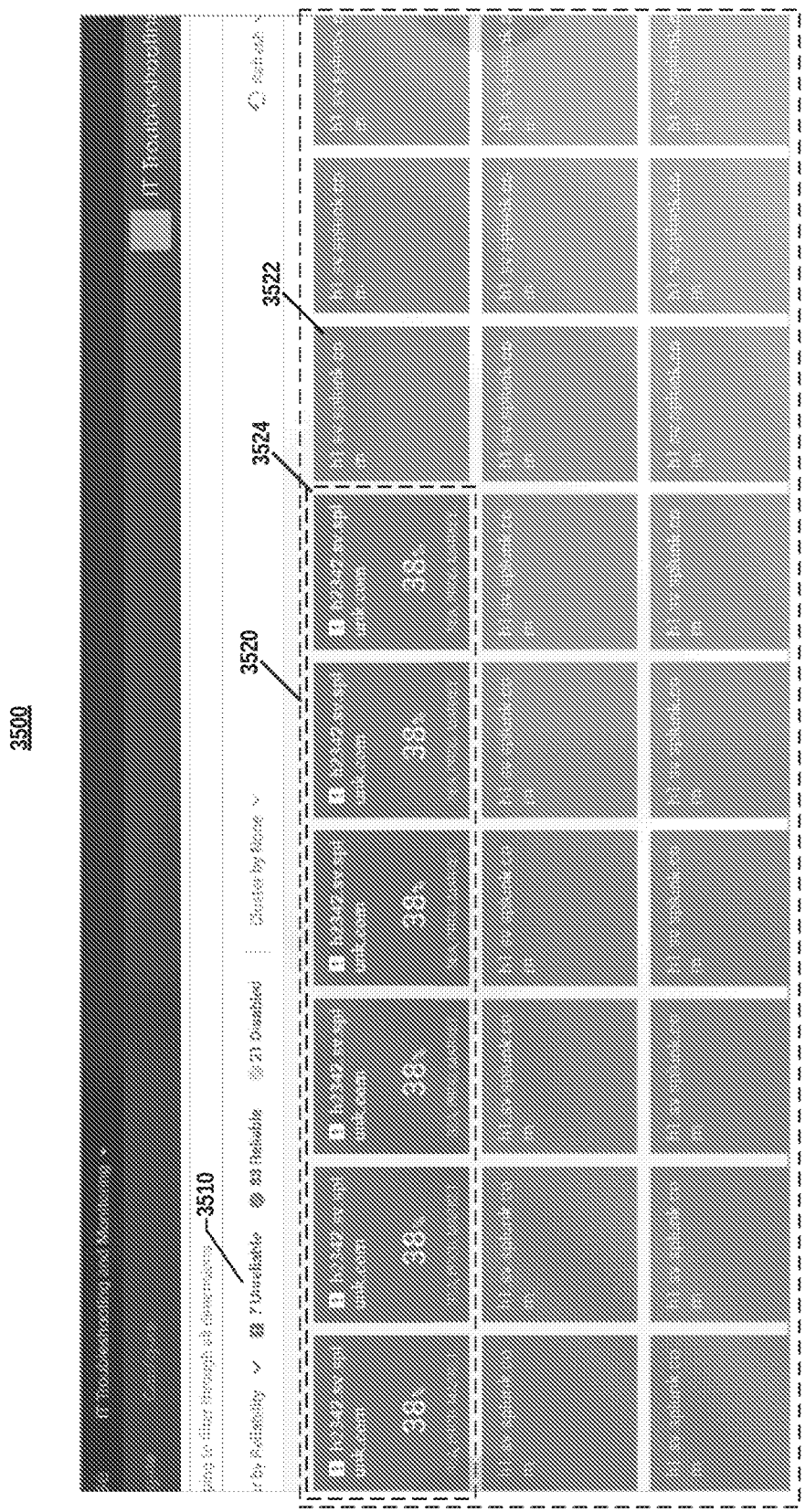
FIG. 35 is an interface diagram of an example user interface of entity reliability indices, in accordance with example embodiments.

Embodiments may vary greatly in the manner of employing the entity reliability indexes as may be produced by processing as exemplified by the illustrative embodiments depicted in FIGS. 32-34. FIG. 35 depicts a portion of a screen as may be presented in a graphical user interface (GUI) display caused by operation of an entity monitoring system. GUI display portion 3500 of FIG. 35 illustrates an example of a manifested use of transmitted or stored entity reliability indexes to prioritize or direct downstream processing in a computing machine, such as a computing machine or system constructed and configured to implement an entity monitoring system. The illustrative example of GUI display portion 3500 is shown to prominently include a tile region 3520 where an individual tile such as 3522 corresponds to a particular entity and presents information related thereto. The entity monitoring system (EMS) causing the display of 3500 performs certain processing conditioned on RI information it receives or assesses, as produced and described in connection with FIGS. 32-34. The conditional processing manifests itself as the distinctive color (red) of the tiles of area 3524 versus the other (green) tiles of 3520; the color having been determined for each tile by the EMS processing based on the RI of the entity represented by a respective tile. The conditional processing further manifests itself in status information as can be seen in "Unreliable" entity count 3510, "7 Unreliable."

6.0. SERVICE MONITORING SYSTEM

Further to the discussion in section 2.16 IT SERVICE MONITORING of this description, the subsequent disclosure of FIGS. 36-61 is generally directed to monitoring performance of a system at a service level using key performance indicators derived from machine data. Implementations of the present disclosure provide users with insight to the performance of monitored services, such as, services pertaining to an information technology (IT) environment. For example, one or more users may wish to monitor the performance of a web hosting service, which provides hosted web content to end users via network. The reader is further directed to U.S. patent application Ser. No. 15/713,606, entitled AUTOMATIC ENTITY CONTROL IN A MACHINE DATA DRIVEN SERVICE MONITORING SYSTEM", filed on Sep. 23, 2017, which is hereby incorporated by reference for all valid purposes, and which provides a robust description of a service monitoring system that includes a collection of entity definitions.

A service can be provided by one or more entities. An entity that provides a service can be associated with machine data. As described in greater detail below, the machine data pertaining to a particular entity may use different formats and/or different aliases for the entity.

Implementations of the present disclosure are described for normalizing the different aliases and/or formats of machine data pertaining to the same entity. In particular, an entity definition can be created for a respective entity. The entity definition can normalize various machine data pertaining to a particular entity, thus simplifying the use of heterogeneous machine data for monitoring a service.

Implementations of the present disclosure are described for specifying which entities, and thus, which heterogeneous machine data, to use for monitoring a service. In one implementation, a service definition is created for a service that is to be monitored. The service definition specifies one or more entity definitions, where each entity definition corresponds to a respective entity providing the service. The service definition provides users with flexibility in associating entities with services. The service definition further provides users with the ability to define relationships between entities and services at the machine data level. Implementations of the present disclosure enable end-users to monitor services from a top-down perspective and can provide rich visualization to troubleshoot any service-related issues. Implementations of the present disclosure enable end-users to understand an environment (e.g., IT environment) and the services in the environment. For example, end-users can understand and monitor services at a business service level, application tier level, etc.

Implementations of the present disclosure may perform an automated identification of services, the entities that provide them, and the associations among the discovered entities and services, starting from a corpus of disparate machine data. In one aspect, an implementation automatically performs the processing against the disparate machine data in accordance with discovery parameters to identify the relevant entities and their service associations. In one aspect, entities actually involved in service provision may be identified from a larger set of potential entities, not all of which provide services. In one aspect, the discovered services, entities, and their associations, are reflected in service and entity definition information that controls service monitoring system operation. In one aspect, one or more user interfaces may be implemented to establish discovery parameters, provide previews of results, interject user modifications to automated process results, and report outcomes. Other aspects will become apparent.

Implementations of the present disclosure are described for methods for the automatic creation of entity definitions in a service monitoring system. Machine data by or about an entity machine is received and made available before an entity definition exists for the machine. An identification criteria may be used to identify the entity machine from the machine data as a newly added machine for which an entity definition should be created. Information to populate an entity definition is then harvested from that and other machine data, and the new entity definition is stored. The entity definition is then available for general use and may be automatically associated with a service using an association rule of the service definition. Portions of the method may be performed automatically on a regular basis. Embodiments may perform the method in conjunction with content from a domain add-on that extends the features and capabilities of the service monitoring system with the addition of a form of codified expertise in a particular domain or field, such as load-balancing or high-volume web transaction processing, as particularly applied to related IT service monitoring. The method may be extended, modified, or adapted as necessary to implement automatic modification and/or deletion of entity definitions, the need for which is determined through machine data analysis.

Figure 36:
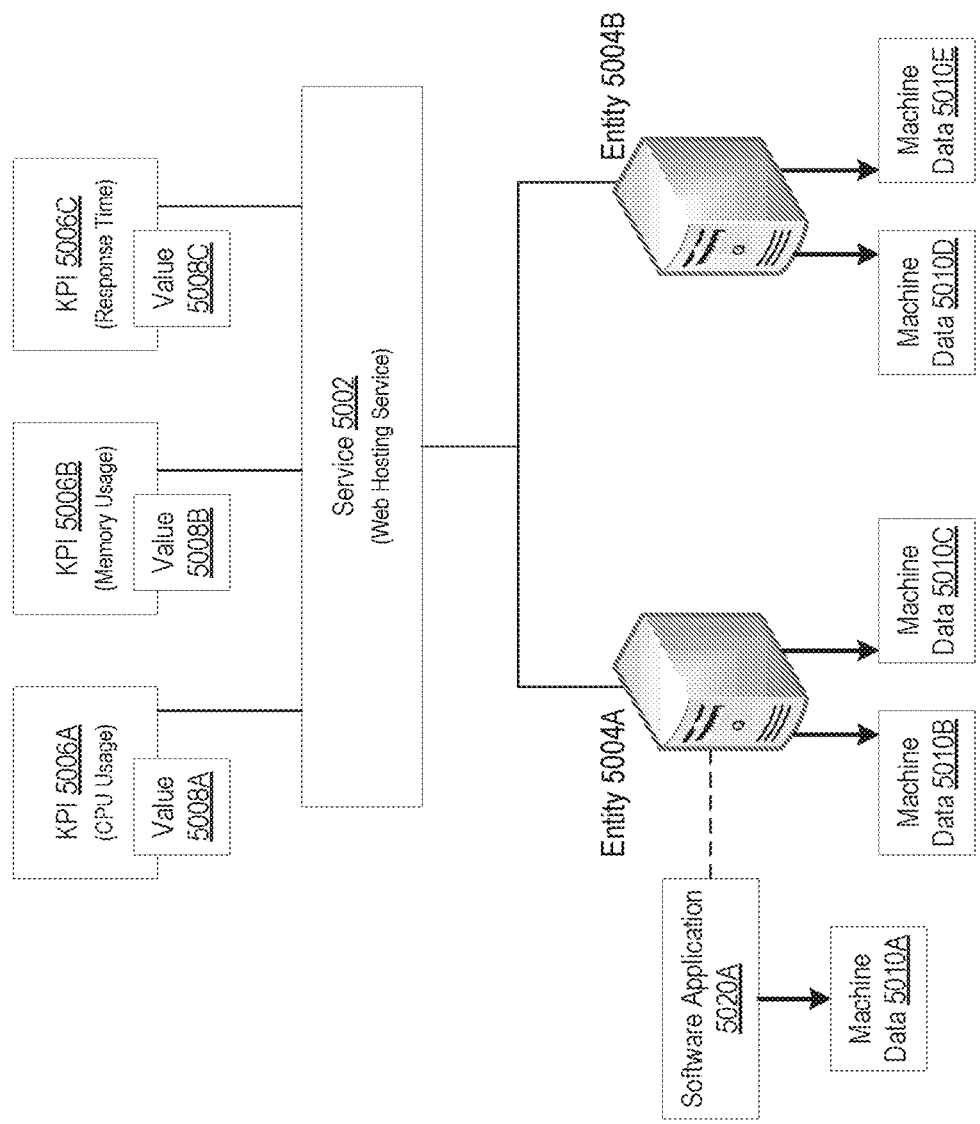
FIG. 36 illustrates a block diagram of an example of entities providing a service, in accordance with one or more implementations of the present disclosure.

FIG. 36 illustrates a block diagram of an example service provided by entities, in accordance with one or more implementations of the present disclosure. One or more entities 5004A, 5004B provide service 5002. An entity 5004A, 5004B can be a component in an IT environment. Examples of an entity can include, and are not limited to a host machine, a virtual machine, a switch, a firewall, a router, a sensor, etc. For example, the service 5002 may be a web hosting service, and the entities 5004A, 5004B may be web servers running on one or more host machines to provide the web hosting service. In another example, an entity could represent a single process on different (physical or virtual) machines. In another example, an entity could represent communication between two different machines.

The service 5002 can be monitored using one or more KPIs 5006 for the service. A KPI is a type of performance measurement. One or more KPIs can be defined for a service. In the illustrated example, three KPIs 5006A-C are defined for service 5002. KPI 5006A may be a measurement of CPU (central processing unit) usage for the service 5002. KPI 5006B may be a measurement of memory usage for the service 5002. KPI 5006C may be a measurement of request response time for the service 5002.

In one implementation, KPI 5006A-C is derived based on machine data pertaining to entities 5004A and 5004B that provide the service 5002 that is associated with the KPI 5006A-C. In another implementation, KPI 5006A-C is derived based on machine data pertaining to entities other than and/or in addition to entities 5004A and 5004B. In another implementation, input (e.g., user input) may be received that defines a custom query, which does not use entity filtering, and is treated as a KPI. Machine data pertaining to a specific entity can be machine data produced by that entity or machine data about that entity, which is produced by another entity. For example, machine data pertaining to entity 5004A can be derived from different sources that may be hosted by entity 5004A and/or some other entity or entities.

A source of machine data can include, for example, a software application, a module, an operating system, a script, an application programming interface, etc. For example, machine data 5010B may be log data that is produced by the operating system of entity 5004A. In another example, machine data 5010C may be produced by a script that is executing on entity 5004A. In yet another example, machine data 5010A may be about an entity 5004A and produced by a software application 5020A that is hosted by another entity to monitor the performance of the entity 5004A through an application programming interface (API).

For example, entity 5004A may be a virtual machine and software application 5020A may be executing outside of the virtual machine (e.g., on a hypervisor or a host operating system) to monitor the performance of the virtual machine via an API. The API can generate network packet data including performance measurements for the virtual machine, such as, memory utilization, CPU usage, etc.

For example, entity 5004A may be a container (an OS-level virtualization), and software application 5020A may be executing outside of the containerized instance to monitor the performance of the container via an API. The API can generate network packet data including performance measurements for the container, such as, memory utilization, CPU usage, etc. Well known examples of containerization ((OS-level virtualization) include Docker by Docker, Inc. (information about which may be found at the domain docker.com), perhaps used in conjunction with a container orchestration facility such as the open source Kubernetes (information about which may be found at the domain kubernetes.io).

Similarly, machine data pertaining to entity 5004B may include, for example, machine data 5010D, such as log data produced by the operating system of entity 5004B, and machine data 5010E, such as network packets including http responses generated by a web server hosted by entity 5004B.

Implementations of the present disclosure provide for an association between an entity (e.g., a physical machine) and machine data pertaining to that entity (e.g., machine data produced by different sources hosted by the entity or machine data about the entity that may be produced by sources hosted by some other entity or entities). The association may be provided via an entity definition that identifies machine data from different sources and links the identified machine data with the actual entity to which the machine data pertains, as will be discussed in more detail below in conjunction with FIG. 38, for example. Entities that are part of a particular service can be further grouped via a service definition that specifies entity definitions of the entities providing the service.

In the illustrated example, an entity definition for entity 5004A can associate machine data 5010A, 5010B and 5010C with entity 5004A, an entity definition for entity 5004B can associate machine data 5010D and 5010E with entity 5004B, and a service definition for service 5002 can group entities 5004A and 5004B together, thereby defining a pool of machine data that can be operated on to produce KPIs 5006A, 5006B and 5006C for the service 5002. In particular, each KPI 5006A, 5006B, 5006C of the service 5002 can be defined by a search query that produces a value 5008A, 5008B, 5008C derived from the machine data 5010A-E. As will be discussed in more detail below, according to one implementation, the machine data 5010A-E is identified in entity definitions of entities 5004A and 5004B, and the entity definitions are specified in a service definition of service 5002 for which values 5008A-C are produced to indicate how the service 5002 is performing at a point in time or during a period of time. For example, KPI 5006A can be defined by a search query that produces value 5008A indicating how the service 5002 is performing with respect to CPU usage. KPI 5006B can be defined by a different search query that produces value 5008B indicating how the service 5002 is performing with respect to memory usage. KPI 5006C can be defined by yet another search query that produces value 5008C indicating how the service 5002 is performing with respect to request response time.

The values 5008A-C for the KPIs can be produced by executing the search query of the respective KPI. In one example, the search query defining a KPI 5006A-C can be executed upon receiving a request (e.g., user request). For example, a service-monitoring dashboard can display KPI widgets providing a numerical or graphical representation of the value 5008 for a respective KPI 5006. A user may request the service-monitoring dashboard to be displayed at a point in time, and the search queries for the KPIs 5006 can be executed in response to the request to produce the value 5008 for the respective KPI 5006. The produced values 5008 can be displayed in the service-monitoring dashboard.

In another example, the search query defining a KPI 5006A-C can be executed in real-time (continuous execution until interrupted). For example, a user may request the service-monitoring dashboard to be displayed, and the search queries for the KPIs 5006 can be executed in response to the request to produce the value 5008 for the respective KPI 5006. The produced values 5008 can be displayed in the service-monitoring dashboard. The search queries for the KPIs 5006 can be continuously executed until interrupted and the values for the search queries can be refreshed in the service-monitoring dashboard with each execution. Examples of interruption can include changing graphical interfaces, stopping execution of a program, etc.

In another example, the search query defining a KPI 5006 can be executed based on a schedule. For example, the search query for a KPI (e.g., KPI 5006A) can be executed at one or more particular times (e.g., 6:00 am, 12:00 pm, 6:00 pm, etc.) and/or based on a period of time (e.g., every 5 minutes). In one example, the values (e.g., values 108A) produced by a search query for a KPI (e.g., KPI 5006A) by executing the search query on a schedule are stored in a data store, and are used to calculate an aggregate KPI score for a service (e.g., service 5002). An aggregate KPI score for the service 5002 is indicative of an overall performance of the KPIs 5006 of the service.

In one implementation, the machine data (e.g., machine data 5010A-E) used by a search query defining a KPI (e.g., KPI 5006A) to produce a value can be based on a time range. The time range can be a user-defined time range or a default time range. For example, in the service-monitoring dashboard example above, a user can select, via the service-monitoring dashboard, a time range to use to further specify, for example, based on time-stamps, which machine data should be used by a search query defining a KPI. For example, the time range can be defined as "Last 15 minutes," which would represent an aggregation period for producing the value. In other words, if the query is executed periodically (e.g., every 5 minutes), the value resulting from each execution can be based on the last 15 minutes on a rolling basis, and the value resulting from each execution can be, for example, the maximum value during a corresponding 15-minute time range, the minimum value during the corresponding 15-minute time range, an average value for the corresponding 15-minute time range, etc.

In another implementation, the time range is a selected (e.g., user-selected) point in time and the definition of an individual KPI can specify the aggregation period for the respective KPI. By including the aggregation period for an individual KPI as part of the definition of the respective KPI, multiple KPIs can run on different aggregation periods, which can more accurately represent certain types of aggregations, such as, distinct counts and sums, improving the utility of defined thresholds. In this manner, the value of each KPI can be displayed at a given point in time. In one example, a user may also select "real time" as the point in time to produce the most up to date value for each KPI using its respective individually defined aggregation period.

An event-processing system can process a search query that defines a KPI of a service. An event-processing system can aggregate heterogeneous machine-generated data (machine data) received from various sources (e.g., servers, databases, applications, networks, etc.) and optionally provide filtering such that data is only represented where it pertains to the entities providing the service. In one example, a KPI may be defined by a user-defined custom query that does not use entity filtering. The aggregated machine data can be processed and represented as events. An event can be represented by a data structure that is associated with a certain point in time and comprises a portion of raw machine data (i.e., machine data). The event-processing system can be configured to perform real-time indexing of the machine data and to execute real-time, scheduled, or historic searches on the source data.

6.1. Service Monitoring System Example

Figure 37:
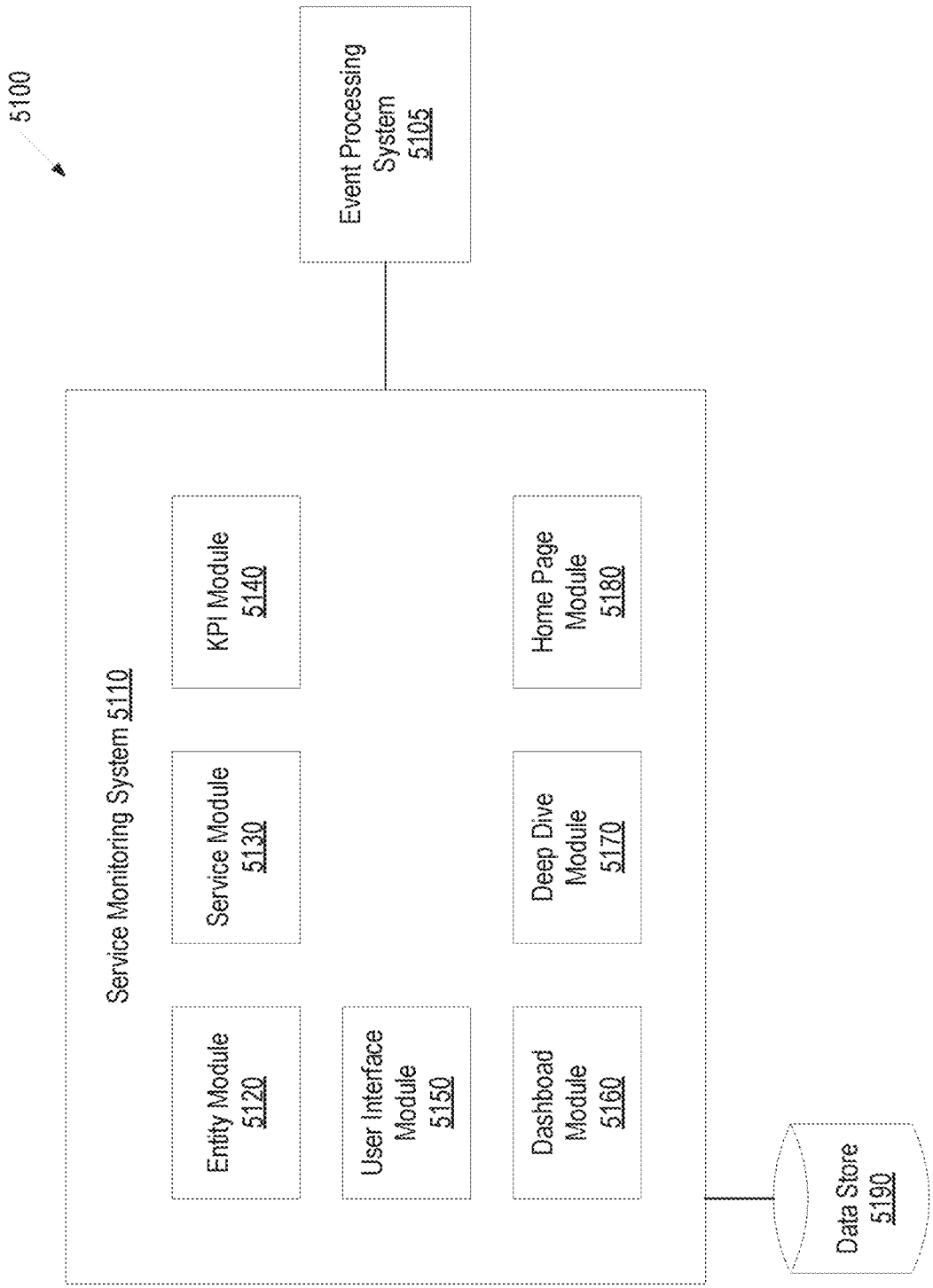
FIG. 37 is a block diagram of one implementation of a service monitoring system, in accordance with one or more implementations of the present disclosure.

FIG. 37 is a block diagram 5100 of one implementation of a service monitoring system 5110 for monitoring performance of one or more services using key performance indicators derived from machine data, in accordance with one or more implementations of the present disclosure. The service monitoring system 5110 can be hosted by one or more computing machines and can include components for monitoring performance of one or more services. The components can include, for example, an entity module 5120, a service module 5130, a key performance indicator module 5140, a user interface (UI) module 5150, a dashboard module 5160, a deep dive module 5170, and a home page module 5180. The components can be combined together or separated in further components, according to a particular embodiment. The components and/or combinations of components can be hosted on a single computing machine and/or multiple computing machines. The components and/or combinations of components can be hosted on one or more client computing machines and/or server computing machines.

Figure 38:
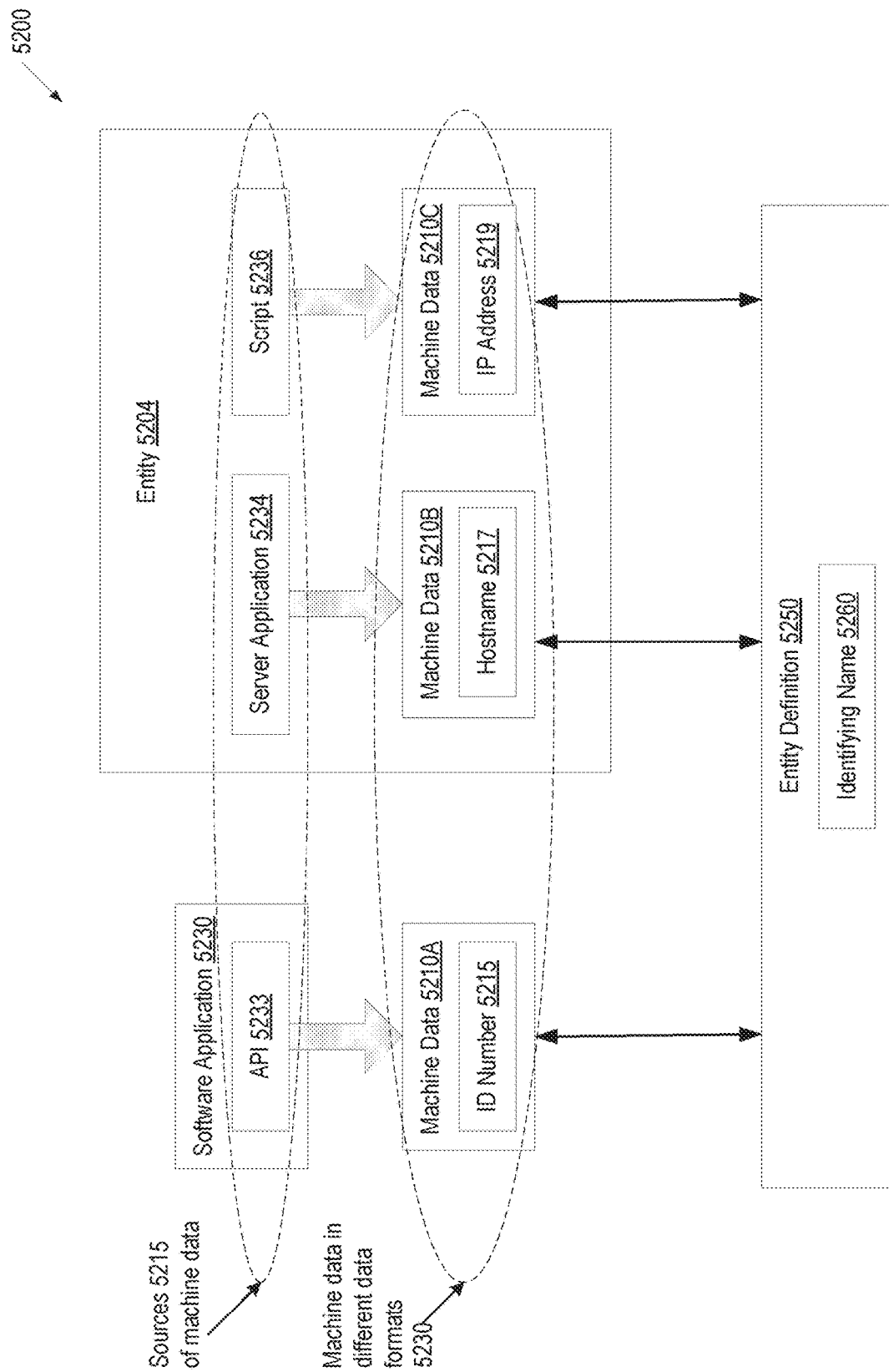
FIG. 38 is a block diagram illustrating an entity definition for an entity, in accordance with one or more implementations of the present disclosure.

The entity module 5120 can create entity definitions. "Create" hereinafter includes "edit" throughout this document. An entity definition is a data structure that associates an entity (e.g., entity 5004A in FIG. 36) with machine data (e.g., machine data 5010A-C in FIG. 36). The entity module 5120 can determine associations between machine data and entities, and can create an entity definition that associates an individual entity with machine data produced by different sources hosted by that entity and/or other entity(ies). In one implementation, the entity module 5120 automatically identifies the entities in an environment (e.g., IT environment), automatically determines, for each entity, which machine data is associated with that particular entity, and automatically generates an entity definition for each entity. In another implementation, the entity module 5120 receives input (e.g., user input) for creating an entity FIG. 38 is a block diagram 5200 illustrating an entity definition for an entity, in accordance with one or more implementations of the present disclosure. The entity module 5120 can create entity definition 5250 that associates an entity 5204 with machine data (e.g., machine data 5210A, machine data 5210B, machine data 5210C) pertaining to that entity 5204. Machine data that pertains to a particular entity can be produced by different sources 5215 and may be produced in different data formats 5230. For example, the entity 5204 may be a host machine that is executing a server application 5234 that produces machine data 5210B (e.g., log data). The entity 5204 may also host a script 5236, which when executed, produces machine data 5210C. A software application 5230, which is hosted by a different entity (not shown), can monitor the entity 5204 and use an API 5233 to produce machine data 5210A about the entity 5204.

Each of the machine data 5210A-C can include an alias that references the entity 5204. At least some of the aliases for the particular entity 5204 may be different from each other. For example, the alias for entity 5204 in machine data 5210A may be an identifier (ID) number 5215, the alias for entity 5204 in machine data 5210B may be a hostname 5217, and the alias for entity 5204 in machine data 5210C may be an IP (internet protocol) address 5219.

The entity module 5120 can receive input for an identifying name 5260 for the entity 5204 and can include the identifying name 5260 in the entity definition 5250. The identifying name 5260 can be defined from input (e.g., user input). For example, the entity 5204 may be a web server and the entity module 5120 may receive input specifying webserver01.splunk.com as the identifying name 5260. The identifying name 5260 can be used to normalize the different aliases of the entity 5204 from the machine data 5210A-C to a single identifier.

Figure 39:
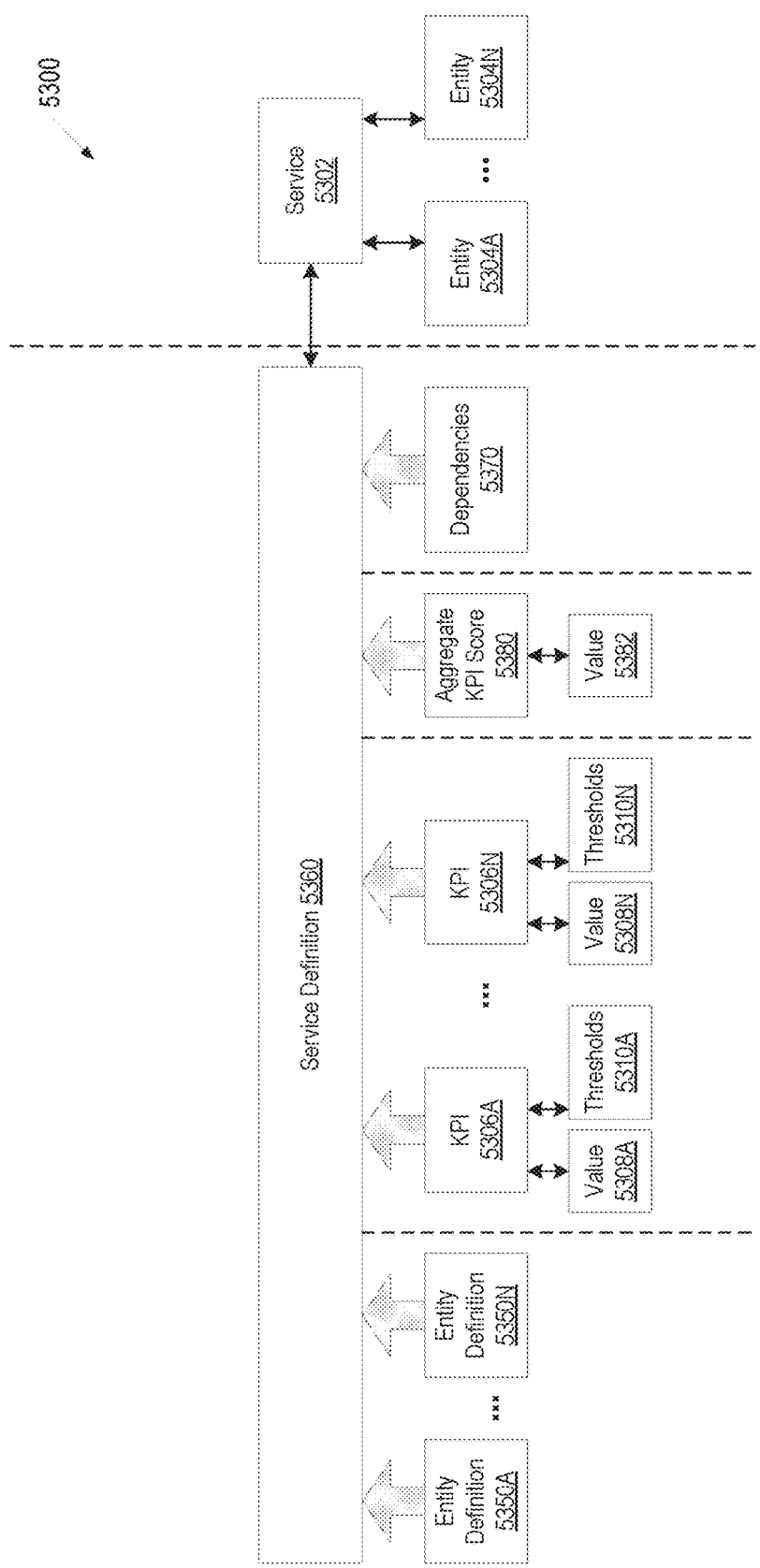
FIG. 39 is a block diagram illustrating a service definition that relates one or more entities with a service, in accordance with one or more implementations of the present disclosure.

A KPI, for example, for monitoring CPU usage for a service provided by the entity 5204, can be defined by a search query directed to search machine data 5210A-C based a service definition, which is described in greater detail below in conjunction with FIG. 39, associating the entity definition 5250 with the KPI, the entity definition 5250 associating the entity 5204 with the identifying name 5260, and associating the identifying name 5260 (e.g., webserver01.splunk.com) with the various aliases (e.g., ID number 5215, hostname 5217, and IP address 5219).

Referring to FIG. 37, the service module 5130 can create service definitions for services. A service definition is a data structure that associates one or more entities with a service. The service module 5130 can receive input (e.g., user input) of a title and/or description for a service definition. FIG. 39 is a block diagram illustrating a service definition that associates one or more entities with a service, in accordance with one or more implementations of the present disclosure. In another implementation, a service definition specifies one or more other services which a service depends upon and does not associate any entities with the service. In another implementation, a service definition specifies a service as a collection of one or more other services and one or more entities.

In one example, a service 5302 is provided by one or more entities 5304A-N. For example, entities 5304A-N may be web servers that provide the service 5302 (e.g., web hosting service). In another example, a service 5302 may be a database service that provides database data to other services (e.g., analytical services). The entities 5304A-N, which provides the database service, may be database servers.

The service module 5130 can include an entity definition 5350A-5350N, for a corresponding entity 5304A-N that provides the service 5302, in the service definition 5360 for the service 5302. The service module 5130 can receive input (e.g., user input) identifying one or more entity definitions to include in a service definition.

The service module 5130 can include dependencies 5370 in the service definition 5360. The dependencies 5370 indicate one or more other services for which the service 5302 is dependent upon. For example, another set of entities (e.g., host machines) may define a testing environment that provides a sandbox service for isolating and testing untested programming code changes. In another example, a specific set of entities (e.g., host machines) may define a revision control system that provides a revision control service to a development organization. In yet another example, a set of entities (e.g., switches, firewall systems, and routers) may define a network that provides a networking service. The sandbox service can depend on the revision control service and the networking service. The revision control service can depend on the networking service. If the service 5302 is the sandbox service and the service definition 5360 is for the sandbox service 5302, the dependencies 5370 can include the revision control service and the networking service. The service module 5130 can receive input specifying the other service(s) for which the service 5302 is dependent on and can include the dependencies 5370 between the services in the service definition 5360. In one implementation, the service associated defined by the service definition 5360 may be designated as a dependency for another service, and the service definition 5360 can include information indicating the other services which depend on the service described by the service definition 5360.

Referring to FIG. 37, the KPI module 5140 can create one or more KPIs for a service and include the KPIs in the service definition. For example, in FIG. 39, various aspects (e.g., CPU usage, memory usage, response time, etc.) of the service 5302 can be monitored using respective KPIs. The KPI module 5140 can receive input (e.g., user input) defining a KPI for each aspect of the service 5302 to be monitored and include the KPIs (e.g., KPIs 5306A-5306N) in the service definition 5360 for the service 5302. Each KPI can be defined by a search query that can produce a value. For example, the KPI 5306A can be defined by a search query that produces value 5308A, and the KPI 5306N can be defined by a search query that produces value 5308N.

The KPI module 5140 can receive input specifying the search processing language for the search query defining the KPI. The input can include a search string defining the search query and/or selection of a data model to define the search query. The search query can produce, for a corresponding KPI, value 5308A-N derived from machine data that is identified in the entity definitions 5350A-N that are identified in the service definition 5360.

The KPI module 5140 can receive input to define one or more thresholds for one or more KPIs. For example, the KPI module 5140 can receive input defining one or more thresholds 5310A for KPI 5306A and input defining one or more thresholds 5310N for KPI 5306N. Each threshold defines an end of a range of values representing a certain state for the KPI. Multiple states can be defined for the KPI (e.g., unknown state, trivial state, informational state, normal state, warning state, error state, and critical state), and the current state of the KPI depends on which range the value, which is produced by the search query defining the KPI, falls into. The KPI module 5140 can include the threshold definition(s) in the KPI definitions. The service module 5130 can include the defined KPIs in the service definition for the service.

The KPI module 5140 can calculate an aggregate KPI score 5380 for the service for continuous monitoring of the service. The score 5380 can be a calculated value 5382 for the aggregate of the KPIs for the service to indicate an overall performance of the service. For example, if the service has 10 KPIs and if the values produced by the search queries for 9 of the 10 KPIs indicate that the corresponding KPI is in a normal state, then the value 5382 for an aggregate KPI may indicate that the overall performance of the service is satisfactory.

Referring to FIG. 37, the service monitoring system 5110 can be coupled to one or more data stores 5190. The entity definitions, the service definitions, and the KPI definitions can be stored in the data store(s) 5190 that are coupled to the service monitoring system 5110. The entity definitions, the service definitions, and the KPI definitions can be stored in a data store 5190 in a key-value store, a configuration file, a lookup file, a database, or in metadata fields associated with events representing the machine data. A data store 5190 can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

The user interface (UI) module 5150 can generate graphical interfaces for creating and/or editing entity definitions for entities, creating and/or editing service definitions for services, defining key performance indicators (KPIs) for services, setting thresholds for the KPIs, and defining aggregate KPI scores for services. The graphical interfaces can be user interfaces and/or graphical user interfaces (GUIs).

The UI module 5150 can cause the display of the graphical interfaces and can receive input via the graphical interfaces. The entity module 5120, service module 5130, KPI module 5140, dashboard module 5160, deep dive module 5170, and home page module 5180 can receive input via the graphical interfaces generated by the UI module 5150. The entity module 5120, service module 5130, KPI module 5140, dashboard module 5160, deep dive module 5170, and home page module 5180 can provide data to be displayed in the graphical interfaces to the UI module 5150, and the UI module 5150 can cause the display of the data in the graphical interfaces.

The dashboard module 5160 can create a service-monitoring dashboard. In one implementation, dashboard module 5160 works in connection with UI module 5150 to present a dashboard-creation graphical interface that includes a modifiable dashboard template, an interface containing drawing tools to customize a service-monitoring dashboard to define flow charts, text and connections between different elements on the service-monitoring dashboard, a KPI-selection interface and/or service selection interface, and a configuration interface for creating service-monitoring dashboard. The service-monitoring dashboard displays one or more KPI widgets. Each KPI widget can provide a numerical or graphical representation of one or more values for a corresponding KPI indicating how an aspect of a service is performing at one or more points in time. Dashboard module 5160 can work in connection with UI module 5150 to define the service-monitoring dashboard in response to user input, and to cause display of the service-monitoring dashboard including the one or more KPI widgets. The input can be used to customize the service-monitoring dashboard. The input can include for example, selection of one or more images for the service-monitoring dashboard (e.g., a background image for the service-monitoring dashboard, an image to represent an entity and/or service), creation and representation of adhoc search in the form of KPI widgets, selection of one or more KPIs to represent in the service-monitoring dashboard, selection of a KPI widget for each selected KPI. The input can be stored in the one or more data stores 5190 that are coupled to the dashboard module 5160. In other implementations, some other software or hardware module may perform the actions associated with generating and displaying the service-monitoring dashboard, although the general functionality and features of the service-monitoring dashboard should remain as described herein.

In one implementation, deep dive module 5170 works in connection with UI module 5150 to present a wizard for creation and editing of the deep dive visual interface, to generate the deep dive visual interface in response to user input, and to cause display of the deep dive visual interface including the one or more graphical visualizations. The input can be stored in the one or more data stores 5190 that are coupled to the deep dive module 5170. In other implementations, some other software or hardware module may perform the actions associated with generating and displaying the deep dive visual interface, although the general functionality and features of deep dive should remain as described herein.

The home page module 5180 can create a home page graphical interface. The home page graphical interface can include one or more tiles, where each tile represents a service-related alarm, service-monitoring dashboard, a deep dive visual interface, or the value of a particular KPI. In one implementation home page module 5180 works in connection with UI module 5150. The UI module 5150 can cause the display of the home page graphical interface. The home page module 5180 can receive input (e.g., user input) to request a service-monitoring dashboard or a deep dive to be displayed. The input can include for example, selection of a tile representing a service-monitoring dashboard or a deep dive. In other implementations, some other software or hardware module may perform the actions associated with generating and displaying the home page graphical interface, although the general functionality and features of the home page graphical interface should remain as described herein.

Referring to FIG. 37, the service monitoring system 5110 can be coupled to an event processing system 5105 via one or more networks. Event Processing System (EPS) 5105 may be an implementation of a data intake and query system (DIQS), such as DIQS 108 of FIGS. 2, 4, and 8 that emphasizes or exclusively supports event mode data. An embodiment of SMS 5110 may utilize multimode data and may interface with an EPS 5105 that is a multimode DIQS. Discussion of service monitoring system aspects and the processing of event data only, without the mention of data of other modes, is for simplicity of explanation, and one of skill will understand that embodiments practicing inventive aspects are not so limited. The event processing system 5105 can receive a request from the service monitoring system 5110 to process a search query. For example, the dashboard module 5160 may receive input request to display a service-monitoring dashboard with one or more KPI widgets. The dashboard module 5160 can request the event processing system 5105 to process a search query for each KPI represented by a KPI widget in the service-monitoring dashboard.

The one or more networks can include one or more public networks (e.g., the Internet), one or more private networks (e.g., a local area network (LAN) or one or more wide area networks (WAN)), one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof.

6.2. Entity Definitions

Figure 40:
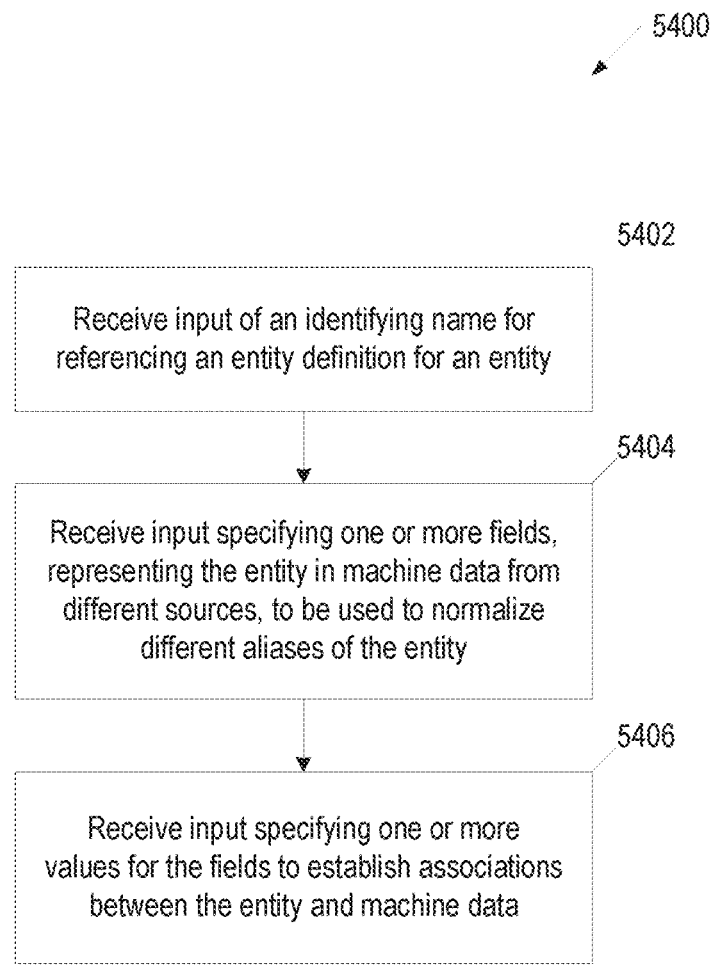
FIG. 40 is a flow diagram of an implementation of a method for creating an entity definition for an entity, in accordance with one or more implementations of the present disclosure.

FIG. 40 is a flow diagram of an implementation of a method 5400 for creating an entity definition for an entity, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, at least a portion of method is performed by a client computing machine. In another implementation, at least a portion of method is performed by a server computing machine.

At block 5402, the computing machine receives input of an identifying name for referencing the entity definition for an entity. The input can be user input. The user input can be received via a graphical interface. Some implementations of creating an entity definition via input received from a graphical interface are discussed in greater detail below. The identifying name can be a unique name.

At block 5404, the computing machine receives input (e.g., user input) specifying one or more search fields ("fields") representing the entity in machine data from different sources, to be used to normalize different aliases of the entity. Machine data can be represented as events. As described above, the computing machine can be coupled to an event processing system (e.g., event processing system 5105 in FIG. 37). The event processing system can process machine data to represent the machine data as events. Each of the events is raw data, and when a late-binding schema is applied to the events, values for fields defined by the schema are extracted from the events. A number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored. Each event has metadata associated with the respective event. Implementations of the event processing system processing the machine data to be represented as events are discussed in greater detail below in conjunction with FIG. 5A, for example.

At block 5406, the computing machine receives input (e.g., user input) specifying one or more search values ("values") for the fields to establish associations between the entity and machine data. The values can be used to search for the events that have matching values for the above fields. The entity can be associated with the machine data that is represented by the events that have fields that store values that match the received input.

The computing machine can optionally also receive input (e.g., user input) specifying a type of entity to which the entity definition applies. The computing machine can optionally also receive input (e.g., user input) associating the entity of the entity definition with one or more services. Some implementations of receiving input for an entity type for an entity definition and associating the entity with one or more services are discussed in greater detail in conjunction with FIG. 41-42, for example.

Figure 41:
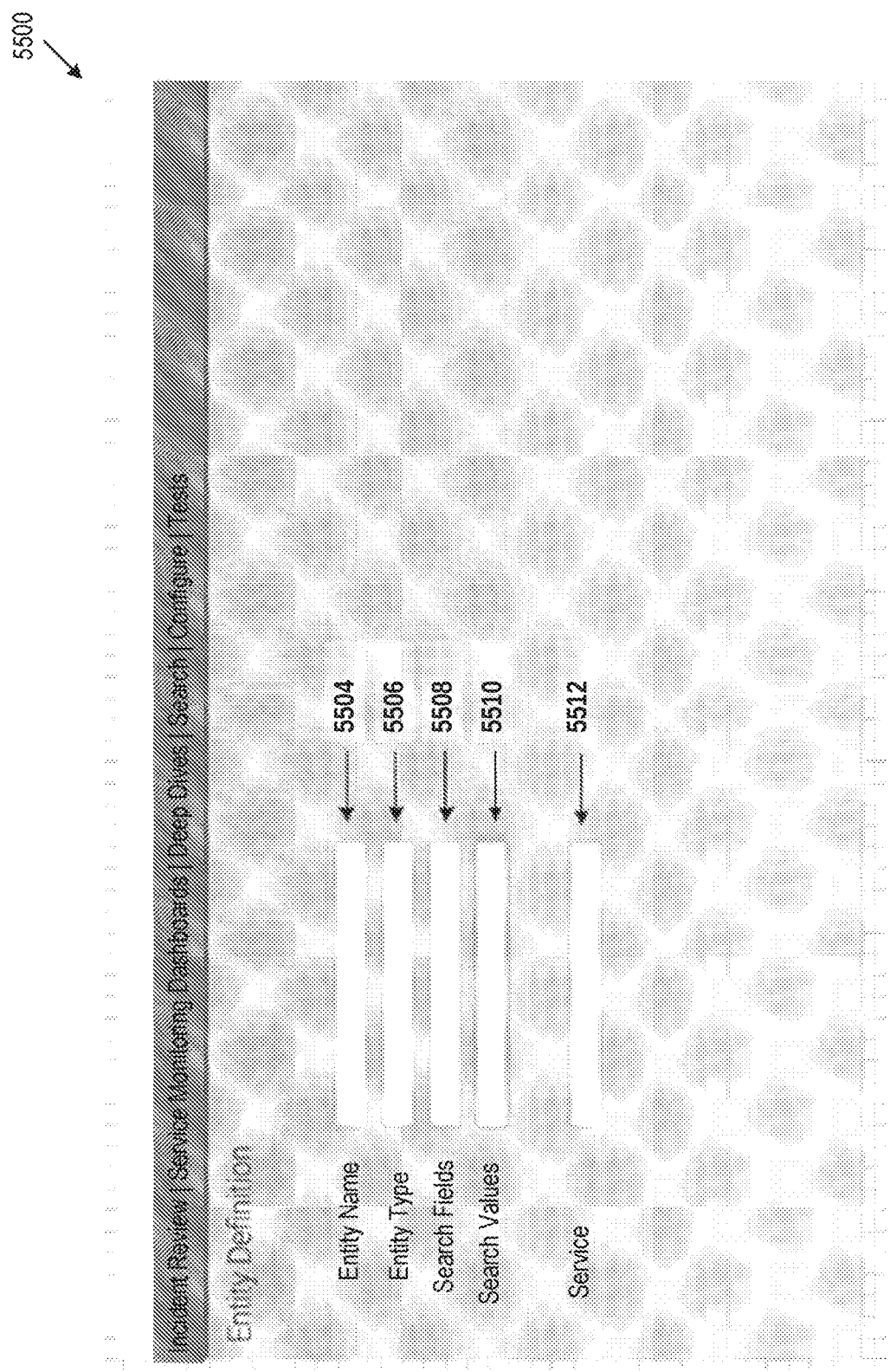
FIG. 41 illustrates an example of a GUI for creating an entity definition, in accordance with one or more implementations of the present disclosure.
Figure 42:
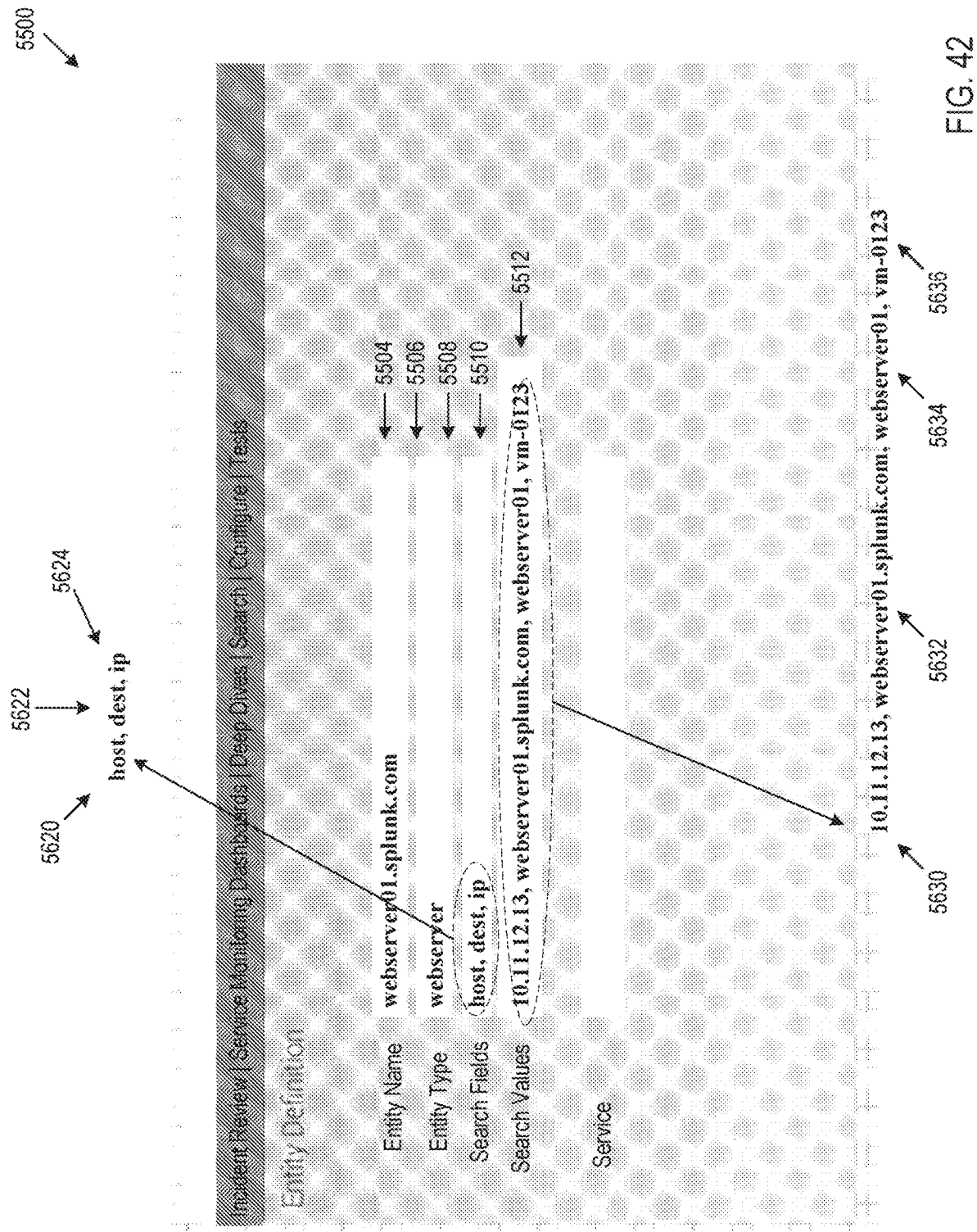
FIG. 42 illustrates an example of input received via GUI for creating an entity definition, in accordance with one or more implementations of the present disclosure.

FIG. 41 illustrates an example of a GUI 5500 of a service monitoring system for creating an entity definition, in accordance with one or more implementations of the present disclosure. GUI 5500 can facilitate user input specifying an identifying name 5504 for the entity, an entity type 5506 for the entity, field(s) 5508 and value(s) 5510 for the fields 5508 to use during the search to find events pertaining to the entity, and any services 5512 that the entity provides. The entity type 5506 can describe the particular entity. For example, the entity may be a host machine that is executing a webserver application that produces machine data. FIG. 42 illustrates an example of input received via GUI 5500 for creating an entity definition, in accordance with one or more implementations of the present disclosure.

For example, the identifying name 5504 is webserver01.splunk.com and the entity type 5506 is web server. Examples of entity type can include, and are not limited to, host machine, virtual machine, type of server (e.g., web server, email server, database server, etc.) switch, firewall, router, sensor, etc. The fields 5508 that are part of the entity definition can be used to normalize the various aliases for the entity. For example, the entity definition specifies three fields 5620,5622,5624 and four values 5510 (e.g., values 5630,5632,5634,5636) to associate the entity with the events that include any of the four values in any of the three fields.

For example, the event processing system (e.g., event processing system 5105 in FIG. 37) can apply a late-binding schema to the events to extract values for fields (e.g., host field, ip field, and dest field) defined by the schema and determine which events have values that are extracted for a host field that includes 10.11.12.13, webserver01.splunk.com, webserver01, or vm-0123, determine which events have values that are extracted for an ip field that includes 10.11.12.13, webserver01.splunk.com, webserver01, or vm-0123, or a dest field that includes 10.11.12.13, webserver01.splunk.com, webserver01, or vm-0123. The machine data that relates to the events that are produced from the search is the machine data that is associated with the entity webserver01.splunk.com.

In another implementation, the entity definition can specify one or more values 5510 to use for a specific field 5508. For example, the value 5630 (10.11.12.13) may be used for extracting values for the ip field and determine which values match the value 5630, and the value 5632 (webserver01.splunk.com) and the value 5636 (vm-0123) may be used for extracting values for the host 5620 field and determining which values match the value 5632 or value 5636.

In another implementation, GUI 5500 includes a list of identifying field/value pairs. A search term that is modeled after these entities can constructed, such that, when a late-binding schema is applied to events, values that match the identifiers associated with the fields defined by the schema will be extracted. For example, if identifier.fields="X,Y" then the entity definition should include input specifying fields labeled "X" and "Y". The entity definition should also include input mapping the fields. For example, the entity definition can include the mapping of the fields as "X":"1","Y":["2","3"]. The event processing system (e.g., event processing system 5105 in FIG. 37) can apply a late-binding schema to the events to extract values for fields (e.g., X and Y) defined by the schema and determine which events have values extracted for an X field that include "1", or which events have values extracted for a Y field that include "2", or which events have values extracted for a Y field that include "3".

GUI 5500 can facilitate user input specifying any services 5512 that the entity provides. The input can specify one or more services that have corresponding service definitions. For example, if there is a service definition for a service named web hosting service that is provided by the entity corresponding to the entity definition, then a user can specify the web hosting service as a service 5512 in the entity definition.

The save button 5516 can be selected to save the entity definition in a data store (e.g., data store 5190 in FIG. 37). The saved entity definition can be edited.

Figure 43:
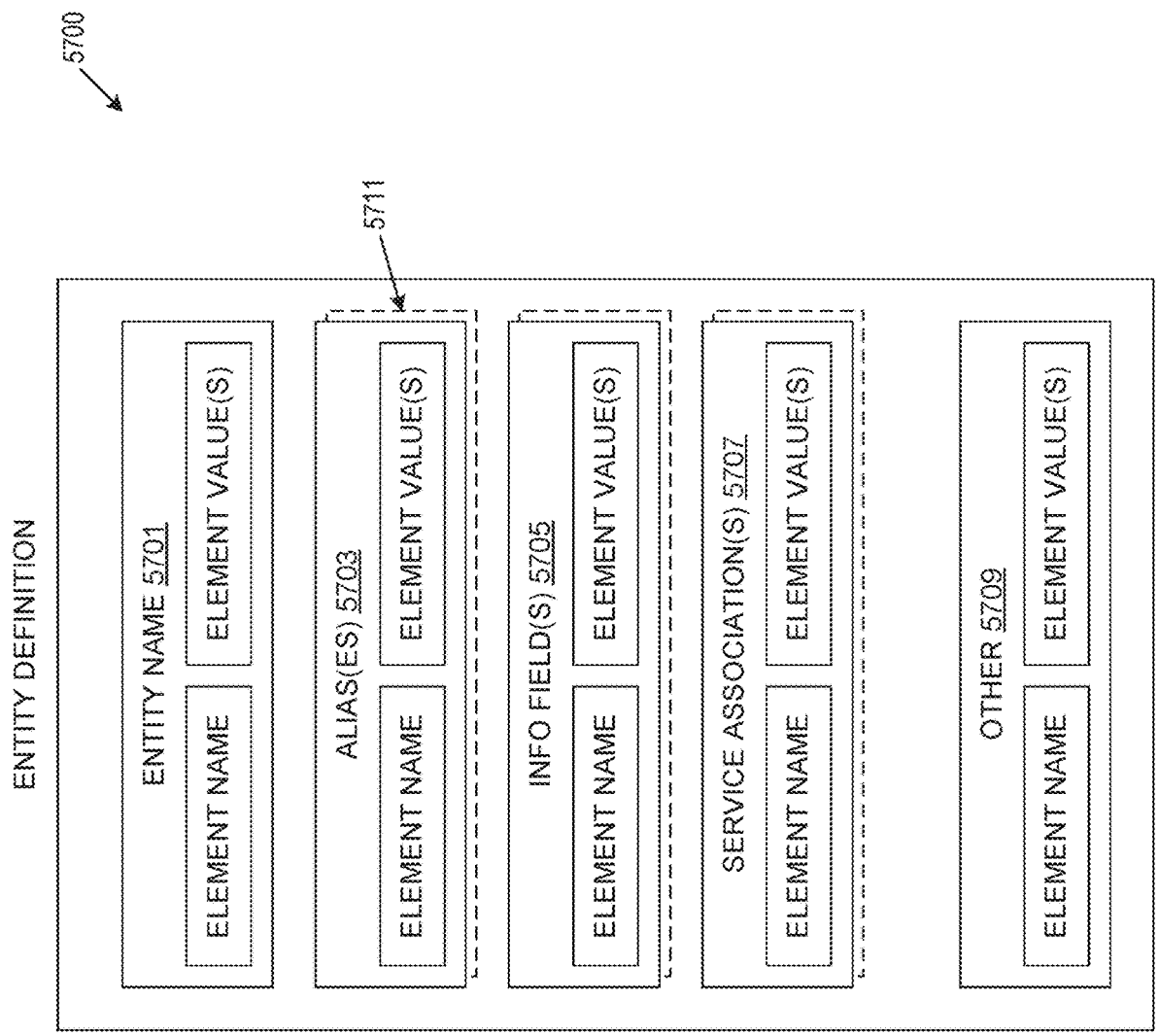
FIG. 43 illustrates an example of the structure of an entity definition, in accordance with one or more implementations of the present disclosure.

FIG. 43 illustrates an example of the structure 5700 for storing an entity definition, in accordance with one or more implementations of the present disclosure. Structure 5700 represents one logical structure or data organization that illustrates associations among various data items and groups to aid in understanding of the subject matter and is not intended to limit the variety of possible logical and physical representations for entity definition information. An entity definition can be stored in an entity definition data store as a record that contains information about one or more characteristics of an entity. Various characteristics of an entity include, for example, a name of the entity, one or more aliases for the entity, one or more informational fields for the entity, one or more services associated with the entity, and other information pertaining to the entity. Informational fields can be associated with an entity. An informational field is a field for storing user-defined metadata for a corresponding entity, which includes information about the entity that may not be reliably present in, or may be absent altogether from, the raw machine data.

The entity definition structure 5700 includes one or more components. Each entity definition component relates to a characteristic of the entity. For example, there is an entity name 5701 component, one or more alias 5703 components, one or more informational (info) field 5705 components, one or more service association 5707 components, and one or more components for other information 5709. The characteristic of the entity being represented by a particular component is the particular entity definition component's type. For example, if a particular component represents an alias characteristic of the entity, the component is an alias-type component.

Each entity definition component stores information for an element. The information can include an element name and one or more element values for the element. In one implementation, the element name-value pair(s) within an entity definition component serves as a field name-field value pair for a search query. The search query can be directed to search machine data. As described above, the computing machine can be coupled to an event processing system (e.g., event processing system 5105 in FIG. 37). Machine data can be represented as events. Each of the events includes raw data. The event processing system can apply a late-binding schema to the events to extract values for fields defined by the schema, and determine which events have values that are extracted for a field. A component in the entity definition includes (a) an element name that can be, in one implementation, a name of a field defined by the schema, and (b) one or more element values that can be, in one implementation, one or more extracted values for the field identified by the element name.

The element names for the entity definition components (e.g., name component 5851, the alias components 5853A-B, and the informational (info) field components 5855A-B)

can be based on user input. In one implementation, the elements names correspond to data items that are imported from a file. In another implementation, the element names correspond to data items that are imported from a search result set, as described in greater detail in conjunction with FIG. 46-47, for example. In one implementation, element names for any additional service information that can be associated with the entities are received via user input.

The elements values for the entity definition components (e.g., name component 5851, the alias components 5853A-B, and the informational field components 5855A-B) can be based on user input. In one implementation, the values correspond to data items that are imported from a file, as described in greater detail below in conjunction with FIG. 45, for example. In another implementation, the values correspond to data items that are imported from a search result set, as described in greater detail below in conjunction with FIG. 46-47, for example.

In one implementation, an entity definition includes one entity component for each entity characteristic represented in the definition. Each entity component may have as many elements as required to adequately express the associated characteristic of the entity. Each element may be represented as a name-value pair (i.e., (element-name)-(element-value)) where the value of that name-value pair may be scalar or compound. Each component is a logical data collection.

In another implementation, an entity definition includes one or more entity components for each entity characteristic represented in the definition. Each entity component has a single element that may be represented as a name-value pair (i.e., (element-name)-(element-value)). The value of that name-value pair may be scalar or compound. The number of entity components of a particular type within the entity definition may be determined by the number needed to adequately express the associated characteristic of the entity. Each component is a logical data collection.

In another implementation, an entity definition includes one or more entity components for each entity characteristic represented in the definition. Each entity component may have one or more elements that may each be represented as a name-value pair (i.e., (element-name)-(element-value)). The value of that name-value pair may be scalar or compound. The number of elements for a particular entity component may be determined by some meaningful grouping factor, such as the day and time of entry into the entity definition. The number of entity components of a particular type within the entity definition may be determined by the number needed to adequately express the associated characteristic of the entity. Each component is a logical data collection. These and other implementations are possible including representations in RDBMS's and the like.

Figure 44:
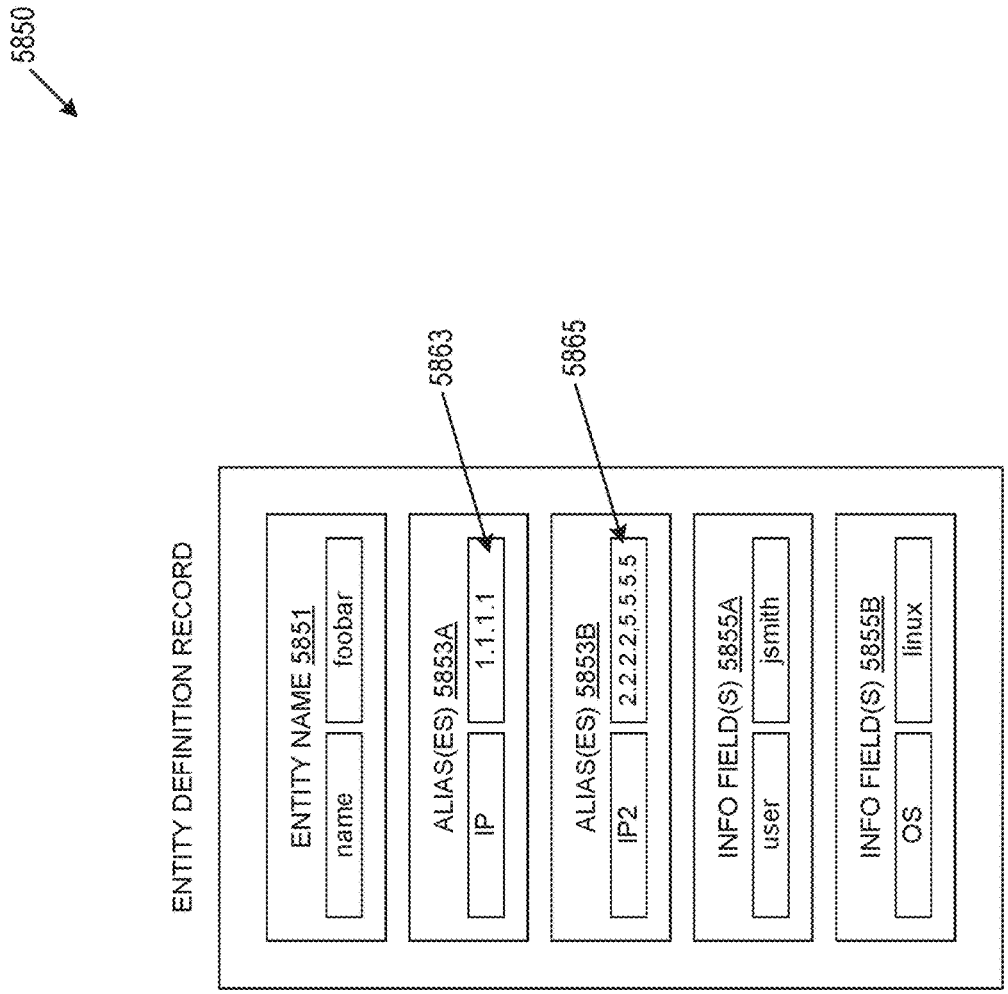
FIG. 44 illustrates an example of an instance of an entity definition record for an entity, in accordance with one or more implementations of the present disclosure.

FIG. 44 illustrates an example of an instance of an entity definition record 5850 for an entity, in accordance with one or more implementations of the present disclosure. An entity definition component (e.g., alias component, informational field component, service association component, other component) can specify all, or only a part, of a characteristic of the entity. For example, in one implementation, an entity definition record includes a single entity name component that contains all of the identifying information (e.g., name, title, and/or identifier) for the entity. The value for the name component type in an entity definition record can be used as the entity identifier for the entity being represented by the record. For example, the entity definition record 5850 includes a single entity name component 5851 that has an element name of "name" and an element value of "foobar".

The value "foobar" becomes the entity identifier for the entity that is being represented by record 5850.

There can be one or multiple components having a particular entity definition component type. For example, the entity definition record 5850 has two components (e.g., informational field component 5855A and informational field component 5855B) having the informational field component type. In another example, the entity definition record 5850 has two components (e.g., alias component 5853A and alias component 5853B) having the alias component type. In one implementation, some combination of a single and multiple components of the same type are used to store information pertaining to a characteristic of an entity.

An entity definition component can store a single value for an element or multiple values for the element. For example, alias component 5853A stores an element name of "IP" and a single element value 5863 of "1.1.1.1". Alias component 5853B stores an element name of "IP2" and multiple element values 5865 of "2.2.2.2" and "5.5.5.5". In one implementation, when an entity definition component stores multiple values for the same element, and when the element name-element value pair is used for a search query, the search query uses the values disjunctively. For example, a search query may search for fields named "IP2" and having either a "2.2.2.2" value or a "5.5.5.5" value.

As described above, the element name—element value pair in an entity definition record can be used as a field-value pair for a search query. Various machine data may be associated with a particular entity, but may use different aliases for identifying the same entity. Record 5850 has an alias component 5853A that stores information for one alias, and has another alias component 5853B that stores another alias element (having two alias element values) for the entity. The alias components 5853A,B of the entity definition can be used to aggregate event data associated with different aliases for the entity represented by the entity definition. The element name—element value pairs for the alias components can be used as field-value pairs to search for the events that have matching values for fields specified by the elements' names. The entity can be associated with the machine data represented by the events having associated fields whose values match the element values in the alias components. For example, a search query may search for events with a "1.1.1.1" value in a field named "IP" and events with either a "2.2.2.2" value or a "5.5.5.5" value in a field named "IP2".

Various implementations may use a variety of data representation and/or organization for the component information in an entity definition record based on such factors as performance, data density, site conventions, and available application infrastructure, for example. The structure (e.g., structure 5700 in FIG. 43) of an entity definition can include rows, entries, or tuples to depict components of an entity definition. An entity definition component can be a normalized, tabular representation for the component, as can be used in an implementation, such as an implementation storing the entity definition within an RDBMS. Different implementations may use different representations for component information; for example, representations that are not normalized and/or not tabular. Different implementations may use various data storage and retrieval frameworks, a JSON-based database as one example, to facilitate storing entity definitions (entity definition records). Further, within an implementation, some information may be implied by, for example, the position within a defined data structure or schema where a value, such as "1.1.1.1" 5863 in FIG. 44, is stored—rather than being stored explicitly. For example, in an implementation having a defined data structure for an entity definition where the first data item is defined to be the value of the name element for the name component of the entity, only the value need be explicitly stored as the entity component and the element name (name) are known from the data structure definition.

Figure 45:
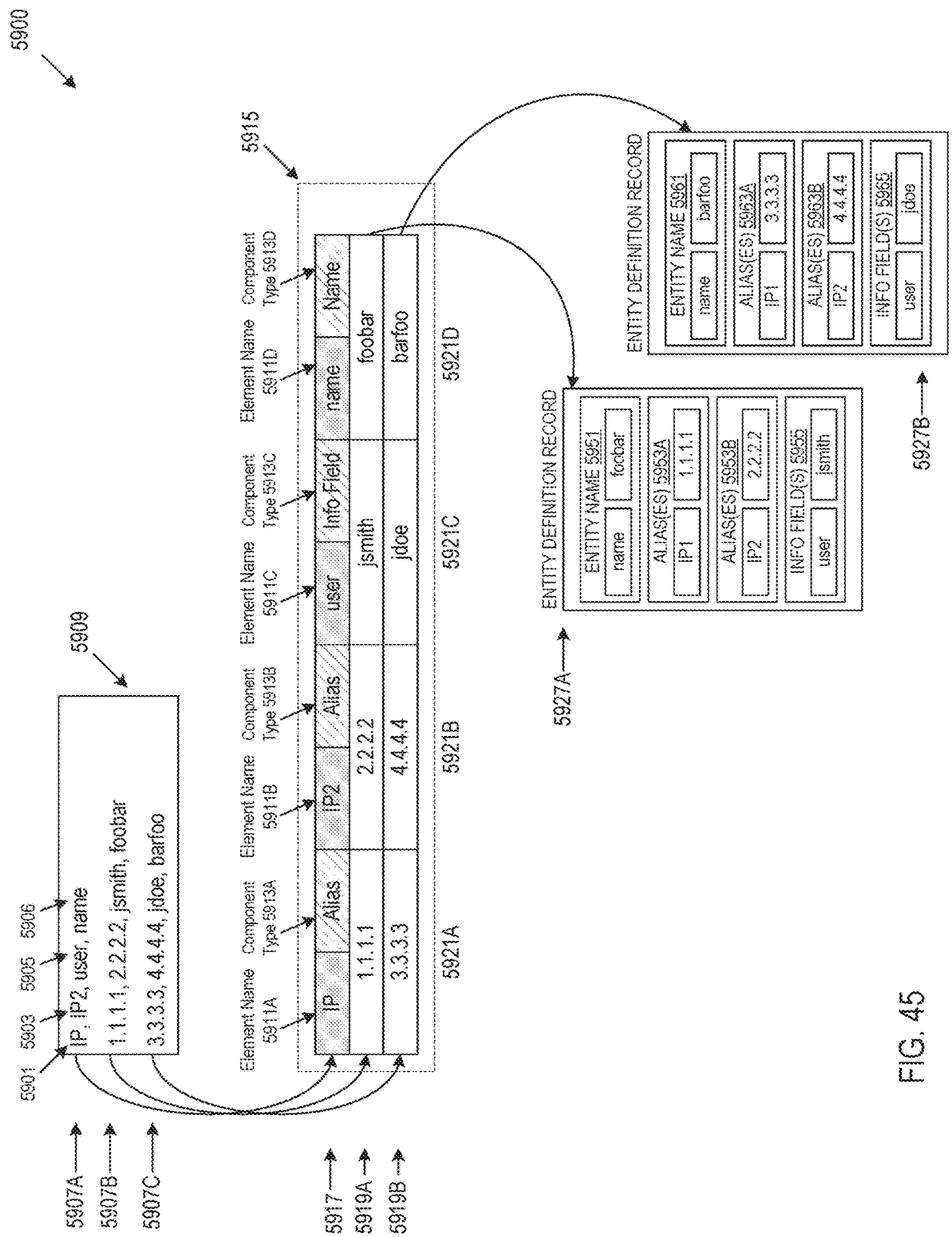
FIG. 45 is a block diagram of an example of creating entity definition(s) using a file, in accordance with one or more implementations of the present disclosure.

FIG. 45 is a block diagram 5900 of an example of creating entity definition(s) using a file, in accordance with one or more implementations of the present disclosure. A file 5909 can be stored in a data store. The file 5909 can have a delimited data format that has one or more sequentially ordered data items (each corresponding to a tabular column) in one or more lines or entries (each corresponding to a tabular row). The file 5909 is a CSV file called "test.csv" and includes multiple entries 5907A-C. Each entry 5907A-C includes one or more data items. A CSV file stores tabular data in plain-text form and consists of any number of entries (e.g., entries 5907A-C).

The rows in the file 5909 can be defined by the delimiters that separate the entries 5907A-C. The entry delimiters can include, for example, line breaks, such as a line feed (not shown) or carriage return (not shown). In one implementation, one type of entry delimiter is used to separate the entries in the same file.

The nominal columns in the file 5909 can be defined by delimiters that separate the data items in the entries 5907A-C. The data item delimiter may be, for example, a comma character. For example, for entry 5907A, "IP" 5901 and "IP2" 5903 are separated by a comma character, "IP2" 5903 and "user" 5905 are also separated by a comma character, and "user" 5905 and "name" 5906 are also separated by a comma character. In one implementation, the same type of delimiter is used to separate the data items in the same file.

The first entry 5907A in the file 1309 may be a "header" entry. The data items (e.g. IP 5901, IP2 5903, user 5905, name 5906) in the "header" entry 5907A can be names defining the types of data items in the file 5909.

A table 5915 can be displayed in a GUI. The table 5915 can include one or more rows. In one implementation, a top row in the table 5915 is a column identifier row 5917, and each subsequent row 5919A,B is a data row. A column identifier row 5917 contains column identifiers, such as an element name 5911A-D and an entity definition component type 5913A-D, for each column 5921A-D in the table 5915. User input can be received via the GUI for designating the element names 5911A-D and component types 5913A-D for each column 5921A-D.

In one implementation, the data items of the first entry (e.g., entry 5907A) in the file 5909 are automatically imported as the element names 5911A-D into the column identifier row 5917 in the table 5915, and user input is received via the GUI that indicates acceptance of using the data items of the first entry 5907A in the file 5909 as the element names 5911A-D in the table 5915. In one implementation, user input designating the component types is also received via the GUI. For example, a user selection of a save button or a next button in a GUI can indicate acceptance.

The determination of how to import a data item from the file 5909 to a particular location in the table 5915 is based on ordinal positions of the data items within a respective entry in the file 5909 and ordinal positions of columns within the table 5915. In one implementation, ordinal positions of the entries 5907A-D within the file 5909 and ordinal positions of the rows (e.g., rows 5917, 5919A-B) within the table 5915 are used to determine how to import a data item from the file 5909 into the table 5915.

Each of the entries and data items in the file 5909 has an ordinal position. Each of the rows and columns in the table 5915 has an ordinal position. In one implementation, the first position in a numbered series is zero. In another implementation, the first position in a numbered series is one.

For example, each entry 5907A-C in the file 5909 has an ordinal position within the file 5909. In one implementation, the top entry in the file 5909 has a first position in a numbered series, and each subsequent entry has a corresponding position in the number series relative to the entry having the first position. For example, for file 5909, entry 5907A has an ordinal position of one, entry 5907B has an ordinal position of two, and entry 5907C has an ordinal position of three.

Each data item in an entry 5907A-C has an ordinal position within the respective entry. In one implementation, the left most data item in an entry has a first position in a numbered series, and each subsequent data item has a corresponding position in the number series relative to the data item having the first position. For example, for entry 5907A, "IP" 5901 has an ordinal position of one, "IP2" 5903 has an ordinal position of two, "user" 5905 has an ordinal position of three, and "name" 5906 has an ordinal position of four.

Each row in the table 5915 has an ordinal position within the table 5915. In one implementation, the top row in the table 5915 has a first position in a numbered series, and each subsequent row has a corresponding position in the number series relative to the row having the first position. For example, for table 5915, row 5917 has an ordinal position of one, row 5919A has an ordinal position of two, and row 5919B has an ordinal position of three.

Each column in the table 5915 has an ordinal position within the table 5915. In one implementation, the left most column in the table 5915 has a first position in a numbered series, and each subsequent column has a corresponding position in the number series relative to the column having the first position. For example, for table 5915, column 5921A has an ordinal position of one, column 5921B has an ordinal position of two, column 5921C has an ordinal position of three, and column 5921D has an ordinal position of four.

Each element name 5911A-C in the table 5915 has an ordinal position within the table 5915. In one implementation, the left most element name in the table 5915 has a first position in a numbered series, and each subsequent element name has a corresponding position in the numbered series relative to the element name having the first position. For example, for table 5915, element name 5911A has an ordinal position of one, element name 5911B has an ordinal position of two, element name 5911C has an ordinal position of three, and element name 5911D has an ordinal position of four.

The ordinal positions of the rows in the table 5915 and the ordinal positions of the entries 5907A-C in the file 5909A can correspond to each other. The ordinal positions of the columns in the table 1315 and the ordinal positions of the data items in the file 5909 can correspond to each other. The ordinal positions of the element names in the table 5915 and the ordinal positions of the data items in the file 5909 can correspond to each other.

The determination of an entity name 5911A-D in which to place a data item can be based on the ordinal position of the entity name 5911A-D that corresponds to the ordinal position of the data item. For example, "IP" 5901 has an ordinal position of one within entry 5907A in the file 5909. Element name 5911A has an ordinal position that matches the ordinal position of "IP" 5901. "IP" 5901 can be imported from the file 5909 and placed in row 5917 and in element name 5911A.

The data items for a particular entry in the file 5909 can appear in the same row in the table 5915. The determination of a row in which to place the data items for the particular entry can be based on the ordinal position of the row that corresponds to the ordinal position of the entry. For example, entry 5907B has an ordinal position of two. Row 5919A has an ordinal position that matches the ordinal position of entry 5907B. "1.1.1.1", "2.2.2.2", "jsmith", and "foobar" can be imported from the file 5909 and placed in row 5919A in the table 5915.

The determination of a column in which to place a particular data item can be based on the ordinal position of the column within the table 5915 that corresponds to the ordinal position of the data items within a particular entry in the file 5909. For example, "1.1.1.1" in entry 5907B has an ordinal position of one. Column 5921A has an ordinal position that matches the ordinal position of "1.1.1.1". "1.1.1.1" can be imported from the file 5909 and placed in row 5919A and in column 5921A.

Corresponding ordinal positions need not be equal in an implementation, and one may be calculated from the other using, for example, an offset value.

User input designating the component types 5913A-D in the table 5915 is received via the GUI. For example, a selection of "Alias" is received for component type 5913A, a selection of "Alias" is received for component type 5913B, a selection of "Informational Field" is received for component type 5913C, and a selection of "Name" is received for component type 5913D.

User input can be received via the GUI for creating entity definitions records 5927A,B using the element names 5911A-D, component types 5913A-D, and data items displayed in the table 5915 and importing the entity definitions records 5927A,B in a data store.

When user input designating the entity definition component types 5913A-D for the table 5915 is received, and user input indicating acceptance of the display of the data items from file 5909 into the table 5915 is received, the entity definition records can be created and stored. For example, two entity definition records 5927A,B are created.

As described above, in one implementation, an entity definition stores no more than one component having a name component type. The entity definition can store zero or more components having an alias component type, and can store zero or more components having an informational field component type. In one implementation, user input is received via a GUI (e.g., entity definition editing GUI, service definition GUI) to add one or more service association components and/or one or more other information components to an entity definition record. While not explicitly shown in the illustrative example of FIG. 45, the teachings regarding the importation of component information into entity definition records from file data can understandably be applied to service association component information, after the fashion illustrated for alias and informational field component information, for example.

In one implementation, the entity definition records 5927A,B store the component having a name component type as a first component, followed by any component having an alias component type, followed by any component having an informational field component type, followed by any component having a service component type, and followed by any component having a component type for other information.

Figure 46:
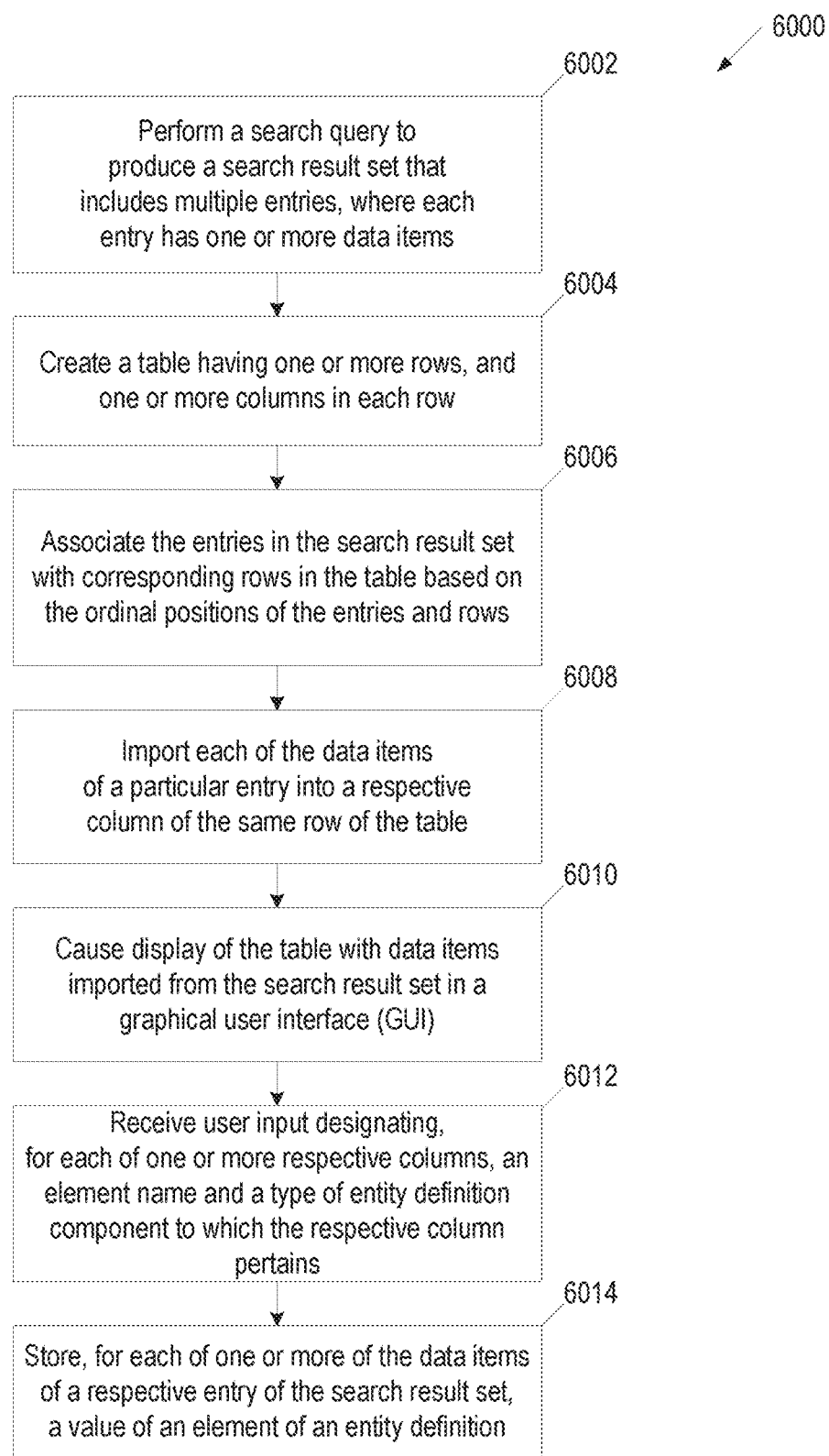
FIG. 46 is a flow diagram of an implementation of a method for creating entity definition(s) using a search result set, in accordance with one or more implementations of the present disclosure.

FIG. 46 is a flow diagram of an implementation of a method 6000 for creating entity definition(s) using a search result set, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, at least a portion of method is performed by a client computing machine. In another implementation, at least a portion of method is performed by a server computing machine.

At block 6002, the computing machine performs a search query to produce a search result set. The search query can be performed in response to user input. The user input can include a user selection of the type of search query to use for creating entity definitions. The search query can be an ad-hoc search or a saved search. A saved search is a search query that has search criteria, which has been previously defined and is stored in a data store. An ad-hoc search is a new search query, where the search criteria are specified from user input that is received via a graphical user interface (GUI).

In one implementation, the search query is directed to searching machine data. As described above, the computing machine can be coupled to an event processing system (e.g., event processing system 5105 in FIG. 37). Machine data can be represented as events. Each of the events can include raw data. The event processing system can apply a late-binding schema to the events to extract values for fields defined by the schema, and determine which events have values that are extracted for a field. The search criteria for the search query can specify a name of one or more fields defined by the schema and a corresponding value for the field name. The field-value pairs in the search query can be used to search the machine data for the events that have matching values for the fields named in search criteria. For example, the search criteria may include the field name "role" and the value "indexer." The computing machine can execute the search query and return a search result set that includes events with the value "indexer" in the associated field named "role."

In one implementation, the search query is directed to search a data store storing service monitoring data pertaining to the service monitoring system. The service monitoring data, can include, and is not limited to, entity definition records, service definition records, key performance indicator (KPI) specifications, and KPI thresholding information. The data in the data store can be based on one or more schemas, and the search criteria for the search query can include identifiers (e.g., field names, element names, etc.) for searching the data based on the one or more schemas. For example, the search criteria can include a name of one or more elements defined by the schema for entity definition records, and a corresponding value for the element name. The element name element value pair in the search query can be used to search the entity definition records for the records that have matching values for the elements named in search criteria.

The search result set can be in a tabular format, and can include one or more entries. Each entry includes one or more data items. The search query can search for information pertaining to an IT environment. For example, the search query may return a search result set that includes information for various entities (e.g., physical machines, virtual machines, APIs, processes, etc.) in an IT environment and various characteristics (e.g., name, aliases, user, role, owner, operating system, etc.) for each entity. One or more entries in the search result set can correspond to entities. Each entry can include one or more data items. As discussed above, an entity has one or more characteristics (e.g., name, alias, informational field, service association, and/or other information). Each data item in an entry in the search result set can correspond to a characteristic of a particular entity.

Each entry in the search result set has an ordinal position within the search result set, and each data item has an ordinal position within the corresponding entry in the search result set. An ordinal position is a specified position in a numbered series. Each entry in the search result set can have the same number of data items. Alternatively, the number of data items per entry can vary.

At block 6004, the computing machine creates a table having one or more rows, and one or more columns in each row. The number of rows in the table can be based on the number of entries in the search result set, and the number of columns in the table can be based on the number of data items within an entry in the search result set (e.g., the number of data items in an entry having the most data items). Each row has an ordinal position within the table, and each column has an ordinal position within the table.

At block 6006, the computing machine associates the entries in the search result set with corresponding rows in the table based on the ordinal positions of the entries within the search result set and the ordinal positions of the rows within the table. For each entry, the computing machine matches the ordinal position of the entry with the ordinal position of one of the rows. The matched ordinal positions need not be equal in an implementation, and one may be calculated from the other using, for example, an offset value.

At block 6008, for each entry in the search result set, the computing machine imports each of the data items of a particular entry in the search result set into a respective column of the same row of the table. An example of importing the data items of a particular entry to populate a respective column of a same row of a table is described in greater detail below in conjunction with FIG. 47.

At block 6010, the computing system causes display in a GUI of one or more rows of the table populated with data items imported from the search result set. An example GUI presenting a table with data items imported from a search result set is described in greater detail below in conjunction with FIG. 47, for example.

At block 6012, the computing machine receives user input designating, for each of one or more respective columns, an element name and a type of entity definition component to which the respective column pertains. As discussed above, an entity definition component type represents a particular characteristic type (e.g., name, alias, information, service association, etc.) of an entity. An element name represents a name of an element associated with a corresponding characteristic of an entity. For example, the entity definition component type may be an alias component type, and an element associated with an alias of an entity may be an element name "role".

The user input designating, for each respective column, an element name and a type (e.g., name, alias, informational field, service association, and other) of entity definition component to which the respective column pertains can be received via the GUI.

At block 6014, the computing machine stores, for each of one or more of the data items of the particular entry of the search result set, a value of an element of an entity definition. I data item will be stored if it appeared in a column for which a proper element name and entity definition component type were specified. As discussed above, an entity definition includes one or more components. Each component stores information pertaining to an element. The element of the entity definition has the element name designated for the respective column in which the data item appeared. The element of the entity definition is associated with an entity definition component having the type designated for the respective column in which the data item appeared. The element names and the values for the elements can be stored in an entity definition data store, which may be a relational database (e.g., SQL server) or a document-oriented database (e.g., MongoDB), for example.

Figure 47:
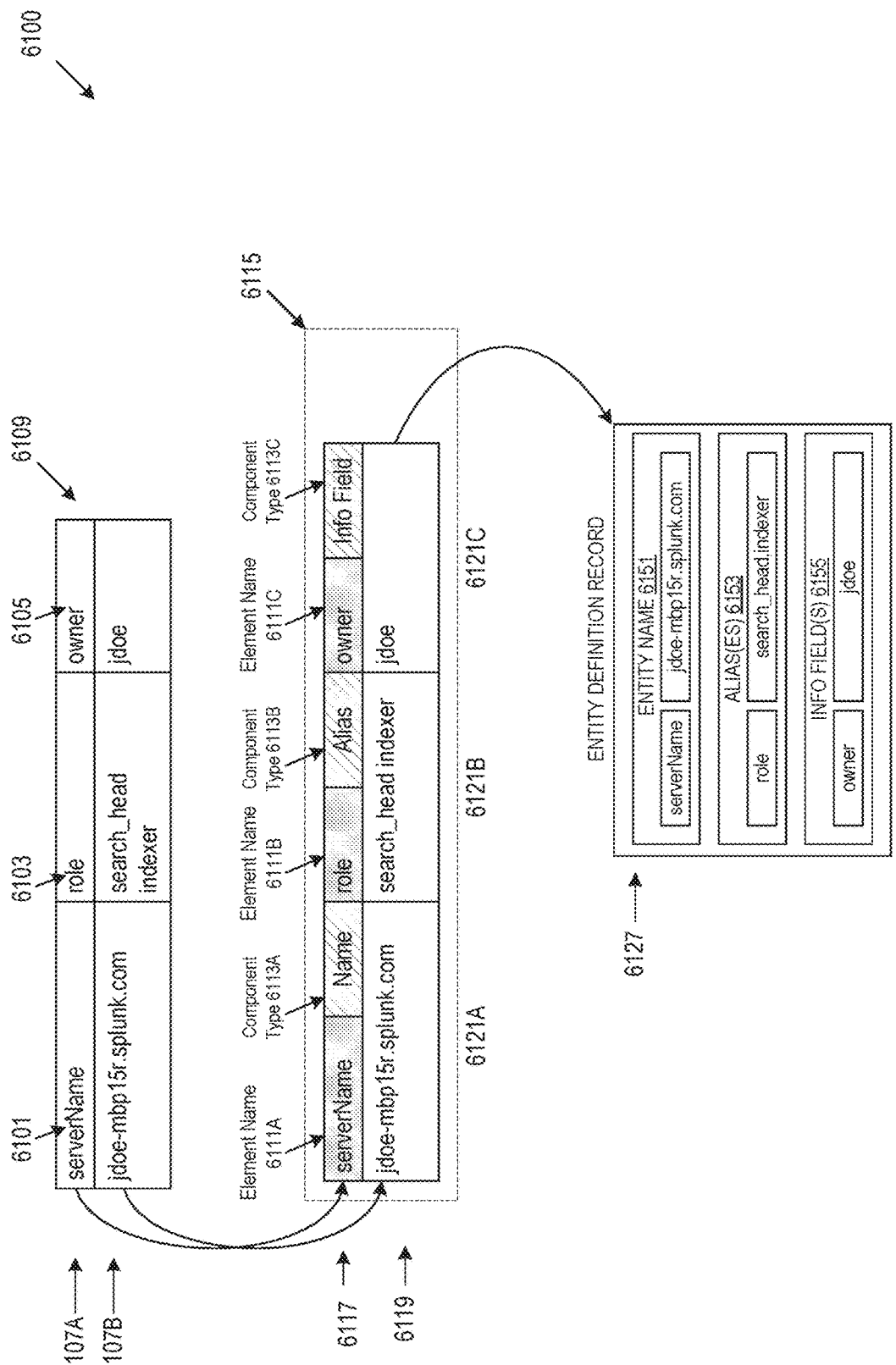
FIG. 47 is a block diagram of an example of creating entity definition(s) using a search result set, in accordance with one or more implementations of the present disclosure.

FIG. 47 is a block diagram 6100 of an example of creating entity definition(s) using a search result set, in accordance with one or more implementations of the present disclosure. A search result set 6109 can be produced from the execution of a search query. The search result set 6109 can have a tabular format that has one or more columns of data items and one or more rows of entries. The search result set 6109 includes multiple entries 6107A-B. Each entry 6107A-B includes one or more data items.

The first entry 6107A in the search result set 6109 may be a "header" entry. The data items (e.g. serverName 6101, role 6103, and owner 6105) in the "header" entry 6107A can be names defining the types of data items in the search result set 6109.

A table 6115 can be displayed in a GUI. The table 6115 can include one or more rows. In one implementation, a top row in the table 6115 is a column identifier row 6117, and each subsequent row 6119 is a data row. A column identifier row 6117 contains column identifiers, such as an element name 6111A-C and an entity definition component type 6113A-C, for each column 6121A-C in the table 6115. User input can be received via the GUI for designating the element names 6111A-C and component types 6113A-C for each column 6121A-C.

In one implementation, the data items of the first entry (e.g., entry 6107A) in the search result set 6109 are automatically imported as the element names 6111A-C into the column identifier row 6117 in the table 6115, and user input is received via the GUI that indicates acceptance of using the data items of the first entry 6107A in the search result set 6109 as the element names 6111A-C in the table 6115. For example, a user selection of a save button or a next button in a GUI can indicate acceptance. In one implementation, user input designating the component types is also received via the GUI.

The determination of how to import a data item from the search result set 6109 to a particular location in the table 6115 is based on ordinal positions of the data items within a respective entry in the search result set 6109 and ordinal positions of columns within the table 6115. In one implementation, ordinal positions of the entries 6107A-B within the search result set 6109 and ordinal positions of the rows (e.g., row 6117, row 6119) within the table 6115 are used to determine how to import a data item from the search result set 6109 into the table 6115.

Each of the entries and data items in the search result set 6109 has an ordinal position. Each of the rows and columns in the table 6115 has an ordinal position. In one implementation, the first position in a numbered series is zero. In another implementation, the first position in a numbered series is one.

For example, each entry 6107A-B in the search result set 6109 has an ordinal position within the search result set 6109. In one implementation, the top entry in the search result set 6109 has a first position in a numbered series, and each subsequent entry has a corresponding position in the number series relative to the entry having the first position.

For example, for search result set 6109, entry 6107A has an ordinal position of one, and entry 6107B has an ordinal position of two.

Each data item in an entry 6107A-B has an ordinal position within the respective entry. In one implementation, the left most data item in an entry has a first position in a numbered series, and each subsequent data item has a corresponding position in the number series relative to the data item having the first position. For example, for entry 6107A, "serverName" 6101 has an ordinal position of one, "role" 6103 has an ordinal position of two, and "owner" 6105 has an ordinal position of three.

Each row in the table 6115 has an ordinal position within the table 6115. In one implementation, the top row in the table 6115 has a first position in a numbered series, and each subsequent row has a corresponding position in the number series relative to the row having the first position. For example, for table 6115, row 6117 has an ordinal position of one, and row 6119 has an ordinal position of two.

Each column in the table 6115 has an ordinal position within the table 6115. In one implementation, the left most column in the table 6115 has a first position in a numbered series, and each subsequent column has a corresponding position in the number series relative to the column having the first position. For example, for table 6115, column 6121A has an ordinal position of one, column 6121B has an ordinal position of two, and column 6121C has an ordinal position of three.

Each element name 6111A-C in the table 6115 has an ordinal position within the table 6115. In one implementation, the left most element name in the table 6115 has a first position in a numbered series, and each subsequent element name has a corresponding position in the numbered series relative to the element name having the first position. For example, for table 6115, element name 6111A has an ordinal position of one, element name 6111B has an ordinal position of two, and element name 6111C has an ordinal position of three.

The ordinal positions of the rows in the table 6115 and the ordinal positions of the entries 6107A-B in the search result set 6109 can correspond to each other. The ordinal positions of the columns in the table 6115 and the ordinal positions of the data items in the search result set 6109 can correspond to each other. The ordinal positions of the element names in the table 6115 and the ordinal positions of the data items in the search result set 6109 can correspond to each other.

The determination of an element name GUI element 6111A-C in which to place a data item (when importing a search results entry that contains the element (column) names) can be based on the ordinal position of the entity name 6111A-C that corresponds to the ordinal position of the data item. For example, "serverName" 6101 has an ordinal position of one within entry 6107A in the search result set 6109. Element name 6111A has an ordinal position that matches the ordinal position of "serverName" 6101. "serverName" 6101 can be imported from the search result set 6109 and placed in element name 6111A in row 6117.

The data items for a particular entry in the search result set 6109 can appear in the same row in the table 6115. The determination of a row in which to place the data items for the particular entry can be based on the ordinal position of the row that corresponds to the ordinal position of the entry. For example, entry 6107B has an ordinal position of two. Row 6119 has an ordinal position that matches the ordinal position of entry 6107B. The data items "jdoe-mbp15r.splunk.com", "search_head, indexer", and "jdoe" can be imported from entry 6107B in the search result set 6109 and placed in row 6119 in the table 6115.

The determination of a column in which to place a particular data item can be based on the ordinal position of the column within the table 6115 that corresponds to the ordinal position of the data items within a particular entry in the search result set 6109. For example, the data item "jdoe-mbp15r.splunk.com" in entry 6107B has an ordinal position of one. Column 6121A has an ordinal position that matches the ordinal position of "jdoe-mbp15r.splunk.com". The data item "jdoe-mbp15r.splunk.com" can be imported from the search result set 6109 and placed in row 6119 and in column 6121A.

User input designating the component types 6113A-C in the table 6115 is received via the GUI. For example, a selection of "Name" is received for component type 6113A, a selection of "Alias" is received for component type 6113B, and a selection of "Informational Field" is received for component type 6113C.

Corresponding ordinal positions need not be equal in an implementation, and one may be calculated from the other using, for example, an offset value.

User input can be received via the GUI for creating entity definitions records, such as 6127, using the element names 6111A-C, component types 6113A-C, and data items displayed in the table 6115, and importing the entity definitions records, such as 6127, in a data store.

When user input designating the entity definition component types 6113A-C for the table 6115 is received, and user input indicating acceptance of the display of the data items from search result set 6109 into the table 6115 is received, the entity definition record(s) can be created and stored. For example, the entity definition record 6127 is created.

As described above, in one implementation, an entity definition stores no more than one component having a name component type. The entity definition can store zero or more components having an alias component type, and can store zero or more components having an informational field component type. In one implementation, user input is received via a GUI (e.g., entity definition editing GUI, service definition GUI) to add one or more service association components and/or one or more other information components to an entity definition record. While not explicitly shown in the illustrative example of FIG. 47, the teachings regarding the importation of component information into entity definition records from search query results can understandably be applied to service association component information, after the fashion illustrated for alias and informational field component information, for example.

In one implementation, an entity definition record (e.g., entity definition record 6127) stores the component having a name component type as a first component, followed by any component having an alias component type, followed by any component having an informational field component type, followed by any component having a service component type, and followed by any component having a component type for other information.

Figure 48:
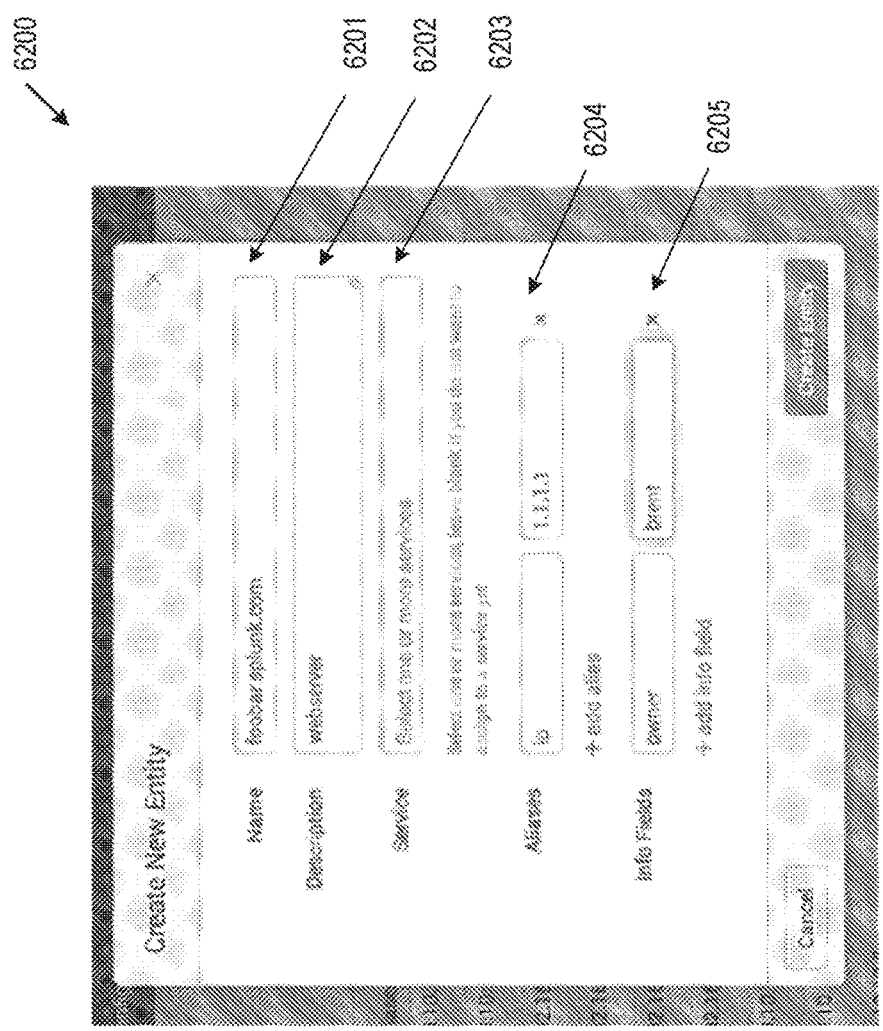
FIG. 48 illustrates an example of a GUI facilitating user input for creating an informational field and adding the informational field to an entity definition, in accordance with one or more implementations of the present disclosure.

FIG. 48 illustrates an example of a GUI 6200 facilitating user input for creating an informational field and adding the informational field to an entity definition, in accordance with one or more implementations of the present disclosure. For example, GUI 6200 can include multiple GUI fields 6201-6205 for creating an entity definition, as discussed above in conjunction with FIG. 40. In one implementation, name GUI field 6201 may receive user input of an identifying name for referencing the entity definition for an entity (e.g., "foobar.splunk.com"). Description GUI field 6202 may receive user input of information that describes the entity, such as what type of machine it is, what the purpose of the machine is, etc. In the illustrated example, the description of "webserver" has been entered into description GUI field 6202 to indicate that the entity named "foobar.splunk.com" is a webserver. Service GUI field 6203 may receive user input of one or more services of which the entity is a part. In one implementation, service GUI field 6203 is optional and may be left black if the user does not which to assign the entity to a service. Additional details related to the association of entities with services are provided below with respect to FIG. 61, for example. Aliases GUI fields 6204 may receive user input of an alias name-value pair. Each machine data event pertaining to the entity can include one or more aliases that denote additional ways to reference the entity, aside from the entity name. In one implementation, the alias can include a key-value pair comprised of an alias name and an alias value. GUI 6200 may allow a user to provide multiple aliases for the entity.

Info Fields GUI fields 6205 may receive user input of an information field name-value pair. The informational field name-value pair may be added to the entity definition to store user-defined metadata for the entity, which includes information about the entity that may not be reliably not present in, or may be absent altogether from, the machine data events pertaining to that entity. The informational field name-value pair may include data about the entity that may be useful in searches of an event store including machine data events pertaining to the entity, in searches for entities or entity definitions, in information visualizations or other actions. GUI 6200 can allow a user to add multiple informational fields for the entity.

Upon entering the above characteristics of the entity, the user can request that the entity definition be created (e.g., by selecting the "Create Entity" button). In response, the entity definition is created using, for example, the structure described above in conjunction with FIG. 43.

6.3. Entity Definition Automation and Lifecycle

FIGS. 49-60 generally relate to certain automatic methods and mechanisms for maintaining an accurate and up-to-date set of entity definitions. While described in the context of the entity-rich environment of an example Service Monitoring System, the use of inventive aspects is not so limited. One of skill will appreciate by consideration of the disclosure that follows the usefulness of inventive aspects beyond the context of an example Service Monitoring System.

6.3.1. Automatic Updating

Figure 49:
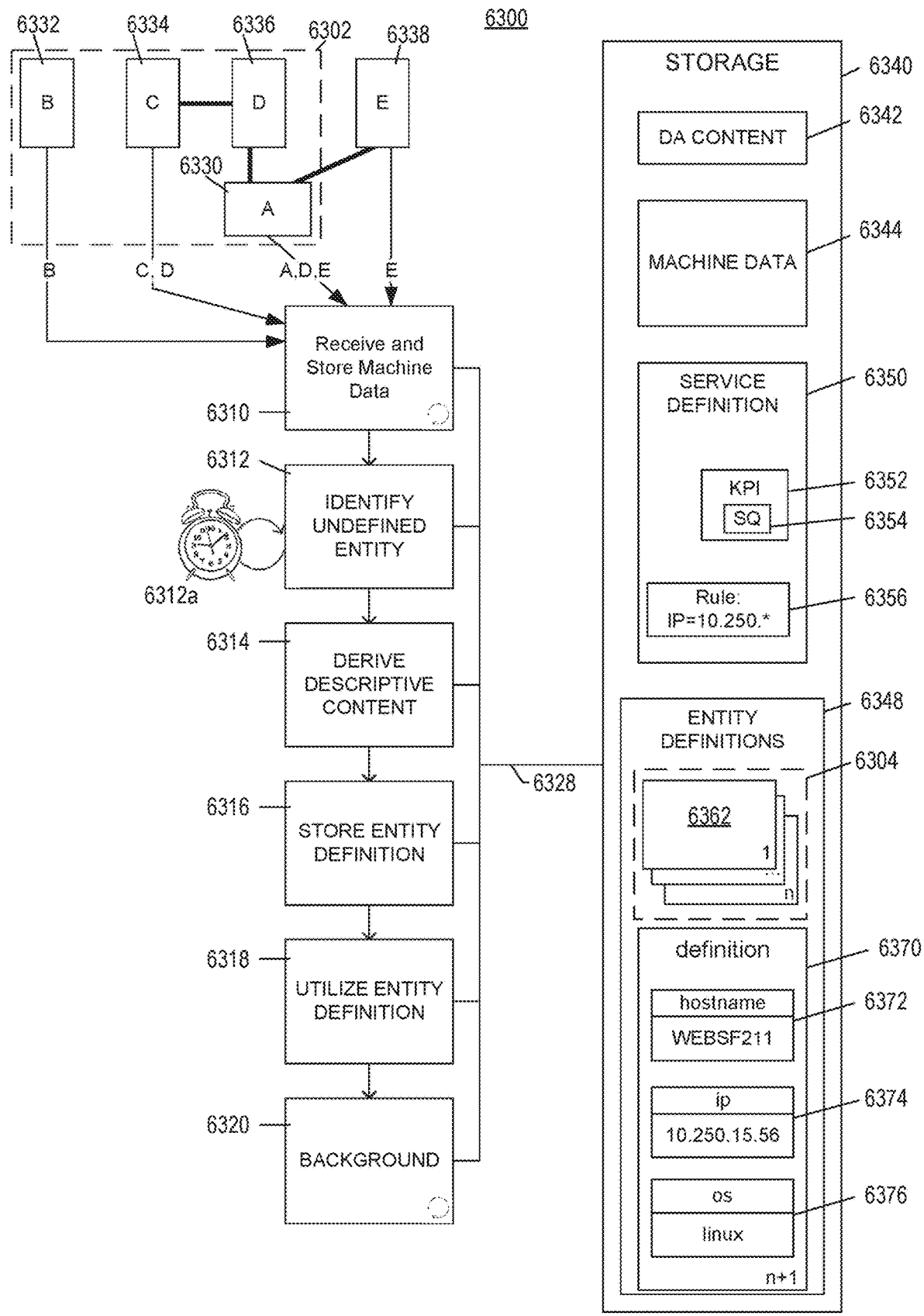
FIG. 49 is a flow diagram of a method addressing the automatic updating of a set of stored entity definitions, including depictions of certain components in the computing environment.

FIG. 49 is a flow diagram of a method addressing automatic updating of a set of stored entity definitions, including depictions of certain components in the computing environment. The processing performed in the illustrative method and environment 6300 of FIG. 49 is principally discussed in relation to Receive and Store Machine Data block 6310, Identify Undefined Entity block 6312 and its associated timer 6312a, Derive Descriptive Content block 6314, Store Entity Definition block 6316, Utilize Entity Definition block 6318, Background block 6320, and relationships and control flow therebetween. Discussion of the method processing is enhanced by consideration of certain aspects of an example computing environment. Those aspects, as illustrated, include a configuration of machine entities that generate or otherwise supply machine data, and a selection of information available to the method from computer-readable storage. The configuration of machines includes machine A 6330, machine B 6332, machine C 6334, machine D 6336, considered collectively as the pre-existing entities 6302, and machine E 6338, considered for purposes of illustration as a newly added machine. The variety of information in computer-readable storage 6340 includes DA Content 6342, Machine Data 6344, a set of Entity Definitions 6348, and single Service Definition 6350. Service Definition 6350 further includes entity association rule 6356, and KPI definitional information 6352 that includes search query (SQ) 6354. Entity Definitions 6348 further includes a set of pre-existing entity definitions 6304 and a single entity definition 6370 that includes name information 6372, alias information 6374, and info field information 6376. For purposes of illustration entity definition 6370 is considered a newly added entity definition. Connection 6328 illustrates the connection between the processing blocks of the method and computer-readable storage 6340. Computer-readable storage 6340 should be understood as able to encompass storage apparatus and mechanisms at any level and any combination of levels in a storage hierarchy at one time, and able to encompass at one time transient and persistent, volatile and non-volatile, local and remote, host- and network-attached, and other computer-readable storage. Moreover, commonly identified collections of data such as DA Content 6342, Machine Data 6344, Service Definition 6350, and Entity Definitions 6348, should each be understood as able to have its constituent data stored in and/or across one or more storage mechanisms implementing storage 6340.

The method illustrated and discussed in relation to FIG. 49 may be performed by processing logic that may comprise hardware (circuitry, dedicated logic, etc.), software (such as the one run on a general purpose computer system or a dedicated machine), or a combination of both. In one implementation, the method may be performed by a client computing machine. In another implementation, the method may be performed by a server computing machine coupled to the client computing machine over one or more networks.

For simplicity of explanation, the methods of this disclosure are depicted and described as a series of acts (e.g., blocks). However, acts in accordance with this disclosure can occur in various orders and/or concurrently, and with other acts not presented and described herein. Furthermore, the acts can be subdivided or combined. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Processing for the method illustrated by FIG. 49 that supports, for example, automatic entity definition for a service monitoring system begins at block 6310. At block 6310, machine data is received from a number of machine entities, each a data source, and processed for storage in a machine data store 6344. The types of machines or entities from which block 6310 may receive machine data are wide and varied and may include computers of all kinds, network devices, storage devices, virtual machines, servers, embedded processors, intelligent machines, intelligent appliances, sensors, telemetry, and any other kind or category of data generating device as may be discussed within this document or appreciated by one of skill in the art. The machine data may be minimally processed before storage and may be organized and stored as a collection of timestamped events.

The processing of block 6310 may be performed by an event processing system such as disclosed and discussed elsewhere in this detailed description including. The processing of block 6310 receives machine data from pre-existing machines 6302 as well as from newly added machine 6338. The heavy lines showing connections between the entity machines of FIG. 49 illustrate operational connections as may exist between machines in a computing environment. The operational connections may be based on data transfer, processing flow, or some other connection. The operational connections may provide a basis for one machine to generate or supply machine data pertaining to a different machine.

As illustrated by way of example, FIG. 49 depicts block 6310 receiving from entity machine A 6330 machine data pertaining to entity machines A, D, and E; receiving from entity machine B 6332 machine data pertaining to itself (i.e., machine B); receiving from entity machine C 6334 machine data pertaining to entity machines C, and D; and receiving from entity machine E 6338 machine data pertaining to itself (i.e., machine E). The variability shown permits one of skill in the art to appreciate the variability with which machine data pertaining to a particular machine entity may be received at block 6310, including receiving data from a single machine which is itself, a single machine which is a different machine, multiple machines including itself, and multiple machines apart from itself. Notably, the processing of block 6310 may be largely or completely agnostic to service monitoring processes or activities, or to any notion of entities or entity definitions in a service monitoring context.

After the processing and storage represented by block 6310 the machine data can be accessed from the machine data store 6344. The machine data may be stored in machine data store 6344 in accordance with a data model in an embodiment, and the data model may represent a portion of, be derived from, or have accordance with content of DA Content 6342. Where the processing of block 6310 is performed using the capabilities of an event processing system, the event processing system may provide an exclusive or best capability for accessing the data of the machine data store 6344. The event processing system of some embodiments may provide a robust search query processing capability to access and process the machine data of the machine data store 6344. The processing of Receive and Store Machine Data block 6310 may be continuously performed in an embodiment, collecting operational data on an ongoing basis and amassing a wealth of stored machine data. At some point after block 6310 has received and stored machine data pertaining to newly added entity E 6338, the processing of block 6312, Identify Undefined Entity, can begin.

At block 6312, machine data received and stored at block 6310 is processed to identify any undefined entities as possible. As the processing of block 6312 begins, entity definitions 6348 includes only pre-existing definitions 6304, as definition 6370 is yet to be created by the method now being discussed.

The identification process of block 6312 uses identification criteria in one embodiment. For the example now discussed, the identification criteria is maintained in storage 6340 as part of DA Content 6342. Other embodiments and examples may include identification criteria stored or reflected elsewhere.

DA Content 6342 may be introduced into storage by the installation of a Domain Add-on facility as part of or as an extension of a service monitoring system. A domain add-on facility may include computer program code or process specification information in another form such as control parameters. A domain add-on facility may include data components in an embodiment. Data components may include customization and tailoring information such as configuration parameters, option selections, and extensible menu options, for example. Data components may also include templates, models, definitions, patterns, and examples. Templates for a service or entity definition, and an operationally-ready KPI definition are illustrative examples of such data components. Some aspects included in DA Content 6342 may be a mixture of process specification and data component information or may be otherwise difficult to clearly categorize as being one or the other. DA content 6342 in an embodiment may represent the codification of expert knowledge for a specific domain of knowledge such as workload balancing or web services provision within the field of Information Technology, and specifically applying that expert knowledge to service monitoring.

The identification criteria of DA Content 6342 in the example 6300 illustrated in FIG. 49 may specify data selection criteria for selecting or identifying data of machine data 6344 useful for discovering undefined entities (i.e., machines that perform a service but do not have an entity definition in existence when a discovery attempt begins). The data selection criteria may include regular expressions (REGEX) expressions and/or may be in the form of a complete or partial search query ready for processing by an event processing system, in some embodiments. Such data selection criteria may include aspects for selecting machine data from multiple sources possibly associated with multiple source types. Such data selection criteria may include conditional factors extending beyond the condition of matching certain data values to include conditions requiring, certain relationships to exist between multiple data items or requiring a certain data item location, for example. For example, a data selection criteria may specify that an IP address field is to be selected if its value matches the pattern "192.168.10.*" but only if it also appears in a log data event with a sourceID matching the sourceID in a network event of a particular type within a particular timeframe.

The identification criteria may include information specifying the process used to identify an undefined entity from machine data at block 6312, or some aspect of the process. The information specifying the process may be a module of computer program code written in a programming language such as Java or Python, or may be a set of control parameters used at block 6312 to determine the pattern or flow of processing it actually performs in order to identify an undefined entity, for example. The identification criteria may include these and any other criteria affecting, defining, determining, or specifying the process or algorithm(s) being effected or exercised to perform the identification.

Identification criteria may include criteria to prevent or minimize false positive and/or false-negative identifications. Identification criteria may include criteria for inclusion or exclusion based on the sources of machine data pertaining to an entity represented in machine data 6344. For example, identification criteria may include criteria that results in the identification of an undefined entity where the entity has machine data pertaining to itself in machine data 6344 produced only by itself, or by itself and another entity, or by only one other entity, or by multiple other entities and not itself. As another example, the criteria mentioned in the preceding example can be expanded to specify that the entity and/or one or more of the other entities produces machine data associated with a particular source type or types.

Identification criteria may include criteria limiting the identification of undefined entities to machine entities discovered or suspected to be performing an existing service or performing work relevant to a service type of interest. The service type of interest may be known because an existing service of that type is already being monitored or because of domain add-on content having been installed, selected, implemented, or otherwise activated by the user. These and other identification criteria are possible.

When any predefined, customized, or configured process for identifying one or more undefined entities using applicable identification criteria at block 6312 is wholly or partially complete and successful, processing can advance to block 6314. Machine entity E 6338 is assumed for purposes of illustration to have been successfully identified by the processing of block 6312, in this discussion.

In some embodiments the processing of block 6312 is automatically repeated on a regular basis as represented in FIG. 49 by icon 6312a. The regular basis may be defined in terms of a repetition frequency or a schedule. The regular basis may also be defined in terms of a predictable execution in response to an event, for example, performing the processing of block 6312 every time block 6310 stores a 50 GB increment of machine data, or at sometime overnight whenever that event occurs. Other regular execution schemes are possible, and on-demand, user-initiated execution represents an alternative or supplementary implementation.

At block 6314, descriptive information about an entity identified at block 6312 is derived in whole or in part from machine data of 6344 pertaining to the entity. (A real-time or near real-time implementation may instead use machine data directly from block 6310 before it is added to machine data store 6344.) The descriptive information is used to populate the content of an entity definition such as entity definition 6370. The particular items or components of the entity definition populated with the derived descriptive information may be identified by DA Content 6342 in one embodiment. In one embodiment, DA content 6342 may provide procedural code or information specifying in whole or in part how to derive the descriptive information from machine data. These and other embodiments are possible.

As an illustrative example, the derivation of descriptive content for newly added machine E 6338 is now described. Based on an entity definition template included in DA Content 6342, processing block 6314 undertakes to derive descriptive content including a hostname field as name information, an IP address as alias information, and an operating system identification as info field information. (FIGS. 43-44 and the related descriptions, for example, provide additional information on entity definition formats and contents in example embodiments.) Certain machine data pertaining to machine E 6338 that was encountered during the processing of block 6312 is available during the processing of block 6314 described here. Entity E provided machine data in the form of a security exceptions log file in which it identified itself using the hostname "WEBSF211." The entity definition template of DA Content 6342 indicates that a hostname field is a valid source for name information and, accordingly, block 6314 harvests the hostname from the security exceptions log data and formats it for inclusion in new entity definition 6370 as block 6372. Entity A 6330 provided machine data in the form of an error log that included an entry having hostname "WEBSF211" appearing in conjunction with IP_address 10.250.15.56. (The conjunction may have been determined by search criteria, extraction rules, late-binding schemas, and/or other information of an entity processing system storing the machine data in one embodiment, or by using DA Content 6342, or by some other means.) Accordingly, block 6314 harvests the IP address from the error log machine data and formats it for inclusion in new entity definition 6370 as block 6374. Entity A further provided machine data in the form of an inventory record having hostname "WEBSF211" appearing in conjunction with a software version field with the value "Apache_httpd_2.4.16_L." DA Content 6342 was able to draw the correspondence between the software version and the use of the LINUX operating system. Accordingly, block 6314 formats the operating system information for inclusion in new entity definition 6370 as block 6376.

At block 6314, the derived descriptive content along with any additional information including, possibly, information from an entity definition template of DA Content 6342, is prepared for storage as an entity definition. Preparing information for storage as an entity definition may include organizing the information into a particular order or structure, in one embodiment. Preparing information for storage as an entity definition may include formatting the information into a request format, such as a function call, procedure call, RPC, HTTP request, or the like. These and other embodiments are possible. Processing may then proceed to block 6316.

At block 6316, the derived descriptive content of block 6314 is stored as an entity definition of the service monitoring system, such as entity definition 6370. In one embodiment the processing described in relation to blocks 6312 and 6314 is effected by a search query. The search query produces its results in a format compatible with a method for updating entity definitions as described or suggested by FIG. 46 and the related discussion. The processing described in relation to block 6316 is then effected by executing an implementation of a method described or suggested by FIG. 46 and the related discussion.

Once stored at block 6316, the new entity definition is available for use in the service monitoring system, and is shown in use in FIG. 49 at block 6318. In one example use, information from the entity definition may be displayed in a GUI permitting a user to update the entity definition. In another example use, information from the entity definition may be displayed in a GUI permitting a user to select entities to associate with the service. In another example use, a KPI search query, such as search query 6354 of KPI 6352, may use information from entity definition 6370 such as alias information 6374, to identify machine data in the machine data store 6344 for use in determining a KPI value. In another example use, a search query based on a rule in a service definition, such as rule 6356, may be executed to identify entities that should be associated with a particular service definition such as 6350, and to make that association. In some embodiments, a rule-based search query to associate entities with a service may be executed on a regular time-based or event-driven basis as part of background processing. Such background processing is represented in FIG. 49 by block 6320 and represents ongoing use of entity definitions 6348, including newly created entity definition 6370. Execution of KPI search queries that may rely on entity definition information to identify machine data also occur in background processing in some embodiments.

While the preceding discussion has focused on using machine data to identify new machine entities and to create entity definitions for them, one of skill will appreciate from this disclosure that the method of 6300 as disclosed and described may be adapted to achieve updates or deletions for entity definitions 6348 based on received and stored machine data and their patterns. For example, identification criteria for a deletion could specify that a machine not supplying data for 4 weeks or more is to be deleted. As another example, identification criteria for a modification could specify that where an old alias value is absent from machine data for at least 7 days, and where a new alias value is seen consistently for the same 7 days, then the old alias value should be replaced in the entity definition with the new alias value. These and other embodiments enabled to one of skill in the art by the disclosure of 6300 are possible.

6.3.2. Creating Relationship Definitions and Updating and Retiring Entity and Relationship Definitions As described in relation to FIGS. 36-39, and 43-44, for example, knowledge of entities within the IT environment (monitored environment) is essential to system administrators for managing, optimizing performance, and troubleshooting issues within the IT environment. The entity module 5120 of the service monitoring system 5110 may automatically discover and generate entity definitions for entities within the IT environment and display such entity definitions to a user. The implementations described above provide the advantages of reducing administrative burdens for managing entities and also improving the quality (e.g., accuracy and relevancy) of presented information regarding the entities within the IT environment.

However, knowledge of the relationship between the entities within the IT environment is also essential to system administrators for managing, optimizing performance, and troubleshooting issues for entities within the IT environment. In general, understanding relationships between the entities is important for maintaining the overall health of the IT environment. For example, if a first entity is related to a second entity, and the first entity is experiencing operational failures, these operational failures will impact and cause operational issues at the second entity, which need to be resolved as well. Thus, for troubleshooting issues arising in the IT environment, knowledge of this relationship between the two entities is important for resolving issues that may arise.

In embodiments already discussed, within the service monitoring system 5110, there are no administrative tools to automatically discover, define, and manage relationships between the entities. Thus, for environments with a large number of entities (e.g., thousands of servers, hypervisors and other entity instances), administrators commonly have difficulty understanding how entities are related to each other. Further, within the service monitoring system 5110, there are currently no administrative tools to update entity and relationship definitions and retire/remove outdated entities and relationships definitions that are no longer needed. Entities and relationships that are discovered and defined are typically retained and stored in a data store until a definition is explicitly and manually deleted by an administrator. Retaining obsolete or outdated definitions of entities and/or relationships congests the entity and relationship definitions and may provide an inaccurate and outdated view of the entities and relationships within the IT environment. Thus, retaining outdated entity and relationship definitions makes understanding and managing the IT environment more difficult for administrators. For environments with a multitude of entities and relationships, it is difficult for administrators to continuously monitor and update the entity and relationship definitions and remove outdated definitions.

As the foregoing illustrates, what is needed in the art is a technique for more efficiently discovering, defining, and managing relationships between entities within an IT environment. What is further needed in the art is an efficient technique for updating and retiring entity and relationship definitions stored to a data store.

At least one advantage of the disclosed technique is that relationships between entities within the IT environment may be automatically discovered and stored as relationship definitions. Another advantage of the disclosed technique is that entity definitions and relationship definitions may be automatically updated, and outdated entity definitions and relationship definitions may be retired/removed from the data store. The implementations described herein reduce the administrative burdens for managing entities and entity relationships and also improve the quality (e.g., accuracy and relevancy) of information regarding entities and entity relationships within an IT environment which in turn improves the accuracy and relevancy of the realtime Service Monitoring System outputs.

6.3.2.1. Overview of Techniques for Creating Relationship Definitions and Updating and Retiring Entity and Relationship Definitions The below description of the disclosed techniques is divided into four sections. The first section describes a system environment that implements the disclosed technique. The system environment includes a service monitoring system that executes a relationship module, an update module, and a retire module. The system environment further includes a data store for storing an entity collection and a relationship collection. The entity collection may include a set of entity search results and a set of entity definitions. The set of entity search results may comprise results from an entity discovery search. The set of entity definitions may comprise the information of the set of entity search results that is formatted and organized according to a predefined schema specified for an entity definition. Likewise, the relationship collection may store a set of relationship search results and a set of relationship definitions. The set of relationship search results may comprise results from a relationship discovery search. The set of relationship definitions may comprise the information of the set of relationship search results that is formatted and organized according to a predefined schema specified for a relationship definition.

The second section describes a technique for automatically discovering relationships between entities within an IT environment and generating definitions for the relationships. The technique may be performed by the relationship module executing on the service monitoring system that performs a discovery search for relationships and define relationships. The relationship module may specify a set of relationship rules that specify the types of entities and entity relationships to be discovered within an IT environment. The relationship module may then generate a set of search queries based on the set of relationship rules and apply the set of search queries to the entity search results or entity definitions stored to the entity collection. The set of search queries are applied to the entity collection to discover/identify a set of relationships between the entities, and a set of relationship search results is returned in response. The set of relationship search results may be displayed via a UI. The relationship module then generates a set of relationship definitions from the set of relationship search results. Each relationship definition may comprise information for a particular relationship search result that has been formatted and organized according to a predefined schema specified for a relationship definition. The set of relationship search results and the set of relationship definitions may then be stored to the relationship collection and made available for use and display by administrators or automated processes, whereby particular requests may be performed on the set of relationship definitions.

The third section describes a technique for automatically updating entity and relationship definitions stored to the entity collection and relationship collection, respectively. The technique may be performed by the update module executing on the service monitoring system that may automatically perform an update process on the entity definitions and relationship definitions at predetermined time intervals. In these embodiments, an entity definition and a relationship definition each comprise a schema that includes additional entries for storing update history, a cleanup state (such as "active," "stale," etc.), and a stale-state time specifying a time when a definition was determined to be stale. The update module may update the entity definitions by retrieving a first set of entities comprising a set of entity definitions currently stored to the entity collection and performing a new entity discovery search on the IT environment that produces a second set of entities. The update module may then compare the first set of entities to the second set of entities to determine a set of changed entities. The set of changed entities may comprise zero or more new entities, removed entities, modified entities, or any combination thereof. The set of changed entities may then be applied to the entity definitions stored in the entity collection to update the entity definitions to a new state. The update history in each entity definition stored in the entity collection is also updated to reflect the current update process.

Likewise, the update module may update the relationship definitions by retrieving a first set of relationships comprising a set of relationship definitions currently stored to the relationship collection and performing a new relationship discovery search which produces a second set of relationships. The update module may then compare the first set of relationships to the second set of relationships to determine a set of changed relationships. The set of changed relationships may comprise zero or more new relationships, removed relationships, modified relationships, or any combination thereof. The set of changed relationships may then be applied to the relationship definitions stored in the relationship collection to update the relationship definitions to a new state. The update history in each relationship definition stored in the relationship collection is also updated to reflect the current update process. The update module may automatically perform the update process to update the entity definitions and/or relationship definitions at predefined time intervals. In this manner, the entity definitions stored to the entity collection and the relationship definitions stored to the relationship collection may be easily updated by the update module.

The fourth section describes a technique for automatically retiring/removing outdated entity definitions and relationship definitions stored to the entity collection and relationship collection, respectively. The technique may be performed by the retire module executing on the service monitoring system that automatically and periodically performs a retire process on the entity definitions and relationship definitions based on the update histories of the entity definitions and relationship definitions. The retire module may process the definitions by applying one or more policies to the update histories of the entity definitions and relationship definitions to determine a cleanup state and stale-state time for each definition. The one or more policies may include a stale policy that specifies that an entity or relationship definition is determined to be stale if a time difference between a current time and a time of the last update exceeds a threshold time period. If an entity or relationship definition is determined to be stale based on the stale policy, then the cleanup state of the definition is set to "stale." The one or more policies may also include a remove policy that specifies that an entity or relationship definition is to be removed from the entity or relationship collection, respectively, if a time difference between a current time and a stale-state time (time that the definition was determined to become stale) exceeds a threshold time period. If an entity or relationship definition is determined to be removed based on the remove policy, then the retire module removes the entity or relationship definition from the entity or relationship collection, respectively. The retire module may automatically perform the retire process at predefined time intervals. In this manner, outdated entity definitions stored to the entity collection and outdated relationship definitions stored to the entity collection may be easily marked as stale and removed from the entity and relationship collections.

Thus, the disclosed technique enables management of entities and relationships through the entire lifecycle of the entities and relationships. In a beginning phase, via the entity module 5120 and relationship module executing on the service monitoring system 5110, the entities and relationships in an IT environment are automatically discovered, and entity and relationship definitions are created. In a middle phase, via the update module executing on the service monitoring system 5110, the entity and relationship definitions are automatically and continuously updated and kept current. In a final phase, via the retire module executing on the service monitoring system 5110, outdated entity and relationship definitions are automatically marked and removed from the entity and relationship collections, respectively.

As used in the below description, an "item" may refer to an entity or a relationship. The term "item" may be used in relation to features that are similar for both entities and relationships and processes that are performed in a similar manner for both entities and relationships.

Figure 50:
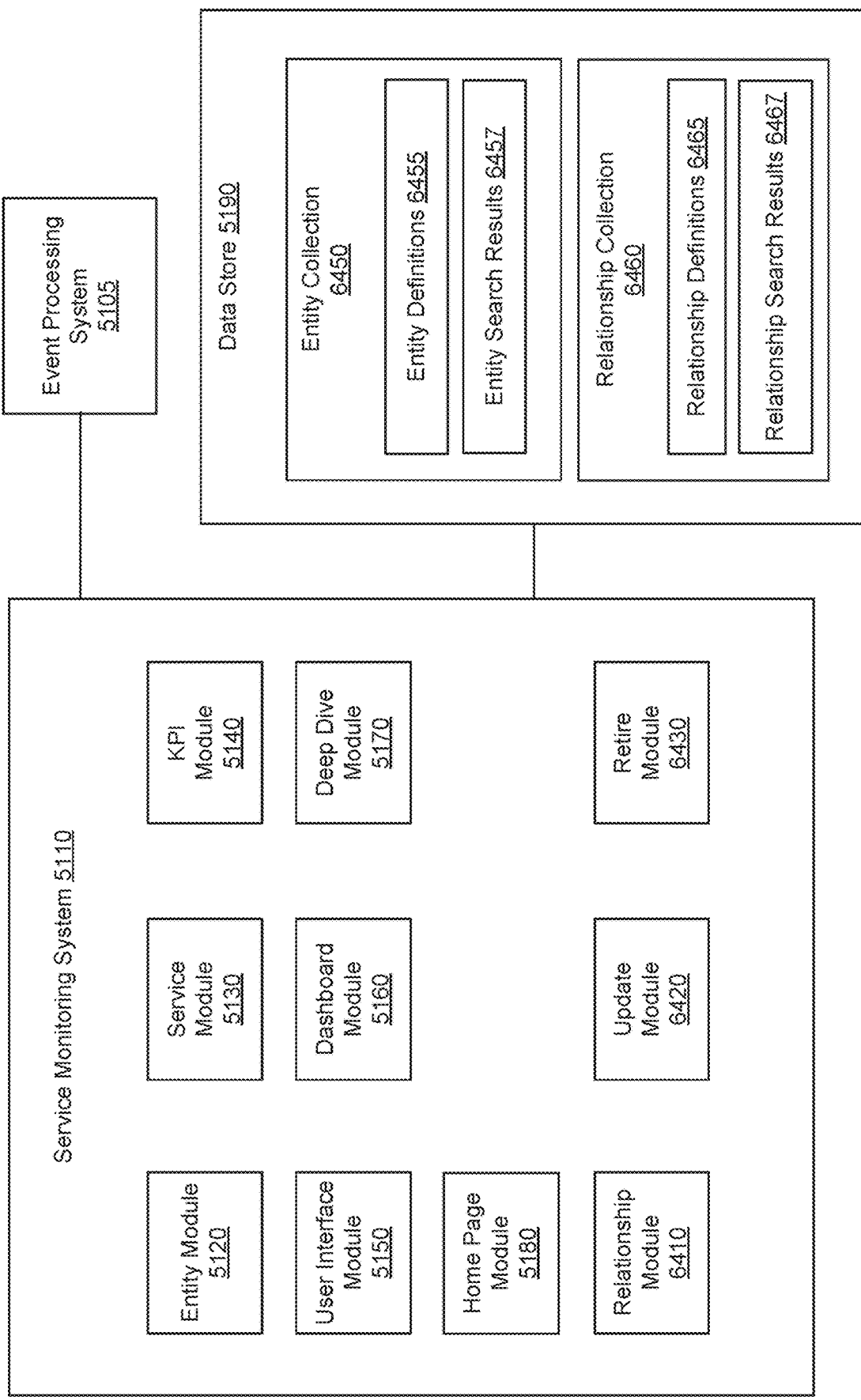
FIG. 50 is a block diagram of one implementation of a service monitoring system for creating relationship definitions and updating and retiring entity and relationship definitions, in accordance with one or more implementations of the present disclosure.

FIG. 50 is a block diagram of one implementation of a service monitoring system 5110 for creating relationship definitions and updating and retiring entity and relationship definitions, in accordance with one or more implementations of the present disclosure. The service monitoring system 5110, data store 5190, and event processing system 5105 shown in FIG. 50 comprise features and components similar to the service monitoring system 5110, data store 5190, and event processing system 5105 described in relation to FIG. 37, and those similar features and components are not described in detail here.

In some embodiments, the service monitoring system 5110 may further include components comprising a relationship module 6410, an update module 6420, and a retire module 6430. The relationship module 6410, update module 6420, and retire module 6430 can receive input via graphical user interfaces generated by the UI module 5150. The relationship module 6410, update module 6420, and retire module 6430 can provide data to be displayed in the graphical interfaces to the UI module 5150, and the UI module 5150 can cause the display of the data in the graphical user interfaces.

In some embodiments, the data store 5190 may store an entity collection 6450 and a relationship collection 6460. The entity collection 6450 may store a set of entity definitions 6455 and a set of entity search results 6457. The set of entity search results 6457 may comprise results from an entity discovery search, as described in relation to FIG. 46-47, for example. The set of entity definitions 6455 may comprise the information of the set of entity search results 6457 that has been formatted and organized according to a predefined schema specified for an entity definition, examples of which can be found illustrated and discussed elsewhere herein Likewise, the relationship collection 6460 may store a set of relationship definitions 6465 and a set of relationship search results 6467. The set of relationship search results 6467 may comprise results from a relationship discovery search, as described below. The set of relationship definitions 6465 may comprise the information of the set of relationship search results 6467 that has been formatted and organized according to a predefined schema specified for a relationship definition.

The relationship module 6410 may cause a search for entity relationships to be performed on the entity search results 6457 and/or entity definitions 6455 in the entity collection 6450 to produce a set of relationship search results 6467. In one implementation, the relationship module 6410 automatically searches for and identifies the relationships between entities in an IT environment based on a set of search queries generated from a set of relationship rules. The relationship module 6410 may create the set of relationship definitions 6465 based on the set of relationship search results 6467 and store to the relationship collection 6460. Each relationship definition may comprise information for a particular relationship search result that is organized according to a predefined schema. Each relationship definition comprises a data structure that specifies a particular type of relationship between a subject entity and an object entity. The relationship definition may further include additional information/characteristics that describe the subject entity, object entity, and/or the relationship between the subject entities and object entities. The set of relationship definitions 6465 stored to the relationship collection 6450 are then made available for use by administrators or other automated processes. For example, particular requests may be performed on the relationship definitions for displaying one or more relationships via a UI. For example, particular requests may be performed on the relationship definitions by an automated process that initiates corrective actions after identifying an upstream entity causing a problem for a downstream entity.

The update module 6420 may perform an update process that automatically updates item definitions (entity or relationship definitions) stored to an item collection (entity collection 6450 or relationship collection 6460, respectively). The update module 6420 may update an item definition by retrieving the current item definitions from the item collection which comprises a first set of items and performing a new item discovery search on the IT environment that produces a second set of items. The update module 6420 compares the first and second sets of items to determine a set of changed items. The set of changed items may be displayed to a user via a UI generated by the UI module 5150. The set of changed items may then be applied to the item definitions stored in the corresponding item collection to update the item definitions to a new state. The update history in each item definition is also modified to reflect the current update process. The update module 6420 may automatically perform the update process to update the item definitions at predefined time intervals.

The retire module 6430 may perform a retire process that automatically marks and removes outdated item definitions (entity definitions or relationship definitions) stored to an item collection (entity collection or relationship collection, respectively). The retire module 6430 may process each item definition by applying a stale policy to the item definition to determine if the item definition is stale and apply a remove policy to the item definition to determine if the item definition is to be removed from the corresponding item collection. The item definitions determined to be stale or to be removed may be caused to be displayed to a user via a UI generated by the UI module 5150. The retire module 6430 may automatically perform the retire process on the item definitions at predefined time intervals.

6.3.2.2. Discovering Relationships and Generating Relationship Definitions

Techniques described in this section relate to processes performed by the relationship module 6410 for specifying and discovering relationships between entities and generating definitions of the discovered relationships. In a first stage, relationships between entities are searched to produce a set of relationship search results. In a second stage, the relationship module 6410 then generates a set of relationship definitions from the set of relationship search results, which are both stored to a relationship collection 6460. In a third stage, the set of relationship definitions are made available for use and display by the administrator or automated processes, whereby various requests/operations may be performed on the relationship definitions.

Before the relationship module 6410 performs the functions of the first, second, and third stages, it is assumed that various embodiments described above have already been performed to discover and collect information for entities within the IT system. For example, it may be assumed that an entity discovery search has been performed, entity search results 6457 have been received for the entity discovery search, and entity definitions 6455 have been created based on the entity search results 6457, as described in relation to FIG. 46-47. The entity search results 6457 and entity definitions 6455 have also been stored to the entity collection 6450.

Each entity search result and entity definition for a particular entity includes information collected for the particular entity. The collected entity information for a particular entity comprises characteristics of the particular entity, such as names, aliases, user, role, owner, operating system, etc. Each entity search result and entity definition may organize the collected entity information into a set of field-value pairs, each field-value pair comprising a field and one or more values for the field, as described in relation to FIG. 47, for example. In some embodiments, in addition to the characteristics of an entity previously described above (such as names, aliases, user, etc.), the collected entity information in an entity search result and/or entity definition may also include information that indicates relationships to other entities within the IT environment.

FIG. 51 is a conceptual diagram of an example of collected entity information 6500 included in an entity search result or entity definition for an entity, in accordance with one or more implementations of the present disclosure. In the example shown in FIG. 51, the collected entity information 6500 is associated with an entity comprising a database instance. As shown, the collected entity information 6500 may include a plurality of entries 6510. Each entry 6510 may comprise a field-value pair comprising a field 6520 and one or more values 6530 for the field. Each entry 6510 in the collected entity information 6500 may have an ordinal position within the collected entity information 6500. For entries 6510 having multiple values 6530 for a given field 6520, each value 6530 may have an ordinal position within the entry 6510.

In the example shown in FIG. 51, the collected entity information 6500 may include relationship information that indicates relationships to other entities within the IT environment. The relationship information may be organized as entries comprising field-value pairs. For example, the relationship information may include entries for "Subject Field for hosted_by:" and "Object Field for hosted_by:" that specify relationships to other entities. The entry for "Subject Field for hosted_by:" may comprise the field from which the subject value is supplied to a subject-predicate-object relationship. The entry for "Object Field for hosted_by:" may comprise the field from which the object value is supplied to the subject-predicate-object relationship. The entry for "Entity fields:" may comprise identifier or informational fields for the entity. In the example of FIG. 51 shows that the subject in the 'database_instance' field is hosted by the object in the 'host' field (database_instance is hosted by host).

After collected entity information for entities within the IT environment is stored as a set of entity search results 6457 or a set of entity definitions 6455 in the entity collection 6450, the relationship module 6410 may perform the first stage. In the first stage, the relationship module 6410 may specify a set of relationship rules that indicate the types of entity relationships to be searched in the entity collection 6450. Each relationship rule may specify a particular type of relationship between two entities. Each relationship rule may be specified as a "triple" of fields comprising fields for subject entity, predicate, and object entity. The relationship rules may be predetermined (e.g., retrieved from a database) and/or received through a UI from a user having knowledge of the IT environment and the types of relationships typically found between the entities. Each relationship rule may further specify a type of subject entity and a type of object entity to be searched, whereby the predicate specifies the type of relationship between the subject entity and object entity that is to be searched. Examples of predicates include "hosts," "hosted_by," "impacts," "impacted_by," etc. For example, an OS host may host a Hypervisor, a Hypervisor may host a VM (virtual machine), and a VM may host a database instance. For example, a subject entity may "impact" an object entity when the subject entity comprises a resource that can cause the object entity to behave differently. For example, a storage server (subject entity) may impact a VM host (object entity). The predicate "impacted_by" is the inverse of the predicate "impact." For example, "storage_srv1 impacts host1" is equivalent to "host1 impacted_by storage_srv1."

For example, a first relationship rule may specify "host* hosts database*" which specifies a relationship that has a host-type entity (subject entity) that hosts (predicate) a database-type entity (object entity). A first search query based on the first relationship rule would thereby search for all relationships where a host entity hosts a database entity. The subject and object each comprise an entity that may be identified in a search result by the entity name or various aliases of the entity. Therefore, the first search query may return the identities (names or aliases) of all subject entities and object entities that match the relationship specified in the first relationship rule.

As another example, a second relationship rule may specify "VM* hosted by hypervisor*" which specifies a relationship comprising a VM-type entity (subject entity) that is hosted by (predicate) a hypervisor-type entity (object entity). A second search query based on the second relationship rule would thereby search for all relationships where a VM entity is hosted by a hypervisor entity. The subject and object each comprise an entity that may be identified in a search result by the entity name or various aliases of the entity. Therefore, the second search query may return the identities (names or aliases) of all subject entities and object entities that match the relationship specified in the second relationship rule.

The relationship module 6410 generates a set of search queries based on the set of relationship rules and applies the set of search queries to the entity search results or entity definitions stored to the entity collection 6450. For example, the set of search queries may include "search query1=host* hosts database*" and "search query2="VM* hosted by hypervisor*."

The relationship module 6410 may perform the set of search queries by implementing a new modular input (an "entity_relationship" modular input) that is configured for searching the entity collection 6450 using the set of search queries. A modular input may comprise a management routine (modular or scripted input) used by an application to perform a specific management function. Typical examples of functions of a modular input include querying a database, web_service, or API, stream results from a request or command, reformatting complex data, and the like. A modular input API may provide REST API access, whereby platform REST endpoints access modular input scripts. A modular input may sometimes be referred to as a "source" herein.

The "entity_relationship" modular input may be called by a user via a UI to discover entity relationships within the IT environment. The user may enter the set of relationship rules via a UI or the set of relationship rules may be saved to a file and loaded to the modular input. The "entity_relationship" modular input receives the set of relationship rules and produces and performs a set of search queries based on the set of relationship rules. The set of search queries may be stored to a file and loaded to the "entity_relationship" modular input later to perform the same relationship search queries at a later time, such as during an update process described below.

The "entity_relationship" modular input applies the set of one or more search queries to the entity search results or entity definitions stored to the entity collection 6450 to produce a set of relationship search results comprising zero or more relationship search results for each search query. The "entity_relationship" modular input executes each search query in the set of search queries by finding all entity pairs in the entity collection 6450 that have a relationship matching the search query, and producing a relationship search result for each such matching entity pair. The "entity_relationship" modular input may do so by finding entity pairs having fields and field values that match and align with the fields and field values contained in search query. For example, the "entity_relationship" modular input may produce each relationship search result for a search query by finding a first entity and a second entity in the entity collection 6450 that have a relationship that matches the subject entity, predicate, and object entity specified in the search query.

In particular, two sub-queries may be performed for each search query in the set of search queries. The first sub-query searches for all subject entities that match the type of subject entity specified in the search query and the second sub-query searches for all object entities that match the type of object entity specified in the search query. After all subject entities and object entities matching the entity types specified in the search query are identified, the predicate condition of the search query is applied to identify pairs of subject entities and object entities that match the predicate condition specified in the search query. The "entity_relationship" modular input may then generate each relationship search result using the subject, predicate, object format of the corresponding search query.

For example, assume the "entity_relationship" modular input is to perform search query1="host* hosts database*" to discover all relationships where a host entity hosts a database entity. Assume that, in the entity collection 6450, there is an entity search result and/or entity definition for a first entity and a second entity. The collected entity information for the first entity indicates that it is a host entity named "abc." The collected entity information for the second entity indicates that it is a database entity named "xzy" that is hosted by host "abc." A first sub-query for subject entities is performed to identify all entities that are identified as host entities (such as search: inputlookup itsi_entities where host=*). A second sub-query for object entities is performed to identify all entities that are identified as database entities that are hosted by a host and the identity of the host (such as search: inputlookup itsi_entities where database=* and host=*). Note that the type of entity may be specified by the "Entity Type" field in the entity search result or entity definition. Thus, the first sub-query will return a set of subject entities that are hosts, including the first entity. Each host entity in the set of subject entities is referred to as a "subject host." Thus, the first entity is considered a subject host. The second sub-query will return a set of object entities that are databases that have an identified host, including the second entity. Thus, the set of object entities also includes a set of identified hosts that host databases. Each host identified in the set of object entities is referred to as an "object host." Thus, the first entity is also considered an object host since it hosts the second entity comprising a database entity.

The predicate condition ("hosts") of search query1 is then applied to each combination of identified subject and object entities to identify pairs of subject entities and object entities that match the predicate condition. For each pair of subject entities and object entities, the predicate condition dictates that a relationship will be established between the pair of subject and object entities only if a subject host of the subject entity matches an object host of the of the object entity (subject.host==object.host). In the example for the first entities and second entities, the subject host comprises the first entity and the object host also comprises the first entity. Thus the subject host of the subject entity matches the object host of the of the object entity, and the predicate condition is satisfied. Consequently, a first relationship between the first and second entities may be established/specified. The first relationship may be produced by using the predicate to specify the nature of the relationship between the two entities to produce a relationship such as "host abc hosts database xyz" or the like.

In this example, the first identified relationship is used to produce one search result for search query1. For each relationship search result generated for an identified relationship, the "entity_relationship" modular input may also collect additional information regarding the subject entity or object entity and store the additional information to the relationship search result for the identified relationship. For example, the "entity_relationship" modular input may retrieve some or all of the information from the entity search results or entity definitions for the subject entity or object entity and store the information to the relationship search result.

The set of relationship search results may then be caused to be displayed to the user via a UI. The name of a particular relationship search result may comprise the identified relationship itself, such as "host abc hosts database xyz." A listing of the relationship search results for each search query may be caused to be displayed in a UI, for example, by displaying a list of the names of the relationship search results in the UI.

Figure 52:
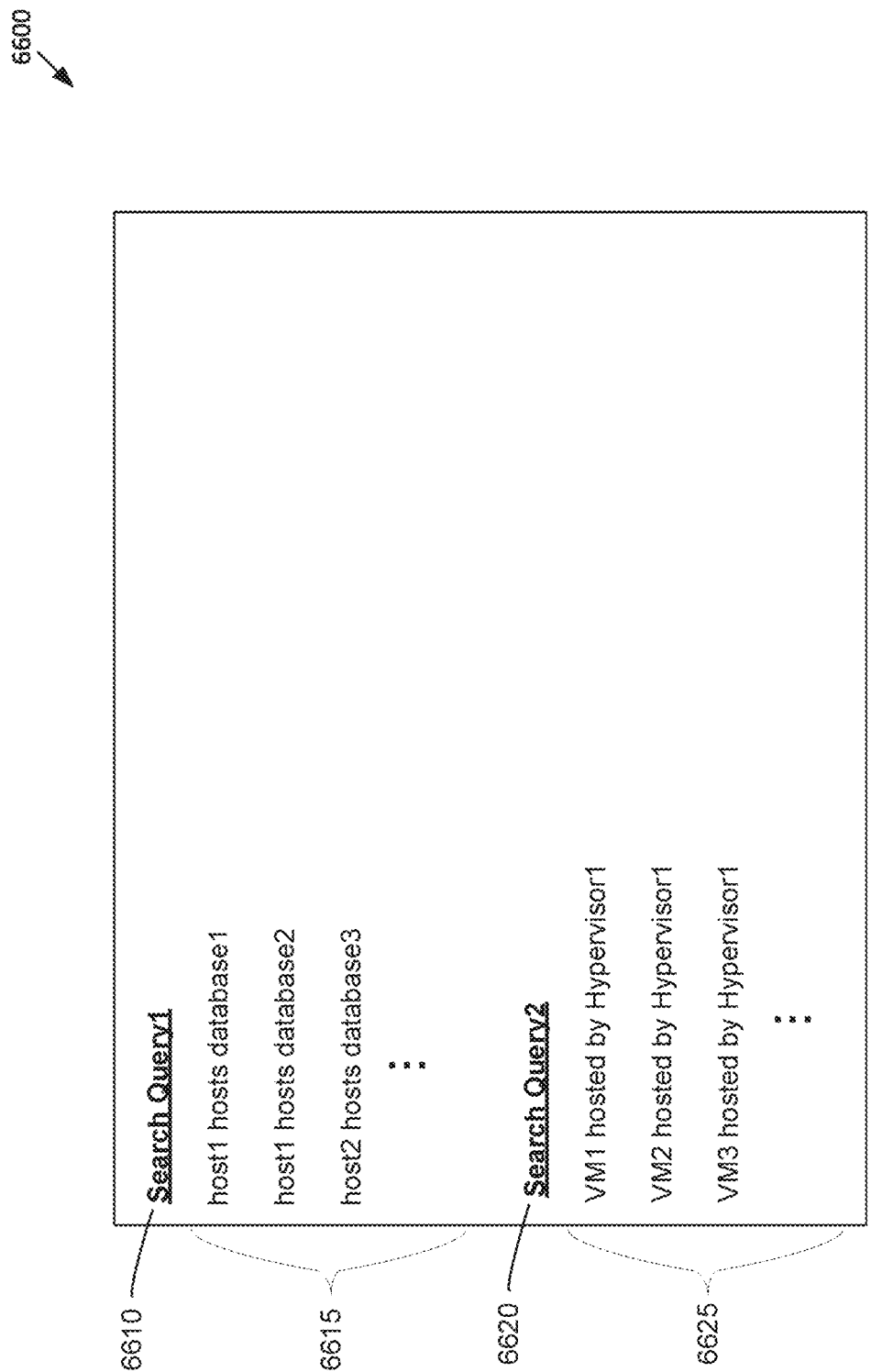
FIG. 52 illustrates an example of a GUI displaying relationship search results for first and second search queries, in accordance with one or more implementations of the present disclosure.

FIG. 52 illustrates an example of a GUI 6600 displaying relationship search results for first and second search queries, in accordance with one or more implementations of the present disclosure. As shown, the GUI 6600 displays a first search query 6610 (e.g., search query1="host* hosts database*) and a first set of relationship search results 6615 returned for the first search query 6610. The GUI 6600 also displays a second search query 6620 (e.g., search query2="VM* hosted by hypervisor*) and a second set of relationship search results 6625 returned for the second search query 6620. The GUI 6600 displays a listing of the names of each relationship search result, such as "host1 hosts database1," "host1 hosts database2," "host2 hosts database3," etc. for the first search query 6610, and "VM1 hosted by Hypervisor1," "VM2 hosted by Hypervisor1," "VM3 hosted by Hypervisor1," etc. for the second search query 6620. In some embodiments, the user may click on a name of a particular relationship search result, and in response, the GUI 6600 may retrieve and cause to be displayed any additional information regarding the relationship, the subject entity, and/or the object entity for the particular relationship search result.

In a second stage, the relationship module 6410 then generates a set of relationship definitions 6465 from the set of relationship search results 6467 and stores the set of relationship definitions 6465 and the set of relationship search results 6467 to the relationship collection 6460. Each relationship definition is a data structure that specifies a particular type of relationship (predicate) between a first entity (subject entity) and a second entity (object entity). As described above, each relationship search result may comprise a name that specifies the subject entity, predicate, and the object entity. The relationship definition may further include additional information and characteristics included in the corresponding relationship search result as well. The additional information may further describe the subject entity, object entity, and/or the relationship between the subject entities and object entities. Each relationship definition may comprise information for a particular relationship search result that is structured and organized according to a predefined schema specified for a relationship definition.

FIG. 53 illustrates an example of a schema for a relationship definition 6700, in accordance with one or more implementations of the present disclosure. In the example shown in FIG. 53, the relationship definition 6700 may include a plurality of entries 6710. Each entry 6710 may comprise a field-value pair comprising a field 6720 and one or more values 6730 for the field. Each entry 6710 in the relationship definition 6700 may have an ordinal position within the relationship definition 6700. For entries 6710 having multiple values 6730 for a given field 6720, each value 6730 may have an ordinal position within the corresponding entry 6710.

In the example shown in FIG. 53, the relationship definition 6700 may include a first entry for a relationship name field containing a string value for specifying the identified relationship (such as "host1 hosts database1"). A second entry may include a key field containing a key value for the relationship definition 6700. The key value may comprise a unique identifier for each relationship definition 6700 and is referred to herein as a relationship identifier (ID). A third entry may include a subject_identifier field comprising a string value specifying one or more identifiers for the subject entity (such as an entity name or different aliases for the entity). A fourth entry may include a predicate field comprising a string value specifying the predicate/relationship between the subject entity and the object entity. A fifth entry may include an object_identifier field comprising a string value specifying one or more identifiers for the object entity (such as an entity name or different aliases for the entity). A sixth entry may include a create_time field comprising a timestamp for when the current relationship definition 6700 is created. A seventh entry may include a create_source field comprising a string value specifying the source from which the current relationship definition 6700 is caused to be created (such as the modular input name, user, UI, etc.).

The relationship module 6410 then stores the set of relationship search results and the set of relationship definitions to the relationship collection 6460 in the data store 5190. A relationship definition can be stored in the data store as a record that contains information about one or more characteristics of a relationship between two entities. The relationship definitions can be stored in the data store 5190 in a key-value store, a configuration file, a lookup file, a database, or the like. Different implementations may use various data storage and retrieval frameworks, a JSON-based database as one example, to facilitate storing relationship definitions (relationship definition records).

In a third stage, the set of relationship definitions 6465 stored to the relationship collection 6460 is made available for use and display by a user, whereby various requests/operations may be performed on the relationship definitions. For example, particular requests may be performed on the relationship definitions for causing display of one or more relationships via a UI generated by the UI module 5150.

Figure 54:
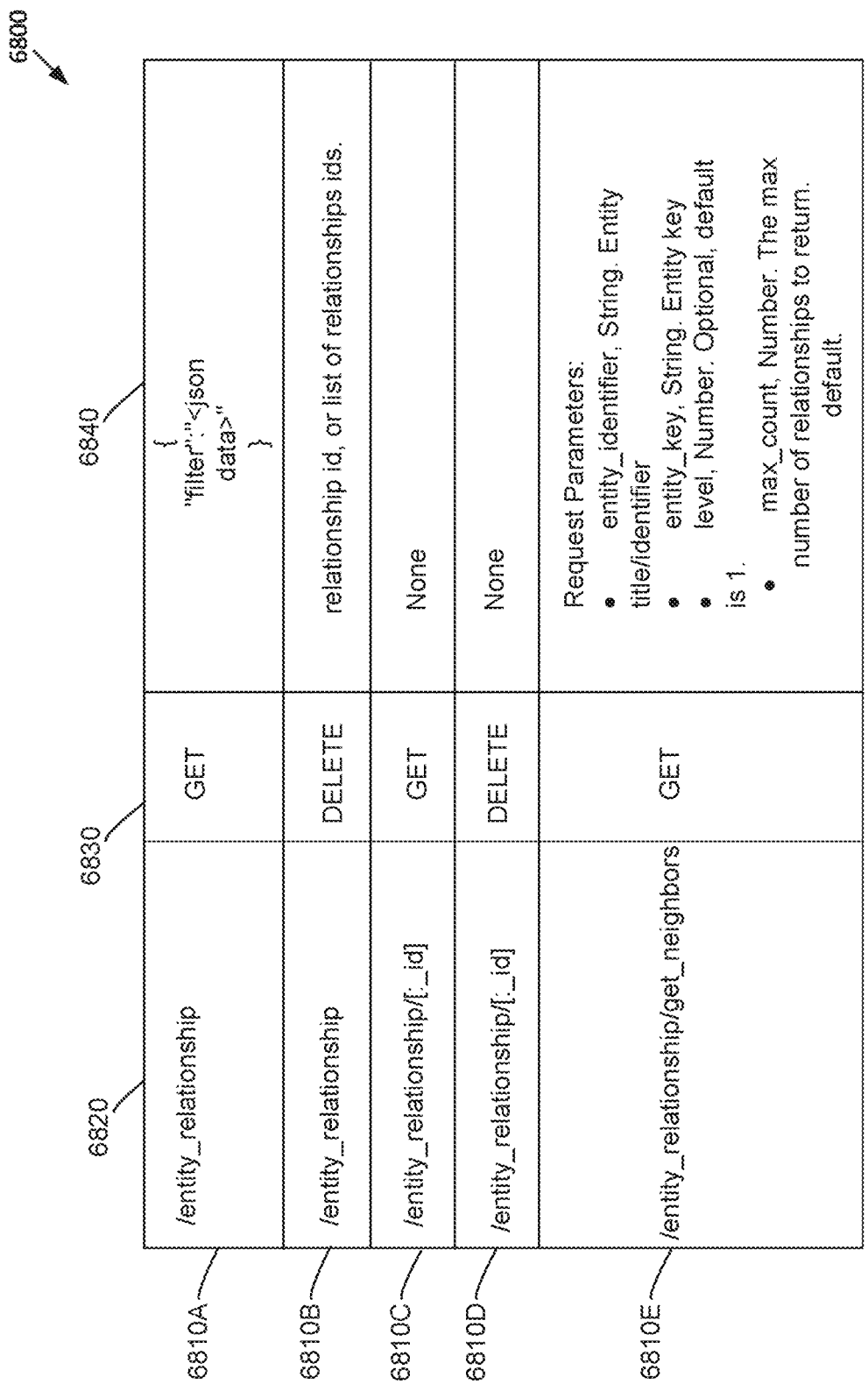
FIG. 54 shows a table of example requests that may be performed on the relationship definitions, in accordance with one or more implementations of the present disclosure.

FIG. 54 shows a table 6800 of example requests that may be performed on the relationship definitions, in accordance with one or more implementations of the present disclosure. The requests may be input by a user through a UI, or by an automated process via an API or other interface, and the results of the requests may be caused to be displayed to the user via a display, or presented to the automated process via the interface. The requested operations may be implemented by the relationship module 6410 via modular inputs and REST Endpoints added to the REST API. As shown, the table 6800 may include a plurality of requests 6810A-10E. Each request 6810 may be specified by a path 6820, an operation type 6830, and a request body 6840. A path 6820 may specify a code path, the operation type 6830 may specify a general type of operation (such as GET, DELETE, etc.), and the request body 6840 may specify what the body of the request includes. The types of requests shown in FIG. 54 are for illustrative purposes only, and in other embodiments, other types of requests may be implemented.

For example, a first request 6810A may comprise a "get stored relationships" request comprising a GET operation that is specified by a particular path and request body shown in FIG. 54. The response may comprise a list of all stored entity relationships that are caused to be displayed in the UI. For example, similar to displaying the set of relationship search results described in relation to FIG. 52, the UI may display a listing of the names of each stored relationship definition. The user may then click on a name of a particular relationship definition, and, in response, the UI may retrieve and cause to be displayed, any additional information contained in the selected relationship definition. Optionally, the first request 6810A may apply filters for a specific subject entity, a specific object entity, or specific subject entity, object entity, and predicate combinations.

A second request 6810B may comprise a "bulk delete relationships" request comprising a DELETE operation that is specified by a particular path and request body (requiring one or more relationship identifiers, such as key values) as shown in FIG. 54. The response may comprise deleting, from the relationship collection 6460, the relationship definitions corresponding to the relationship identifiers and a displayed list of the relationship identifiers of the relationship definitions that have been deleted from the relationship collection 6460.

A third request 6810C may comprise a "single get" request comprising a GET operation that is specified by a particular path including a single relationship identifier, as shown in FIG. 54. The response may comprise retrieving and displaying of the relationship definition corresponding to the specified relationship identifier. A fourth request 6810D may comprise a "single delete" request comprising a DELETE operation that is specified by a particular path including a single relationship identifier, as shown in FIG. 54. The response may comprise deleting, from the relationship collection 6460, the relationship definition corresponding to the relationship identifier and a display of the relationship identifier for the relationship definition that has been deleted.

A fifth request 6810E may comprise a "get neighbors" request comprising a GET operation which is specified by a particular path and request body, as shown in FIG. 54. The "get neighbors" request retrieves all relationships (or a plurality of relationships) that are related to and include a particular specified entity (e.g., specified via the entity_identifier). In response to the "get neighbors" request, the relationship module 6410 may first query the entity collection 6450 to retrieve information for the specified entity, including the entity title and other identifier or alias values. The relationship module 6410 may then query the relationships collection 6460 to retrieve all relationship definitions that contain either a subject_identifier or object_identifier matching the entity title or any of the identifier or alias values for the specified entity. Based on the retrieved relationship definitions, the relationship module 6410 may return one or more relationships that each include the specified entity as a subject entity or an object entity.

The relationship module 6410 may also display the returned relationships to a user via a UI. In some embodiments, the returned relationships may be displayed in the UI using graphics and/or text to visually represent the returned relationships to help users easily visualize the returned relationships. For graphic visualization of the entity relationships, the relationship module 6410 may implement a Javascript library such as d3. The UI may use graphics to visually display one relationship or a plurality of connected relationships that each include the specified entity.

For example, assume that the entity specified in the "get neighbors" request comprises an entity named "host1" having a plurality of various names, identifiers and aliases, such as "IP address: 10.2.13.21" and "hostname: host1.splunk.local" (which are retrieved from the corresponding entity definition for host1). Also, assume the relationship collection 6460 stores relationship definitions for at least first, second, and third relationships. For example, the first relationship may comprise a subject entity (cluster_1), a predicate (hosts), and an object entity (10.2.13.21). The second relationship may comprise a subject entity (10.2.13.21), a predicate (hosts), and an object entity (VM_1234). The third relationship may comprise a subject entity (host1.splunk.local), a predicate (hosts), and an object entity (database_1234). As shown by the information in the corresponding entity definition for host1, the IP address: 10.2.13.21 and hostname: host1.splunk.local each comprise different identifiers or aliases of host1. Accordingly, the relationship module 6410 may retrieve the relationship definitions for the first, second, and third relationships from the relationship collection 6460 and determine that each of the relationships include host1 as a subject entity or an object entity. The relationship module 6410 may then display the first relationship as "cluster_1 hosts host1," the second relationship as host1 hosts VM_1234," and the third relationship as host1 hosts database_1234.

Figure 55:
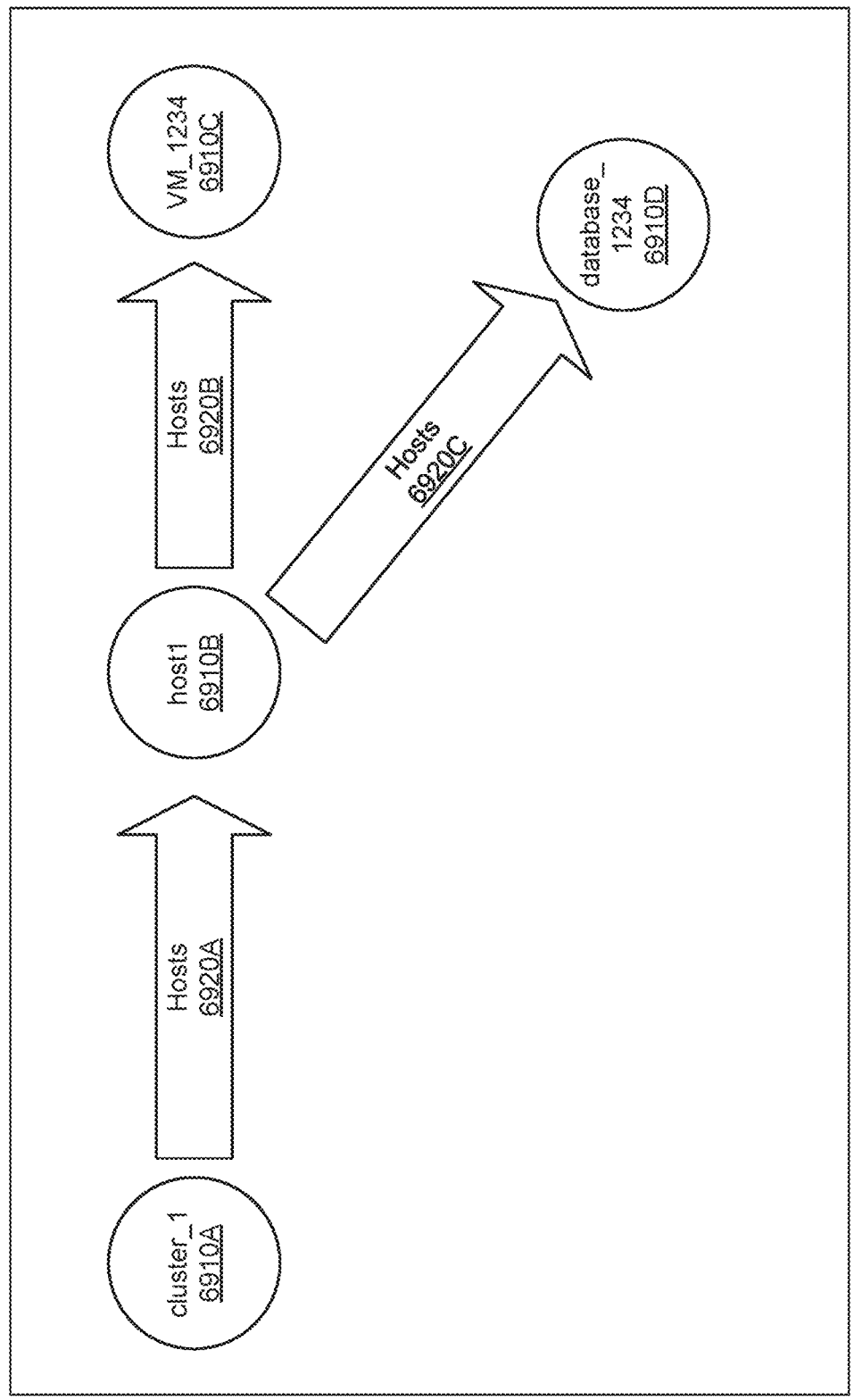
FIG. 55 illustrates an example of a GUI displaying connected relationships using graphics and text, in accordance with one or more implementations of the present disclosure.

In some embodiments, the relationship module 6410 may implement the UI module 5150 to cause display of the returned first, second, and third relationships using graphics to visually represent the returned relationships. In these embodiments, the UI module 5150 may display a single relationship or at least two connected relationships using graphics to visually represent the returned relationships. FIG. 55 illustrates an example of a GUI 6900 displaying connected relationships using graphics and text, in accordance with one or more implementations of the present disclosure. As shown, the connected relationships comprise the returned first, second, and third relationships that are visually represented by graphic nodes 6910 (such as 6910A-D) and graphic connecting arrows 6920 (such as 6920A-C). Each relationship is visually represented by a first node 6910 that represents a subject entity, a second node 6910 that represents an object entity, and a connecting arrow 6920 that represents a predicate or relationship between the subject entity and object entity. The graphic representations of the relationships allows a user to easily visualize the returned relationships and determine that the first, second, and third relationships are connected by the host1 entity which is a subject entity or object entity in each of the relationships. After consideration of the entirety of this disclosure, one of skill in the art may recognize that entity relationships may be represented as directed graphs, just as service dependency relationships; and, accordingly, certain methods and embodiments described for service dependency relationships, such as a topology navigator, may be advantageously employed in relation to entity relationships, and vice versa.

Figure 56:
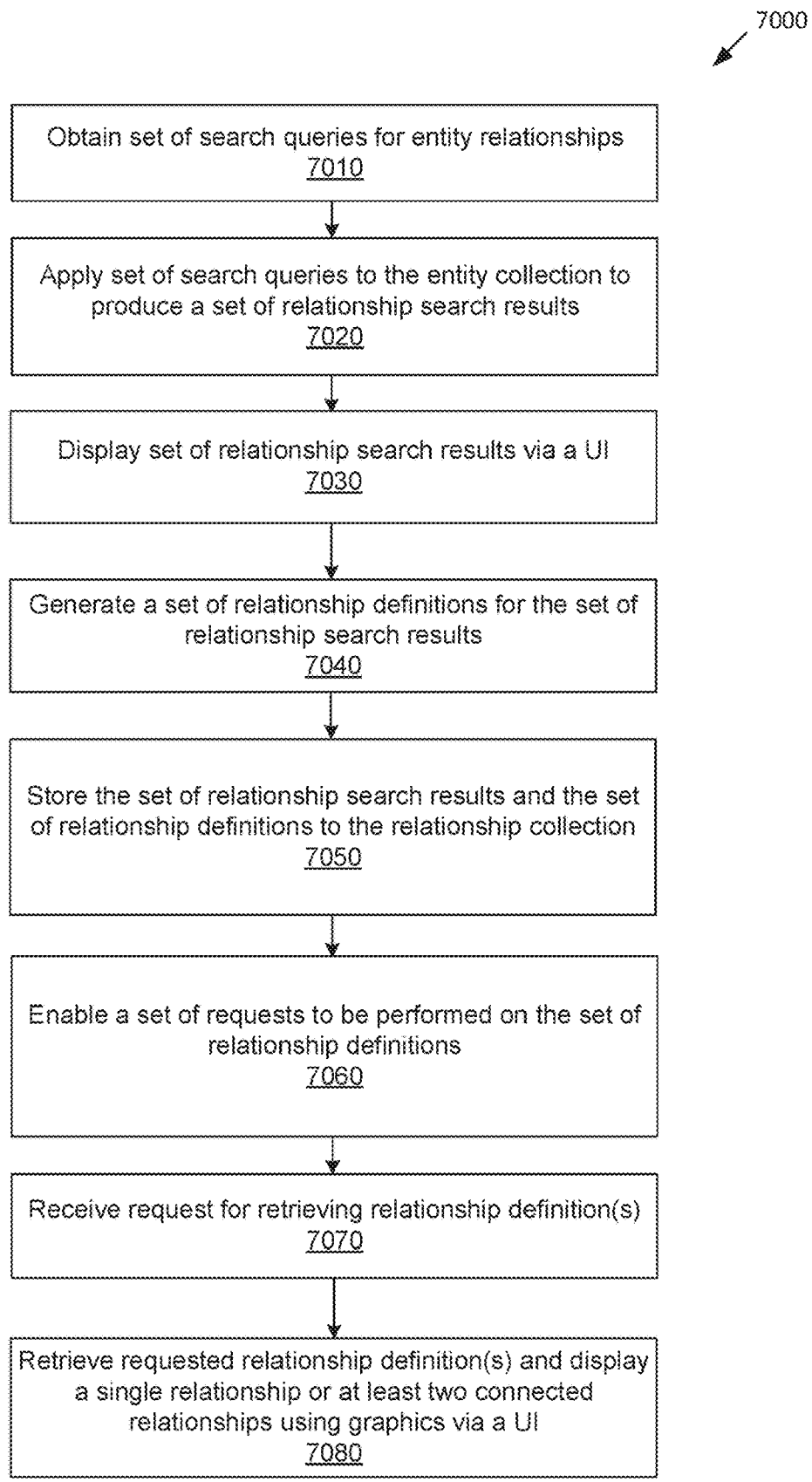
FIG. 56 is a flow diagram of an implementation of a method for discovering entity relationships and generating relationship definitions, in accordance with one or more implementations of the present disclosure.

FIG. 56 is a flow diagram of an implementation of a method 7000 for discovering entity relationships and generating relationship definitions, in accordance with one or more implementations of the present disclosure. The method 7000 may be performed by a relationship module 6410 in conjunction with a UI module 5150 and various modular inputs that reside and execute on a service monitoring system 5110. The service monitoring system 5110 is connected to a data store 5190 storing an entity collection 6450 and a relationship collection 6460 (as shown in FIG. 50). Although the method steps are described in conjunction with the systems of FIG. 50-55, persons skilled in the art will understand that any system configured to perform the method steps, in any order, is within the scope of the present invention.

As shown, a method 7000 begins at step 7010, where a set of one or more search queries for entity relationships is received or generated. The set of search queries may be based on a set of relationship rules that specify the types of entity relationships to be searched. Each relationship rule and search query specifies a particular type of predicate/relationship between a particular type of subject entity and a particular type of object entity that is to be searched in the entity collection 6450. The set of search queries may also be stored to a file and loaded later to perform the same relationship search queries at a later time, such as during an update process described below.

The relationship module 6410 may then apply (at step 7020) the set of one or more search queries to the entity search results or entity definitions stored to the entity collection 6450 to produce a set of relationship search results comprising zero or more relationship search results for each search query. The relationship module 6410 executes each search query in the set of search queries by finding all entity pairs in the entity collection 6450 that have a relationship that matches the search query, and producing a relationship search result for each such matching entity pair. For example, the relationship module 6410 may produce each relationship search result for a search query by finding a first entity and a second entity in the entity collection 6450 which have a relationship that matches the subject entity, predicate, and object entity specified in the search query. Each relationship search result may include information describing an identified relationship, the subject entity, and the object entity. For example, each relationship search result may include a name for the identified relationship (such as "host abc hosts database xyz") and some or all of the information from the entity search results or entity definitions for the corresponding subject entity and/or object entity. The relationship module 6410 may cause display (at step 7030) of the set of relationship search results for the set of search queries to the user via a UI.

The relationship module 6410 generates (at step 7040) a set of relationship definitions for the set of relationship search results. Each relationship definition is generated for a relationship search result and contains the information of the relationship search result that is structured and organized according to a predefined schema specified for a relationship definition. The relationship module 6410 then stores (at step 7050) the set of relationship search results and the set of relationship definitions to the relationship collection 6460 in the data store 5190.

The relationship module 6410 enables (at step 7060) a set of requests, received from a user via a UI, to be performed on the set of relationship definitions stored to the relationship collection 6460. For example, the requests may specify GET or DELETE operations to be performed on one or more relationship definitions stored to the relationship collection 6460. The relationship module 6410 receives (at step 7070) a request for retrieving one or more relationship definitions through a GET operation. In response, the relationship module 6410 retrieves the requested relationship definitions from the relationship collection 6460 and causes display (at step 7080) of the retrieved relationship definitions via the UI, or other presentation via an interface such as to an automated process that provided the request of block 7070. In some embodiments, the relationship module 6410 may implement the UI module 5150 to display a single relationship or at least two connected relationships using graphics to visually represent the retrieved relationships.

6.3.2.3. Updating Entity and Relationship Definitions

As discussed above, within the service monitoring system 5110, there are currently no administrative tools to update entity and relationship definitions and retire/remove outdated entity and relationship definitions that are no longer needed. Retaining definitions of obsolete entities and/or relationships may congest the entity definitions and relationship definitions and may provide an inaccurate and outdated view of the entities and relationships within the IT environment. For environments with a multitude of entities and relationships, it is difficult for administrators to continuously monitor and update entity and relationship definitions and remove outdated definitions.

This section of the disclosed technique describes embodiments for automatically updating entity and relationship definitions stored to the entity collection and relationship collection, respectively. The technique may be performed by the update module 6420 executing on the service monitoring system 5110 to automatically perform an update process on the entity definitions and relationship definitions. In these embodiments, an entity definition and a relationship definition each comprise a schema that includes additional field entries for storing an update history, a cleanup state, and a stale-state time when a particular definition was determined to become stale. The update module 6420 may automatically perform the update process to update the entity and/or relationship definitions at predefined time intervals. In this manner, the entity definitions 6455 stored to the entity collection 6450 and the relationship definitions 6465 stored to the entity collection 6450 may be easily updated by the update module 6420.

As used in the below description, an "item" may refer to an entity or a relationship. The term "item" may be used in relation to features that are similar for both entities and relationships and processes that are performed in a similar manner for both entities and relationships. For example, an item search result indicates an entity search result and/or a relationship search result, an item definition indicates an entity definition and/or a relationship definition, an item collection indicates an entity collection and/or a relationship collection, etc.

Figure 57:
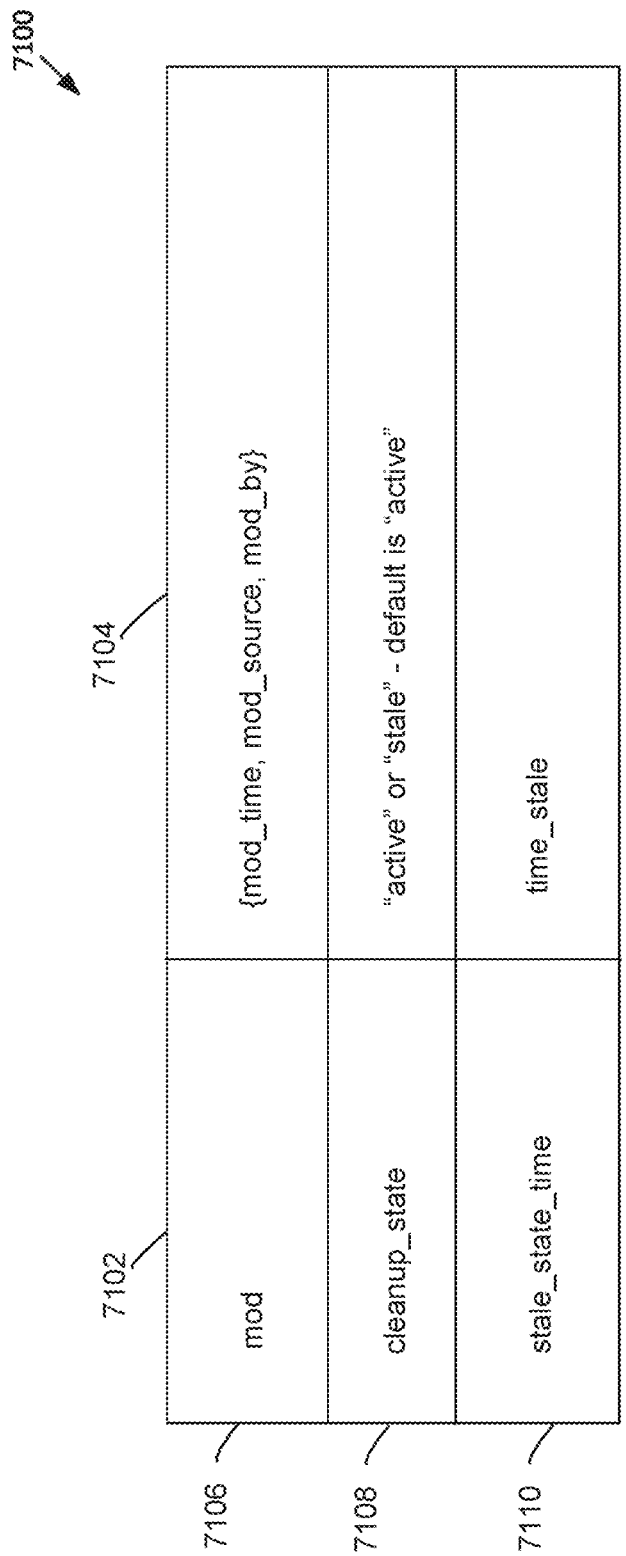
FIG. 57 illustrates an example of a set of additional entries that are included in a schema for an item definition, in accordance with one or more implementations of the present disclosure.

FIG. 57 illustrates an example of a set of additional entries 7100 that are included in a schema for an item definition, in accordance with one or more implementations of the present disclosure. Each entry in the set of additional entries 7100 comprises a field-value pair comprising a field 7102 and one or more values 7104 for the field. Each additional entry may have an ordinal position within the item definition. For entries having multiple values 7104 for a given field 7102, each value 7104 may have an ordinal position within the corresponding entry. As shown, the set of additional entries 7100 comprises an entry for update history 7106, cleanup state 7108, and stale-state time 7110. The update history 7106 is used by the update module 6420 during an update process. The update history 7106, cleanup state 7108, and stale-state time 7110 are used by the retire module 6430 during a retire process, described below.

The entry for update history 7106 comprises a "mod" field 7102 and values 7104 for the field comprising an array. The array includes values for a mod_time, mod_source, and mod_by. The value for mod_time specifies the time (such as a timestamp) when the current item definition record is last updated. The value for mod_source specifies a source from which the definition record is updated, such as a modular input name, UI, or REST. Thus, the value for mod_source may specify the source that caused the update process to be performed, such as a modular input that may periodically and automatically perform the update process or a UI when a user manually inputs a request to perform the update process. The value for mod_by specifies a user who caused an update of the current item definition record.

The update module 6420 may perform an update process that automatically updates item definitions (entity or relationship definitions) stored to an item collection (entity collection 6450 or relationship collection 6460, respectively). The update process may be automatically initiated by the update module 6420 at predetermined intervals to periodically update the item definitions. In other embodiments, the update process may be manually initiated the user (via a command submitted in a UI) in an ad hoc manner. The update module 6420 performs the update process by implementing a modular input as a management routine that is scripted to perform various functions of the update process.

Figure 58:
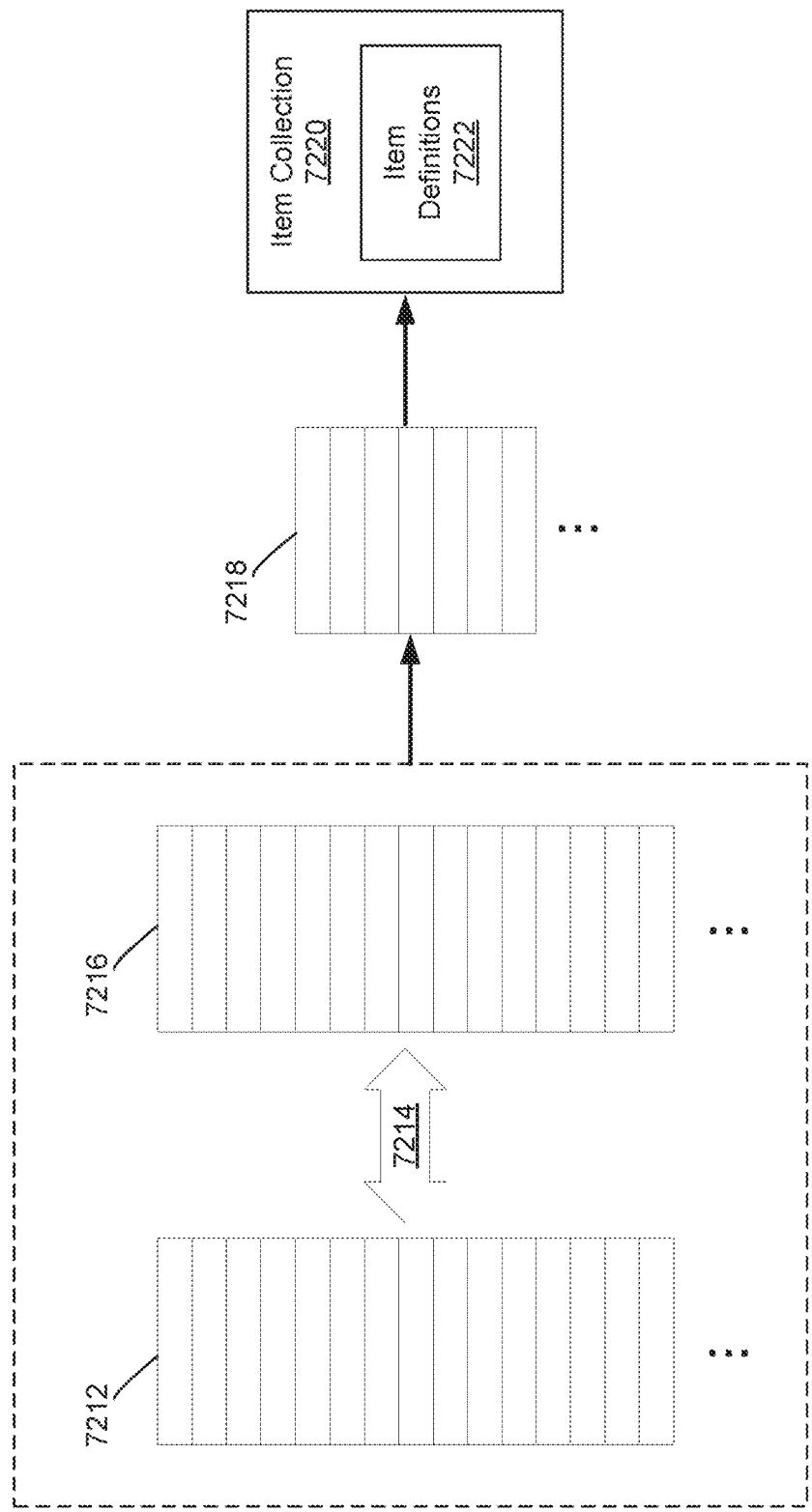
FIG. 58 is a conceptual diagram of operations performed during an update process, in accordance with one or more implementations of the present disclosure.

FIG. 58 is a conceptual diagram of operations performed during an update process, in accordance with one or more implementations of the present disclosure. The update module 6420 may update the item definitions by retrieving a set of current item definitions that are currently stored in the item collection. As shown, the set of current item definitions comprise a first set of items 7212. The update module 6420 may also perform a new item discovery search that produces a new set of item search results, which comprises a second set of items 7216. The new item discovery search may comprise a same or similar search that was previously used to produce the set of current item definitions. For example, the new item discovery search may comprise a new entity discovery search that discovers a new set of entities within an IT environment. The new entity discovery search may comprise a same or similar search that was previously used to produce the set of entity definitions 6455 currently stored to the entity collection 6450. This previous entity discovery search may be stored to the data store 5190 and loaded during the update process to perform the new entity discovery search. Likewise, the new item discovery search may comprise a new relationship discovery search that discovers a new set of relationships between entities within an IT environment. The new entity discovery search may comprise a same or similar search that was previously used to produce the set of current relationship definitions 6465 stored to the relationship collection 6460. This previous relationship discovery search may be stored to the data store 5190 and loaded during the update process to perform the new relationship discovery search.

The update module 6420 may perform a comparison (represented by arrow 7214) between the first set of items 7212 and the second set of items 7216. The comparison 7214 is used to determine a set of changed items 7218 comprising a set of zero or more items that have changed from the first set of items 7212 to the second set of items 7216. The set of changed items 7218 may comprise one or more new items, removed items, modified items, or any combination thereof. A new item may comprise an item included in the second set of items 7216 that is not included in the first set of items 7212. A removed item may comprise an item included in the first set of items 7212 that is not included in the second set of items 7216. A modified item may comprise an item included in both the first set of items 7212 and the second set of items 7216, where some of the information for the item has been modified since the first set of items 7212 was generated. As an optional step, after the set of changed items 7218 are determined, the update module 6420 may cause the set of changed items 7218 to be displayed to a user via a UI which enables the user to edit, modify. delete, select, deselect, approve, or otherwise interact with the changed items 7218 individually or in the aggregate.

The update module 6420 may then apply the set of changed items 7218 to the item definitions 7222 (entity definitions 6455 or relationship definitions 6465) stored in the item collection 7220 (entity collection 6450 or relationship collection 6460, respectively) to update the item definitions to a new state. In this step, the identified changes are incorporated into the item definitions. For example, for a new item, the update module 6420 generates a new item definition for the new item and store to the item definitions 7222. For a removed item, the update module 6420 identifies the item definition that corresponds to the removed item in the item definitions 7222 and removes the corresponding item definition from the item definitions 7222. For a modified item, the update module 6420 identifies the item definition that corresponds to the modified item in the item definitions 7222 and updates the information in the corresponding item definition to reflect the modifications.

The update module 6420 also updates the update history in each item definition in the item definitions 7222 to reflect the current update process. In particular, the update module 6420 updates the entry for update history 7206 in the item definition, such as updating the values for mod_time, mod_source, and/or mod_by to reflect the current update process.

Figure 59:
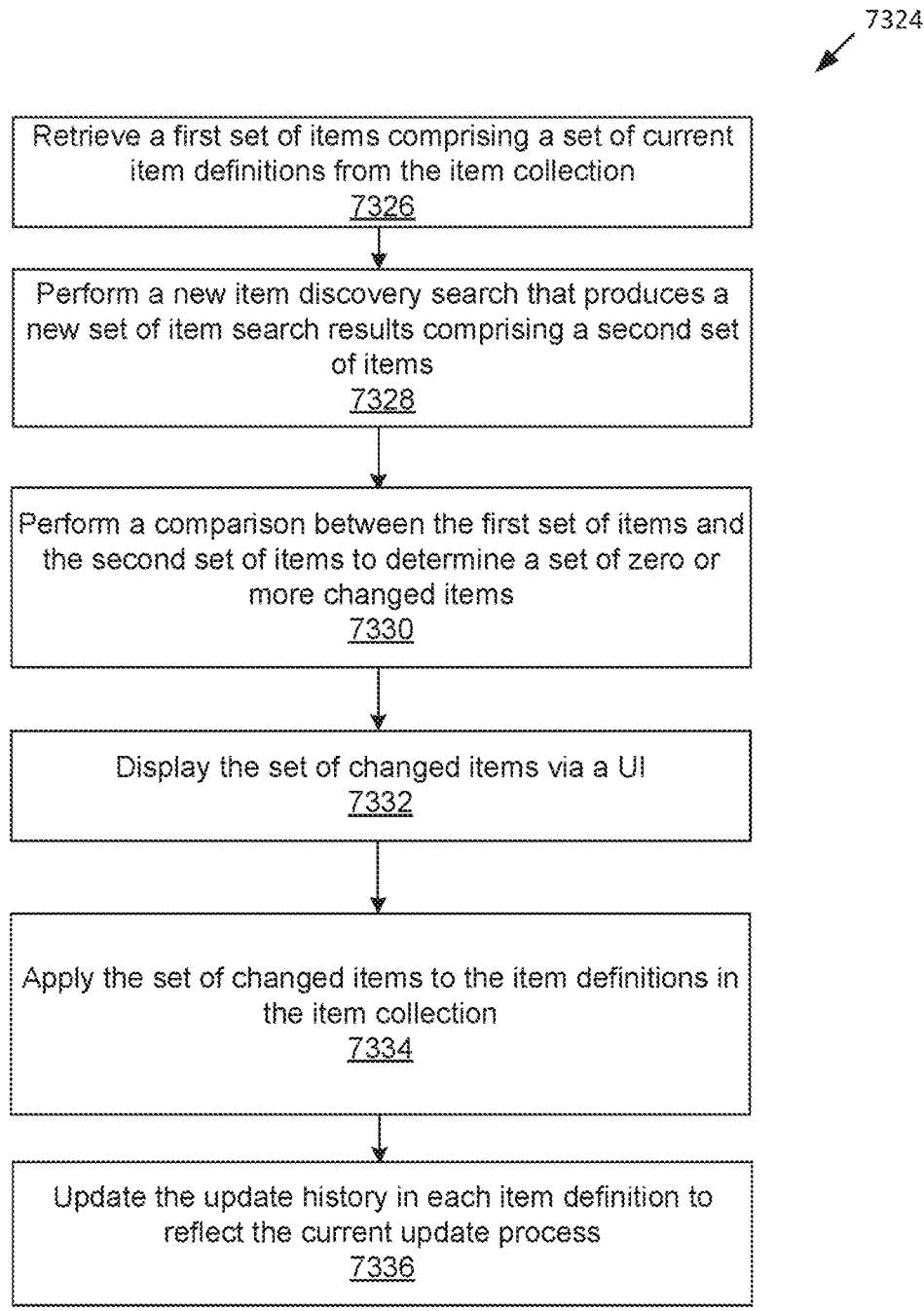
FIG. 59 is a flow diagram of an implementation of a method for updating entity and relationship definitions, in accordance with one or more implementations of the present disclosure.

FIG. 59 is a flow diagram of an implementation of a method 7324 for updating entity and relationship definitions, in accordance with one or more implementations of the present disclosure. The method 7324 may be performed by an update module 6420 in conjunction with a UI module 5150 and various modular inputs that reside and execute on a service monitoring system 5110. The service monitoring system 5110 is connected to a data store 5190 storing an item collection 7220 (entity collection 6450 or relationship collection 6460). Although the method steps are described in conjunction with the systems of FIGS. 50-55 and 57-58, persons skilled in the art will understand that any system configured to perform the method steps, in any order, is within the scope of the present invention.

The update module 6420 may automatically perform the method 7324 of the update process at predetermined intervals to periodically update the item definitions. In this manner, the item definitions 7222 stored to the item collection 7220 may be easily updated by the update module 6420. In other embodiments, the method 7324 of the update process may be manually initiated by the user (via a command submitted in a UI) in an ad hoc manner.

As shown, a method 7324 begins at step 7326, where the update module 6420 retrieves a set of current item definitions 7222 from the item collection 7220. The set of current item definitions 7222 comprises a first set of items 7212 that currently exist in the item collection 7220. The update module 6420 also performs (at 7328) a new item discovery search that produces a new set of item search results. The new set of item search results comprises a second set of items 7216. The search queries for the new item discovery search may comprise the same or similar search queries that were previously used to produce the set of current item definitions 7222.

The update module 6420 then performs (at step 7330) a comparison between the first set of items 7212 and the second set of items 7216 to determine a set of zero or more changed items 7218. The changed items 7218 may comprise zero or more new items, removed items, modified items, or any combination thereof. As an optional step, update module 6420 causes the set of changed items 7218 to be displayed (at step 7332) to a user via a UI.

The update module 6420 then applies (at step 7334) the set of changed items 7218 to the item definitions 7222 stored in the item collection 7220 to update the item definitions 7222 to a new state. In this step, the identified changes are incorporated into the item definitions 7222. The update module 6420 also updates (at step 7336) the update history in each item definition in the item definitions 7222 to reflect the current update process. The method 7324 then ends.

6.3.2.4. Retiring Entity and Relationship Definitions

This section describes a technique for automatically retiring/removing outdated item definitions (entity or relationship definitions) stored to the item collection (entity collection or relationship collection, respectively). The technique may be performed by the retire module 6430 executing on the service monitoring system 5110. The retire process is applied to the item collection to determine whether to retire/remove any of the item definitions from the item collection 7220. The retire module 6430 may automatically perform a retire process at predefined time intervals. In this manner, outdated item definitions stored to the item collection 7220 may be easily marked as stale and removed from the item collection 7220 by the retire module 6430. In other embodiments, the retire process may be manually initiated by the user (via a command submitted in a UI) in an ad hoc manner. The retire module 6430 may perform the update process by implementing a modular input as a management routine that is scripted to perform various functions of the retire process.

The retire process may be performed by the retire module 6430 by applying stale and remove policies on the additional field entries 7100 (shown in FIG. 57) contained in the item definitions. The stale and remove policies may be stored to a file and loaded by the retire module 6430 upon execution of the retire process. An item definition comprises a schema that includes additional field entries 7100 comprising an entry for update history 7106, cleanup state 7108, and stale-state time 7110 (as shown in FIG. 57). The value for the cleanup state 7108 indicates the state of the item definition, such as "active" or "stale," whereby the default value is "active." For example, for any item definition added to the item definitions 7222 through a relationship discovery process, the state of the cleanup state 7108 is set to "active" by default. Further, for any newly created item definition added to the item definitions 7222 through the update process, the state of the cleanup state 7108 is also set to "active" by default. The value for the stale-state time 7110 indicates the time that the item definition was determined to become stale.

The retire module 6430 may process an item definition by applying the stale policy to the information in the update history 7106 to determine a state ("active" or "stale") for the cleanup state 7108 and to update the value for the stale-state time 7110 if needed. The stale policy may specify conditions for when to change a state of an item definition to "stale." For example, the stale policy may specify that an item definition is determined to be stale if a time difference between a current time (time that the retire process executes) and a time of the last update exceeds a threshold time period. The time of the last update is specified by the value for mod_time in the update history 7106 in the item definition. If an item definition is determined to be stale based on the stale policy (e.g., exceeds the time threshold), then the value for the cleanup state 7108 is set to equal "stale" and the value for the stale-state time 7110 is set to equal the current time.

The retire module 6430 may further process an item definition by applying the remove policy to the stale-state time 7110 in the item definition to determine whether or not to remove the item definition from the item collection 7220. The remove policy may specify conditions for when to remove an item definition from the item collection 7222. For example, the remove policy may specify that an item definition is to be removed from the item collection if a time difference between a current time and the stale-state time exceeds a threshold time period. If it is determined that an item definition is to be removed based on the remove policy (exceeds the time threshold), then the retire module 6430 removes the item definition from the item collection.

As an alternative embodiment, an entity definition may be processed differently than a relationship definition with respect to removal. In such alternative embodiments, when the conditions for removing an entity definition are satisfied, instead of removing the entity definition, the value for the cleanup state 7108 is set to "alarm." As an optional step, the retire module 6430 may display the item definitions determined to be stale or to be removed via a UI generated by the UI module 5150. In other embodiments, items may be deleted at the time they are determined to be stale, effectively going from active to deleted/removed (finally retired) from the corresponding collection, with no intermediate state (i.e., "stale state"). In further embodiments, there may be zero to N phases in the retirement process with fewer or greater stages than the stages described above. These and other embodiments are possible that vary the transition out of the active state for items that are identified for retirement.

Figure 60:
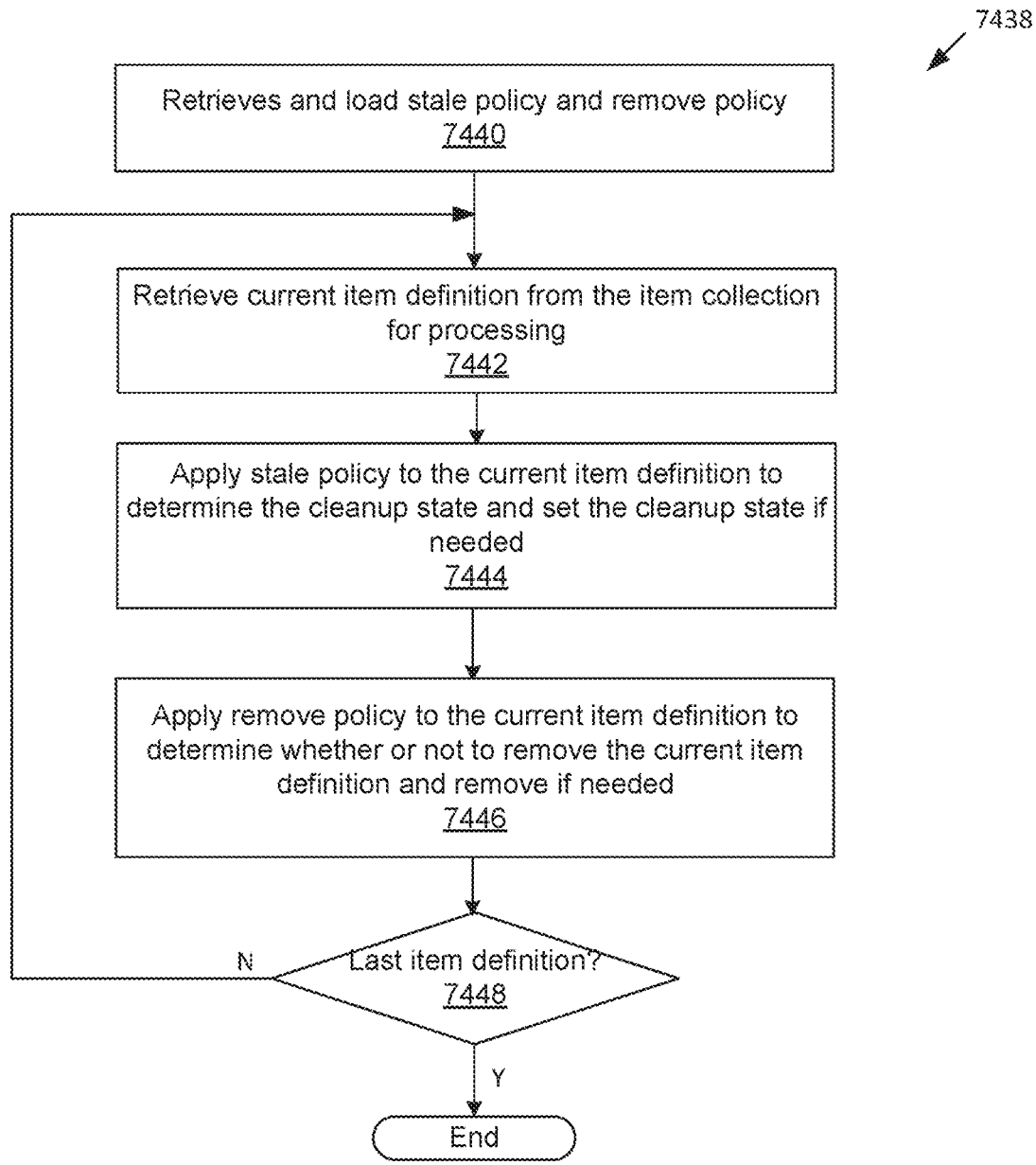
FIG. 60 is a flow diagram of an implementation of a method for retiring entity and relationship definitions, in accordance with one or more implementations of the present disclosure.

FIG. 60 is a flow diagram of an implementation of a method 7438 for retiring entity and relationship definitions, in accordance with one or more implementations of the present disclosure. The method 7438 may be performed by a retire module 6430 in conjunction with a UI module 5150 and various modular inputs that reside and execute on a service monitoring system 5110. The service monitoring system 5110 is connected to a data store 5190 storing an item collection 7220 (entity collection 6450 or relationship collection 6460). Although the method steps are described in conjunction with the systems of FIGS. 50-55 and 57-58, persons skilled in the art will understand that any system configured to perform the method steps, in any order, is within the scope of the present invention.

The retire module 6430 may automatically perform the method 7438 of the retire process at predetermined intervals to periodically retire/remove outdated item definitions. In this manner, the item definitions 7222 stored to the item collection 7220 may be easily updated by the retire module 6430. In other embodiments, the method 7438 of the retire process may be manually initiated the user (via a command submitted in a UI) in an ad hoc manner.

As shown, a method 7438 begins at step 7440, when the retire module 6430 retrieves and loads a stale policy and remove policy (e.g., from a data store 5190). In some embodiments, the stale policy may specify that an item definition is determined to be stale if a time difference between a current time and a time of the last update exceeds a threshold time period. For example, the remove policy may specify that an item definition is to be removed from the item collection if a time difference between a current time and the stale-state time exceeds a threshold time period. The retire module 6430 then retrieves (at step 7442) a current item definition from the item collection 7220 for processing.

The retire module 6430 then applies (at step 7444) the stale policy to the current item definition to determine the cleanup state of the current item definition. For example, the retire module 6430 may determine a time difference between a current time and a time of the last update (as specified by the value for mod_time in the update history 7106). The retire module 6430 may then determine whether the time difference exceeds the time threshold specified in the stale policy. If it is determined that the time difference exceeds the time threshold, the retire module 6430 determines that the current item definition is stale and sets the value for the cleanup state 7108 to "stale" and the value for the stale-state time 7110 to the current time. If the time difference does not exceed the time threshold, then the retire module 6430 determines that the current item definition is not stale and does not modify the values for the cleanup state 7108 or the stale-state time 7110 in the current item definition.

The retire module 6430 then applies (at step 7446) the remove policy to the current item definition to determine whether or not to remove the current item definition and to remove the current item definition from the item collection 7220 if needed. For example, the retire module 6430 may determine a time difference between a current time and a time that the item definition was determined to become stale (as specified by the value for stale-state time 7110 of the current item definition). The retire module 6430 may then determine whether the time difference exceeds the time threshold specified in the remove policy. If it is determined that the time difference exceeds the time threshold, then the retire module 6430 determines that the current item definition is to be removed and removes the current item definition from the item collection 7220. If the time difference does not exceed the time threshold, then the retire module 6430 determines that the current item definition is not to be removed from the item collection 7220.

The retire module 6430 then determines (at step 7448) whether the current item definition is the last item definition in the item collection 7220. If not, the retire module 6430 continues at step 7442 and retrieves a next item definition in the item collection 7220 for processing. If so, the method 7438 then ends.

6.4. Service Definition

Figure 61:
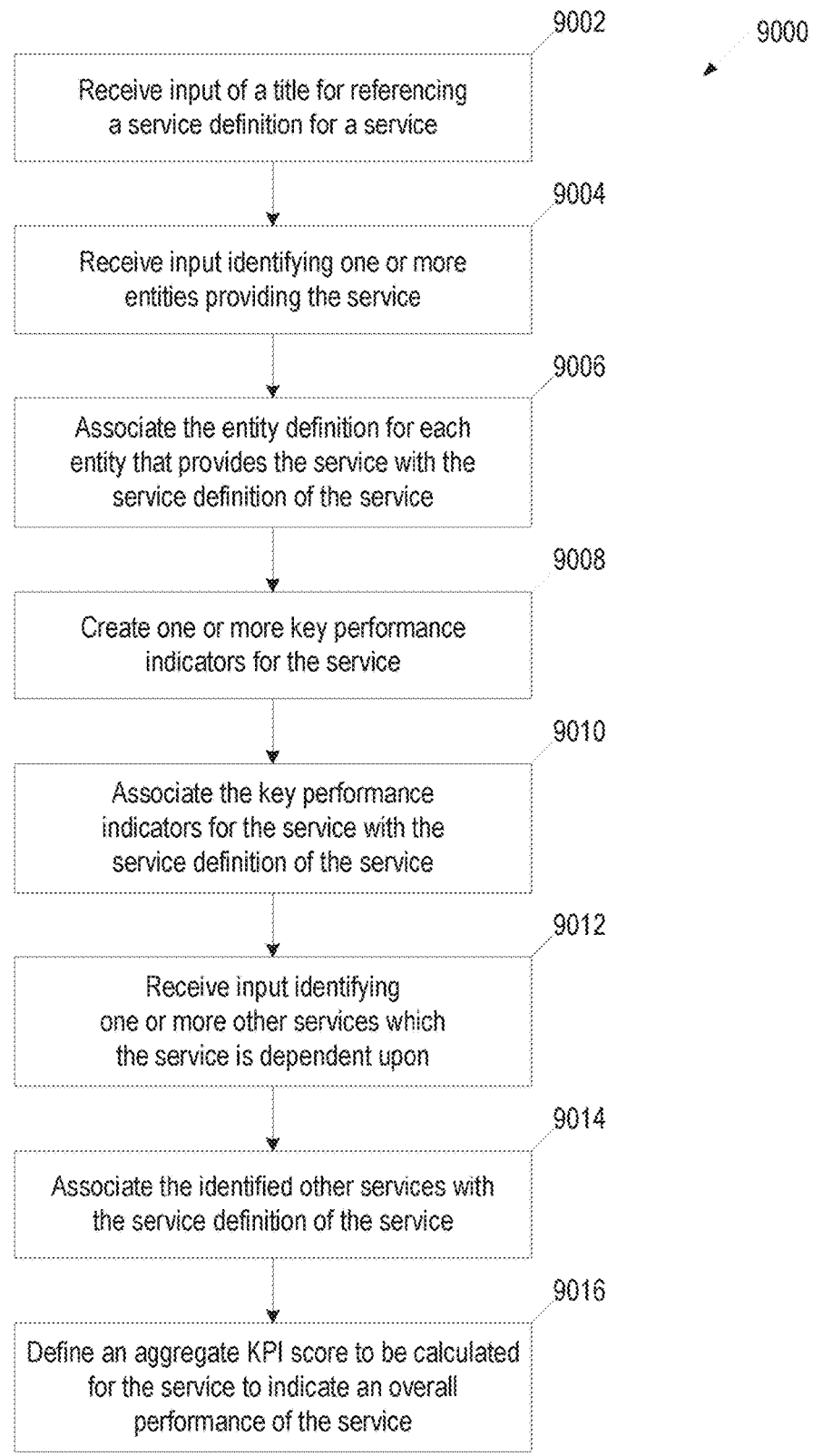
FIG. 61 is a flow diagram of an implementation of a method for creating a service definition for a service, in accordance with one or more implementations of the present disclosure.

FIG. 61 is a flow diagram of an implementation of a method 9000 for creating a service definition for a service, in accordance with one or more implementations of the present disclosure. The method may be performed by processing logic that may comprise hardware (circuitry, dedicated logic, etc.), software (such as is run on a general purpose computer system or a dedicated machine), or a combination of both. In one implementation, at least a portion of method is performed by a client computing machine. In another implementation, at least a portion of method is performed by a server computing machine.

At block 9002, the computing machine receives input of a title for referencing a service definition for a service. At block 9004, the computing machine receives input identifying one or more entities providing the service and associates the identified entities with the service definition of the service at block 9006.

At block 9008, the computing machine creates one or more key performance indicators for the service and associates the key performance indicators with the service definition of the service at block 9010.

At block 9012, the computing machine receives input identifying one or more other services which the service is dependent upon and associates the identified other services with the service definition of the service at block 9014. The computing machine can include an indication in the service definition that the service is dependent on another service for which a service definition has been created.

At block 9016, the computing machine can optionally define an aggregate KPI score to be calculated for the service to indicate an overall performance of the service. The score can be a value for an aggregate of the KPIs for the service. The aggregate KPI score can be periodically calculated for continuous monitoring of the service. For example, the aggregate KPI score for a service can be updated in real-time (continuously updated until interrupted). In one implementation, the aggregate KPI score for a service is updated periodically (e.g., every second).

7.0. COMPUTING SYSTEM ARCHITECTURE

Figure 62:
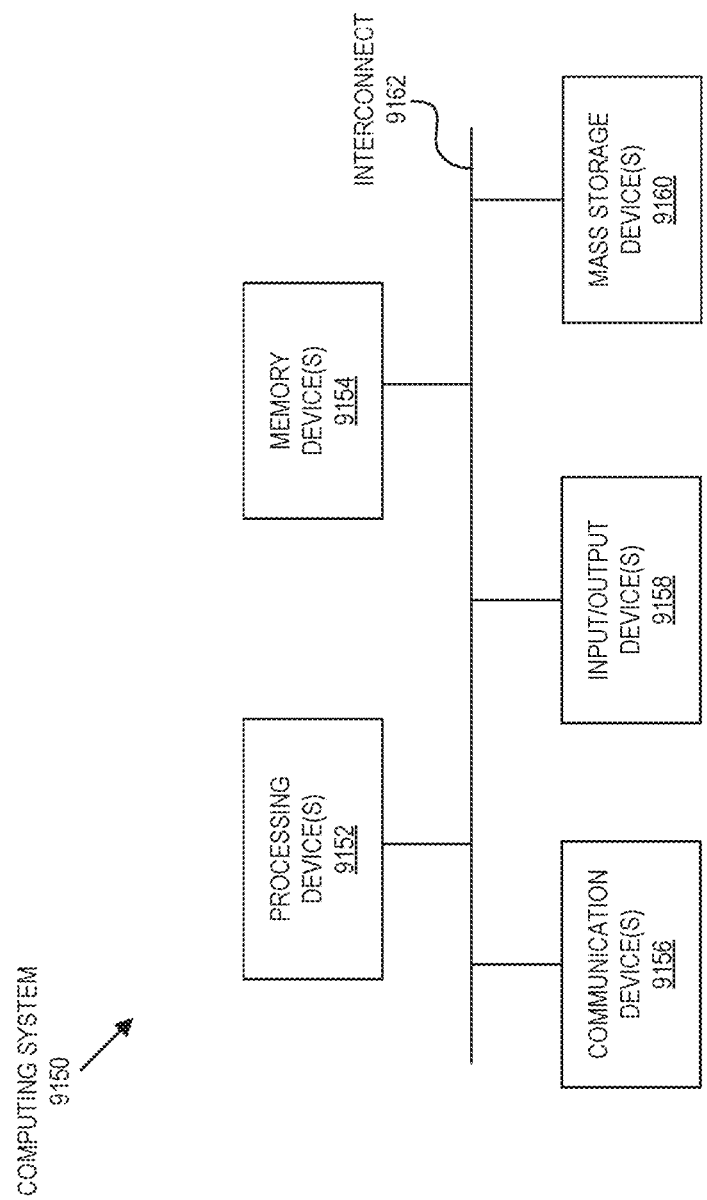
FIG. 62 is a block diagram illustrating a high-level example of a hardware architecture of a computing system in which an embodiment may be implemented.

FIG. 62 is a block diagram illustrating a high-level example of a hardware architecture of a computing system in which an embodiment may be implemented. For example, the hardware architecture of a computing system 9150 can be used to implement any one or more of the functional components described herein (e.g., metrics ingestion component 202, metrics catalog and search component 204, metrics analysis component 206, metrics sharing component 208, or metrics store component 210). The computing system 9150 can also be used to implement any of a forwarder, indexer, search head, data store, or a computing resource. In some embodiments, one or multiple instances of the computing system 9150 can be used to implement the technologies described herein, where multiple such instances can be coupled to each other via one or more networks.

The processes and logic flows described in this specification can be performed by one or more programmable processors executing one or more computer programs to perform functions by operating on input data and generating output. For example, the computing system 9150 includes one or more processing devices 9152, one or more memory devices 9154, one or more communication devices 9156, one or more input/output (I/O) devices 9158, and one or more mass storage devices 9160, all coupled to each other through an interconnect 9162.

The interconnect 9162 may be or include one or more conductive traces, buses, point-to-point connections, controllers, adapters, and/or other conventional connection devices. Each of the processing devices 9152 controls, at least in part, the overall operation of the processing of the computing system 9150 and can be or include, for example, one or more general-purpose programmable microprocessors, digital signal processors (DSPs), mobile application processors, microcontrollers, special purpose logic circuitry, e.g., a field programmable gate array (FPGA) or an application specific integrated circuit (ASIC), or the like, or a combination of such devices.

Each of the memory devices 9154 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 9160 can be or include one or more hard drives, digital versatile disks (DVDs), flash memories, or the like. Each memory device 9154 and/or mass storage device 9160 can store (individually or collectively) data and instructions that configure the processing device(s) 9152 to execute operations to implement the techniques described above.

Processors suitable for the execution of a computer program include, by way of example, both general and special purpose microprocessors, and any one or more processors of any kind of digital computer (e.g., processing devices 452). Generally, a processor will receive instructions and data from a read-only memory or a random access memory or both. The essential elements of a computer are a processor for performing instructions and one or more memory devices for storing instructions and data. Generally, the computer system 9150 will also include, or be operatively coupled to receive data from or transfer data to, or both, one or more mass storage devices for storing data, e.g., magnetic, magneto optical disks, or optical disks. However, a computer need not have such devices.

Each communication device 9156 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing devices 9152, each I/O device 9158 can be or include a device such as a display (which may be a touch screen display), audio speaker, keyboard, mouse or other pointing device, microphone, camera, etc. Note, however, that such I/O devices 9158 may be unnecessary if the processing device 9152 is embodied solely as a server computer.

The computing system 9150 can include clients or servers. A client and server are generally remote from each other and typically interact through a communication network. The relationship of client and server arises by virtue of computer programs running on the respective computers and having a client-server relationship to each other. In the case of a client device, the communication devices(s) 9156 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 9156 can be or include, for example, any of the aforementioned types of communication devices, a wired Ethernet adapter, cable modem, DSL modem, or the like, or a combination of such devices.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

A software program or algorithm, when referred to as "implemented in a computer-readable storage medium," includes computer-readable instructions stored in a memory device (e.g., memory device(s) 454). A processor (e.g., processing device(s) 452) is "configured to execute a software program" when at least one value associated with the software program is stored in a register that is readable by the processor. In some embodiments, routines executed to implement the disclosed techniques may be implemented as part of OS software (e.g., MICROSOFT WINDOWS® or LINUX®) or a specific software application, algorithm component, program, object, module, or sequence of instructions referred to as "computer programs."

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a data store management system, an operating system, or a combination of one or more of them, a propagated signal is an artificially generated signal, e.g., a machine generated electrical, optical, or electromagnetic signal, that is generated to encode information for transmission to suitable receiver apparatus.

A computer program (also known as a program, software, software application, script, or code) typically includes one or more instructions set at various times in various memory devices of a computing device, which, when read and executed by at least one processor (e.g., processing device(s) 9152), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 9154).

A computer program can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The computer system 9150 can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor (e.g., processing devices 452) and the memory (e.g., memory device 9154) can be supplemented by, or incorporated in, special purpose logic circuitry.

To provide for interaction with a user, architecture provider or reviewer, embodiments of the subject matter described in this specification can be implemented with a display device of the I/O devices 9158, e.g., a CRT (cathode ray tube) to LCD (liquid crystal display) monitor, for displaying information to the user and a keyboard and a pointing device, e.g., a mouse or a trackball, by which the user can provide input to the computer. Other kinds of I/O devices 9158 can be used to provide for interaction with a user, architecture provider or reviewer as well; for example, feedback provided to the user can be any form of sensory feedback, e.g., visual feedback, auditory feedback, or tactile feedback; and input from the user, architecture provider or reviewer can be received in any from, including acoustic, speech, or tactile input.

In some embodiments, the computing system 9150 can include a back end component (not shown), e.g., as a data server, or that includes a middleware component, e.g., an application server, or that includes a front end component, e.g., a client computer having a graphical user interface (e.g., metrics-aware UI) or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

8.0. TERMINOLOGY

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

All of the processes and steps described above as may be performed and fully automated by a computer system. The computer system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various identification and marketing service functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Systems and modules described herein may comprise software, firmware, hardware, or any combinations of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Similarly, various components of the illustrated systems can be implemented in other virtualization constructs, such as one or more containers (operating-system-level virtualizations) within a containerization framework like Docker by Docker, Inc., perhaps facilitated with a container orchestration facility like the open source Kubernetes, both widely known. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed:

1. A method, comprising:
receiving an indication of a first user input identifying a performance metric;
causing concurrent display, via a user interface, of:
a plurality of tiles, wherein each tile of the plurality of tiles corresponds to a respective entity of a plurality of entities and is associated with the performance metric identified via the first user input, and wherein each tile of the plurality of tiles has a respective visual status based on a first threshold value and a respective performance metric value for the performance metric identified via the first user input, the respective performance metric value associated with the respective entity, and
a display object for adjusting the first threshold value;
receiving, via the display object, an indication of a second user input to adjust the first threshold value to a second threshold value; and
in response to the second user input, dynamically updating the respective visual status of each tile of the plurality of tiles based on the second threshold value and the respective performance metric value, wherein the updated respective visual status of each tile of the plurality of tiles has one of a plurality of states, wherein a first state of the plurality of states indicates that the respective performance metric value satisfies the second threshold value and a second state of the plurality of states indicates that the respective performance metric value does not satisfy the second threshold value.

2. The method of claim 1, wherein each tile of the plurality of tiles displays the respective performance metric value.

3. The method of claim 1, wherein the first state is visually distinct from the second state.

4. The method of claim 1, wherein the display object comprises a slider for adjusting the first threshold value.

5. The method of claim 1, wherein the display object comprises a threshold value field for adjusting the first threshold value.

6. The method of claim 1 further comprising receiving an indication of a third user input identifying one or more metadata factors associated with the performance metric.

7. The method of claim 1, wherein the user interface enables a user to indicate one or more metadata factors associated with the performance metric, the method further comprising receiving an indication of a third user input identifying the one or more metadata factors.

8. The method of claim 1 further comprising:
receiving a search request message;
executing a search query based on the search request message; and
producing search results based on the search query.

9. The method of claim 1 further comprising:
receiving a search request message;
executing a search query based on the search request message;
producing search results based on the search query;
receiving an indication of a third user input identifying one or more metadata factors associated with the performance metric; and
filtering the search results responsive to the one or more metadata factors.

10. The method of claim 1 further comprising:
obtaining search results;
receiving an indication of a third user input identifying one or more metadata factors associated with the performance metric; and
filtering the search results responsive to the one or more metadata factors.

11. The method of claim 1 further comprising:
obtaining search results;
receiving an indication of a third user input identifying one or more metadata factors associated with the performance metric; and
filtering the search results responsive to the one or more metadata factors, wherein causing concurrent display of the plurality of tiles and the display object comprises causing display of the plurality of tiles and the display object enabling a user to identify the one or more metadata factors.

12. The method of claim 1 further comprising receiving an indication of a third user input identifying one or more metadata factors associated with the performance metric, wherein the one or more metadata factors comprise one or more of an environment of an entity of the plurality of entities, a physical location of an entity of the plurality of entities, an owner of an entity of the plurality of entities, or an escalation priority of an entity of the plurality of entities.

13. The method of claim 1 further comprising receiving an indication of a third user input identifying one or more metadata factors associated with the performance metric, wherein the one or more metadata factors correspond to metadata information representing at least one of an operating system of an entity of the plurality of entities, a version of the operating system, or a system IP address of an entity of the plurality of entities.

14. The method of claim 1, wherein the performance metric comprises one or more of a CPU-related performance metric, a disk free-related performance metric, a disk-related performance metric, an interface-related performance metric, a load-related performance metric, or a memory-related performance metric.

15. The method of claim 1 further comprising receiving performance metric data for the plurality of entities, wherein the performance metric data comprises performance metric values for the performance metric for the plurality of entities, wherein the performance metric values comprise the respective performance metric value for each tile of the plurality of tiles.

16. The method of claim 1 further comprising receiving performance metric data for the plurality of entities, wherein the performance metric data comprises performance metric values for a plurality of performance metrics, the plurality of performance metrics comprising the performance metric, wherein the performance metric values comprise the respective performance metric value for each tile of the plurality of tiles.

17. The method of claim 1, wherein the performance metric comprises a first performance metric, the method further comprising receiving an indication of a third user input identifying a second performance metric.

18. The method of claim 1, wherein the performance metric comprises a first performance metric, the method further comprising:
receiving an indication of a third user input identifying a second performance metric; and
updating the respective visual status of each tile of the plurality of tiles based on the second performance metric.

19. A system comprising:
a memory containing computer-executable instructions; and
a processing device configured to execute the computer-executable instructions to cause the system to:
receive an indication of a first user input identifying a performance metric;
cause concurrent display, via a user interface, of:
a plurality of tiles, wherein each tile of the plurality of tiles corresponds to a respective entity of a plurality of entities and is associated with the performance metric identified via the first user input, and wherein each tile of the plurality of tiles has a respective visual status based on a first threshold value and a respective performance metric value for the performance metric identified via the first user input, the respective performance metric value associated with the respective entity, and
a display object for adjusting the first threshold value;
receive, via the display object, an indication of a second user input to adjust the first threshold value to a second threshold value; and
in response to the second user input, dynamically update the respective visual status of each tile of the plurality of tiles based on the second threshold value and the respective performance metric value, wherein the updated respective visual status of each tile of the plurality of tiles has one of a plurality of states, wherein a first state of the plurality of states indicates that the respective performance metric value satisfies the second threshold value and a second state of the plurality of states indicates that the respective performance metric value does not satisfy the second threshold value.

20. A non-transitory computer readable storage media comprising computer-executable instructions that, when executed by a computing system, cause the computing system to:
receive an indication of a first user input identifying a performance metric;
cause concurrent display, via a user interface, of:
a plurality of tiles, wherein each tile of the plurality of tiles corresponds to a respective entity of a plurality of entities and is associated with the performance metric identified via the first user input, and wherein each tile of the plurality of tiles has a respective visual status based on a first threshold value and a respective performance metric value for the performance metric identified via the first user input, the respective performance metric value associated with the respective entity, and
a display object for adjusting the first threshold value;
receive, via the display object, an indication of a second user input to adjust the first threshold value to a second threshold value; and
in response to the second user input, dynamically update the respective visual status of each tile of the plurality of tiles based on the second threshold value and the respective performance metric value, wherein the updated respective visual status of each tile of the plurality of tiles has one of a plurality of states, wherein a first state of the plurality of states indicates that the respective performance metric value satisfies the second threshold value and a second state of the plurality of states indicates that the respective performance metric value does not satisfy the second threshold value.

* * * * *